United States Patent
Im et al.

(10) Patent No.: US 10,445,055 B2
(45) Date of Patent: Oct. 15, 2019

(54) MOBILE TERMINAL, AUDIO OUTPUT DEVICE AND AUDIO OUTPUT SYSTEM COMPRISING SAME

(71) Applicant: LG ELECTRONICS INC., Seoul (KR)

(72) Inventors: Yoonju Im, Seoul (KR); Jaeyoung Han, Seoul (KR); Sungmin Sohn, Seoul (KR); Jooyoung Lee, Seoul (KR); Byunghoon Min, Seoul (KR); Jongmyeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/539,569

(22) PCT Filed: Dec. 4, 2015

(86) PCT No.: PCT/KR2015/013216
§ 371 (c)(1),
(2) Date: Jun. 23, 2017

(87) PCT Pub. No.: WO2016/104988
PCT Pub. Date: Jun. 30, 2016

(65) Prior Publication Data
US 2017/0357477 A1    Dec. 14, 2017

(30) Foreign Application Priority Data

Dec. 23, 2014  (KR) .......................... 10-2014-0187335
Dec. 23, 2014  (KR) .......................... 10-2014-0187337

(51) Int. Cl.
*G06F 3/16*     (2006.01)
*G06F 3/01*     (2006.01)
(Continued)

(52) U.S. Cl.
CPC ............. *G06F 3/165* (2013.01); *G06F 3/017* (2013.01); *G06F 3/0487* (2013.01);
(Continued)

(58) Field of Classification Search
CPC ............. H04W 4/80; H04W 12/00508; H04R 2420/07; H04R 2430/01; H04M 1/72558;
(Continued)

(56) References Cited

U.S. PATENT DOCUMENTS

2003/0012168 A1*  1/2003  Elson ..................... G01D 9/005
                                                                370/338
2006/0188116 A1*  8/2006  Frerking ............. H04M 1/6066
                                                                381/315
(Continued)

FOREIGN PATENT DOCUMENTS

KR  10-2011-0121675 A   11/2011
KR  10-2012-0128017 A   11/2012
(Continued)

*Primary Examiner* — Andrew C Flanders
(74) *Attorney, Agent, or Firm* — Birch, Stewart, Kolasch & Birch, LLP

(57) ABSTRACT

The present invention relates to a mobile terminal, an audio output device and an audio output system comprising the same. The mobile terminal according to an embodiment of the present invention comprises: a memory for storing audio data; a communication unit for receiving a repetitive radio signal from the audio output device; and a control unit controlling the audio data such that the audio data is transmitted to the audio output device in a wireless manner when the strength or the level of the repetitive radio signal is a first predetermined value or more, while reproducing the audio data, wherein the communication unit comprises a first communication module for receiving the repetitive radio signal and a second communication module for outputting the audio data to the audio output device. Therefore, the (Continued)

audio output device can output a sound of the audio data reproduced by the mobile terminal.

15 Claims, 142 Drawing Sheets

(51) Int. Cl.
    *G06F 3/0487*     (2013.01)
    *H04W 4/80*     (2018.01)
    *H04W 76/10*     (2018.01)
    *H04B 5/00*     (2006.01)
    *H04M 1/725*     (2006.01)
    *H04N 21/439*     (2011.01)
    *H04R 3/12*     (2006.01)
    *H04W 88/06*     (2009.01)

(52) U.S. Cl.
    CPC ...... *H04B 5/0031* (2013.01); *H04M 1/72558* (2013.01); *H04N 21/439* (2013.01); *H04R 3/12* (2013.01); *H04W 4/80* (2018.02); *H04W 76/10* (2018.02); *H04M 1/7253* (2013.01); *H04R 2420/07* (2013.01); *H04R 2430/01* (2013.01); *H04W 88/06* (2013.01)

(58) Field of Classification Search
    CPC .... H04M 1/7253; H04M 15/93; H04H 20/47; H04H 20/88; H04H 20/89; H04H 20/95; H04N 21/43637; G06F 1/1694; G06F 3/017; G06F 3/0487
    See application file for complete search history.

(56) References Cited

U.S. PATENT DOCUMENTS

| | | | |
|---|---|---|---|
| 2006/0205349 A1* | 9/2006 | Passier | H04R 27/00 455/41.2 |
| 2007/0087686 A1* | 4/2007 | Holm | H04S 7/30 455/3.06 |
| 2008/0077261 A1* | 3/2008 | Baudino | H04H 20/63 700/94 |
| 2012/0300962 A1 | 11/2012 | Devoto | |
| 2014/0267002 A1* | 9/2014 | Luna | H04M 1/7253 345/156 |
| 2014/0334636 A1* | 11/2014 | Park | H04R 3/00 381/77 |
| 2014/0369170 A1* | 12/2014 | Inha | H04M 1/7253 367/140 |
| 2014/0376737 A1* | 12/2014 | Goldman | H04M 1/6066 381/80 |
| 2015/0189426 A1* | 7/2015 | Pang | H04M 1/21 381/77 |
| 2015/0319288 A1* | 11/2015 | Kahn | H04W 4/21 455/41.2 |
| 2015/0351143 A1* | 12/2015 | Seymour | H04M 1/72519 455/41.2 |
| 2016/0071409 A1* | 3/2016 | Suomela | H04R 1/1041 340/12.5 |
| 2016/0165381 A1* | 6/2016 | Kapoor | H04M 1/7253 709/227 |

FOREIGN PATENT DOCUMENTS

| | | |
|---|---|---|
| KR | 10-2013-0093915 A | 8/2013 |
| WO | WO 2013/002558 A2 | 1/2013 |

* cited by examiner

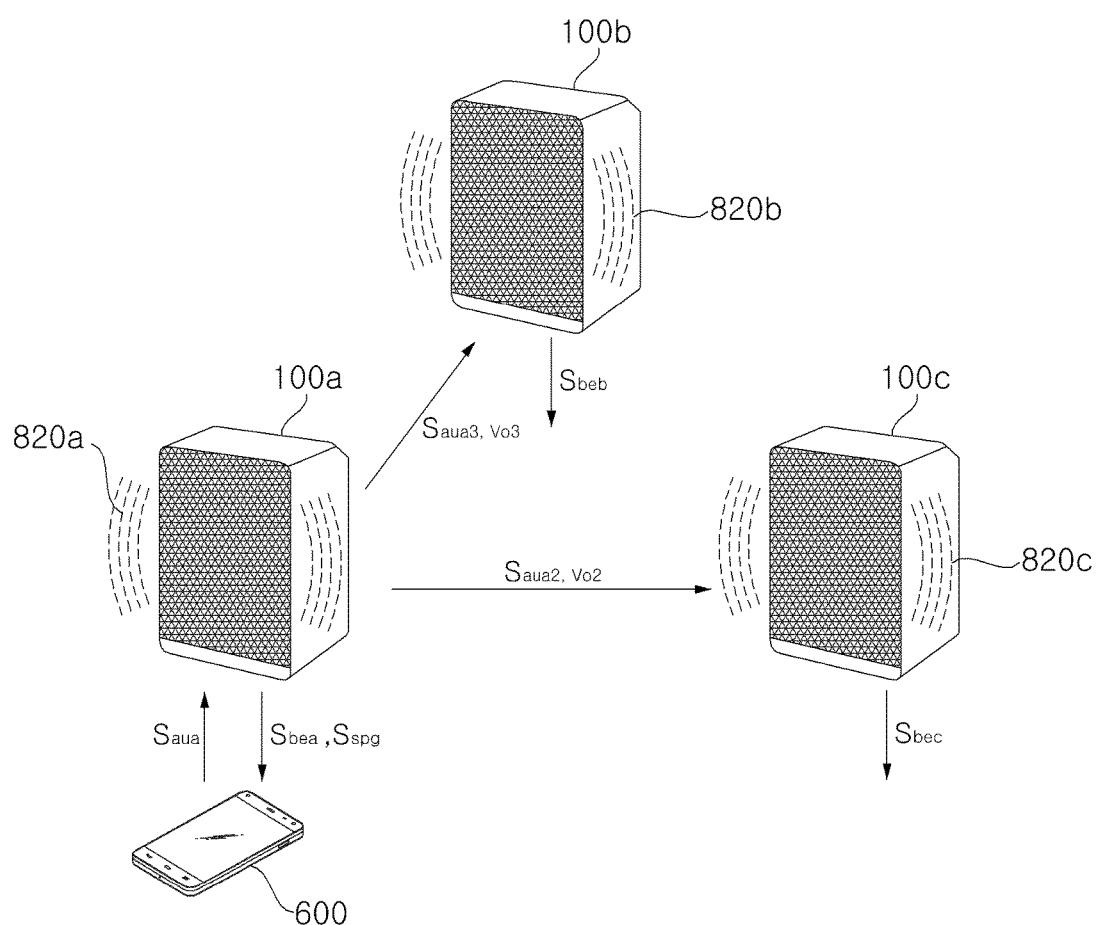

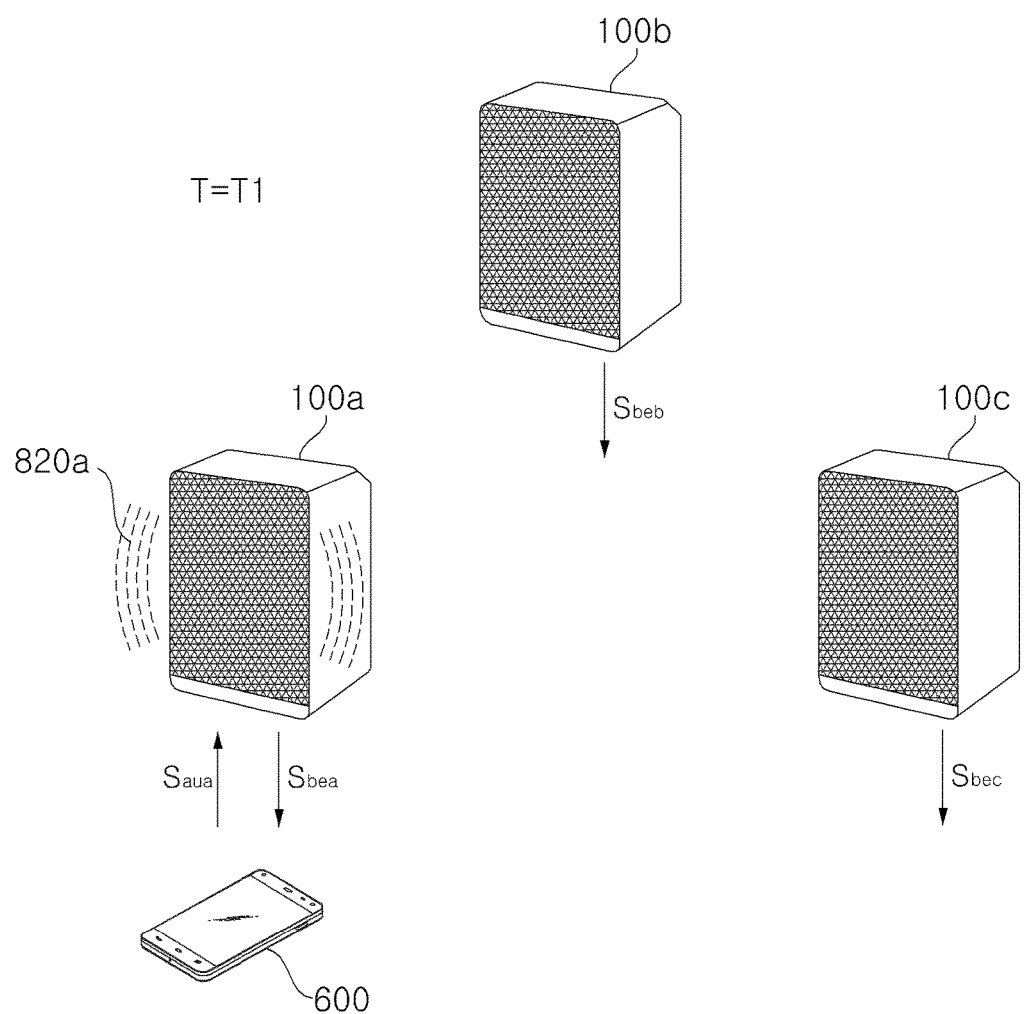

T=Ta

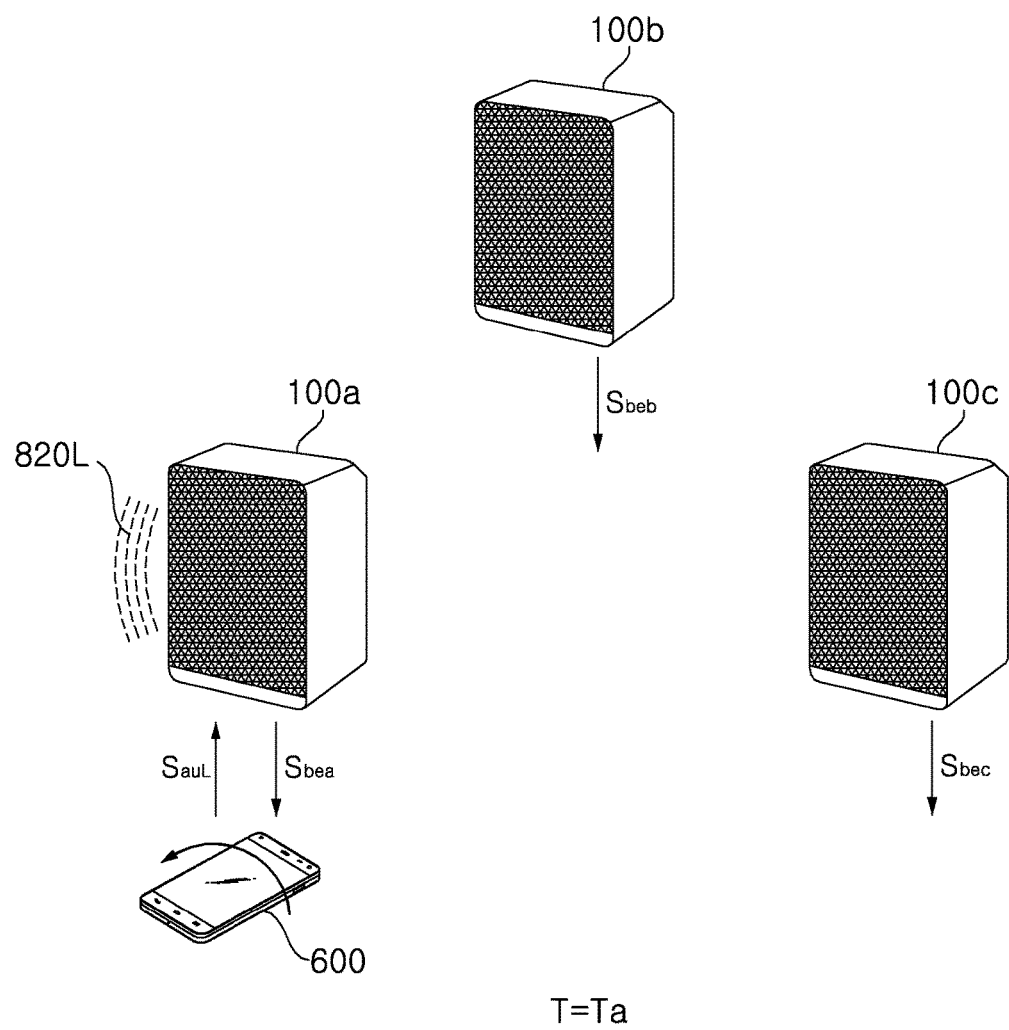

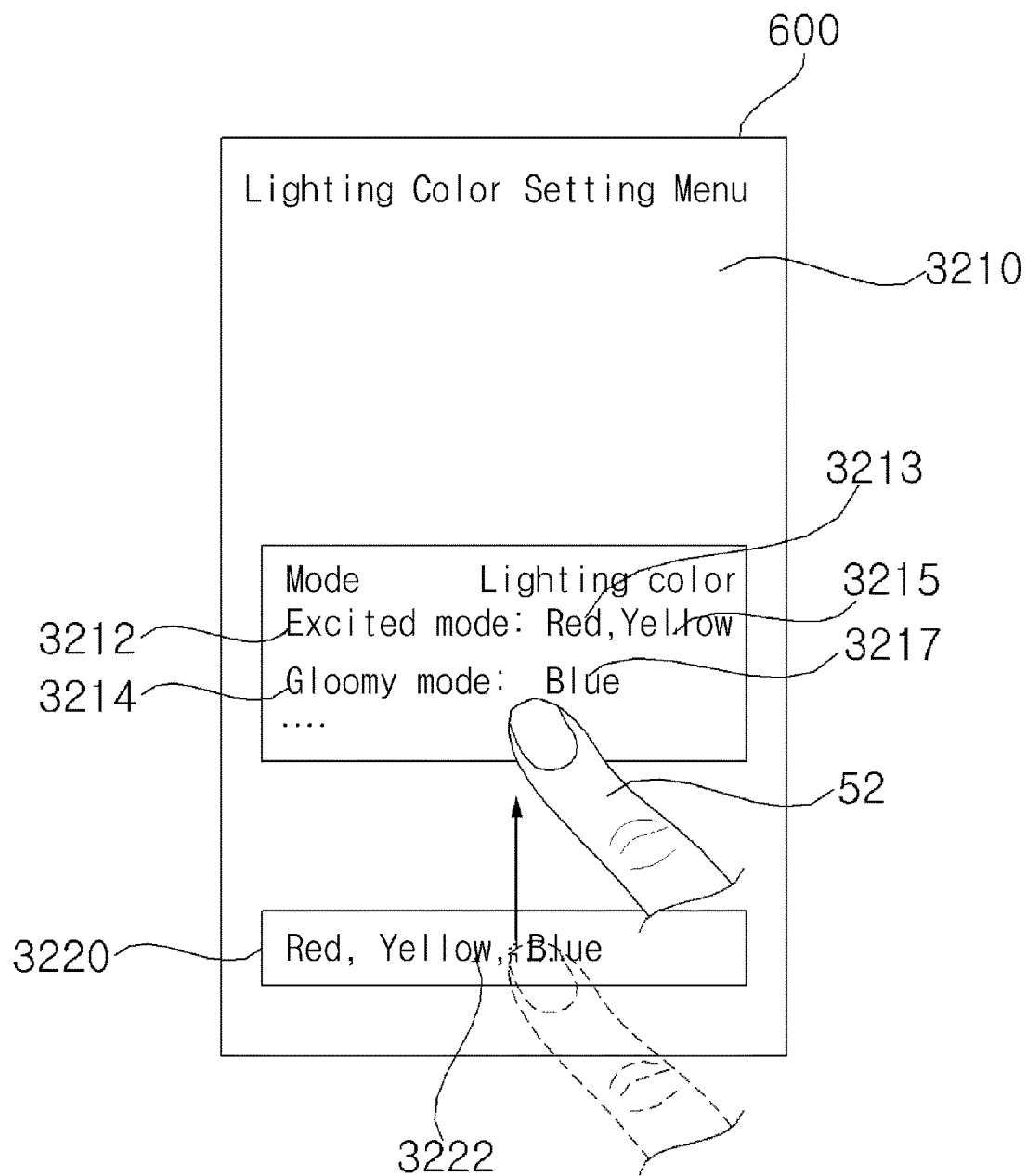

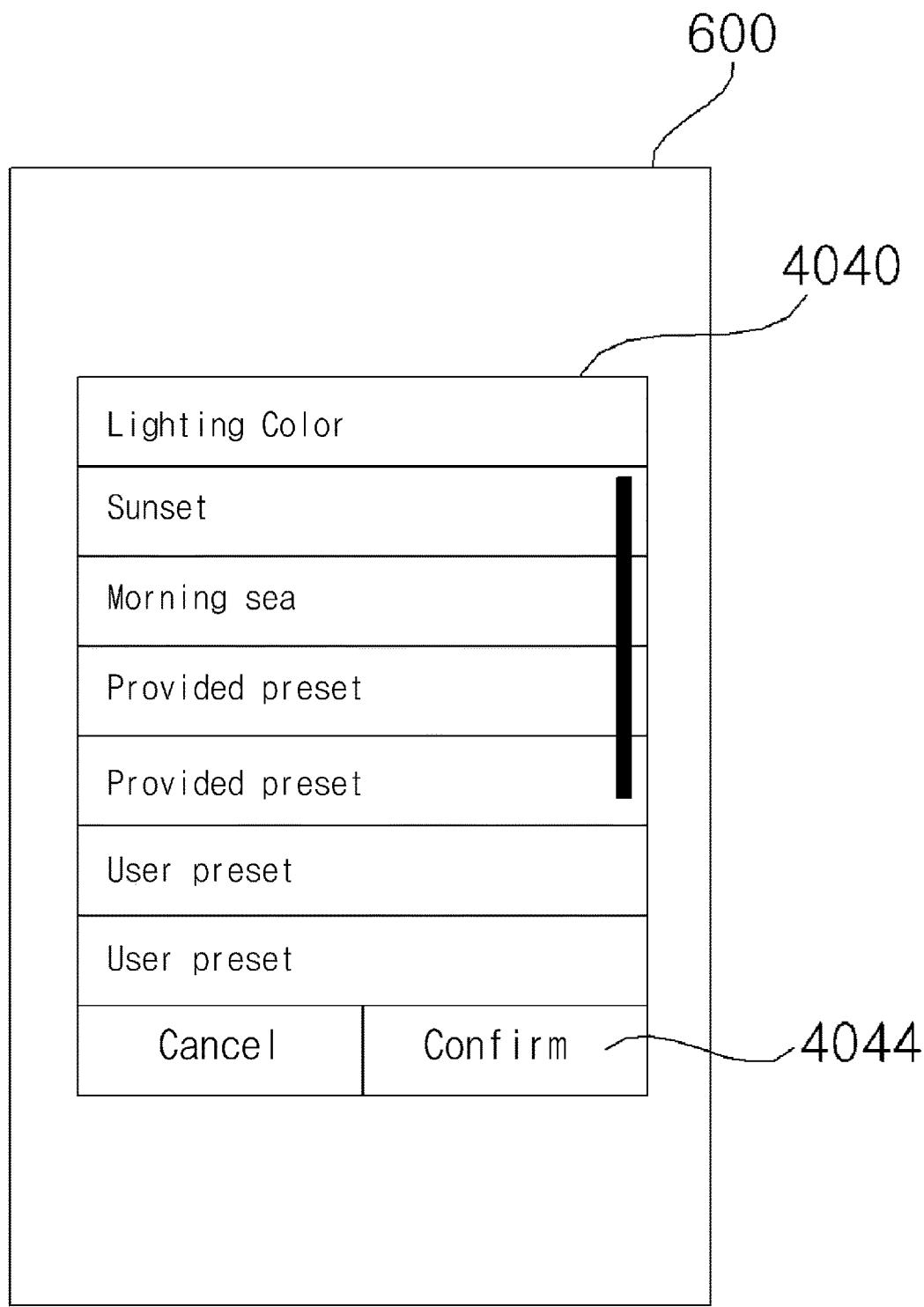

MOBILE TERMINAL, AUDIO OUTPUT DEVICE AND AUDIO OUTPUT SYSTEM COMPRISING SAME

CROSS REFERENCE TO RELATED APPLICATIONS

This application is the National Phase of PCT International Application No. PCT/KR2015/013216, filed on Dec. 4, 2015, which claims priority under 35 U.S.C. 119(a) to Patent Application No. 10-2014-0187335, filed in Republic of Korea on Dec. 23, 2014, and to Patent Application No. 10-2014-0187337, filed in Republic of Korea on Dec. 23, 2014, all of which are hereby expressly incorporated by reference into the present application.

TECHNICAL FIELD

The present invention relates to a mobile terminal, an audio output device, and an audio output system including the same, and more particularly, to a mobile terminal for outputting, from an audio output device, sound of audio data reproduced by the mobile terminal, an audio output device, and an audio output system including the same.

BACKGROUND ART

Various services are provided through the mobile terminal. Particularly, when an audio file is reproduced through the mobile terminal, the user can appreciate for the sound of the audio file.

An audio output unit mounted on the mobile terminal is disadvantageous in that the sound field is deteriorated due to the size of the mobile terminal.

In recent years, a variety of techniques have been developed to overcome the aforementioned issue, but there is still a tendency to use earphones or headphones to listen to music through a mobile terminal.

DISCLOSURE

Technical Problem

It is an object of the present invention to provide a mobile terminal for outputting, from an audio output device, sound of audio data reproduced by the mobile terminal, and an audio output system including the same.

It is another object of the present invention to provide an audio output device for outputting sound of audio data reproduced by a mobile terminal.

Technical Solution

In accordance with an aspect of the present invention, the above and other objects can be accomplished by the provision of a mobile terminal including a memory to store audio data, a communication unit to receive a repeated wireless signal from an audio output device, and a controller to wirelessly transmit the audio data to the audio output device when a strength or level of the repeated wireless signal is greater than or equal to a first predetermined value, wherein the communication unit includes a first communication module to receive the repeated wireless signal, and a second communication module to output the audio data to the audio output device.

In accordance with another aspect of the present invention, there is provided an audio output system including a mobile terminal to receive a repeated wireless signal and to wirelessly transmit audio data to the audio output device during reproduction of the audio data when a strength or level of the repeated wireless signal is greater than or equal to a first predetermined value, and an audio output device to output the repeated wireless signal and to output, when receiving audio data from the mobile terminal, sound corresponding to the received audio data, wherein the mobile terminal includes a first communication module to receive the repeated wireless signal, and a second communication module to output the audio data to the audio output device.

In accordance with another aspect of the present invention, there is provided an audio output device including an audio output unit, a communication unit to output a repeated wireless signal to an outside and to receive audio data from a mobile terminal, and a controller to control sound corresponding to the received audio data to be output through the audio output unit, wherein the communication unit includes a first communication module to transmit the repeated wireless signal to an outside, and a second communication module to receive audio data from the mobile terminal.

Advantageous Effects

According to an embodiment of the present invention, a mobile terminal includes a memory to store audio data, a communication unit to receive a repeated wireless signal from the audio output device, and a controller to wirelessly transmit the audio data to the audio output device when the strength or level of the repeated wireless signal is greater than or equal to a first predetermined value, wherein the communication unit includes a first communication module to receive the repeated wireless signal, and a second communication module to output the audio data to the audio output device. Thereby, the sound of the audio data reproduced by the mobile terminal may be output from the audio output device.

The mobile terminal may adjust the volume of the transmitted audio data and control the volume of the audio data based on the strength or level of the repeated wireless signal, thereby controlling the volume-adjusted sound to be output from the audio output device.

Further, the mobile terminal may perform different channel settings for a plurality of audio output devices and transmit audio data of a corresponding channel, thereby increasing user convenience.

According to another embodiment of the present invention, there is provided an audio output device including an audio output unit, a communication unit to output a repeated wireless signal to the outside and to receive audio data from a mobile terminal, a controller to control sound corresponding to the received audio data to be output through the audio output unit, wherein the communication unit includes a first communication module to transmit the repeated wireless signal to the outside and a second communication module to receive audio data from the mobile terminal. Thereby, the sound for the audio data reproduced in the mobile terminal may be output from the audio output device, and the sound volume may be adjusted based on the level of the audio data. Accordingly, user convenience may be enhanced.

In addition, based on the group information on a plurality of audio output devices, the corresponding audio data and the volume value information may be transmitted to neighboring audio output devices such that the same sound can be output.

Further, channel setting for neighboring audio output devices may be performed based on the group information on a plurality of audio output devices. Thereby, the plurality of audio output devices may output sound for each channel.

BEST MODE

Hereinafter, the present invention will be described in detail with reference to the drawings.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
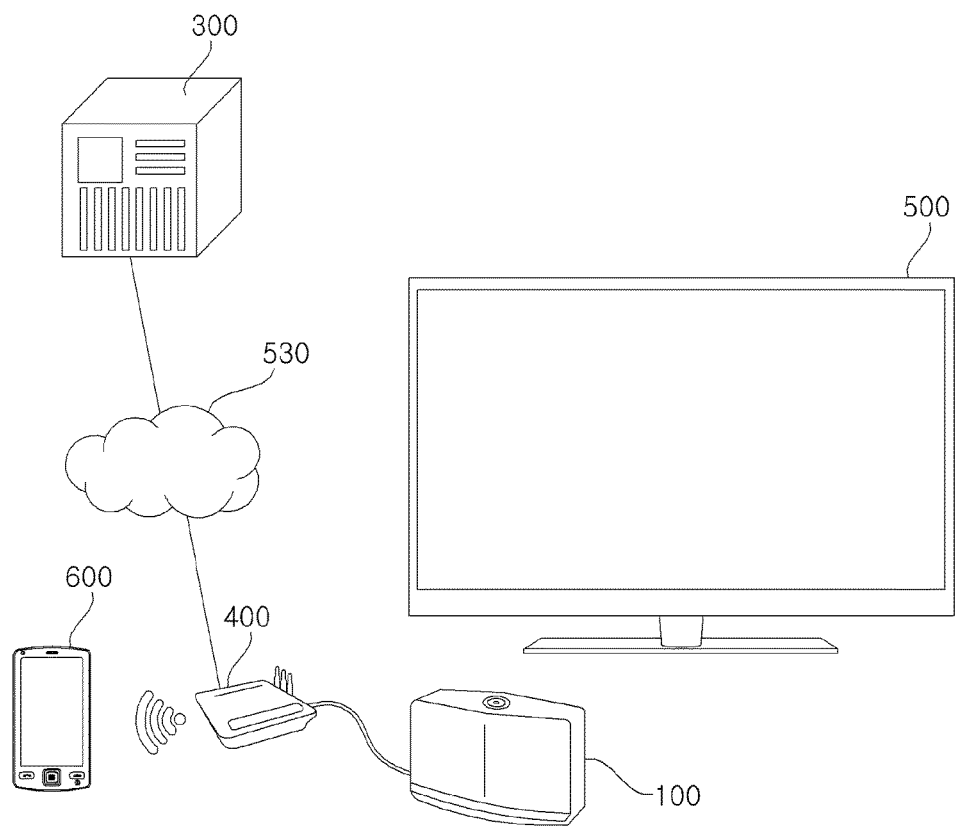
FIG. 1 is a configuration diagram illustrating an audio output system according to an embodiment of the present invention.

FIG. 1 is a configuration diagram illustrating an audio output system according to an embodiment of the present invention.

Referring to the figure, an audio output system 10 according to an embodiment of the present invention may include an audio output device 100, an AP device 400, and a mobile terminal 600.

The audio output system 10 may further include an image display device 500 and a server 300.

The audio output device 100 may transmit a repeated wireless signal to the outside, receive audio data from the mobile terminal that receives the repeated wireless signal, and output sound corresponding to the received audio data.

The repeated wireless signal may be a wireless signal based on BLE (BLUETOOTH LOW ENERGY).

The audio data may be received using a communication scheme other than BLE. For example, the audio data may be received using a communication scheme such as Wi-Fi, Wi-Fi Direct, or DLNA.

The audio output device 100 may be connected to the AP device 400 in a wired or wireless manner. The audio output device 100 may exchange data with the server 300 through the AP device 400 over the network 530.

The audio output device 100 may store information on the output audio data. In particular, the audio output device 100 may store a list of music files reproduced and output. Then, at least a part of the music file list may be transmitted to the server 300.

Meanwhile, the audio output device 100 may be connected to the video display device 500 such as a TV in wired or wireless manner, and may output sound corresponding to the audio data received from the video display device 500.

The server 300 may store at least a part of the music file list. Then, the server 300 may classify the received music file list by mood. and the server 300 may transmit the mood information on the music files to the audio output device 100.

The mobile terminal 600 receives a repeated wireless signal from the audio output device 100 and wirelessly transmits the audio data to the audio output device 100 if the strength or level of the repeated wireless signal is greater than or equal to a first predetermined value.

Particularly, during audio reproduction, audio data may be wirelessly transmitted to the audio output device 100 if the strength or level of the repeated wireless signal received is greater than or equal to the first predetermined value.

At this time, while audio reproduction is maintained by the mobile terminal 600, the audio data to be reproduced may be output to the outside through the second communication module 615b instead of the sound output unit 653 in the mobile terminal 600.

For example, the mobile terminal 600 may receive a repeated beacon signal of the BLE scheme from the audio output device 100, and wirelessly transmit the audio data being reproduced to the audio output device 100 if the received signal strength indicator (RSSI) of the beacon signal is greater than or equal to the first predetermined value.

The beacon signal may include device information on the audio output device. Alternatively, the device information may be transmitted to the outside together with the beacon signal.

Accordingly, the mobile terminal 600 may transmit the audio data being reproduced to the audio output device 100 corresponding to the device information.

Figure 2:
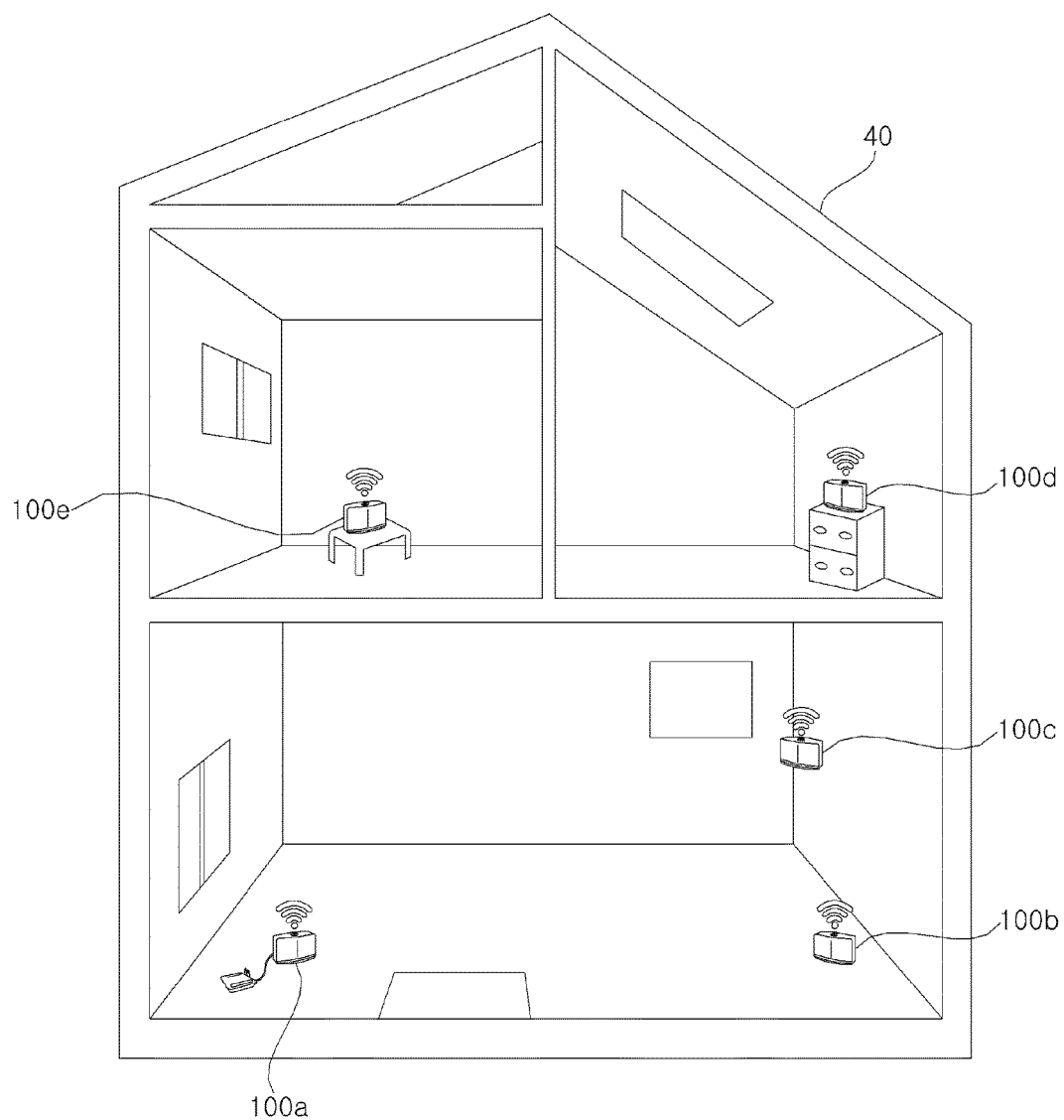
FIG. 2 illustrates an example of deployment of the audio output device of FIG. 1.

FIG. 2 illustrates an example of deployment of the audio output device of FIG. 1.

Referring to the figure, a plurality of audio output devices 100a, 100b, 100c, 100d, and 100e may be disposed in a building 40.

In particular, the plurality of audio output devices 100a, 100b, 100c, 100d, and 100e may be disposed on the same network by the AP device 400 in FIG. 1. The plurality of audio output devices 100a, 100b, 100c, 100d, and 100e may exchange data.

For example, if the distance from the first audio output device 100a is shortened and thus the RSSI of the beacon signal from the first audio output device 100a becomes greater than or equal to the first predetermined value while the mobile terminal 600 reproduces and outputs music, the mobile terminal 600 may wirelessly transmit the audio data to the first audio output device 100a. Thereby, the sound corresponding to the audio data may be output from the first audio output device 100a.

Thereafter, if the distance between the mobile terminal 600 and the second audio output device 100b is shortened and thus the RSSI of the beacon signal from the second audio output device 100b is greater than or equal to the first predetermined value, the mobile terminal 600 may wirelessly transmit the audio data to the second audio output device 100b. Thus, the sound corresponding to the audio data may be output from the second audio output device 100b. Thereby, seamless sound output may be provided.

Figure 3:
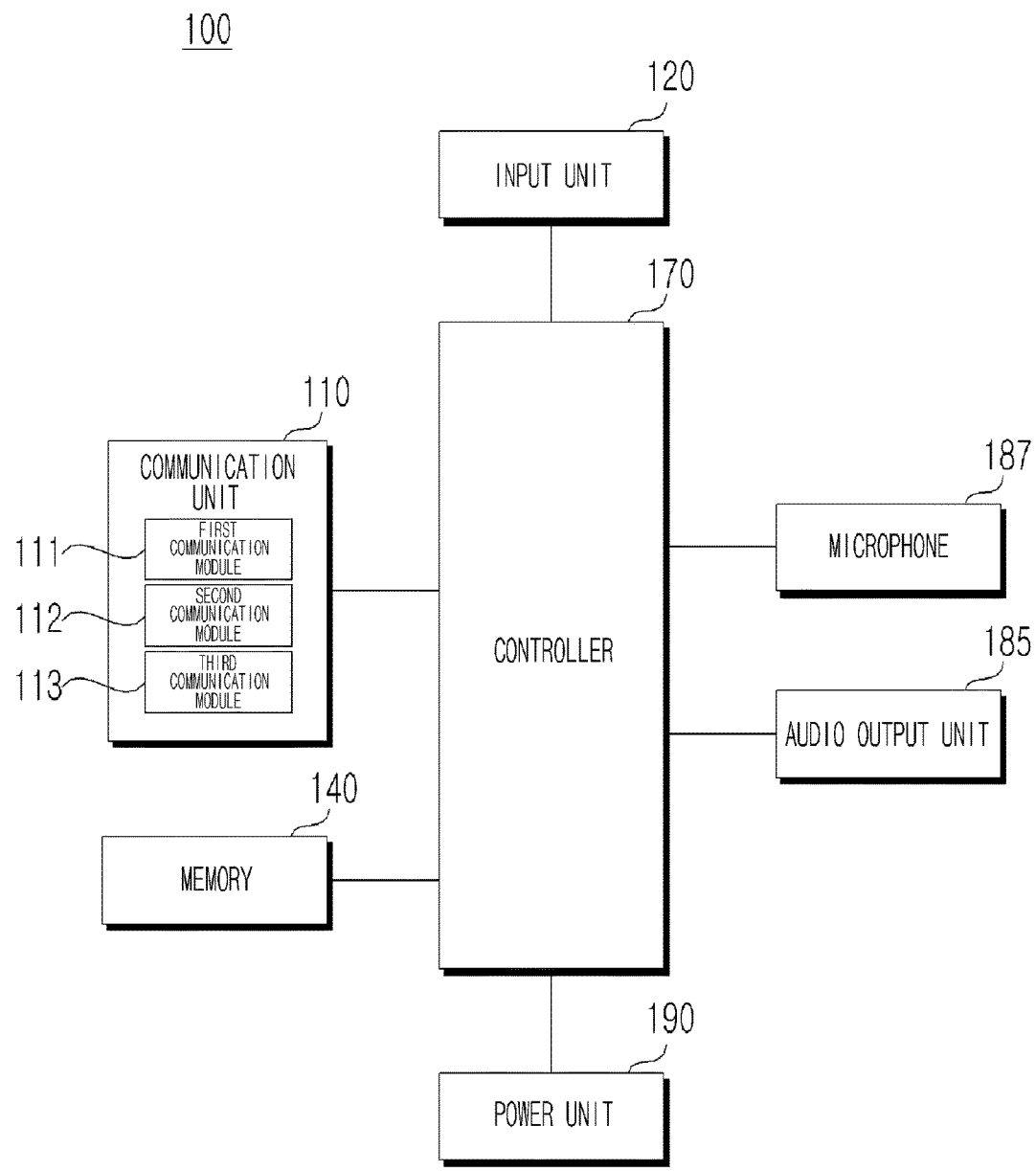
FIG. 3 is an exemplary internal block diagram illustrating the audio output device of FIG. 1.

FIG. 3 is an exemplary internal block diagram illustrating the audio output device of FIG. 1.

Referring to the figure, the audio output device 100 may include a communication unit 110 for communication with other external devices, an input unit 120 for user input, a memory 140, a controller 170 for internal control, an audio output unit 185 to output sound, a microphone 187 to collect sound, and a power unit 190.

The communication unit 110 may include a first communication module 111 to transmit a repeated wireless signal to the outside, a second communication module 112 to receive audio data from the mobile terminal 600 and the like, and a third communication module 113 to exchange data with the AP device.

The first communication module 111 may be, for example, a communication module for Bluetooth communication. In particular, it may be a BLE-based communication module. For example, the first communication module 111 may repeatedly output a BLE-based beacon signal. Here, repetition of the beacon signal may be performed periodically.

The first communication module 111 based on BLE may be driven even at low power, and may be implemented as a separate detachable unit. In addition, the first communication module 111 can be driven for a long time even using a separate internal battery.

Meanwhile, the first communication module 111 may operate in a single mode, in which only BLE-based communication is allowed, or in a dual mode in which BLE-based communication and Bluetooth communication are allowed.

If the RSSI of the beacon signal from the first communication module 111 in the audio output device 100 is greater than or equal to the first predetermined value, the mobile terminal 600 may transmit the beacon signal to the audio output device 100, particularly, the second communication module 112. At this time, the device information on the mobile terminal 600 may also be transmitted.

Meanwhile, the second communication module 112 may be, for example, a communication module for Wi-Fi communication. Therefore, the bandwidth in the communication scheme of the second communication module 112 may be larger than the bandwidth in the communication scheme of the first communication module 111.

The first communication module 111 based on Bluetooth may not be capable of transmitting/receiving a large amount of audio data due to bandwidth limitation. Therefore, in order to transmit/receive audio data having a good sound quality, the Wi-Fi-based second communication module 112 having a larger bandwidth than the first communication module 111 is preferably used.

That is, the second communication module 112 may receive audio data from the mobile terminal 600. The device information of the mobile terminal 600 may also be received.

The third communication module 113 may be a communication module for Ethernet communication. Accordingly, the third communication module 113 may perform wired data exchange with the AP device 400.

The memory 140 may store a list of music files. For example, when a plurality of electronic devices is shared on the same network with respect to the AP device 400, the memory 140 may store a list of music files stored in each electronic device.

The list of music files may be received via the second communication module 112.

The third communication module 113 may transmit the music file list related information to the server 300 via the AP device 400 and the network 530, and receive mode information about each music file from the server 300.

The controller 170 may control each unit in the audio output device 100.

Specifically, the controller 170 may perform a control operation through the communication unit 110 such that a repeated wireless signal is output. In addition, the controller 170 may control the repeated wireless signal to be repeated at regular intervals.

Further, the controller 170 may control the level of the repeated wireless signal to be constant.

In outputting the sound from the audio output unit 185, the controller 170 may control the set volume information to be transmitted to the mobile terminal 600 through the second communication module 112 in order to meet the balance of volume with the volumes of the other audio output devices.

The controller 170 may reproduce the audio data received through the second communication module 112, and control the audio data to be output through the audio output unit 185.

The controller 170 may control a sound with the volume varied to be output in reproducing the audio data, according to a volume adjustment signal from the mobile terminal 600.

The audio output unit 185 receives the audio data, i.e., the electrical signal, signal-processed by the controller 170, converts the audio data into an audio signal, and outputs the audio signal. That is, it outputs sound corresponding to the audio data. To this end, the audio output unit 185 may include a speaker having an internal circuit or the like. For example, a plurality of speakers may be provided internally to output sound of a plurality of channels.

The power unit 190 supplies power to the internal unit. To this end, a DC/DC converter may be provided.

The power unit 190 may include an AC/DC converter for converting AC power input through the power cord into DC power.

Meanwhile, the power unit 190 may include a battery for DC power storage.

Figure 4:
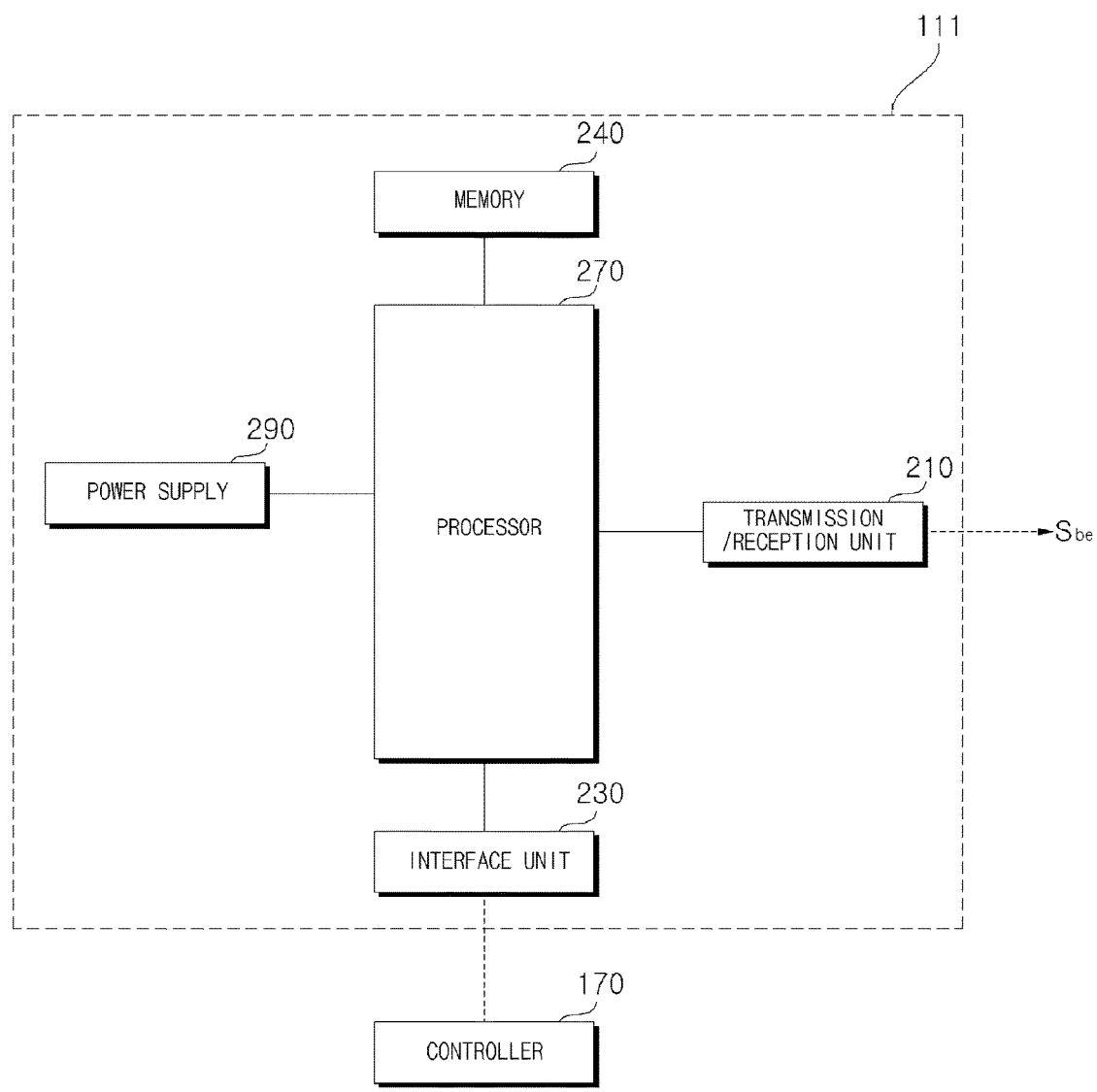
FIG. 4 is an exemplary internal block diagram illustrating the first communication module of FIG. 3.

FIG. 4 is an exemplary internal block diagram illustrating the first communication module of FIG. 3.

Referring to the figure, the first communication module 111 may be a low power based BLE communication module. The first communication module may be detached from or attached to the periphery of various electronic devices.

Accordingly, the first communication module 111 may include a transmission/reception unit 210 capable of transmitting or receiving data according to a BLE-based communication scheme, an interface unit 230 for exchange of data with the controller 170, a memory 240, a processor 270, and a power supply 290.

The transmission/reception unit 210 may transmit the repeated wireless signal, that is, the beacon signal Sbe to the outside. Alternatively, it may receive a Bluetooth-based pairing signal from an external electronic device.

The memory 240 may store channel frequency information for outputting the beacon signal, level information on the beacon signal, and the like. In addition, the memory may store a pairing request signal or the like received from the outside.

The processor 270 controls operations of the first communication module 111 and the like. For example, using the frequency channel information and the level information on the beacon signal stored in the memory 240, the processor 270 may change the frequency channel of the beacon signal output from the first communication module 111 or control the level of the signal to be constant.

The power supply 290 may supply power to internal units such as the transmission/reception unit 210 to transmit a repeating wireless signal, that is, a beacon signal Sbe to the outside.

The power supply 290 may include an internal battery when the first communication module 111 is configured as a separate detectable or attachable unit.

Figure 5:
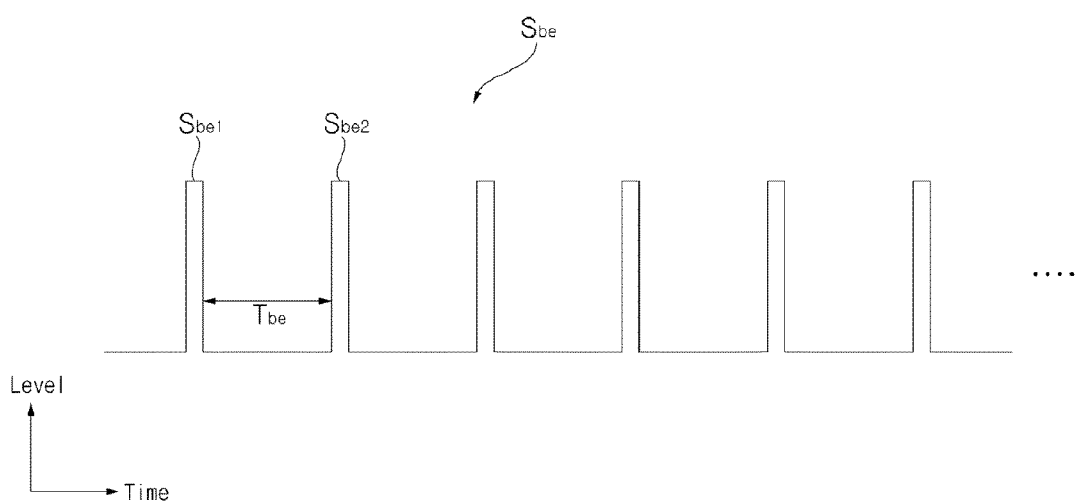
FIG. 5 illustrates an example of a repeated wireless signal output from the first communication module of FIG. 3.

FIG. 5 illustrates an example of a repeated wireless signal output from the first communication module of FIG. 3.

Referring to the figure, a repeated wireless signal may be a BLE-based beacon signal Sbe.

This beacon signal Sbe may be repeated like Sbe1 and Sbe2, and may be repeated with a period of Tbe.

Figure 6:
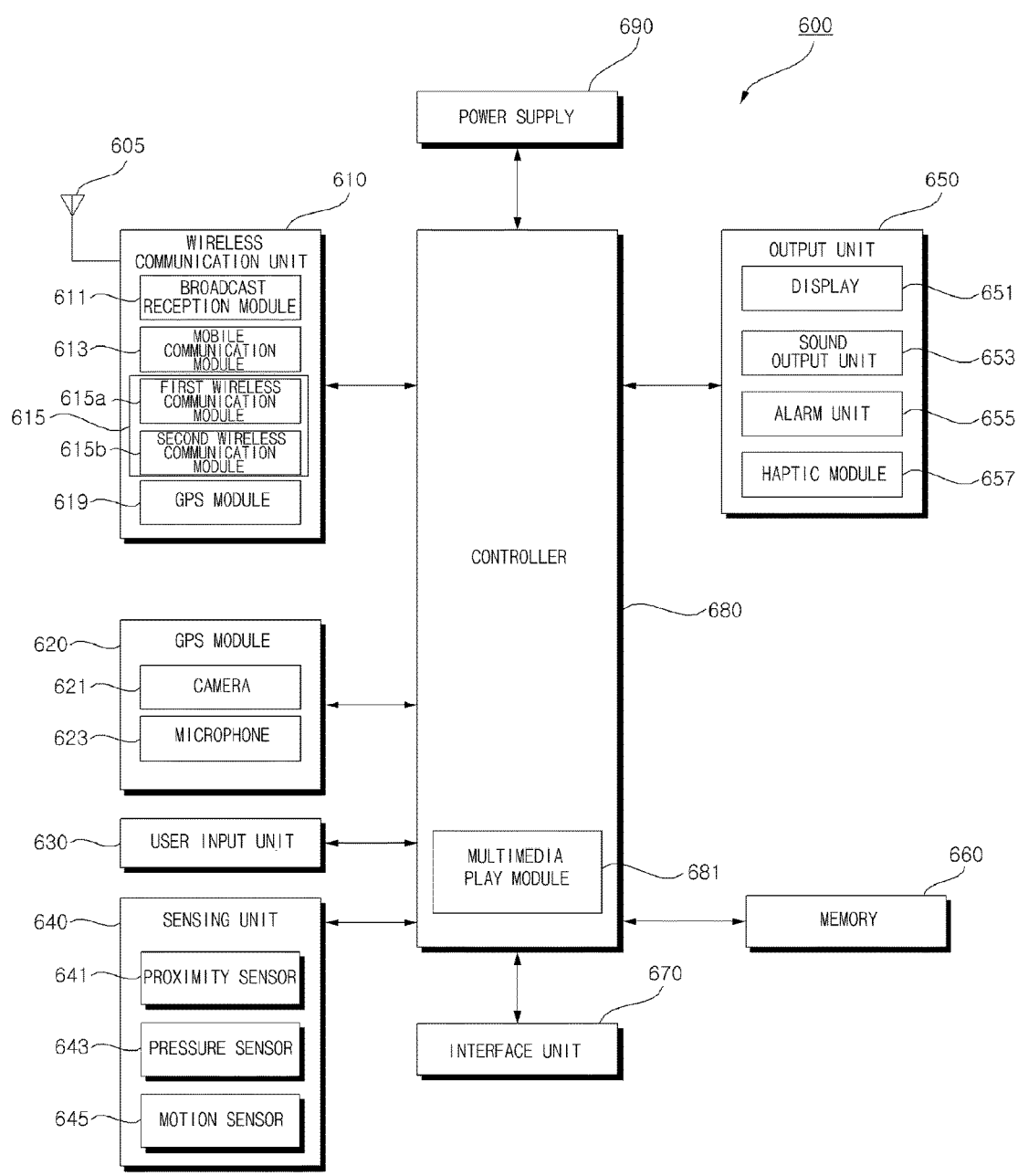
FIG. 6 is an internal block diagram illustrating the mobile terminal of FIG. 1.

FIG. 6 is an internal block diagram illustrating the mobile terminal of FIG. 1.

Referring to FIG. 6, the mobile terminal 600 may include a wireless communication unit 610, an audio/video (A/V) input unit 620, a user input unit 630, a sensing unit 640, an output unit 650, a memory 660, an interface unit 670, a controller 680, and a power supply 690.

The wireless communication unit 610 may include a broadcast reception module 611, a mobile communication module 613, a wireless communication module 615, and a GPS module 619.

The broadcast reception module 611 may receive at least one of a broadcast signal and broadcast related information from an external broadcast management server on a broadcast channel. The broadcast channel may include a satellite channel and a terrestrial channel.

The broadcast signal and/or broadcast related information received through the broadcast reception module 611 may be stored in the memory 660.

The mobile communication module 613 transmits and receives a wireless signal to and from at least one of a base station, an external terminal, and a server over a mobile communication network. Here, the wireless signal may include a voice call signal, a video call signal, or various types of data according to transmission/reception of a text/multimedia message.

The wireless communication module 615 is a module for wireless communication and may be built in or externally attached to the mobile terminal 600. For example, the wireless communication module 615 may include a first communication module 615a for Bluetooth communication, particularly BLE-based Bluetooth communication, and a second communication module 615b for Wi-Fi-based wireless communication or Wi-Fi Direct-based wireless communication.

In addition, radio frequency identification (RFID), infrared data association (IrDA), ultra-wideband (UWB), Zig-Bee, or the like may be used as the short distance communication technology.

The global positioning system (GPS) module 619 may receive position information from a plurality of GPS satellites.

The audio/video (A/V) input unit 620 is provided for inputting an audio signal or a video signal, and may include a camera 621 and a microphone 623.

The user input unit 630 generates key input data that the user inputs to control the operation of the terminal. To this end, the user input unit 630 may include a key pad, a dome switch, and a touch pad (resistive pad/capacitive pad). Particularly, when the touch pad and the display 651 form a layered structure, the structure may be called a touchscreen.

The sensing unit 640 may generate a sensing signal for controlling operation of the mobile terminal 600 by sensing the current state of the mobile terminal 600 such as the open/closed state of the mobile terminal 600, the position of the mobile terminal 600, and contact of the user.

The sensing unit 640 may include a haptic sensor 641, a pressure sensor 643 and a motion sensor 645. The motion sensor 645 may employ an acceleration sensor, a gyro sensor, a gravity sensor and the like to sense movement or location of the mobile terminal. In particular, the gyro sensor, which is used to measure angular speed, may sense orientation (angle) of the mobile terminal with respect to a reference direction.

The output unit 650 may include a display 651, a sound output unit 653, an alarm unit 655, and a haptic module 657.

The display 651 outputs and displays information processed by the mobile terminal 600.

When the display 651 forms a layered structure with the touchpad to implement a touchscreen as described above, the display 651 may be used not only as an output device but also as an input device for input of information according to user touch.

The sound output unit 653 outputs audio data received from the wireless communication unit 610 or stored in the memory 660. The sound output unit 653 may include a speaker and a buzzer.

The alarm unit 655 outputs a signal for reporting occurrence of an event in the mobile terminal 600. For example, the alarm unit 655 may output a signal in the form of vibration.

The haptic module 657 generates various haptic effects which may be felt by the user. A typical example of the haptic effects generated by the haptic module 657 is vibration.

The memory 660 may store a program for processing and control of the controller 680, and function to temporarily store input data or output data (e.g., a phonebook, a message, a still image, a moving image, etc.).

The interface unit 670 serves as an interface for all devices connected to the mobile terminal 600. The interface unit 670 may receive data or power from external devices and transfer the same to the internal constituents of the mobile terminal 600, and allow the data in the mobile terminal 600 to be transmitted to external devices.

The controller 680 typically controls operations of the aforementioned respective elements, thereby controlling overall operation of the mobile terminal. For example, the controller 680 may perform control or processing related to voice communication, data communication, video communication, and the like. The controller 680 may also include a multimedia playback module 681 to reproduce multimedia. The multimedia playback module 681 may be provided in the controller 680 as hardware or may be configured separately from the controller 680.

The power supply 690 supplies power necessary for operations of the respective constituents according to control of the controller 680 when external power or internal power is applied thereto.

The block diagram of the mobile terminal 600 shown in FIG. 6 is simply illustrative. The respective constituents of the block diagram may be integrated, added or omitted according to the specifications of the mobile terminal 600. That is, two or more constituents may be combined into one constituent, or one constituent may be subdivided into two or more constituents, when necessary. In addition, the functions performed in each block are simply illustrative, and it should be noted that specified operations or devices of the blocks do not limit the scope of the present invention.

Figure 7:
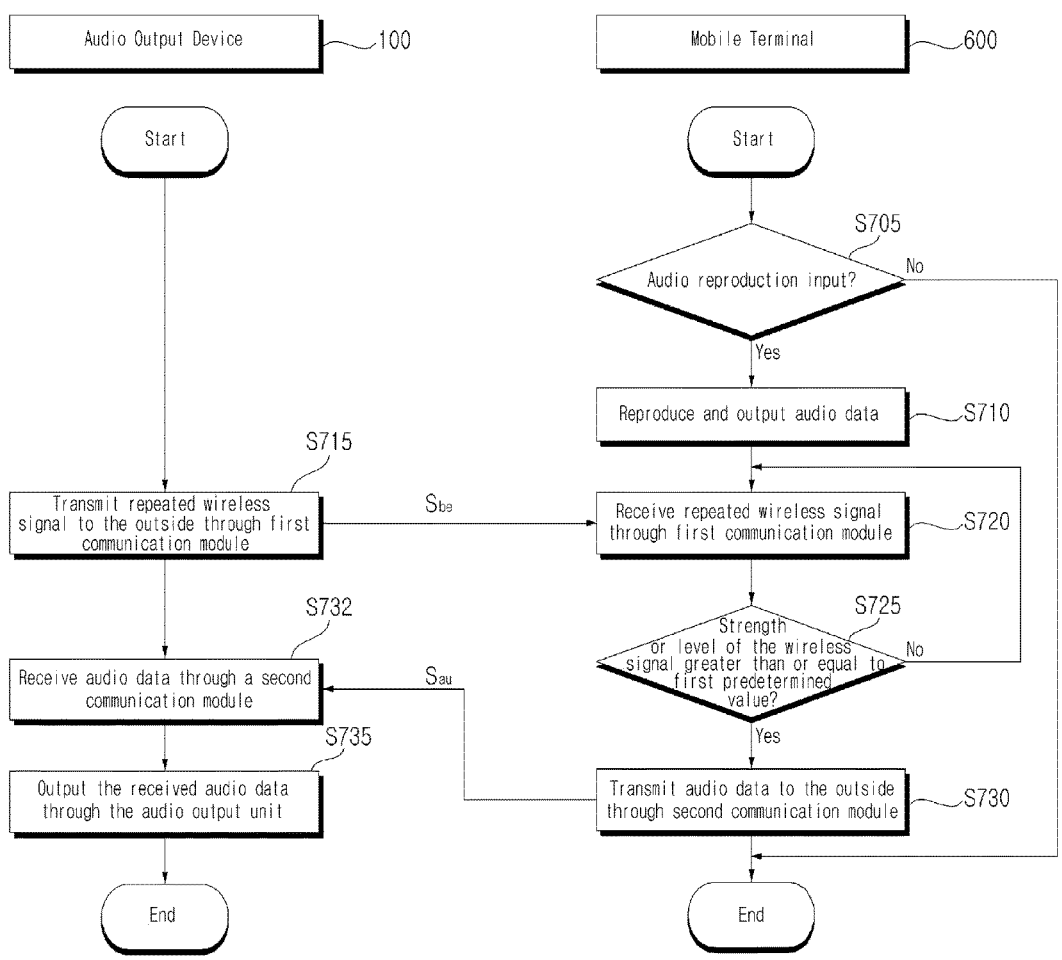
FIG. 7 is a flowchart illustrating an exemplary operation of an audio output system according to an embodiment of the present invention.

FIG. 7 is a flowchart illustrating an exemplary operation of an audio output system according to an embodiment of the present invention. FIGS. 8A to 28B illustrate operation of the audio output system of FIG. 7.

First, referring to FIG. 7, when an audio reproduction input is provided (S705), the mobile terminal 600 reproduces and outputs the audio data (S710).

For example, the mobile terminal 600 may reproduce and output an audio file stored therein or an audio file received through external streaming, according to a user input or the like. In particular, the mobile terminal 600 may output sound through the sound output unit 653.

The audio output device 100 including the first communication module 111 based on BLE, which may be driven at low power, may repeatedly transmit a beacon signal Sbe to the outside (S715).

The mobile terminal 600 receives the beacon signal Sbe (S720). Then, the mobile terminal 600 measures the RSSI of the received beacon signal, and determines whether the RSSI is greater than or equal to a first predetermined value (S725). That is, it is determined whether the strength or level of the beacon signal is greater than or equal to the first predetermined value.

If the strength or level of the beacon signal is greater than or equal to the first predetermined value, the mobile terminal 600 transmits audio data being reproduced to the outside through the second communication module (S730).

At this time, the controller 680 of the mobile terminal 600 may control reproduction of the audio data to be maintained, but control the reproduced audio data to be output through the second communication module 615*b*, not through the sound output unit 653 in the mobile terminal 600.

Meanwhile, the audio output device 100 receives the audio data from the mobile terminal 600 through the second communication module, which is based on Wi-Fi (S732). Then, the audio output device 100 outputs sound corresponding to the received audio data through the audio output unit 185 (S735)

Here, the controller 170 of the audio output device 100 may signal-process the received audio data and transmit an electrical signal corresponding to the signal-processed audio data to the audio output unit 185.

Alternatively, the controller 170 of the audio output device 100 may bypass separate signal processing and transmit the received audio data to the audio output unit 185.

As a result, the user can seamlessly listen to the audio data reproduced by the mobile terminal 600 through the sound output from the audio output device 100. Thereby, music may be appreciated through the audio output device 100, which provides better sound output, and thus user convenience may be increased.

Figure 8A:
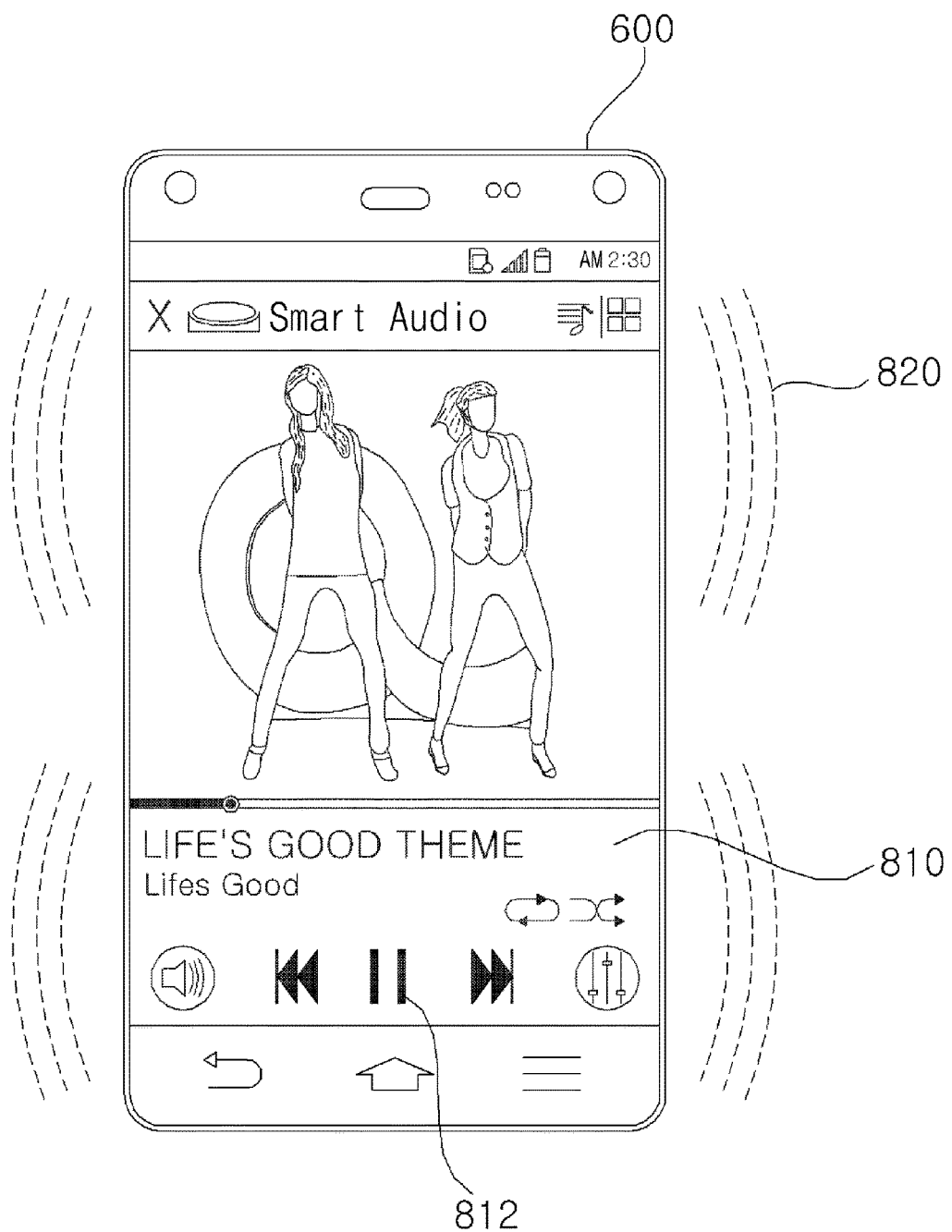
FIGS. 8A to 28B illustrate operation of the audio output system of FIG. 7.

FIG. 8A illustrates a case where a music file reproduction screen 810 is displayed on the mobile terminal 600.

The controller 680 of the mobile terminal 600 may drive an application for reproduction of a music file by user input or the like and control a music file reproduction screen 810 as shown in the figure to be displayed.

The music file reproduction screen 810 may further include an image related to a reproduced music file, a play item (pause item), a previous item, a next item, and a volume adjustment item.

In the figure, it is illustrated that the reproduced music file is output as a predetermined sound 820 through the sound output unit 653. Unlike the example of the figure, the reproduced music file may be output as a predetermined sound through headphones or earphones (not shown).

Figure 8B:
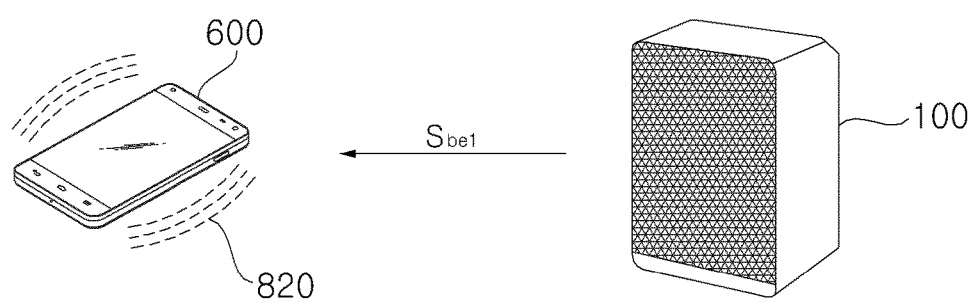

FIG. 8B illustrate a case where the distance between the mobile terminal 600 and the audio output device 100 is approximately a first distance.

The audio output device 100 may repeatedly output a BLE-based beacon signal as described above.

As shown in the figure, when the distance between the mobile terminal 600 and the audio output device 100 is approximately the first distance at a first time, the audio output device 100 may wirelessly output the signal Sbe1 among the beacon signals.

The controller 680 of the mobile terminal 600 receives Sbe1 through the first communication module 815*a* and calculates the RSSI of Sbe1. Then, the controller determines whether or not the RSSI of Sbe1 is greater than or equal to a first predetermined value. The controller 680 may reproduce the audio data being reproduced without any separate data transfer if the RSSI is less than the first predetermined value.

Figure 8C:
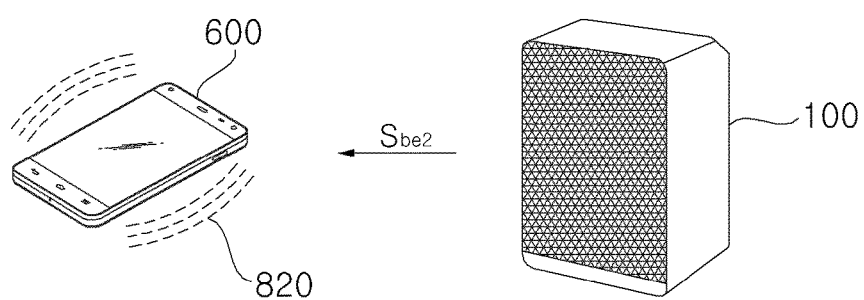

FIG. 8C illustrates a case where the distance between the mobile terminal 600 and the audio output device 100 is approximately a second distance shorter than the distance of FIG. 8B.

The audio output device 100 may repeatedly output a BLE-based beacon signal as described above.

As shown in the figure, when the distance between the mobile terminal 600 and the audio output device 100 is approximately the second distance at a second time, the audio output device 100 may output the signal Sbe2 among the beacon signals of FIG. 5.

The controller 680 of the mobile terminal 600 receives Sbe2 through the first communication module 815*a* and calculates the RSSI of Sbe2. Then, the controller determines whether or not the RSSI of Sbe2 is greater than or equal to the first predetermined value.

If the RSSI is greater than or equal to the first predetermined value, the controller 680 may perform a control operation through the second communication module 815*a* to transmit the audio data for reproduction. In particular, the audio data being reproduced may be controlled to be transmitted after the time when the RSSI is determined to be greater than or equal to the first predetermined value.

Figure 8D:
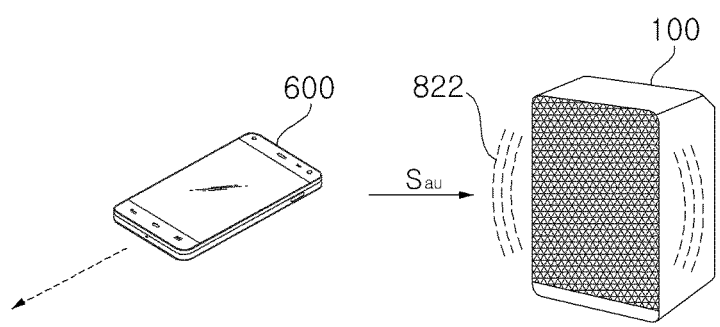

FIG. 8D illustrates a case where audio data Sau is output from the mobile terminal 600 and a sound 822 corresponding to the received audio data is output by the audio output device 100.

The controller 170 of the audio output device 100 receives the audio data and transmits the received audio data to the audio output unit 185. Accordingly, the audio output unit 185 outputs the sound 822 corresponding to the audio data.

The controller 170 of the audio output device 100 may repeatedly output a BLE-based beacon signal in outputting the sound.

Alternatively, the controller 170 of the audio output device 100 may control the BLE-based beacon signal not to be output any longer in outputting the sound.

The controller 170 may configure transmission or non-transmission of the beacon signal according to user setting in outputting the sound.

Even if the distance between the mobile terminal 600 and the audio output device 100 increases after the mobile terminal 600 transmits the audio data to the audio output device 100, the audio data may continue to transmit the audio data to the audio output device 100.

For example, the controller 680 of the mobile terminal 600 may not perform RSSI calculation on the beacon signal after the audio data is transmitted.

As another example, after the audio data is transmitted, the controller 680 of the mobile terminal 600 may perform RSSI calculation on the beacon signal, and may not transmit the audio data to the audio output device 100 only when the RSSI is less than or equal to a second predetermined value, which is less than or equal to the first predetermined value.

In other words, if the RSSI is greater than the second predetermined value, the audio data may be continuously transmitted to the audio output device 100.

Figure 9A:
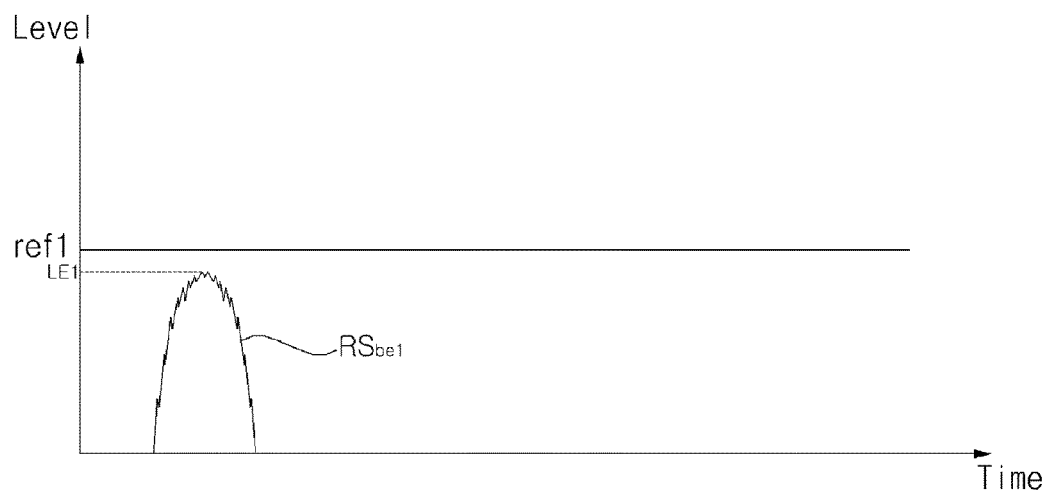

FIG. 9A illustrates a beacon signal RSbe1 received by the mobile terminal 600 when the distance between the mobile terminal 600 and the audio output device 100 is approximately the first distance as in FIG. 8B.

Referring to the figure, it is illustrated that the peak level LE1 of the beacon signal RSbe1 received by the mobile terminal 600 is less than a first predetermined value ref1.

If the peak level LE1 of the received beacon signal RSbe1 is less than the first predetermined value ref1, the controller 680 of the mobile terminal 600 outputs sound through the sound output unit 653, rather than outputting the audio data being reproduced to the audio output device 100.

Figure 9B:
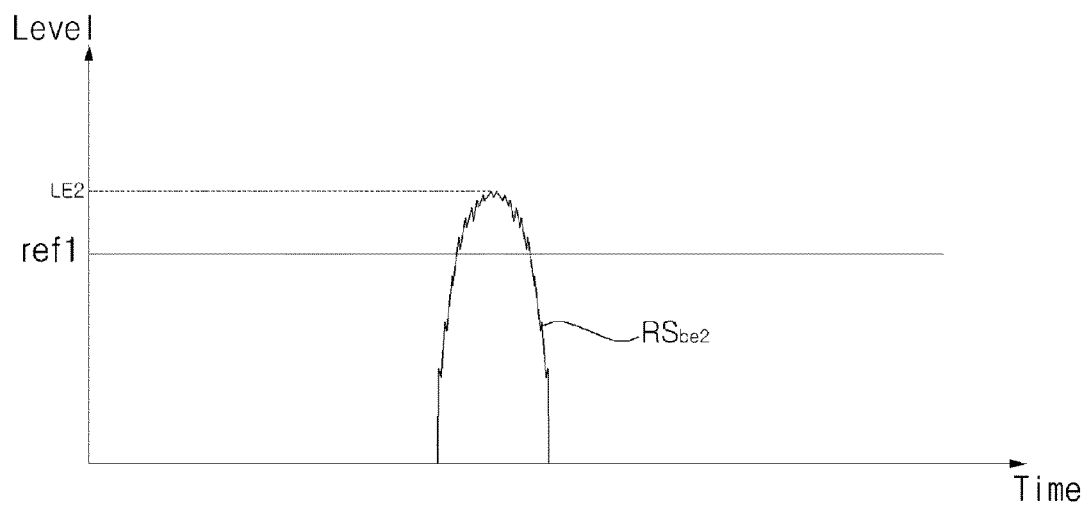

FIG. 9B illustrates a beacon signal RSbe2 received from the mobile terminal 600 when the distance between the mobile terminal 600 and the audio output device 100 is approximately a second distance shorter than the first distance as in FIG. 8C.

Referring to the figure, it is illustrated that the peak level Le2 of the beacon signal RSbe2 received by the mobile terminal 600 is greater than the first predetermined value ref1.

If the peak level Le2 of the received beacon signal RSbe2 is greater than the first predetermined value ref1, the controller 680 of the mobile terminal 600 transmits the reproduced audio data to the audio output device 100 without outputting the same through the sound output unit 653. Then, the audio output device 100 outputs sound corresponding to the received audio data.

In brief, the peak level of the beacon signal RSbe received by the mobile terminal 600 is approximately inversely proportional to the distance between the mobile terminal 600 and the audio output device 100.

Accordingly, if the mobile terminal 600 approaches the audio output device 100 within a predetermined distance and the peak level of the received beacon signal is greater than or equal to the first predetermined value, the mobile terminal 600 transmits the audio data being reproduced to the audio output device 100, and the audio output device 100 outputs the sound corresponding to the received audio data.

The mobile terminal 600 or the audio output device 100 may adjust the volume of sound output from the audio output device 100 according to the distance between the mobile terminal 600 and the audio output device 100. Details will be described with reference to FIGS. 10A to 13C.

Figure 10A:
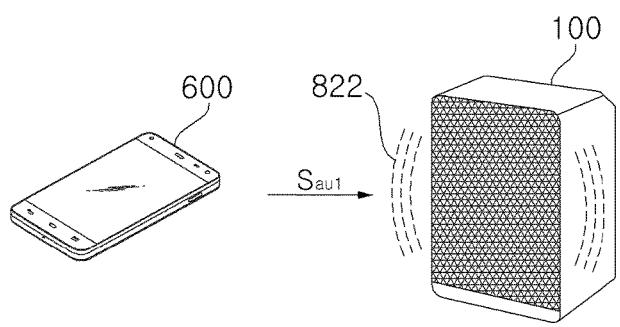

FIG. 10A illustrates output of sound 822 of a first volume from the audio output device 100 while the distance between the mobile terminal 600 and the audio output device 100 is approximately a second distance.

The second communication module 112 of the audio output device 100 receives audio data from the mobile terminal 600.

The controller 170 of the audio output device 100 controls the volume of the sound output from the audio output unit 185 according to the strength or level of the received audio data.

For example, the controller 170 of the audio output device 100 controls the volume of the sound output from the audio output unit 185 to increase as the strength or level of the received audio data is lowered.

Figure 11A:
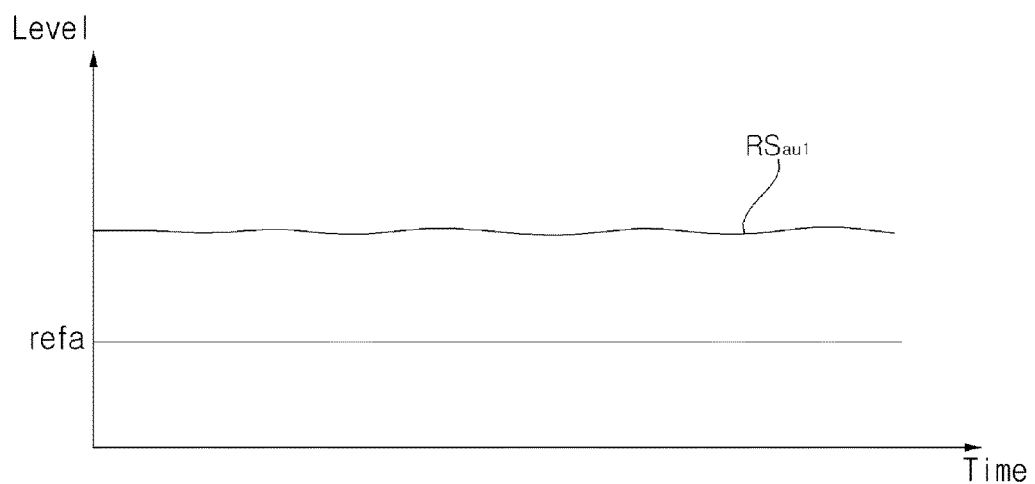

FIG. 11A illustrates an audio data signal RSau1 received from the audio output device 100 when the distance between the mobile terminal 600 and the audio output device 100 is approximately the second distance as in FIG. 10A.

Referring to the figure, it is illustrated that the level of the audio data signal RSau1 received by the audio output device 100 is higher than a reference level refa.

The controller 170 of the audio output device 100 controls the sound corresponding to the received audio data to be continuously output if the level of the received audio data is higher than the reference level refa. Meanwhile, the controller 170 of the audio output device 100 controls the sound 822 of the first volume to be output according to the level of the received audio data signal RSau1, as shown in FIG. 10A.

Figure 10B:
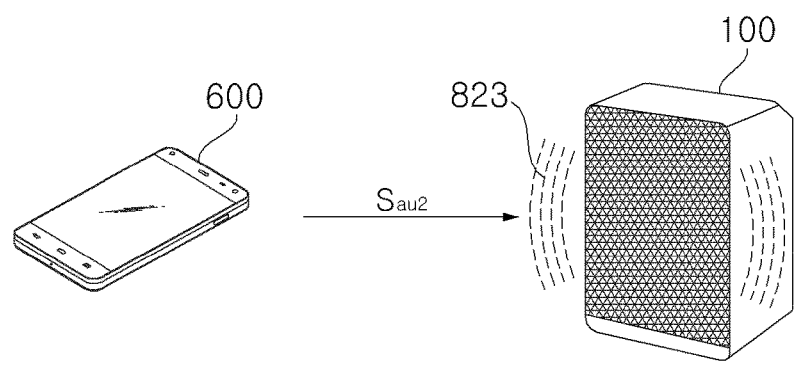

FIG. 10B illustrates output of a sound 823 of a second volume higher than the first volume from the audio output device 100 while the distance between the mobile terminal 600 and the audio output device 100 is approximately a first distance longer than the second distance.

Figure 11B:
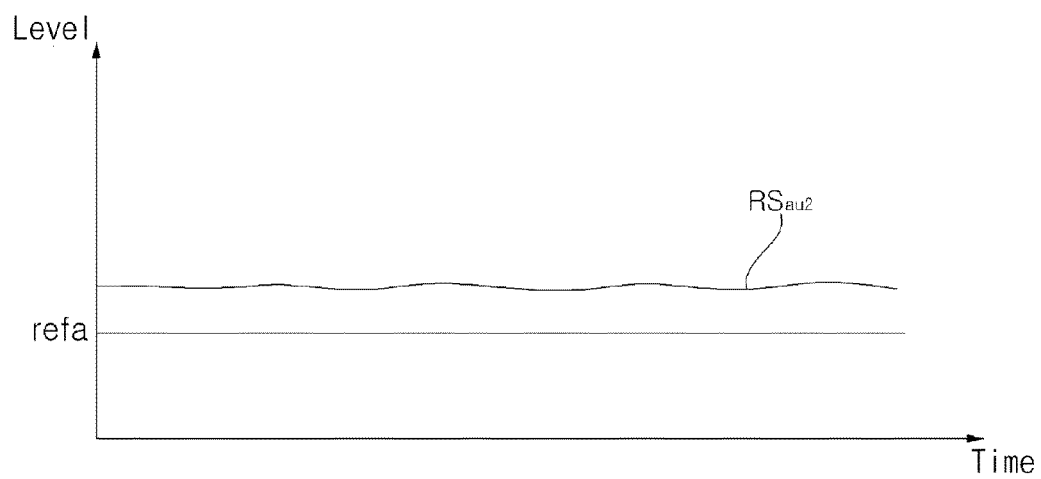

FIG. 11B illustrates an audio data signal RSau2 received by the audio output device 100 when the distance between the mobile terminal 600 and the audio output device 100 is approximately the first distance as shown in FIG. 10B.

Referring to the figure, it is illustrated that the level of the audio data signal RSau2 received by the audio output device 100 is higher than the reference level refa.

The controller 170 of the audio output device 100 controls the sound corresponding to the received audio data to be continuously output if the level of the received audio data is higher than the reference level refa. The controller 170 of the audio output device 100 controls the sound 823 of the second volume, which is higher than the first volume, to be output according to the level of the received audio data signal RSau2, as shown in FIG. 10B.

Figure 10C:
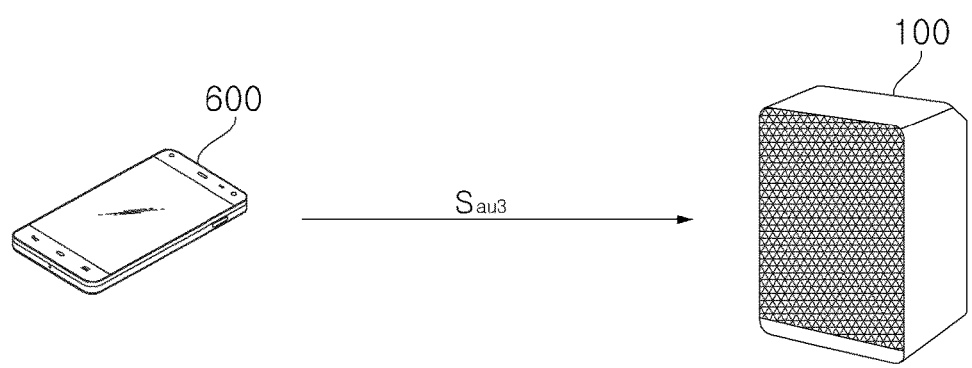

FIG. 10C illustrates a case where no sound is output from the audio output device 100 while the distance between the mobile terminal 600 and the audio output device 100 is approximately a third distance longer than the first distance.

Figure 11C:
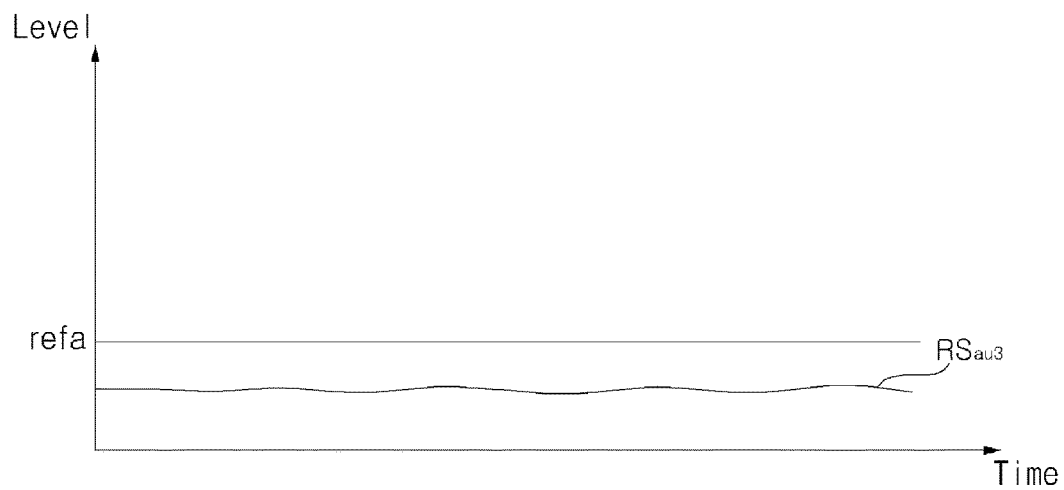

FIG. 11C illustrates an audio data signal RSau3 received from the audio output device 100 when the distance between the mobile terminal 600 and the audio output device 100 is approximately the third distance as shown in FIG. 10C.

Referring to the figure, it is illustrated that the level of the audio data signal RSau3 received by the audio output device 100 is lower than the reference level refa.

The controller 170 of the audio output device 100 controls the sound corresponding to the received audio data not to be output if the level of the received audio data is lower than the reference level refa.

Figure 10D:
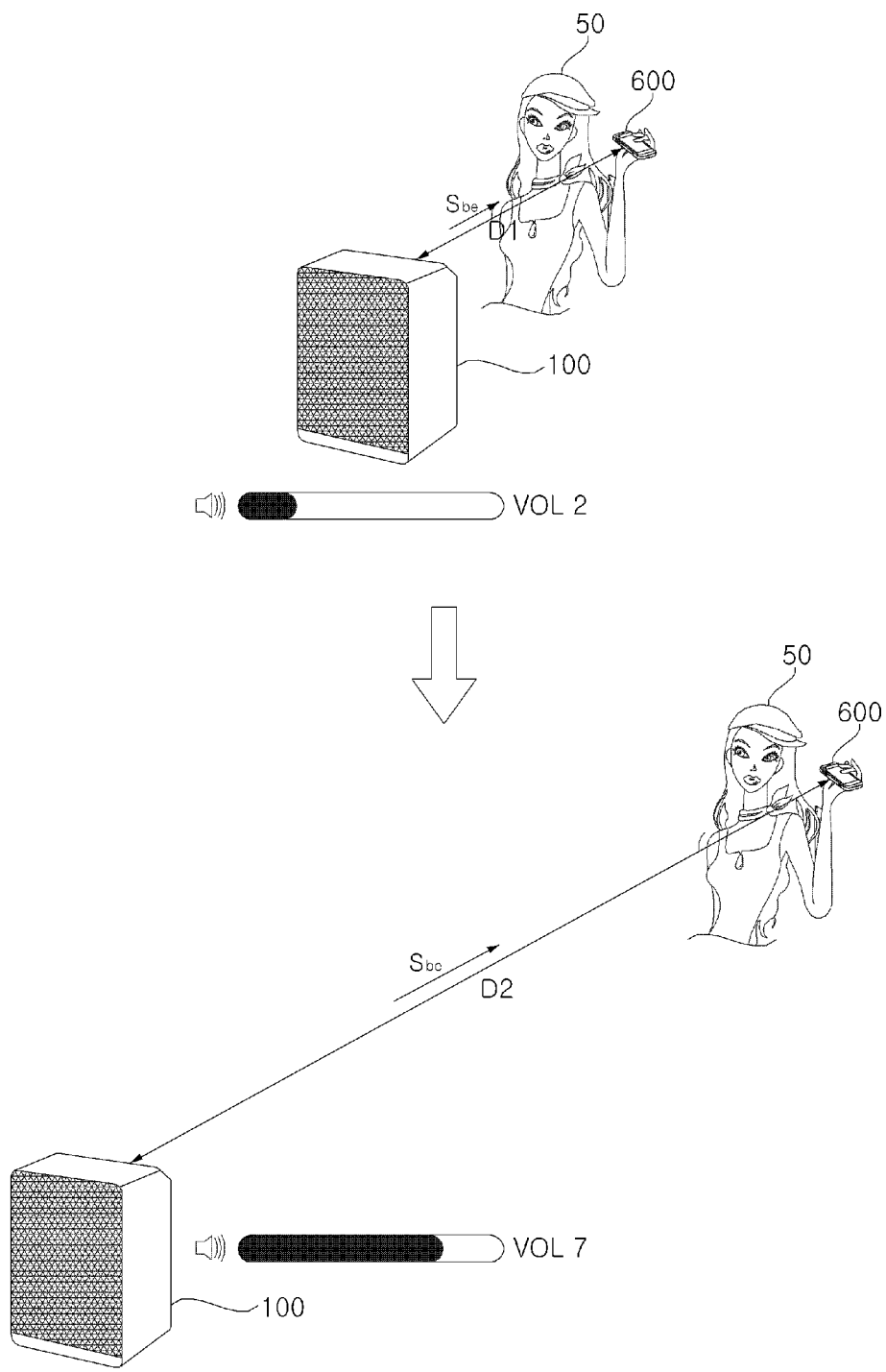

FIG. 10D illustrates a case where the volume of the sound output from the audio output device 100 at distance D1 is VOL 2 and the volume of the sound output from the audio output device 100 at distance D2 longer than distance D1 is VOL 7 when the user 50 moves the mobile terminal 600.

In this case, the audio output device 100 continues to output a BLE based repeated beacon signal Sbe.

Adjustment of the volume of the audio output device 100 according to the distance may be controlled by the mobile terminal 600, rather than the audio output device 100. Details will be described with reference to FIG. 12A to 13C.

Figure 12A:
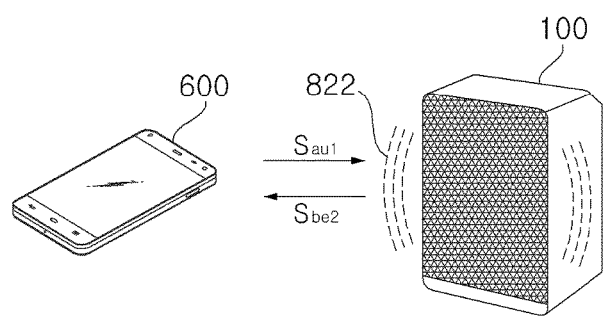

FIG. 12A illustrates a case where the audio output device 100 outputs a beacon signal Sbe2 and the mobile terminal 600 transmits an audio data signal Sau1 to the audio output device 100 in response to the beacon signal when the distance between the mobile terminal 600 and the audio output device 100 is approximately the second distance. In this case, the audio output device 100 may output the sound 822 of the first volume.

Figure 13A:
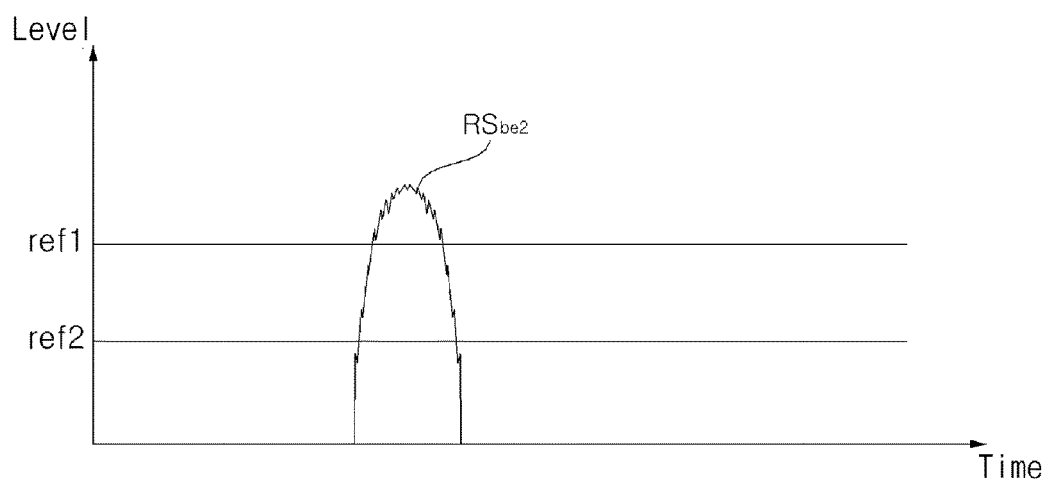

FIG. 13A illustrates a beacon signal RSbe2 received by the mobile terminal 600 when the distance between the mobile terminal 600 and the audio output device 100 is approximately the second distance as shown in FIG. 12A.

Referring to the figure, it is illustrated that the level of the beacon signal RSbe2 received by the mobile terminal 600 is greater than the first predetermined value ref1.

The controller 680 of the mobile terminal 600 controls sound corresponding to the received audio data to be output if the level of the beacon signal RSbe2 received by the mobile terminal 600 is greater than the first predetermined value ref1.

Specifically, if the level of the received beacon signal RSbe2 is greater than the first predetermined value ref1, the controller 680 of the mobile terminal 600 may control sound of the first volume to be output from the audio output device 100.

For example, the controller 680 of the mobile terminal 600 may further transmit the first volume information and the audio data to the audio output device 100, based on the received beacon signal RSbe2.

The controller 170 of the audio output device 100 controls the sound 822 of the first volume to be output based on the received first volume information.

Figure 12B:
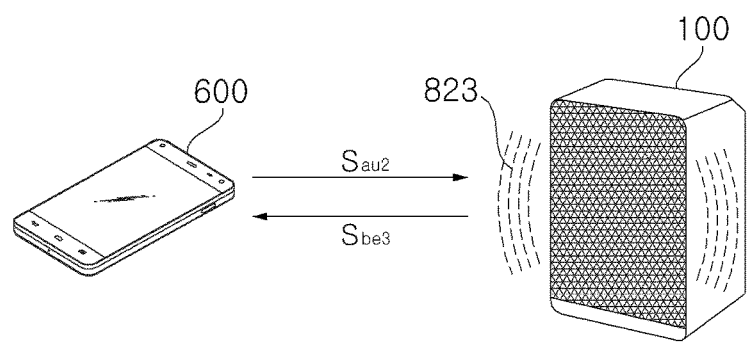
Figure 13B:
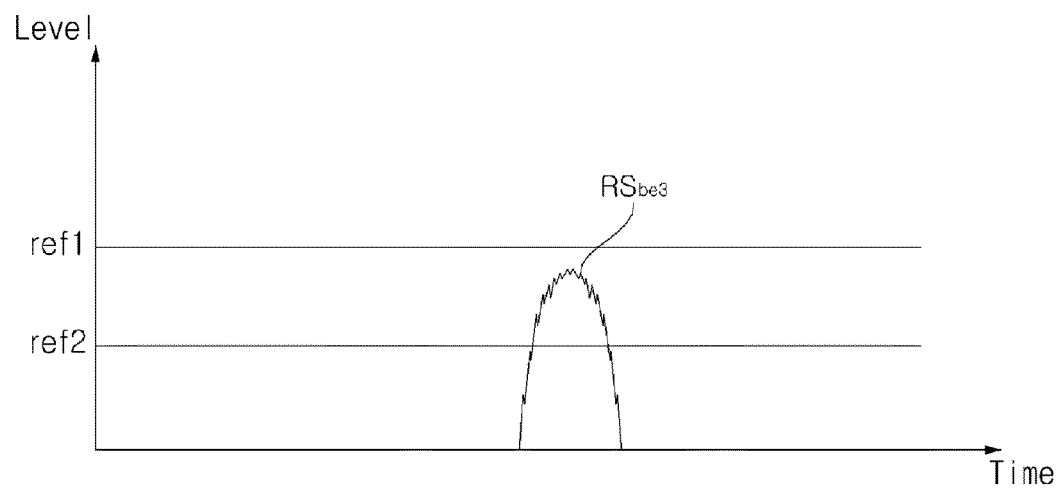

FIG. 13B illustrates a beacon signal RSbe3 received by the mobile terminal 600 when the distance between the mobile terminal 600 and the audio output device 100 is a first distance longer than the second distance, as shown in FIG. 12B.

Referring to the figure, it is illustrated that the level of the beacon signal RSbe3 received by the mobile terminal 600 is less than the first predetermined value ref1 but greater than the second predetermined value ref2.

If the level of the received beacon signal RSbe3 is greater than the second predetermined value ref2, the controller 680 of the mobile terminal 600 may control sound 823 of a second volume higher than the first volume of the reproduced audio data to be output from the audio output device 100.

For example, the controller 680 of the mobile terminal 600 may further transmit the second volume information and the audio data to the audio output device 100, based on the RSSI of the received beacon signal RSbe3.

The controller 170 of the audio output device 100 controls the sound 823 of the second volume to be output based on the received second volume information.

Figure 12C:
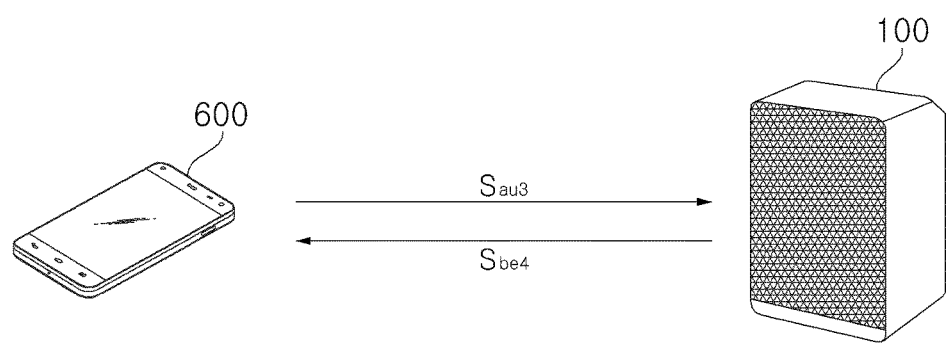
Figure 13C:
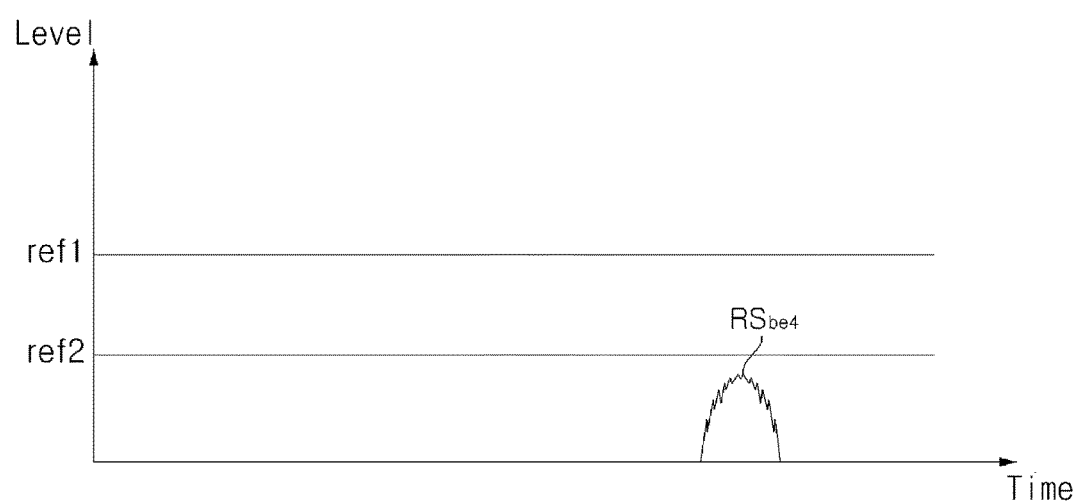

FIG. 13C illustrates a beacon signal RSbe4 received by the mobile terminal 600 when the distance between the mobile terminal 600 and the audio output device 100 is approximately a third distance longer than the first distance, as shown in FIG. 12C.

Referring to the figure, it is illustrated that the level of the beacon signal RSbe4 received by the mobile terminal 600 is less than the second predetermined value ref2.

If the level of the received beacon signal RSbe4 is less than the second predetermined value ref2, the controller 680 of the mobile terminal 600 may control the reproduced audio data not to be transmitted to the audio output device 100 any longer. Thereby, the audio output device 100 does not output sound corresponding to the received audio data any more.

A plurality of audio output devices may be provided in the audio output system 10 of FIG. 1A or 1B, and various examples of sound output from the plurality of audio output devices will be described with reference to FIGS. 14A to 18B.

Figure 14A:
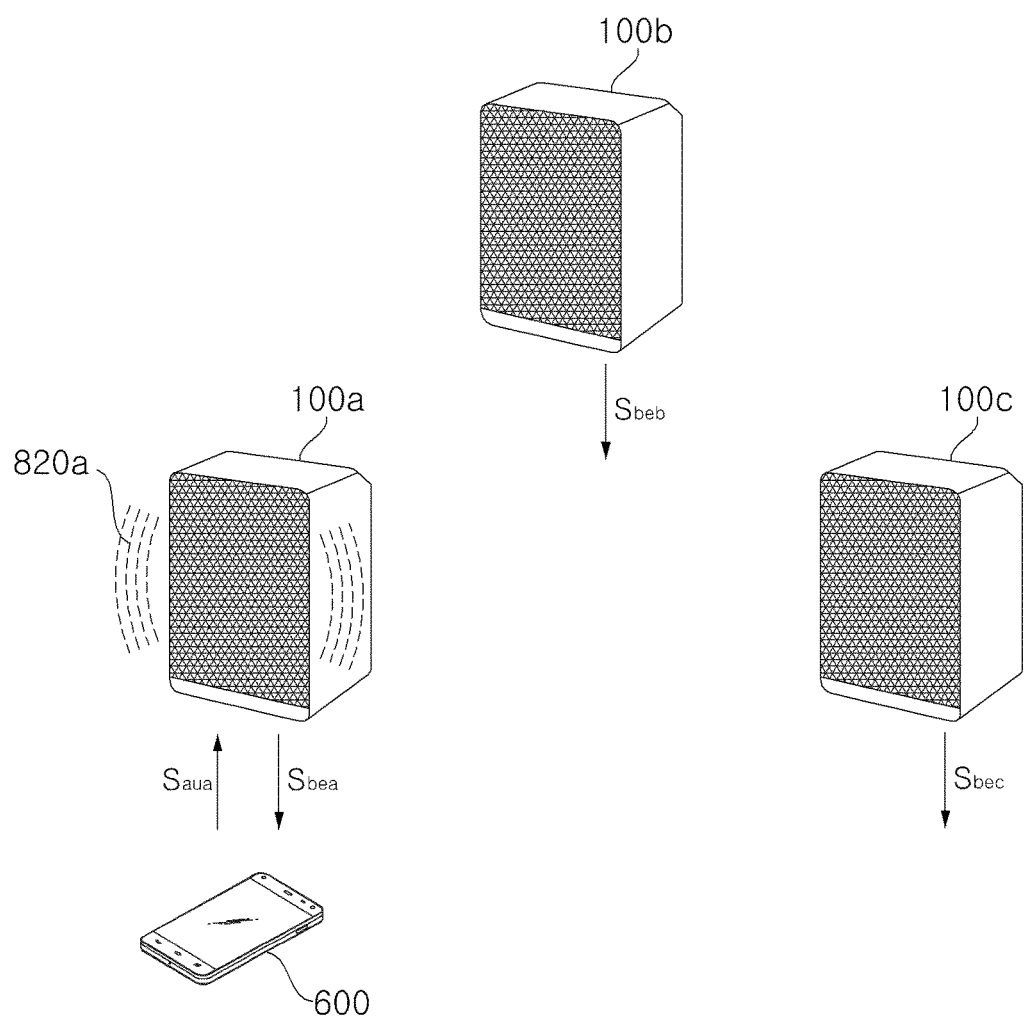

FIG. 14A illustrates a case where a first audio output device 100a of the plurality of audio output devices 100a, 100b and 100c receives audio data reproduced by the mobile terminal 600 and outputs corresponding sound 820a.

The plurality of audio output devices 100a, 100b, and 100c output beacon signals Sbea, Sbeb, and Sbec, respectively, which are repeated.

The beacon signals Sbea, Sbeb, and Sbec may include device information on each of the plurality of audio output devices 100a, 100b, and 100c. Alternatively, the device information may be transmitted to the outside together with the respective beacon signals Sbea, Sbeb, and Sbec.

The mobile terminal 600 may receive the beacon signals Sbea, Sbeb, and Sbec from the plurality of audio output devices 100a, 100b, and 100c through the first communication module 615a.

For example, the controller 680 of the mobile terminal 600 may control an audio output device corresponding to the largest RSSI among the beacon signals Sbea, Sbeb and Sbec to transmit audio data being reproduced, through the second communication module 812.

Specifically, when receiving one beacon signal, the controller 680 of the mobile terminal 600 may control the audio data being reproduced to be transmitted to the outside only when the RSSI of the beacon signal is greater than or equal to a first predetermined value.

However, when receiving a plurality of beacon signals, the controller 680 of the mobile terminal 600 may control an audio output device corresponding to the greatest RSSI to transmit the audio data being reproduced, regardless of whether the RSSI of one beacon signal is greater than or equal to the first predetermined value.

As another example, the controller 680 of the mobile terminal 600 may control the audio data being reproduced to be transmitted to an audio output device corresponding to a beacon signal whose RSSI is greater than or equal to the first predetermined value ref1 among the beacon signals Sbea, Sbeb and Sbec.

In this case, the controller 680 of the mobile terminal 600 may control the same audio data to be transmitted to the plurality of audio output devices if the RSSI of the received beacon signal is greater than or equal to the first predetermined value.

As another example, the controller 680 of the mobile terminal 600 may control the audio data being reproduced to be output to the outside only when the RSSI of the corresponding beacon signal among the received beacon signals Sbea, Sbeb, and Sbec is greater than or equal to the first predetermined value. When there are multiple beacon signals whose RSSIs are greater than or equal to the first predetermined value, the reproduced audio data may be controlled to be transmitted to multiple audio output devices.

Hereinafter, it is assumed that, if the RSSI of the beacon signal is greater than or equal to a first predetermined value, the controller 680 of the mobile terminal 600 performs a control operation to transmit all the audio data being reproduced to the corresponding audio output device regardless of whether a plurality of beacon signals or a single beacon signal is received by the mobile terminal 600.

FIG. 14A may illustrate a case where only the first beacon signal Sbea output from the first audio output device 100*a* among the plurality of beacon signals Sbea, Sbeb, and Sbec has an RSSI greater than or equal to a first predetermined value, and thus the mobile terminal 600 transmits audio data Saua to the first audio output device 100*a*, and the first audio output device 100*a* outputs sound 820*a* corresponding to the audio data Saua.

Figure 14B:
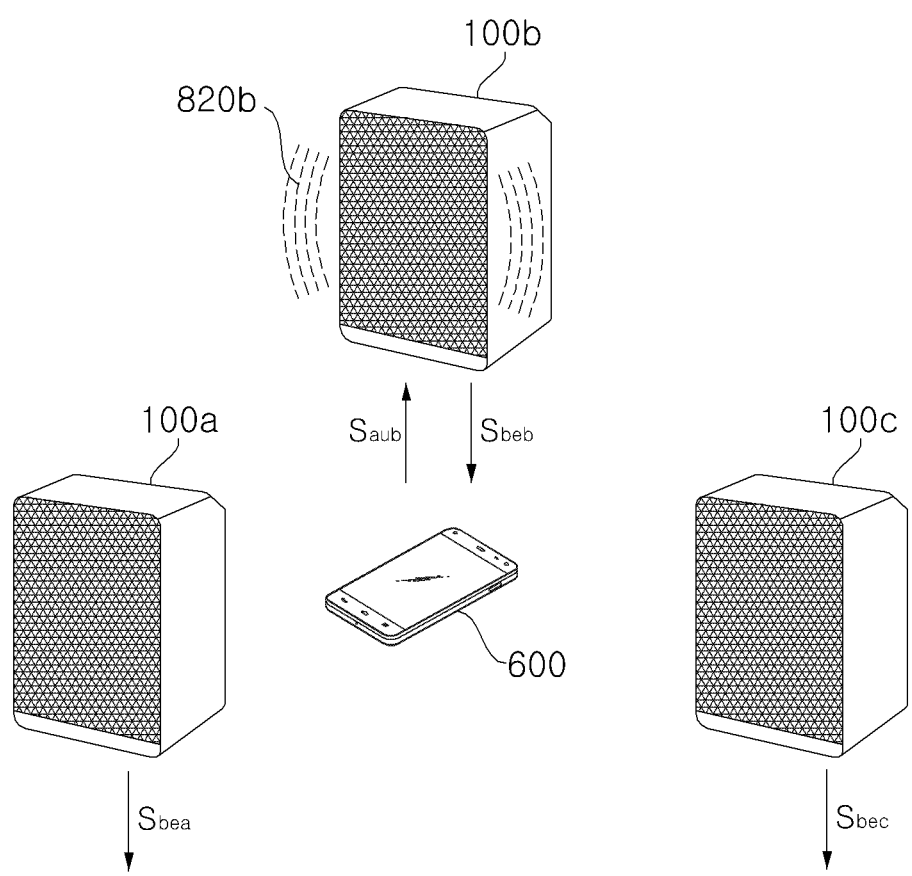

Next, FIG. 14B illustrates a case where the second audio output device 100*b* among the plurality of audio output devices 100*a*, 100*b* and 100*c* receives audio data Saub reproduced by the mobile terminal 600 and outputs corresponding sound 820*b*.

That is, FIG. 14B may illustrate a case where only the second beacon signal Sbeb output from the second audio output device 100*b* among a plurality of beacon signals is greater than or equal to the first predetermined value, and thus the mobile terminal 600 transmits the audio data Saub to the second audio output device 100*b* and the second audio output device 100*b* outputs sound 820*b* corresponding to the audio data Saub.

Figure 14C:
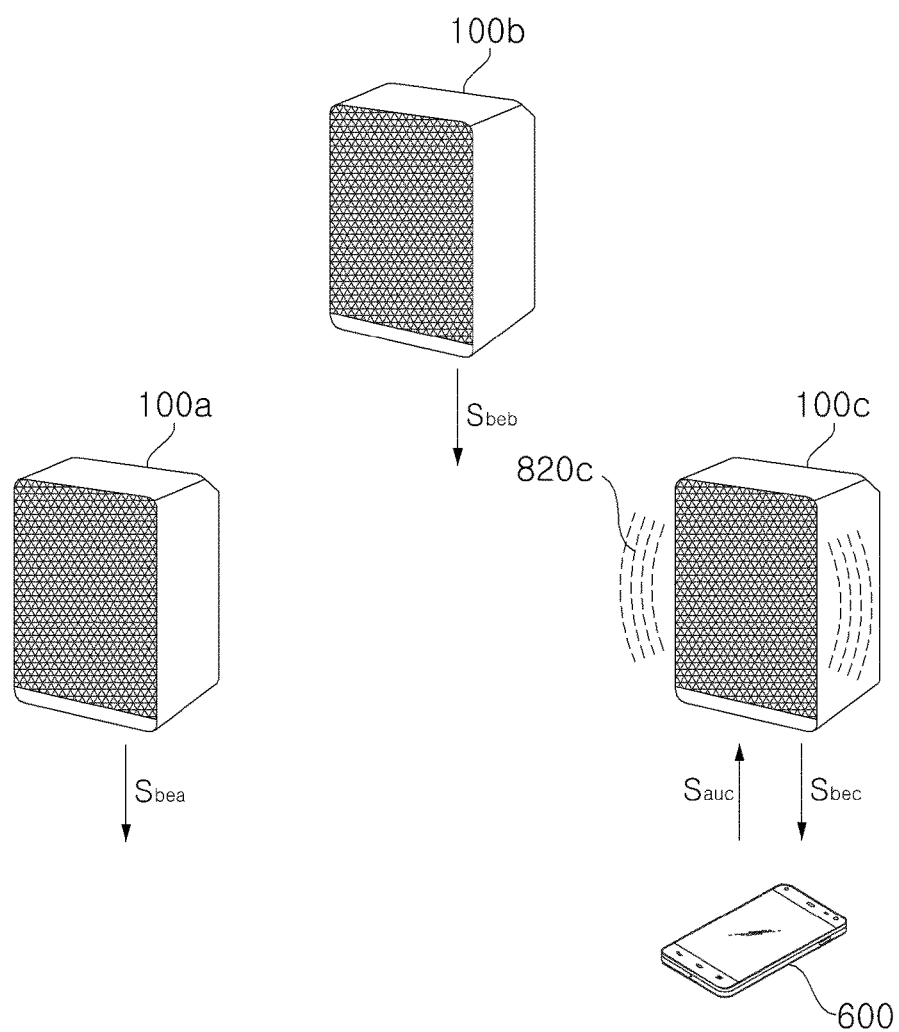

Next, FIG. 14C illustrates a case where the third audio output device 100*c* among the audio output devices 100*a*, 100*b* and 100*c* receives audio data Sauc reproduced by the mobile terminal 600 and outputs corresponding sound 820*c*.

That is, FIG. 14C illustrates a case where only the third beacon signal Sbec output from the third audio output device 100*c* among the plurality of beacon signals has a strength greater than or equal to the first predetermined value, and the mobile terminal 600 transmits the audio data Sauc to the third audio output device 100*c* and the third audio output device 100*c* outputs sound 820*c* corresponding to the audio data Sauc.

The plurality of audio output devices 100*a*, 100*b*, and 100*c* may be grouped together. The grouping information on the plurality of audio output devices 100*a*, 100*b*, and 100*c* may be stored in one of the audio output devices 100*a*, 100*b*, and 100*c*.

For example, when the first audio output device 100*a* among the audio output devices 100*a*, 100*b*, and 100*c* is a main audio output device, the memory 140 of the first audio output device 100*a* may contain device information on the plurality of audio output devices 100*a*, 100*b* and 100*c*, and the controller 170 may perform a control operation such that different sounds or the same sound are output according to audio channel assignment to the audio output devices 100*a*, 100*b* and 100*c*.

Figure 15A:
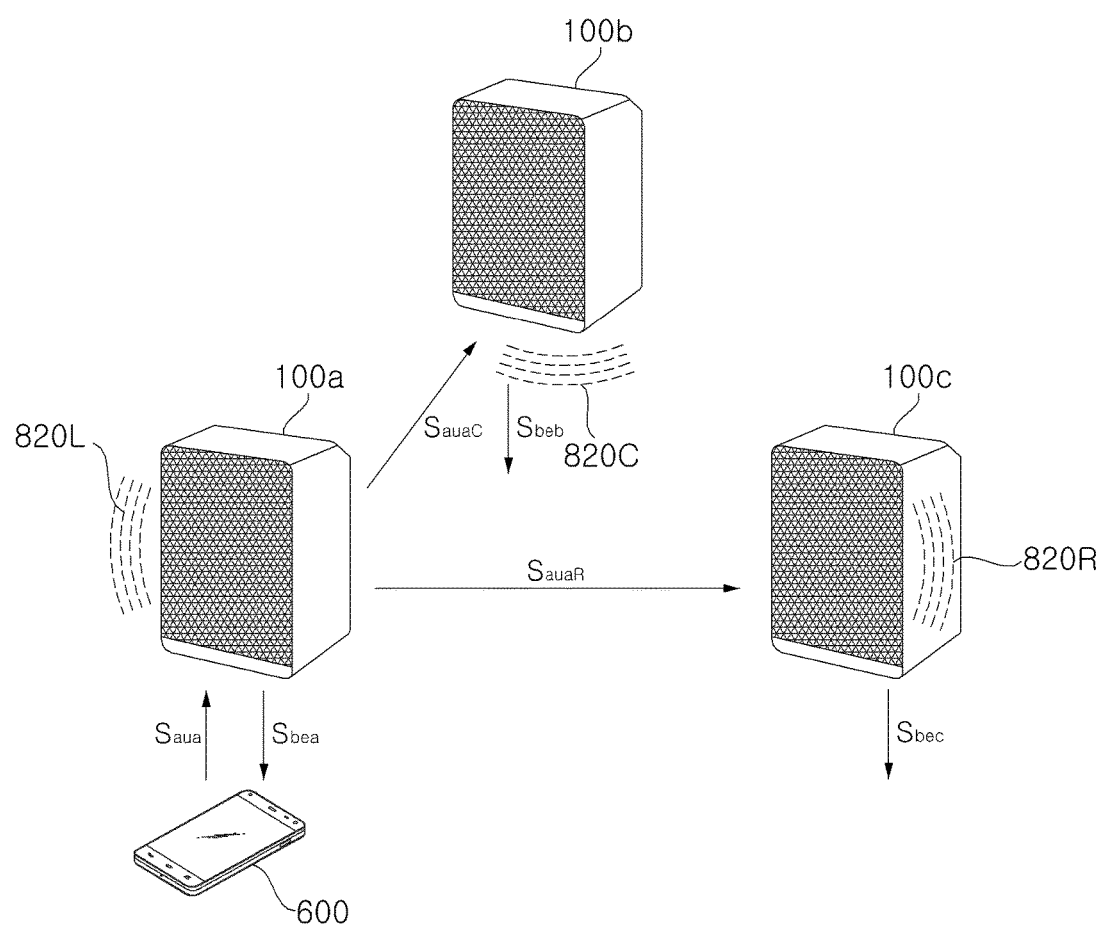

FIG. 15A illustrates output of sounds of different channels from the plurality of audio output devices 100*a*, 100*b*, and 100*c*.

The figure may illustrate that only the first beacon signal Sbea output from the first audio output device 100*a* among the plurality of beacon signals Sbea, Sbeb and Sbec is greater than or equal to the first predetermined value, and thus the mobile terminal 600 transmits audio data Saua to the first audio output device 100*a* and the first audio output device 100*a* outputs a first sound 820L corresponding to the audio data Saua.

The controller 170 of the first audio output device 100*a* may perform audio channel setting based on the grouping information on the plurality of audio output devices 100*a*, 100*b*, and 100*c*.

For example, upon receiving the audio data Saua from the mobile terminal 600, the controller 170 of the first audio output device 100*a* may perform a control operation such that a left channel sound 820L is output from the first audio output device 100*a*, a center channel sound 802*c* is output from the second audio output device 100*b*, and a right channel sound 802R is output from the third audio output device 100*c*.

To this end, when the audio data Saua is received from the mobile terminal 600, the controller 170 of the first audio output device 100*a* may perform a control operation to separate channels for the audio data Saua to transmit audio data of the left channel among the separated channels to the audio output unit 185 of the first audio output device 100*a*, transmit audio data SauaC of the center channel among the separated channels to the second audio output device 100*b* through the second communication module 112, and transmit audio data SauaR of the right channel among the separated channels to the third audio output device 100*c* through the second communication module 112.

Figure 15B:
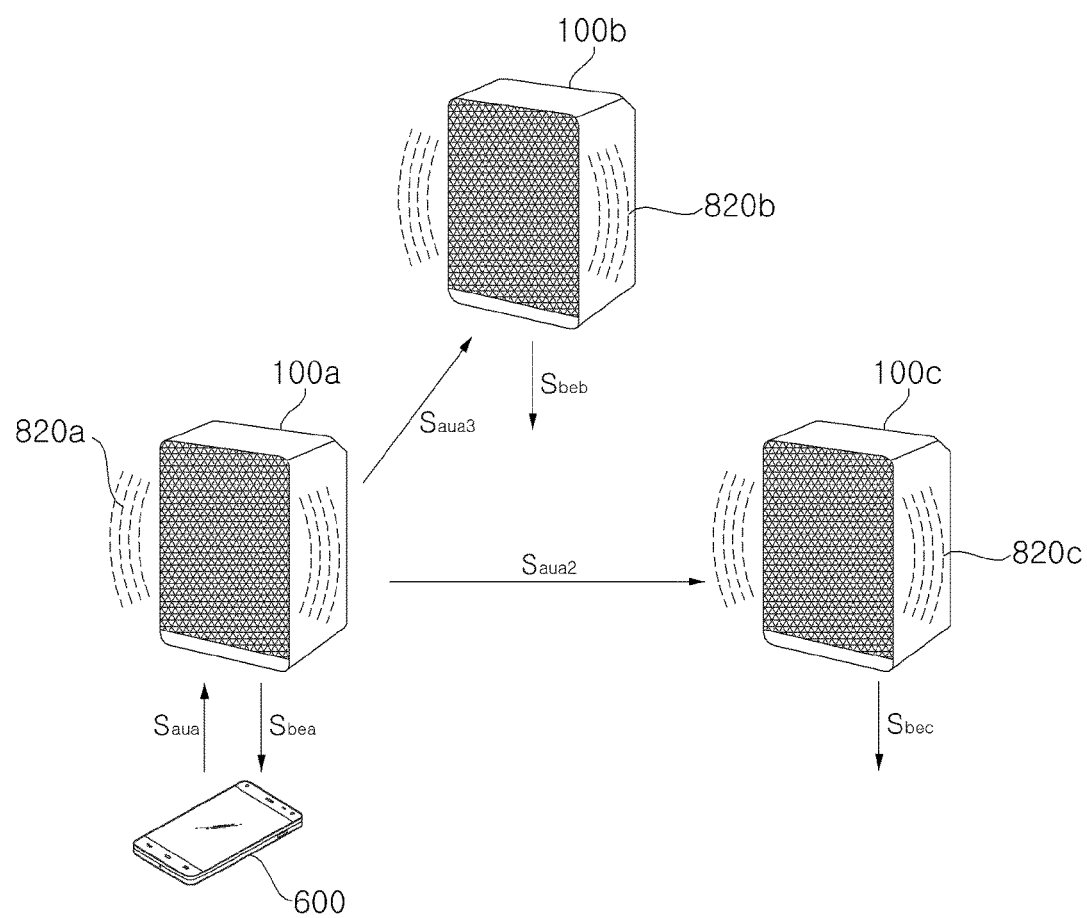

FIG. 15B illustrates a case where the same sound is output from a plurality of audio output devices 100*a*, 100*b*, and 100*c*.

The figure illustrates that only the first beacon signal Sbea output from the first audio output device 100*a* among the plurality of beacon signals Sbea, Sbeb, and Sbec has an RSSI greater than or equal to a first predetermined value, and thus the mobile terminal 600 transmits audio data Saua to the first audio output device 100*a*, and the first audio output device 100*a* outputs sound 820*a* corresponding to the audio data Saua.

The controller 170 of the first audio output device 100*a* may perform a control operation to output the same sound based on the grouping information on the plurality of audio output devices 100*a*, 100*b*, and 100*c*.

For example, upon receiving the audio data Saua from the mobile terminal 600, the controller 170 of the first audio output device 100*a* may perform a control operation such that the audio data Saub based on the received audio data Saua is transmitted to the second audio output device 100*b* through the second communication module 112, and the audio data Sauc based on the received audio data Saua is transmitted to the third audio output device 100*c* through the second communication module 112.

FIG. 15C illustrates output of the same sound and the same volume from the plurality of audio output devices 100*a*, 100*b*, and 100*c*.

FIG. 15C is nearly the same as FIG. 15B, except that the same volume is output from the plurality of audio output devices 100*a*, 100*b*, and 100*c*.

Different volume setting values may be set in the audio output devices 100*a*, 100*b*, and 100*c*.

The first audio output device 100*a*, which is the main audio output device, may store volume setting values for the respective audio output devices 100*a*, 100*b* and 100*c* in the memory 140. The volume setting value of each of these audio output devices may be received from each of the audio output devices 100b and 100c through the second communication module 112.

The first audio output device 100a may transmit the beacon signal Sbea and the volume setting value Sspg for each of the audio output devices 100a, 100b, and 100c) to the mobile terminal 600 through the first communication module 111.

When the mobile terminal 600 transmits the audio data Saua to the first audio output device 100a, the mobile terminal 600 may also transmit information about the volume value to be output from each audio output device.

Thereby, after receiving the audio data Saua and the volume value information, the controller 170 of the first audio output device 100a may perform a control operation to transmit the audio data Saua3 and the volume value information vo3 to the second audio output device 100b and to transmit the audio data Saua2 and the volume value information vo2 to the third audio output device 100c.

Unlike FIG. 15C, the mobile terminal 600 may not transmit separate volume value information to the first audio output device 100a, but the controller 170 of the first audio output device 100a may perform a control operation to transmit the audio data Saua3 and the volume value information vo3 to the second audio output device 100b and to transmit the audio data Saua2 and the volume value information vo2 to the third audio output device 100c in consideration of the received audio data Saua and a preset volume setting value for each audio output device.

If the RSSI of the received beacon signal continues to be greater than or equal to a first predetermined value within a predetermined time, the controller 680 of the mobile terminal 600 may perform a control operation to transmit the audio data being reproduced to each of the audio output devices 100a, 100b and 100c.

Figure 16B:
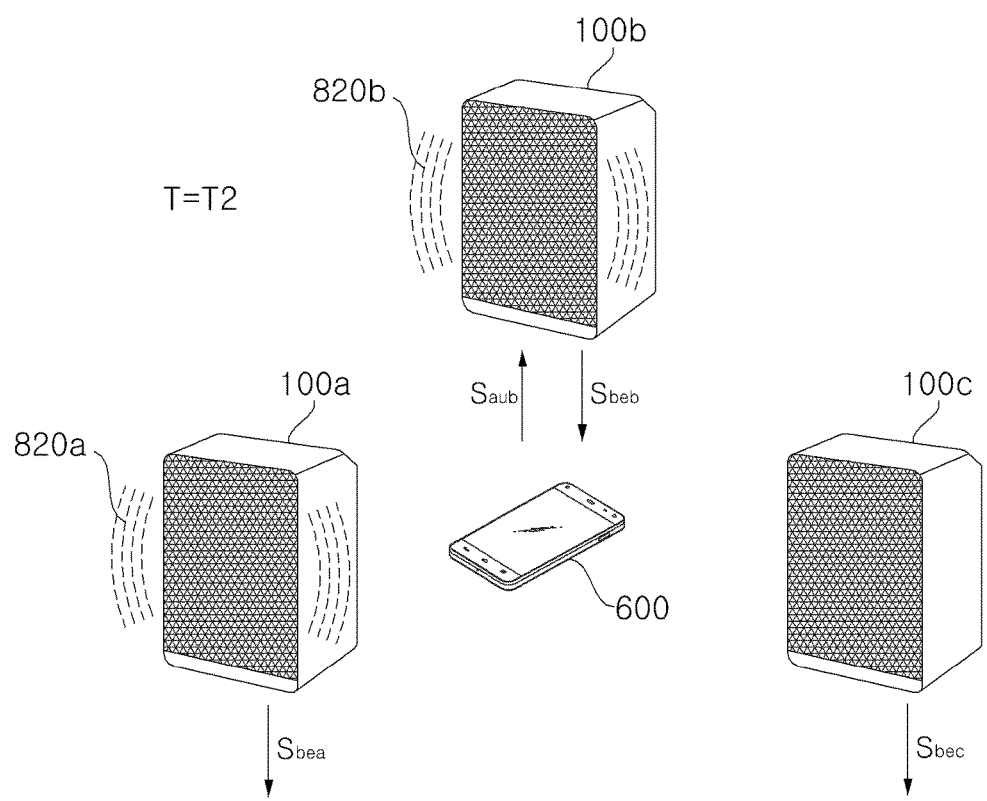
Figure 16C:
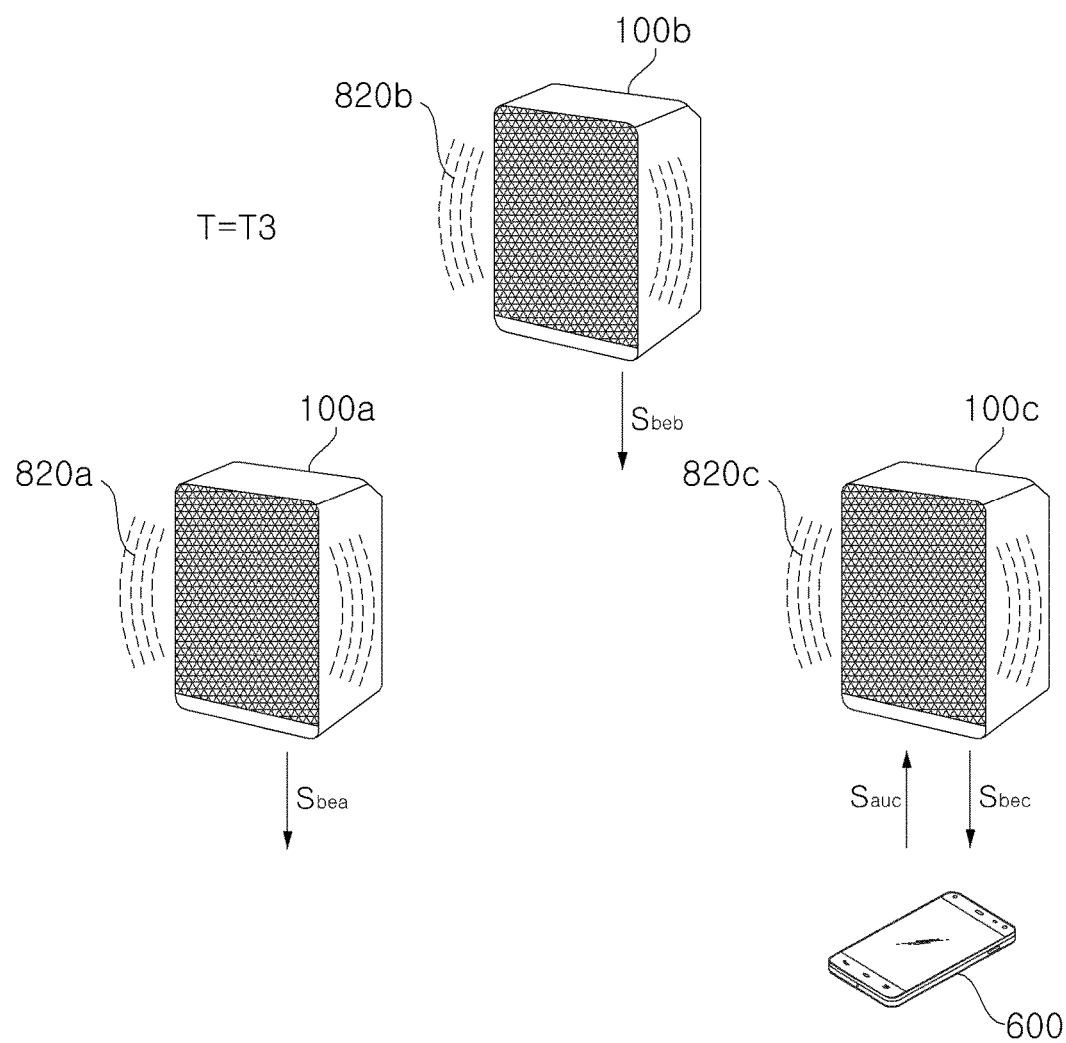

FIGS. 16A to 16C illustrate outputting sound from each audio output device when the RSSI of the received beacon signal continues to be greater than or equal to a first predetermined value in the mobile terminal 600 within a predetermined time.

FIG. 16A illustrates a case where only the first beacon signal Sbea output from the first audio output device 100a among the plurality of beacon signals Sbea, Sbeb and Sbec is greater than or equal to the first predetermined value at a first time T1, and thus the mobile terminal 600 transmits the audio data Saua to the first audio output device 100a and the first audio output device 100a outputs sound 820a corresponding to the audio data Saua.

Next, FIG. 16B illustrates a case where the mobile terminal 600 moves close to the second audio output device 100b at a second time T2, which is within a predetermined time after the first time T1.

That is, FIG. 16B illustrates that only the second beacon signal Sbeb output from the second audio output device 100b among the plurality of beacon signals Sbea, Sbeb and Sbec is greater than or equal to the first predetermined value at the second time T2, and thus the mobile terminal 600 transmits the audio data Saub to the second audio output device 100b and the second audio output device 100b outputs sound 820b corresponding to the audio data Saub.

At this time, the mobile terminal 600 may transmit the audio data Saua to the first audio output device 100a, and the first audio output device 100a may transmit the sound 820a corresponding to the audio data Saua. Here, the sound 820a and the sound 820b may be the same sound of the same channel.

Next, FIG. 16C illustrates a case where the mobile terminal 600 moves close to the third audio output device 100c at a third time T3 within a predetermined time after the second time T2.

That is, FIG. 16C illustrates that only the third beacon signal Sbec output from the third audio output device 100c among the plurality of beacon signals Sbea, Sbeb and Sbec is greater than or equal to the first predetermined value at the third time T3, and thus the mobile terminal 600 transmits the audio data Sauc to the third audio output device 100c and the third audio output device 100c outputs sound 820c corresponding to the audio data Sauc.

At this time, the mobile terminal 600 may transmit the audio data Saua and Saub to the first audio output device 100a and the second audio output device 100b, and the first audio output device 100a and the second audio output device 100b may output the same sound 820a together.

If the RSSI of the received beacon signal continues to be greater than or equal to a first predetermined value within a predetermined time, the controller 680 of the mobile terminal 600 may perform a control operation to transmit the audio data being reproduced to each audio output device such that the audio data is distinguished by channels.

Figure 17A:
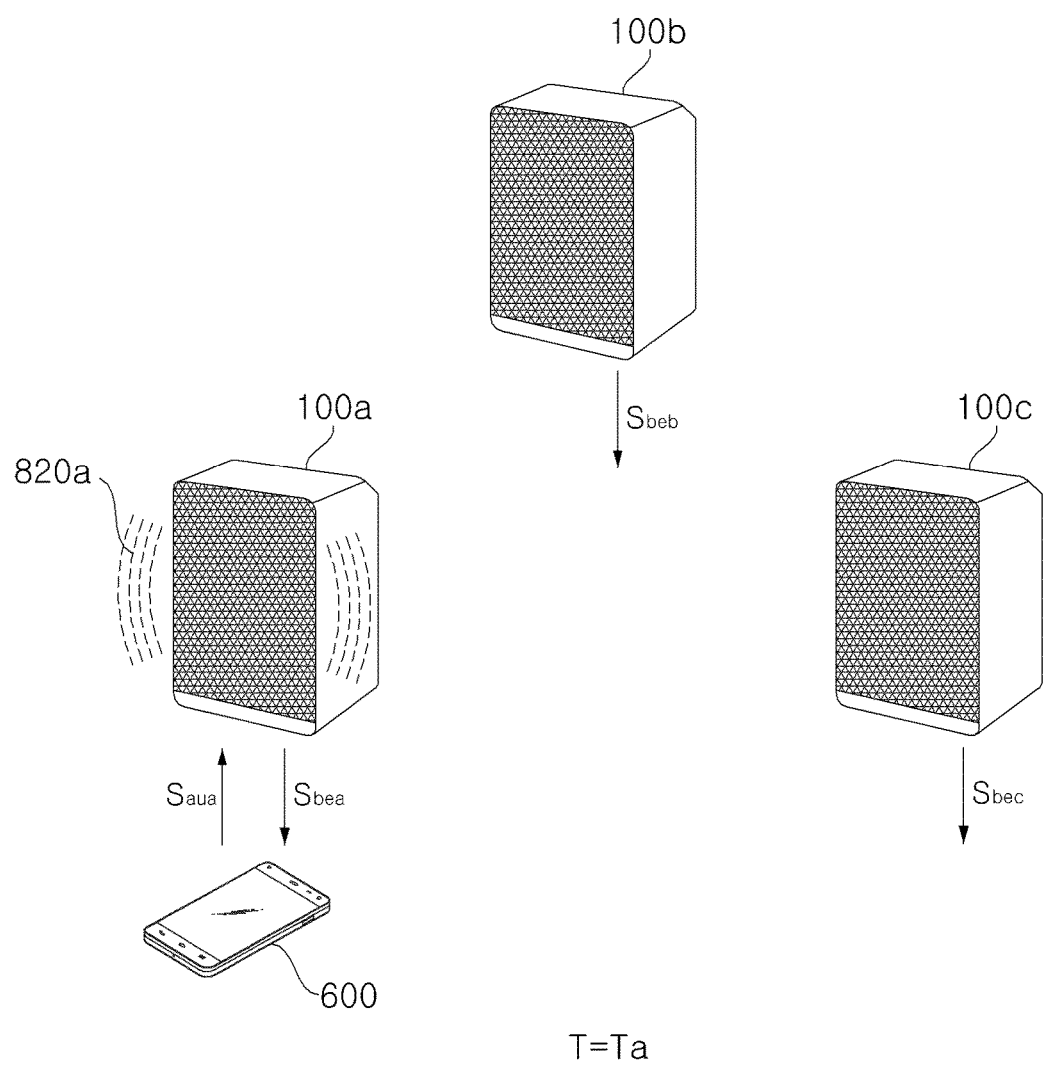
Figure 17B:
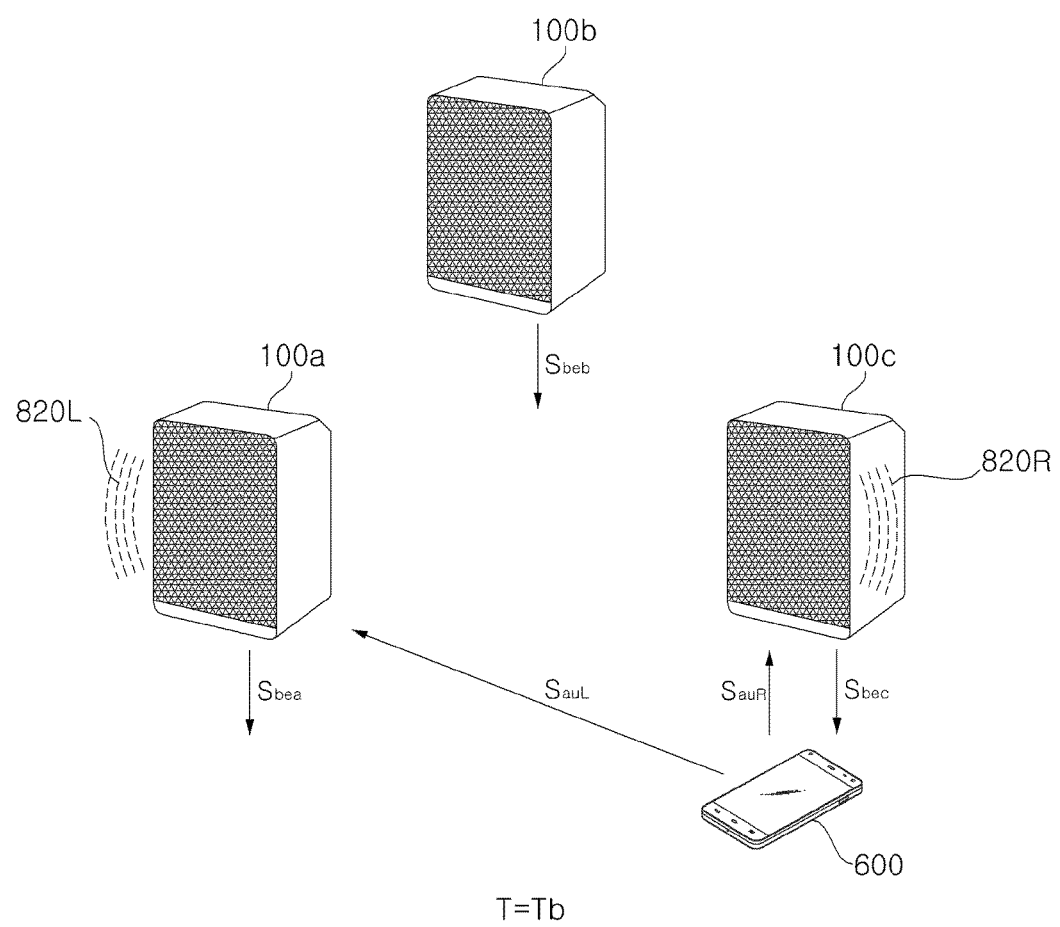

FIGS. 17A and 17B illustrate output of sound from each audio output device when the RSSI of the received beacon signal continues to be greater than or equal to a first predetermined value in the mobile terminal 600 within a predetermined time, such that the sounds are distinguished by channels.

FIG. 17A illustrates outputting the sound 820a corresponding to the received audio data Saua from the first audio output device 100a at time Ta, as in FIG. 16A.

In addition to the beacon signal, the mobile terminal 600 may receive grouping information on a plurality of audio output devices.

FIG. 17B illustrates a case where the mobile terminal 600 moves close to the third audio output device 100c at time Tb, which is within a predetermined time after time Ta.

If the third beacon signal Sbec in addition to the first beacon signal Sbea is greater than or equal to the first predetermined value within a predetermined time, the controller 680 of the mobile terminal 600 may perform a control operation to transmit audio data SauR corresponding to the right channel to the third audio output device 100c. Then, the controller may perform a control operation to transmit audio data SauL corresponding to the left channel to the first audio output device 100a.

That is, the first audio output device 100a may receive the audio data Saua of the stereo channel and output the corresponding sound 820a at time Ta, and then receive audio data SauL of the left channel and output the corresponding sound 820L at time Tb.

The third audio output device 100c may output sound 820R corresponding to the audio data SauR corresponding to the right channel at time Tb. Accordingly, sounds may be output channel by channel using a plurality of audio output devices.

Meanwhile, the mobile terminal 600 may receive device information and channel setting information on each of the audio output devices 100a, 100b, and 100c together with or separately from the beacon signal.

The controller 680 of the mobile terminal 600 may set an audio channel for each of the audio output devices 100a, 100b, and 100c based on the device information and the channel setting information. In addition, as shown in FIG. 17B, the controller may perform a control operation to output the left channel sound 820L to the first audio output device 100*a* and the right channel sound 820R to the third audio output device 100*c*.

Figure 18B:
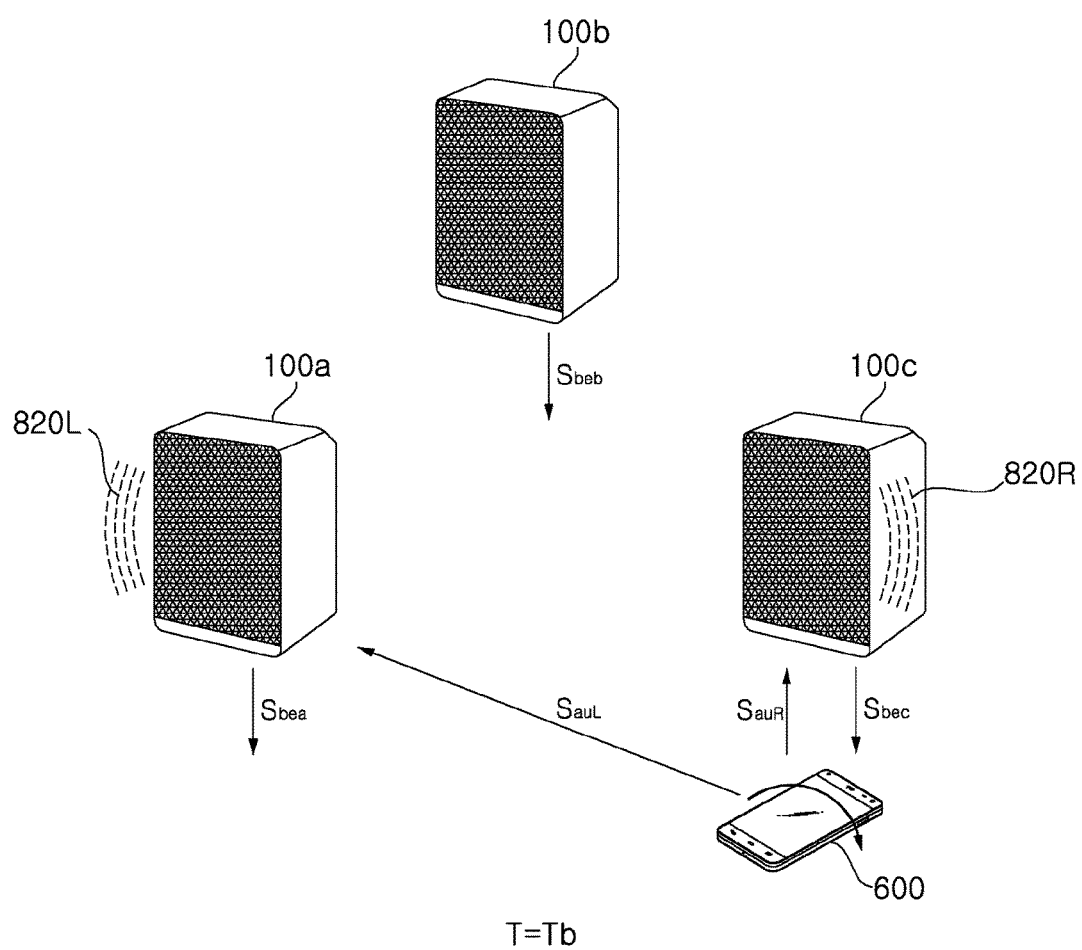

FIGS. 18A and 18B are similar to FIGS. 17A and 17B.

The difference is that channel setting is performed based on motion information sensed by the mobile terminal 600, rather than based on the device information on the audio output devices and the channel setting information received by the mobile terminal 600.

FIG. 18A illustrates that the mobile terminal 600 is rotated counterclockwise while being positioned near the first audio output device 100*a*. The counterclockwise rotation may be sensed by the motion sensor 645 in the sensing unit 640.

The mobile terminal 600 receives the beacon signal Sbea of the first audio output device 100*a*. If the beacon signal is greater than or equal to a first predetermined value, the controller 680 of the mobile terminal 600 may perform a control operation to transmit the left channel audio data SauL to the first audio output device 100*a*.

Thus, the first audio output device 100*a* outputs sound 820L corresponding to the left channel audio data SauL.

Next, FIG. 18B illustrates that the mobile terminal 600 is positioned close to the third audio output device 100*c* and rotated clockwise at time Tb, which is within a predetermined time after time Ta. The clockwise rotation may be sensed by the motion sensor 645 in the sensing unit 640.

The mobile terminal 600 receives the beacon signal Sbec of the third audio output device 100*c*. If the beacon signal is greater than or equal to the first predetermined value, the controller 680 of the mobile terminal 600 may perform a control operation to transmit the right channel audio data SauR to the third audio output device 100*c*.

Thus, the third audio output device 100*c*) outputs sound 820R corresponding to the right channel audio data SauR. The first audio output device 100*a* continues to output the sound 820L corresponding to the left channel audio data SauL.

FIGS. 19A to 22F illustrate various UIs for connection and addition of an audio output device.

First, FIG. 19A to 19H illustrate a UI for connecting an audio output device to an AP device in a wired manner.

The controller 680 of the mobile terminal 600 may perform a control operation to display an installation start screen 1903 on the display 651.

Figure 19A:
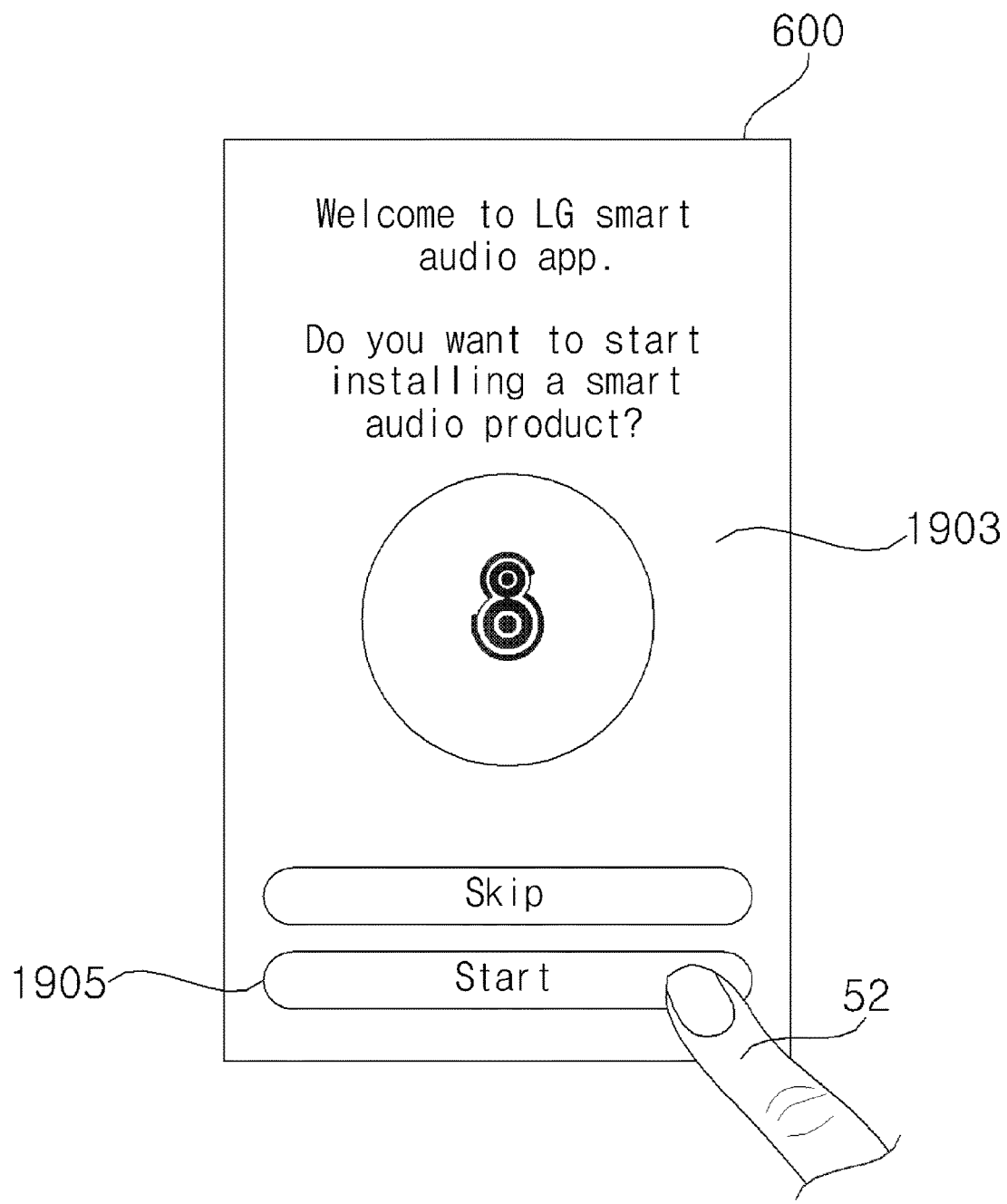
Figure 19B:
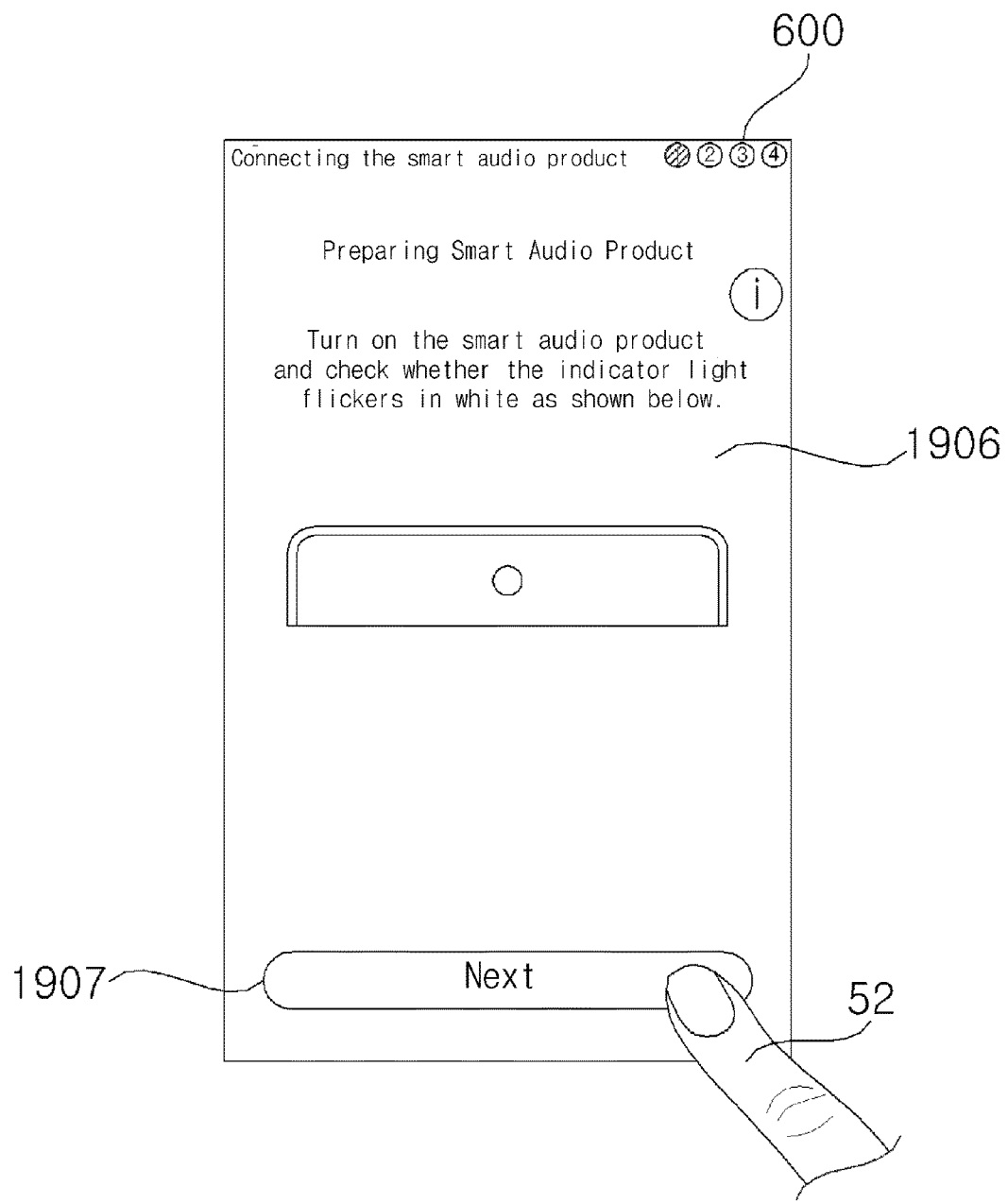

When the Start item 1905 is selected on the installation start screen 103 by a user's hand 52, a screen 1906 as shown in FIG. 19B may be displayed. When the Next item 1907 is selected by the user's hand 52, a connection method selection screen 1908 may be displayed as shown in FIG. 19C.

The connection method selection screen 1908 may include a Wired item 1909 and a Wireless item.

Figure 19C:
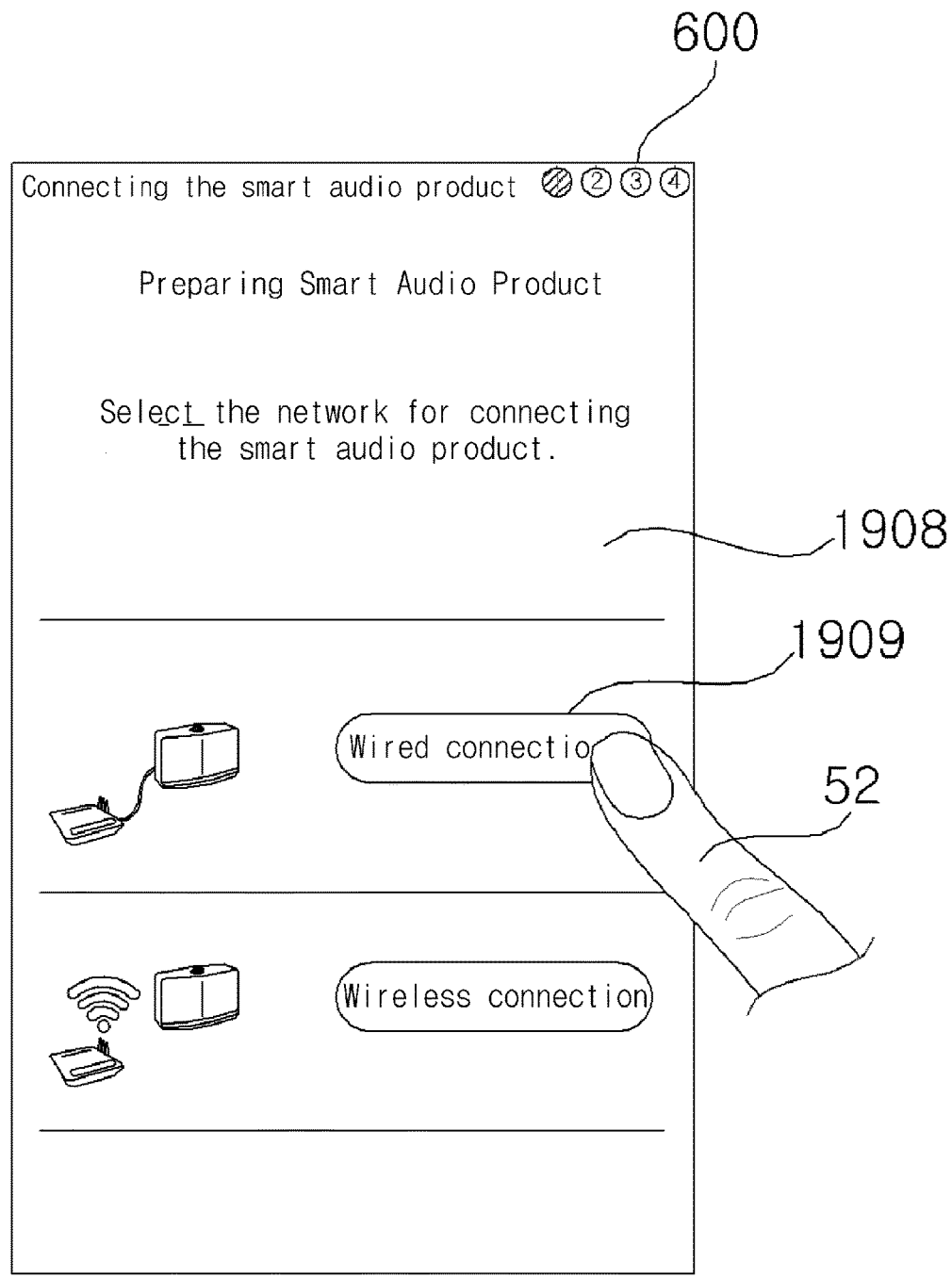
Figure 19D:
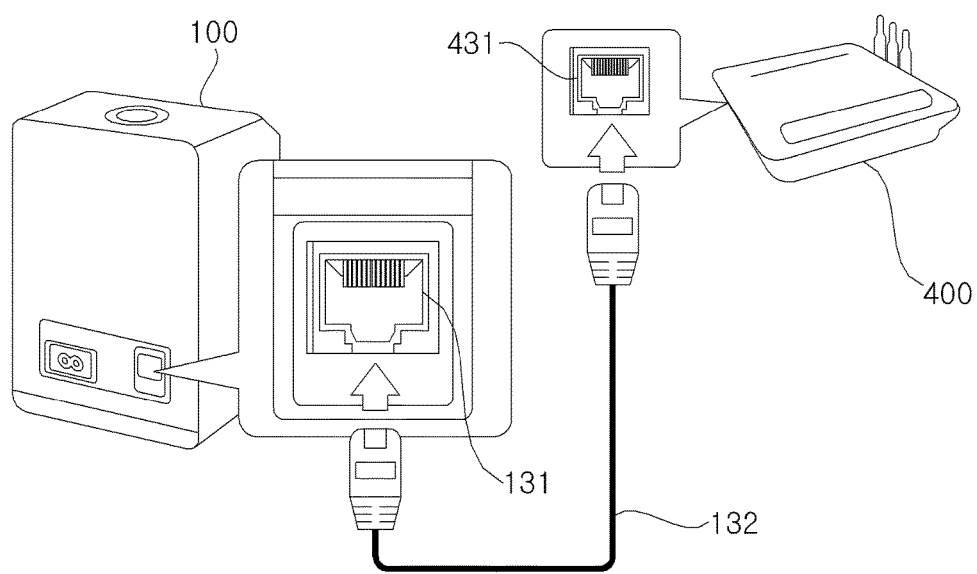

The wired connection indicates that a wired cable 132 is connected to a connection part 131 of the audio output device 100 and to a connection part 431 of the AP device 400, as shown in FIG. 19D.

Figure 19E:
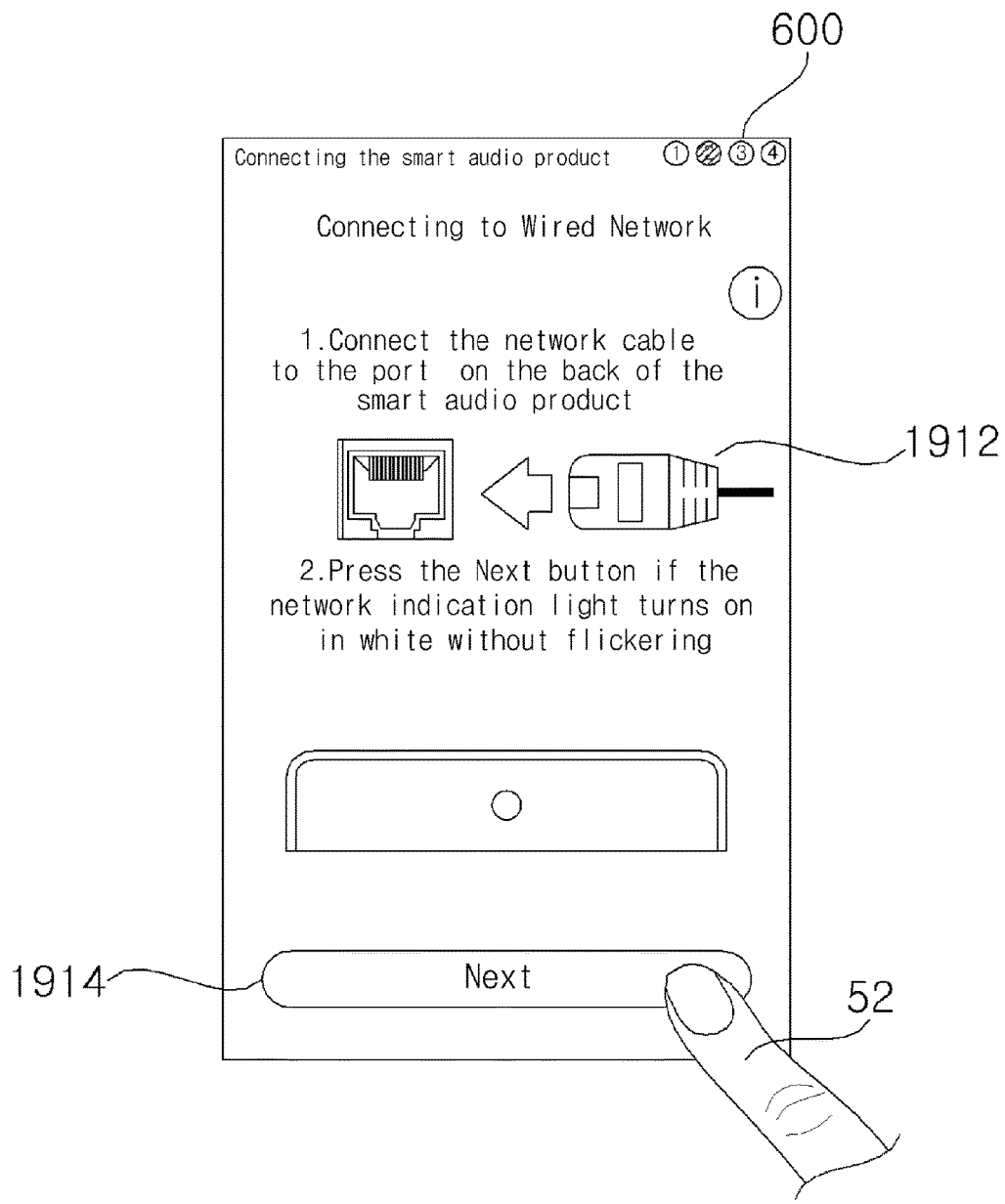

When the Wired item 1909 is selected by the user's hand 52 on the connection method selection screen 1908 as shown in FIG. 19C, the controller 680 of the mobile terminal 600 may perform a control operation to display a wired connection example screen 1912 as shown in FIG. 19E.

Figure 19F:
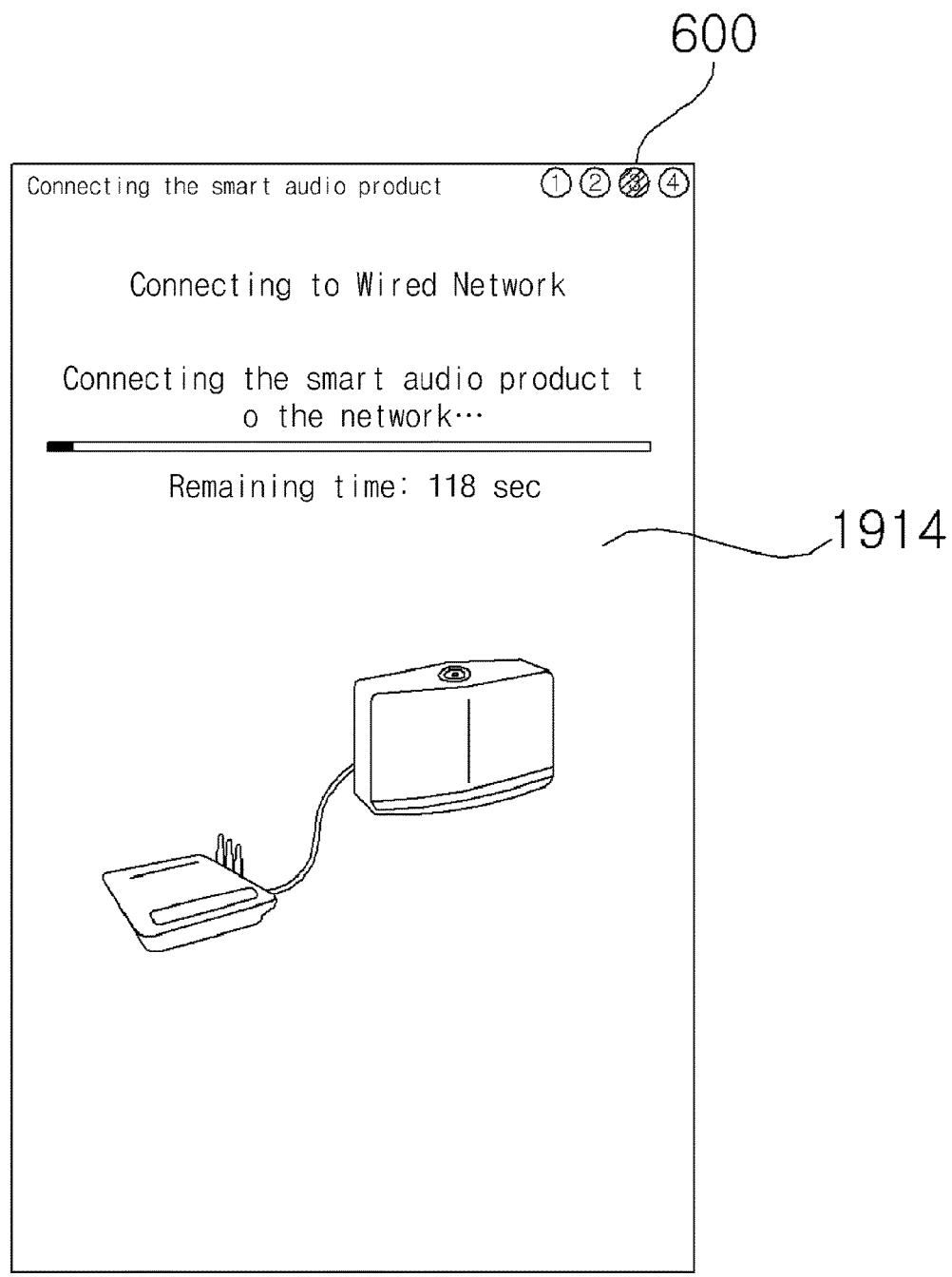

When the Next item 1914 is selected by the user's hand 52 on the wired connection example screen 1912, the controller 680 of the mobile terminal 600 may perform a control operation to display a wired connection execution screen 1914 as shown in FIG. 19F.

Figure 19G:
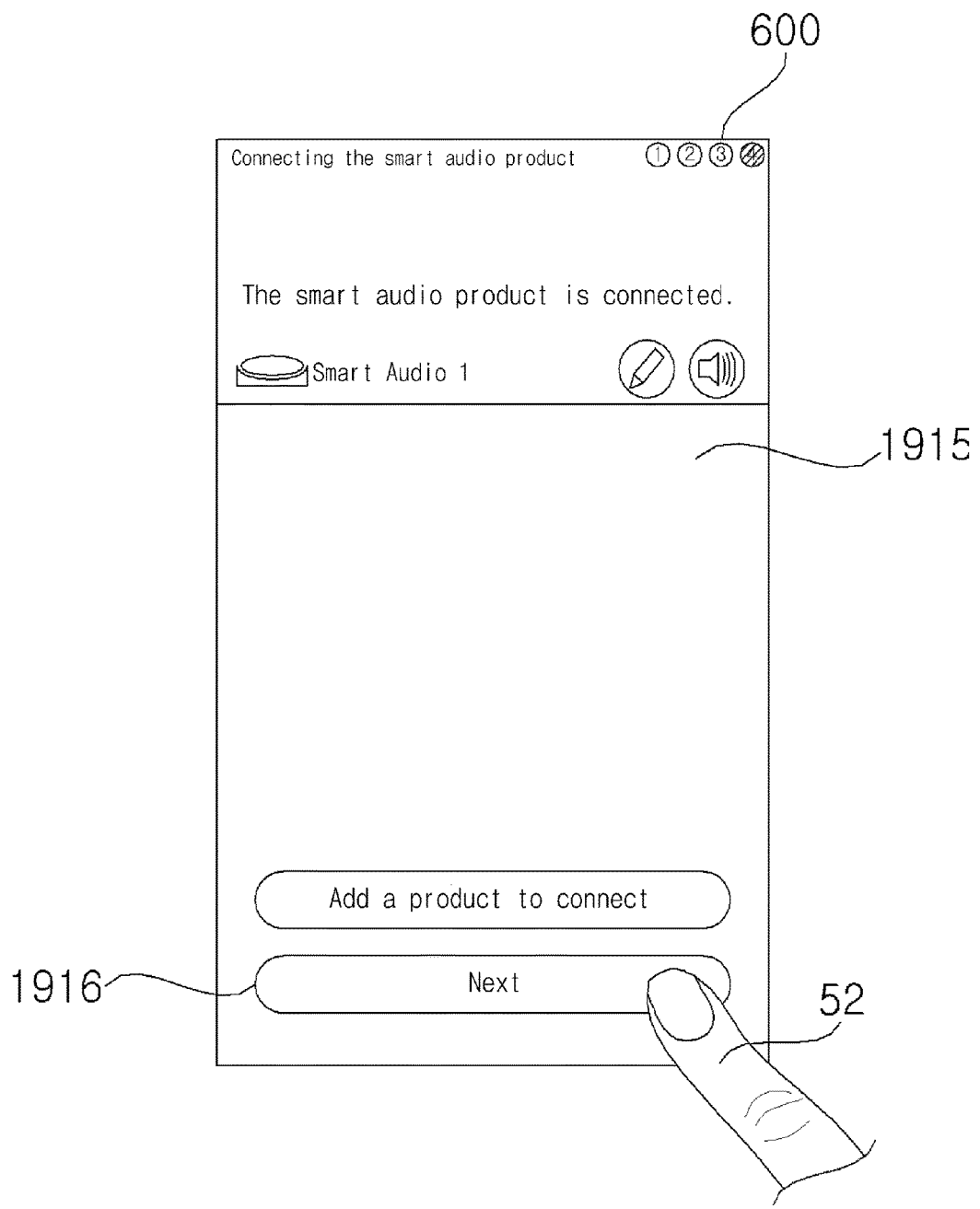

After the wired connection is completed, the controller 680 of the mobile terminal 600 may control a wired connection termination screen 1915 as shown in FIG. 19G to be displayed. The wired connection termination screen 1915 may include an add-device-to-be-connected item and a Next item 1916.

Figure 19H:
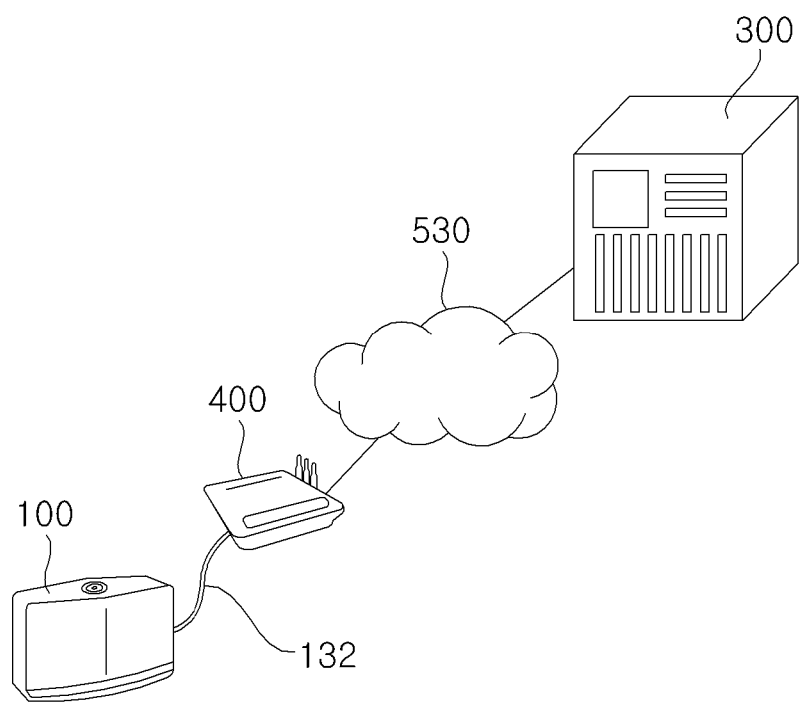

After wired connection is completed, the audio output device 100 may be wired to the AP device 400 as shown in FIG. 19H. After being wired to the AP device 400, the audio output device 100 may exchange data with the server 300 via the network 530.

Next, FIGS. 20A to 20K illustrate an example of a UI for wirelessly connecting an audio output device to an AP device.

Figure 20A:
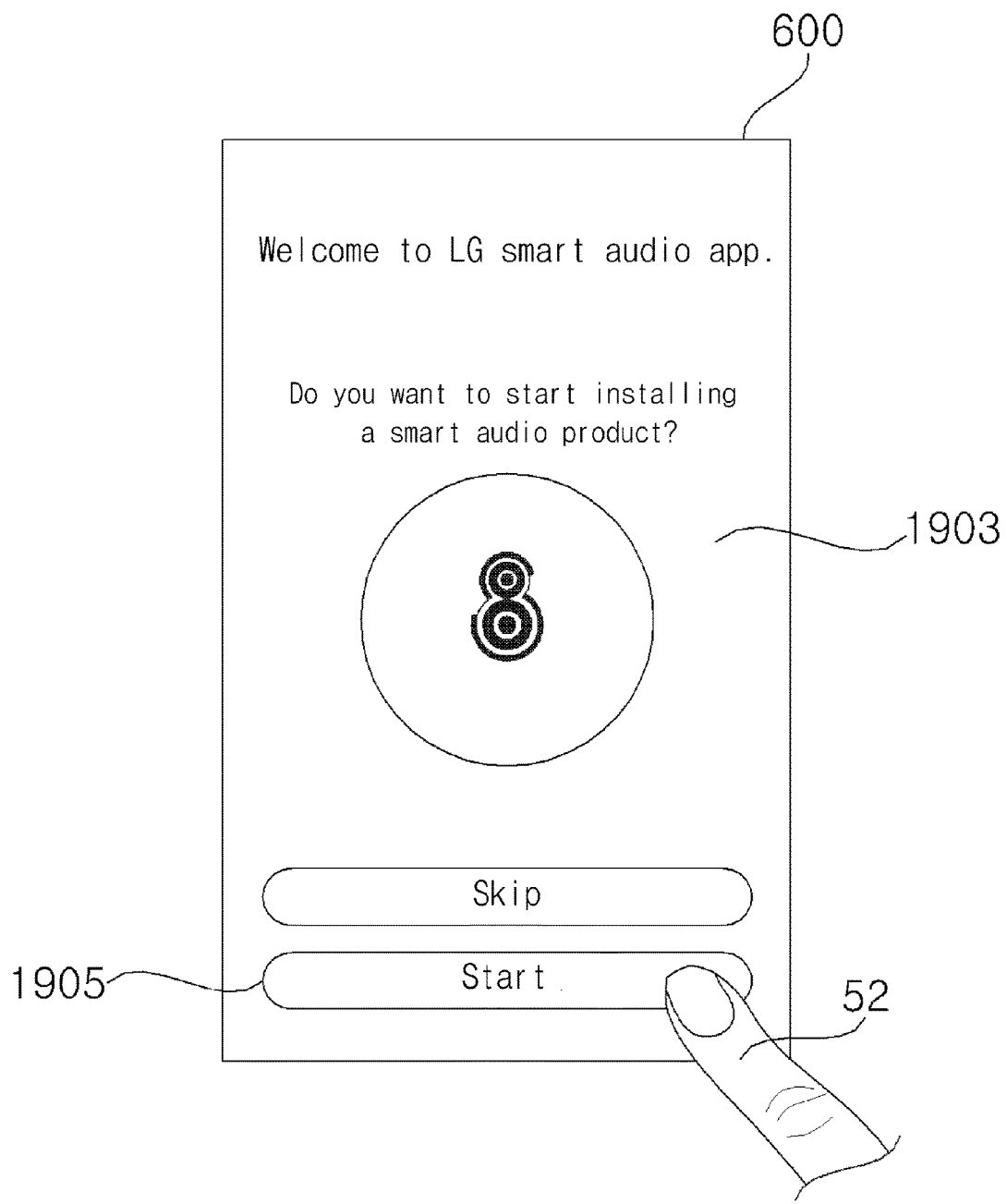
Figure 20B:
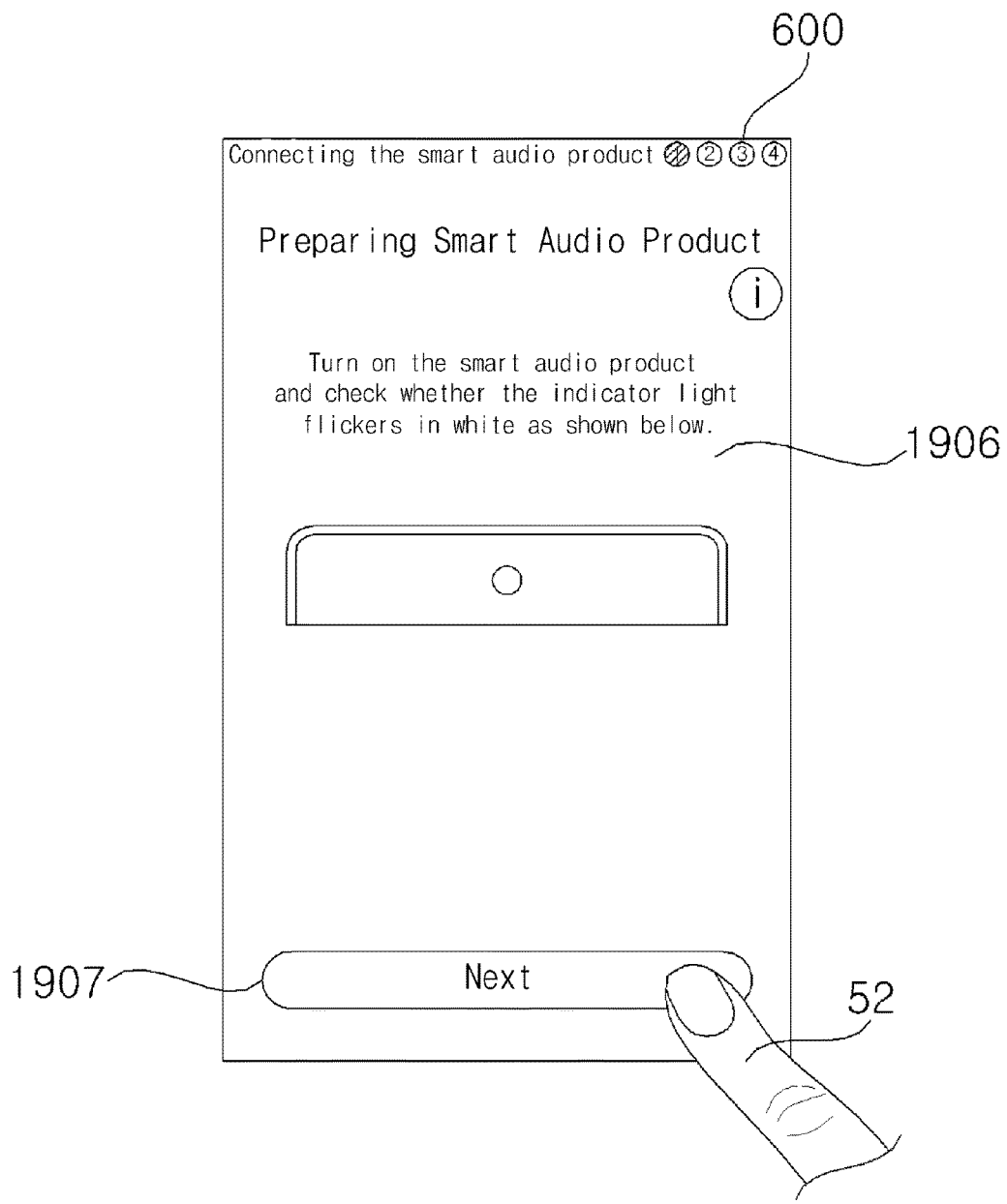
Figure 20C:
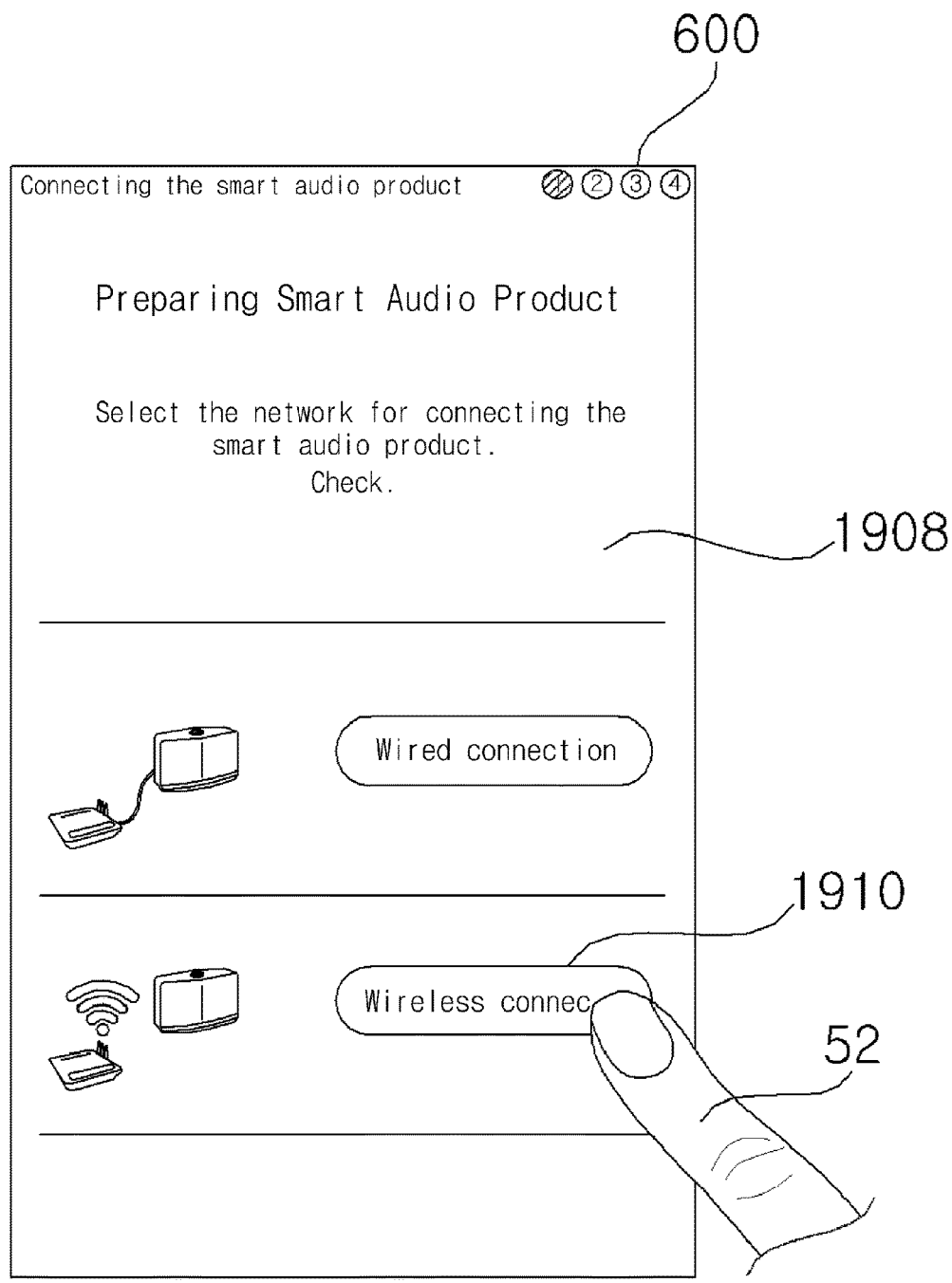

The screens 1903, 1906, and 1908 in FIGS. 20A to 20C are the same as the screens 1903, 1906, and 1908 in FIGS. 19A to 19C.

Figure 20D:
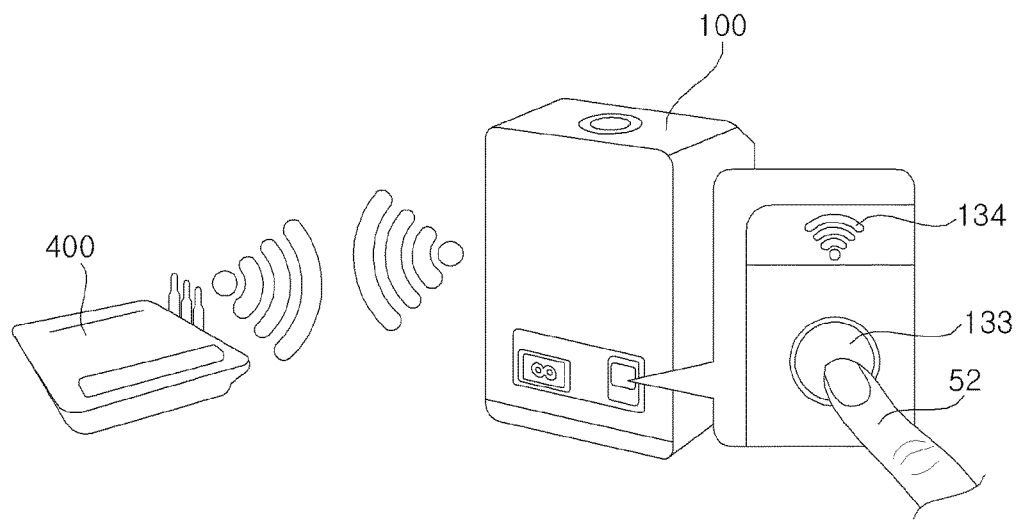
Figure 20E:
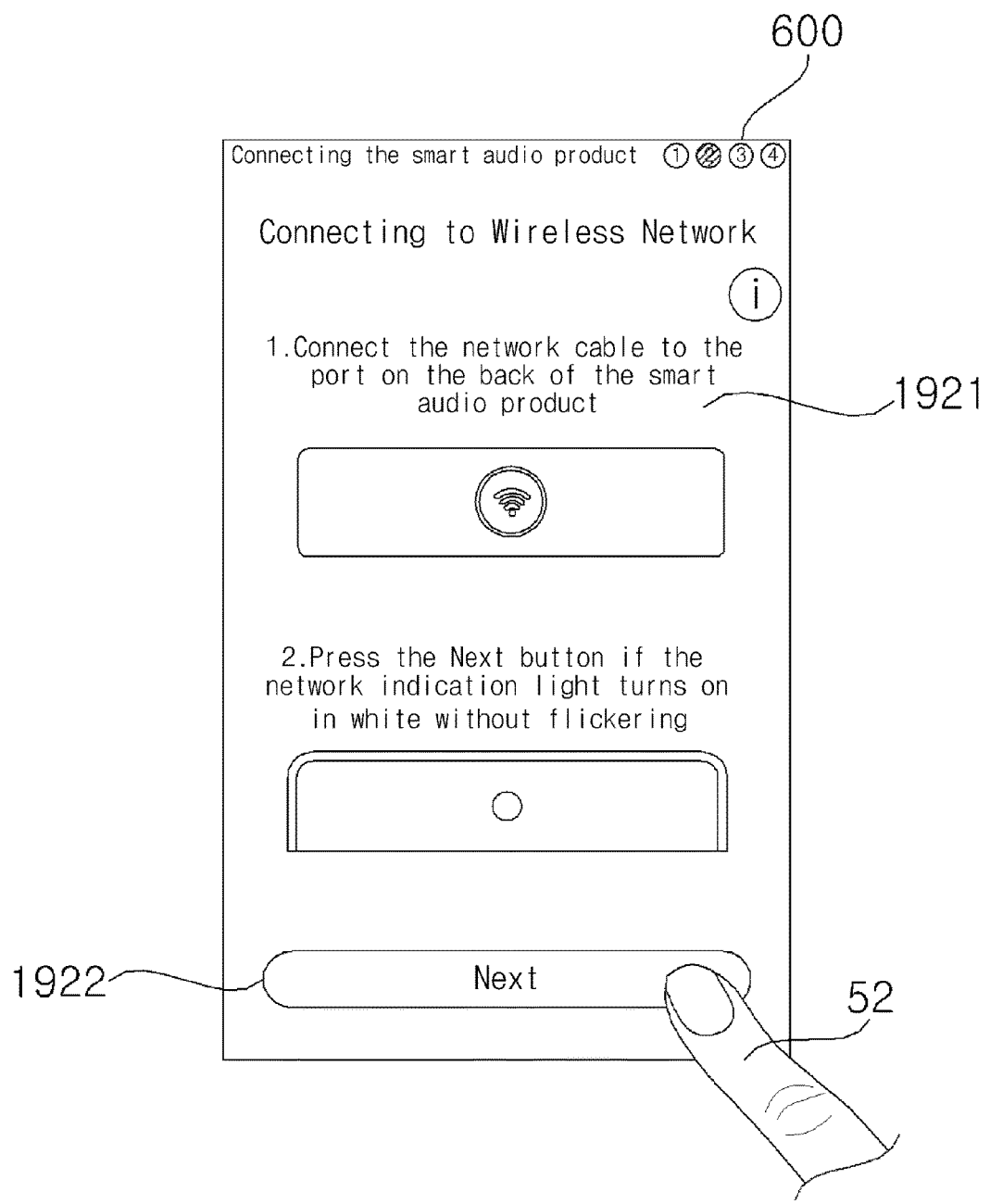

When the Wireless item 1910 is selected by the user's hand 52 on the connection method selection screen 1908 as shown in FIG. 20C, the controller 680 of the mobile terminal 600 may perform a control operation to display a wireless connection example screen 1921 as shown in FIG. 20E.

FIG. 20D illustrates wireless connection between the AP device 400 and the audio output device 100. The wireless connection may be executed when a button 133 on the audio output device 100 is pressed as shown in FIG. 20D, and a wireless connection indication may be displayed on a display window 134.

When the Wireless item 1910 is selected by the user's hand 52 on the connection method selection screen 1908 as shown in FIG. 20C, the controller 680 of the mobile terminal 600 may perform a control operation to display the wireless connection example screen 1921 as shown in FIG. 20E.

Figure 20F:
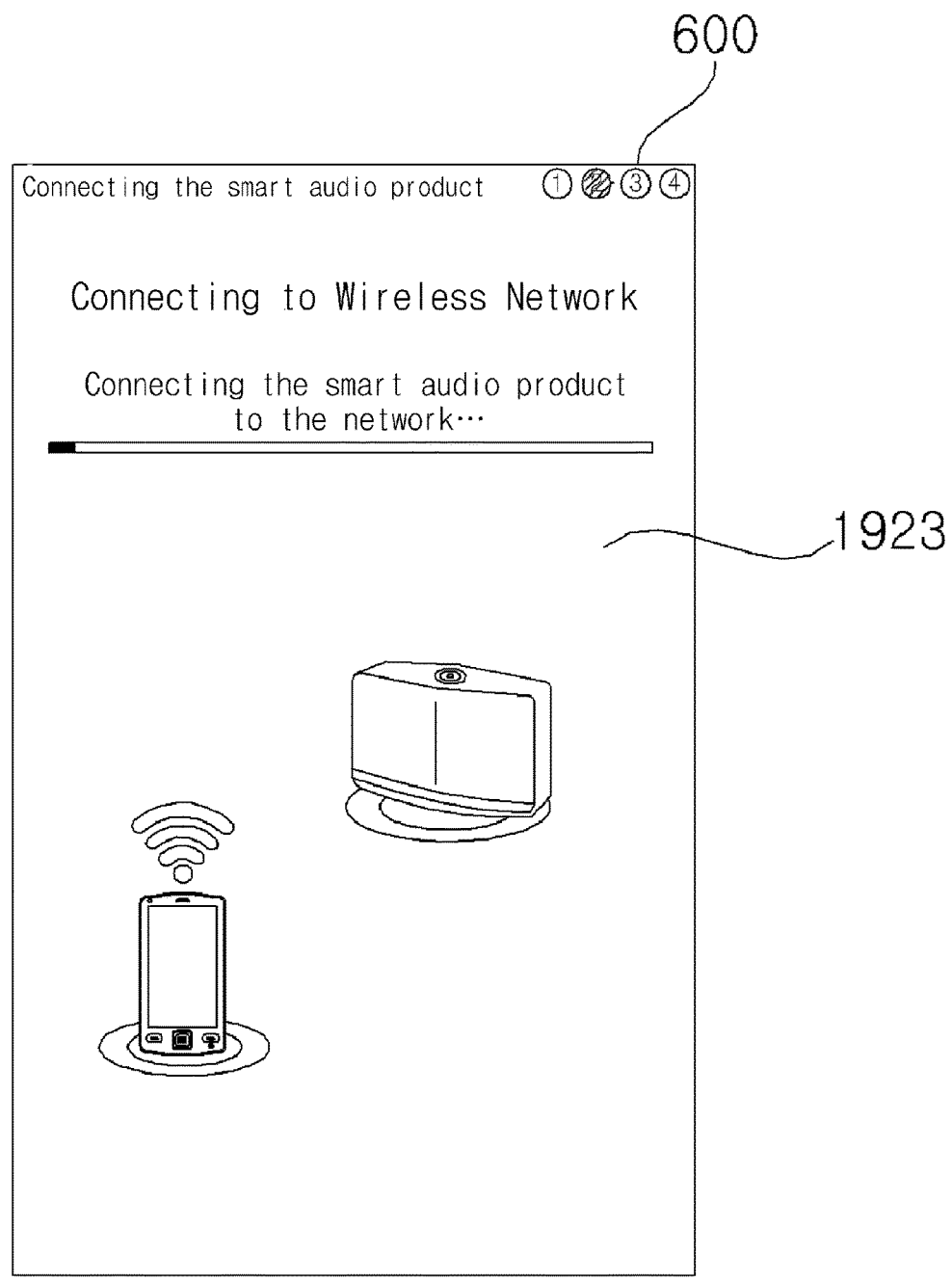

When the Next item 1922 is selected by the user's hand 52 on the wireless connection example screen 1921, the controller 680 of the mobile terminal 600 may perform a control operation to display a wireless connection execution screen 1923 as shown in FIG. 20F.

Figure 20G:
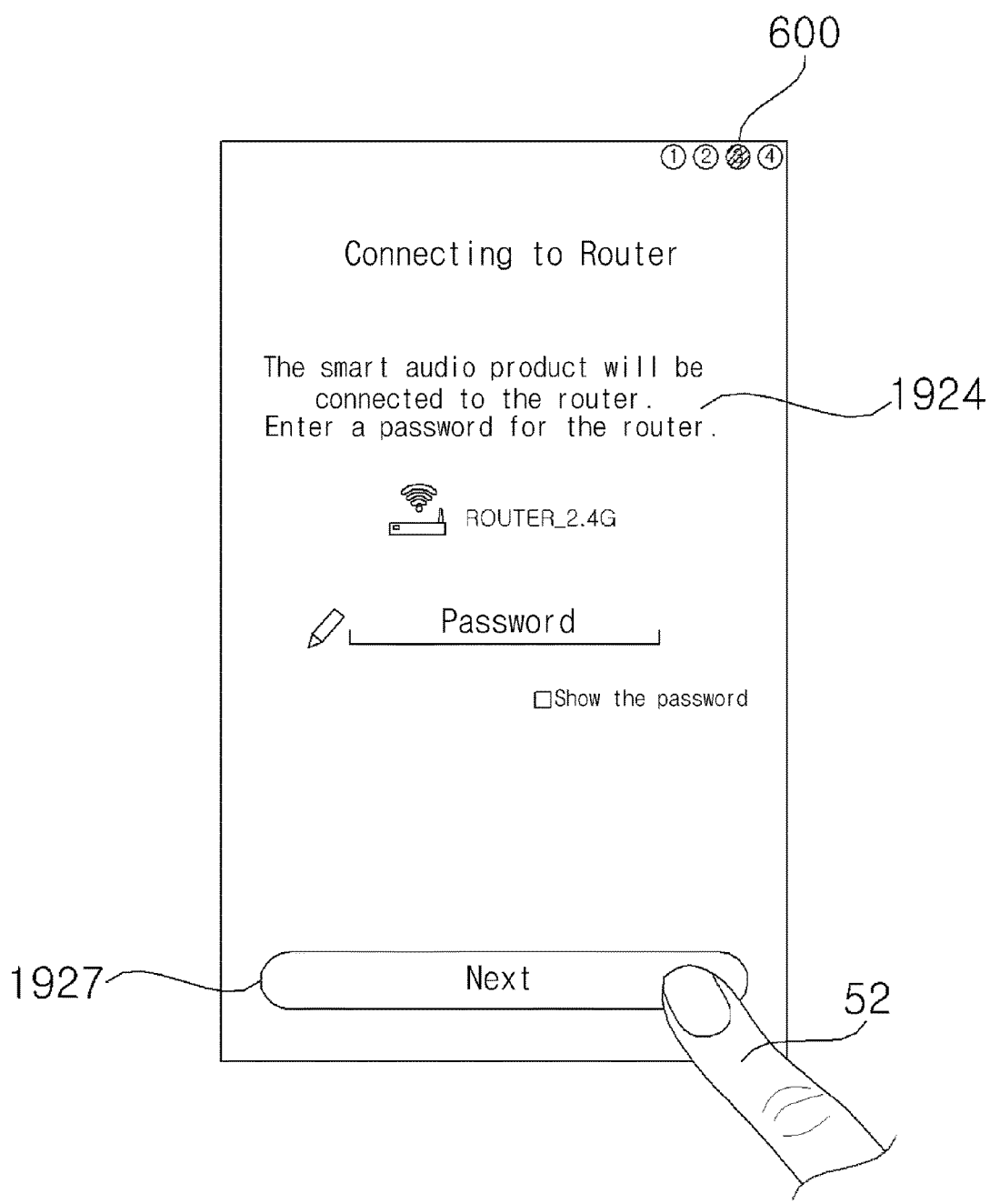
Figure 20H:
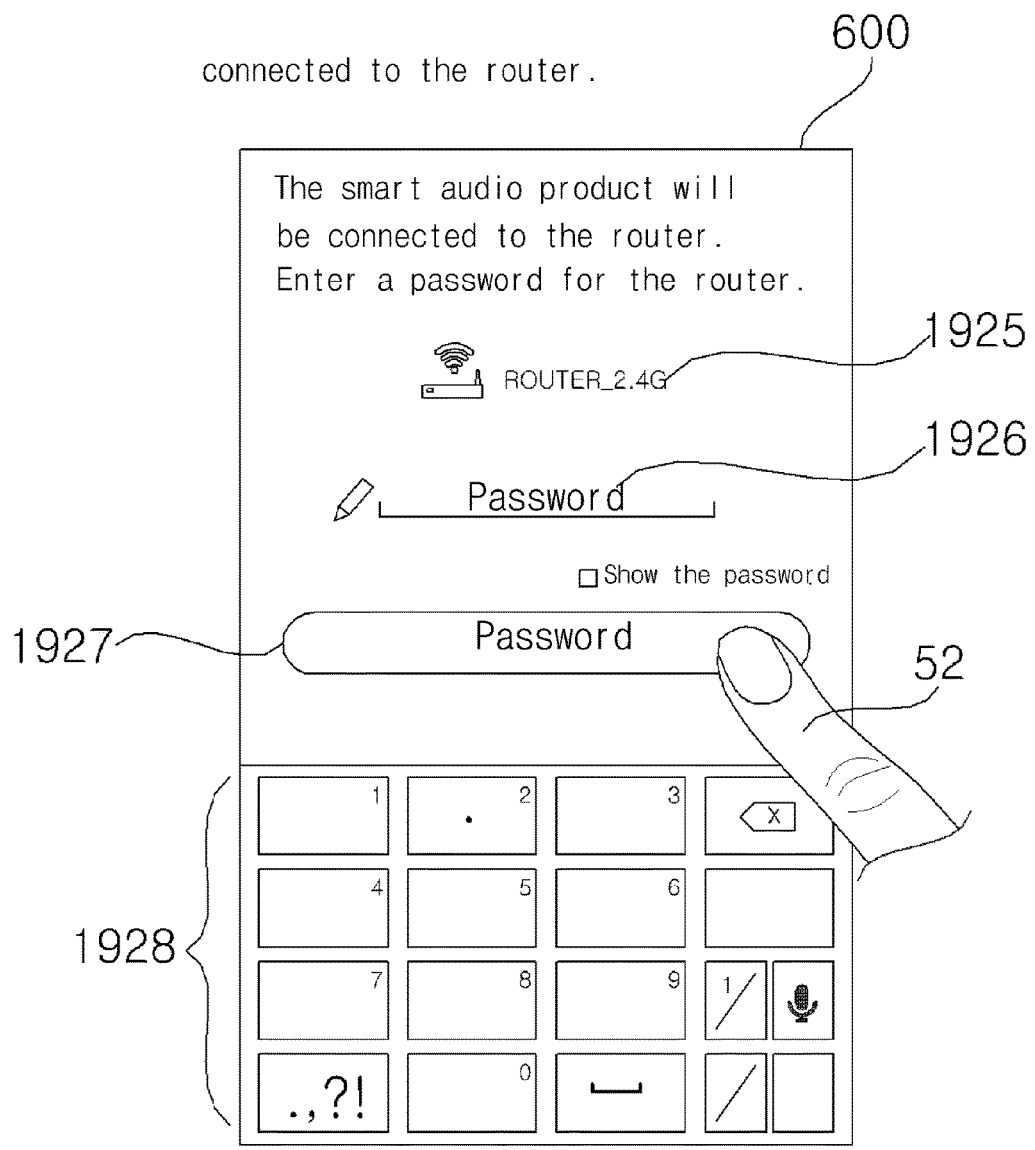

Next, the controller 680 of the mobile terminal 600 may perform a control operation to display an AP device connection screen 1924 as shown in FIG. 20G. At this time, if the Next item 1927 is selected, a password entry screen for access to the AP device appears as shown in FIG. 20H.

The password entry screen for access to the AP device may include an AP device name 1925, a password entry window 1926, a character window 1928 for inputting characters, and a Next item 1927.

Figure 20I:
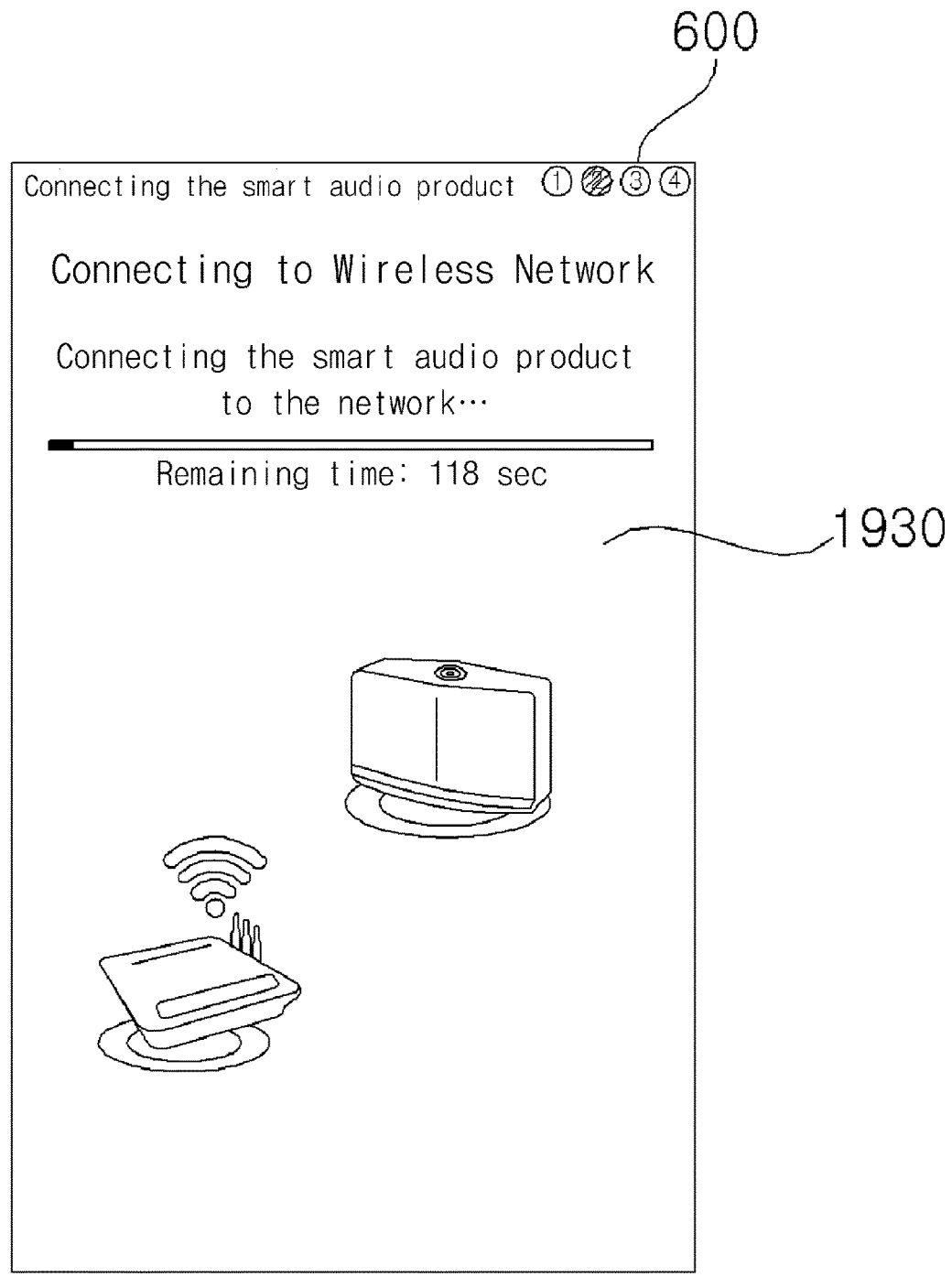

When the Next item 1927 is selected after characters for the character window 1928 are input on the password entry window 1926, the controller 680 of the mobile terminal 600 may perform a control operation to display a wireless connection execution screen 1930 as shown in FIG. 20I.

Figure 20J:
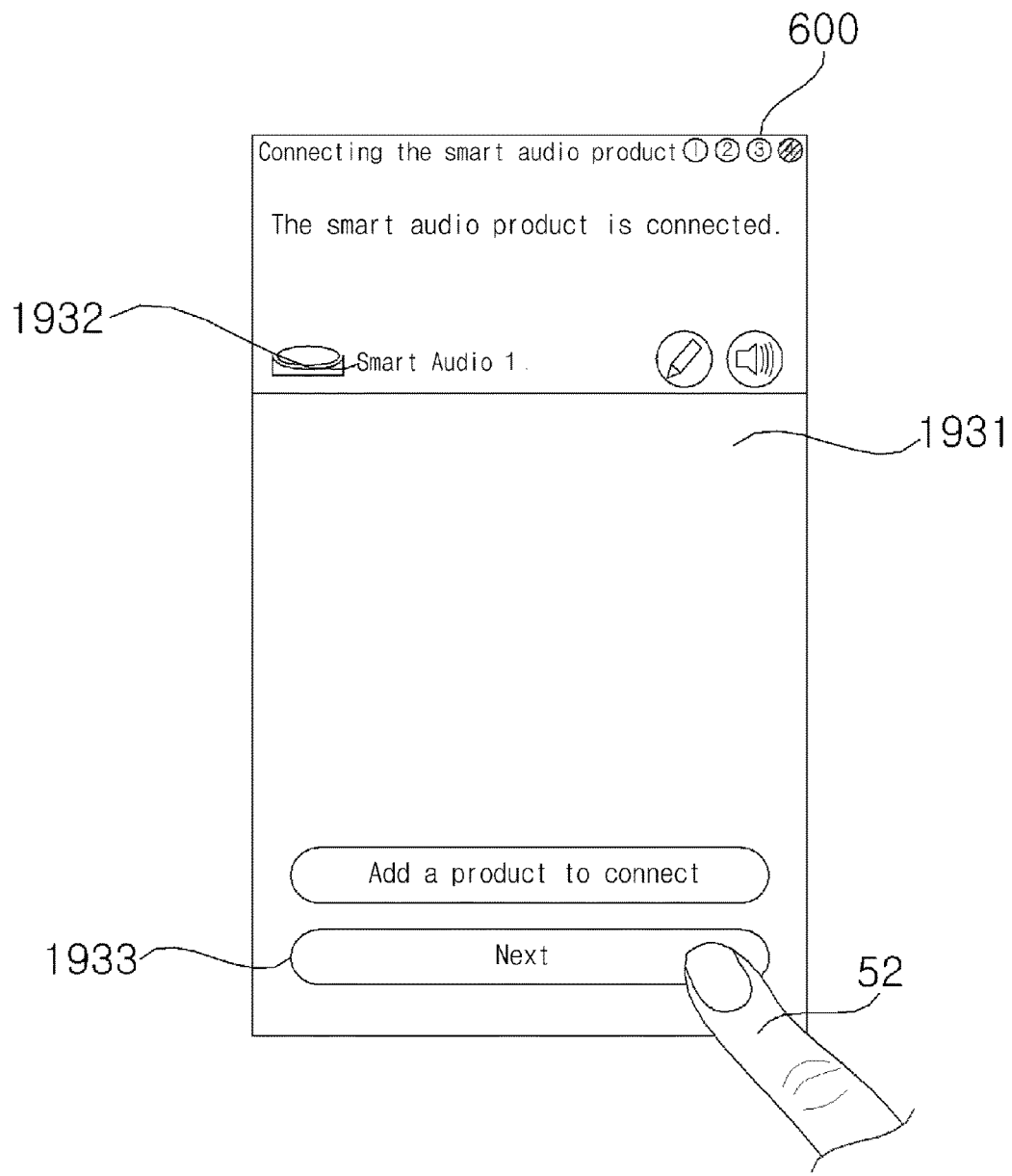

After wireless connection is completed, the controller 680 of the mobile terminal 600 may control a wireless connection termination screen 1931 as shown in FIG. 20J to be displayed. The wireless connection termination screen 1931 may include an add-device-to-be-connected item and a Next item 1933.

Figure 20K:
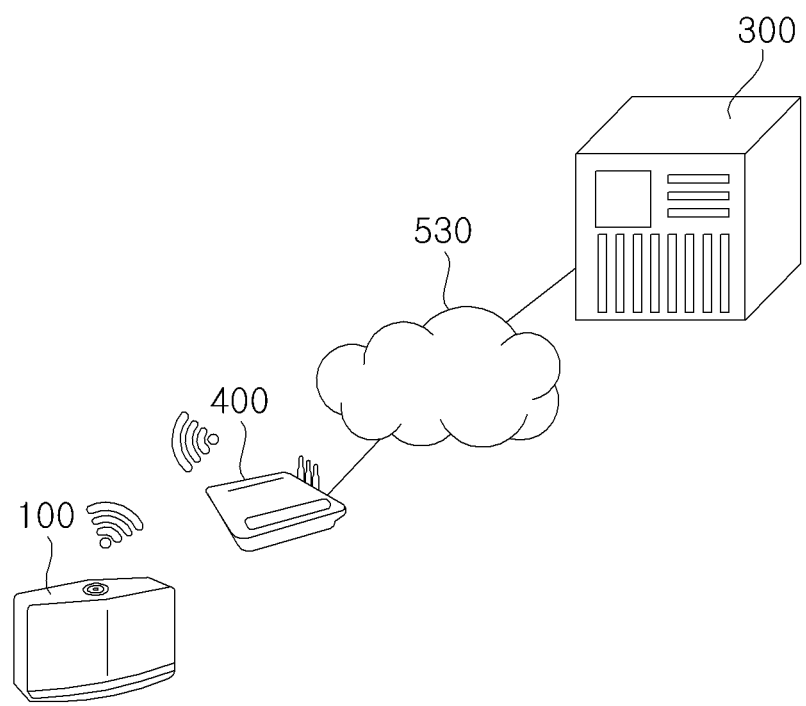

After wireless connection is completed, the audio output device 100 may be wirelessly connected to the AP device 400 as shown in FIG. 20K. After being wirelessly connected to the AP device 400, the audio output device 100 may exchange data with the server 300 via the network 530.

Figure 21A:
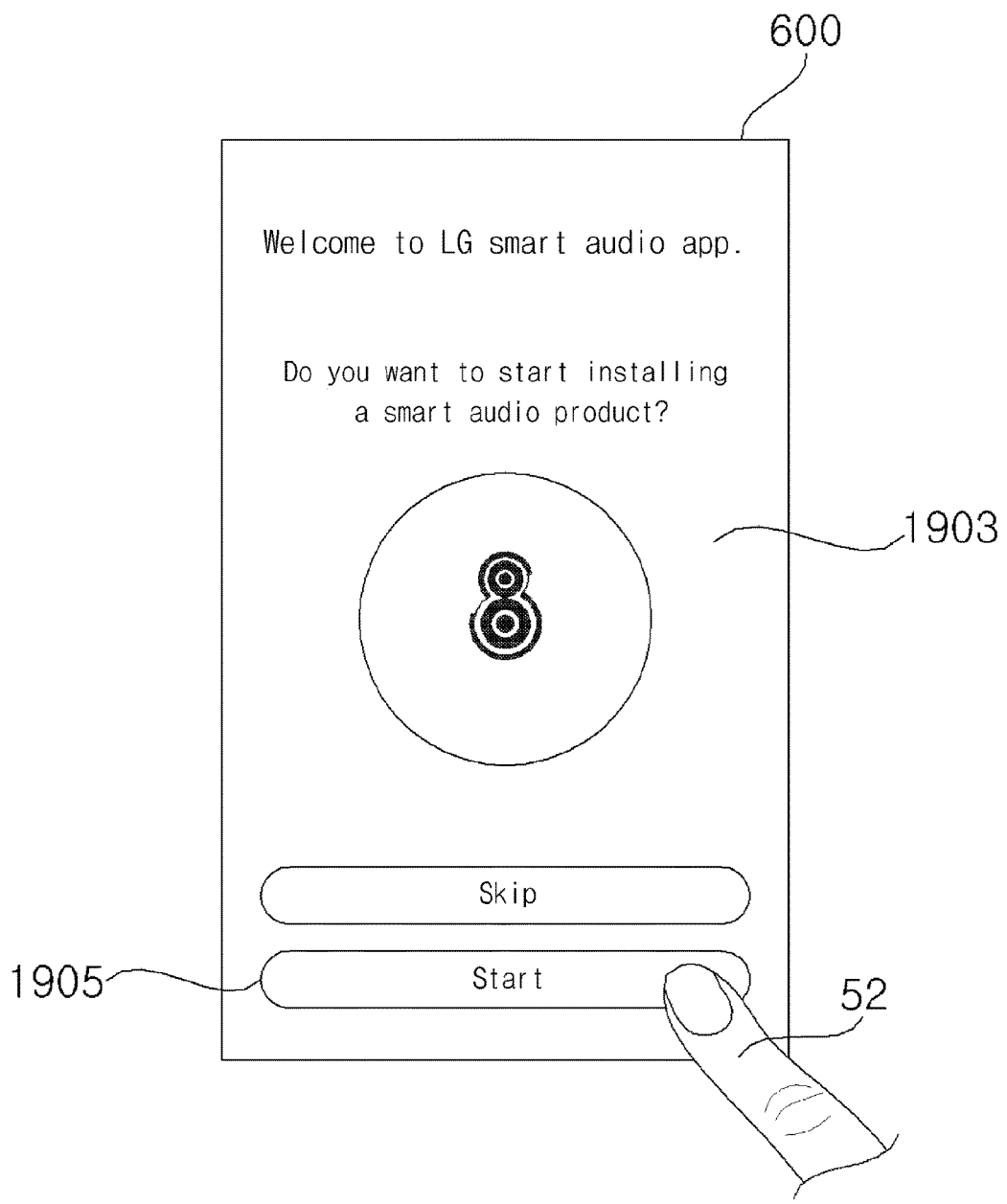
Figure 21B:
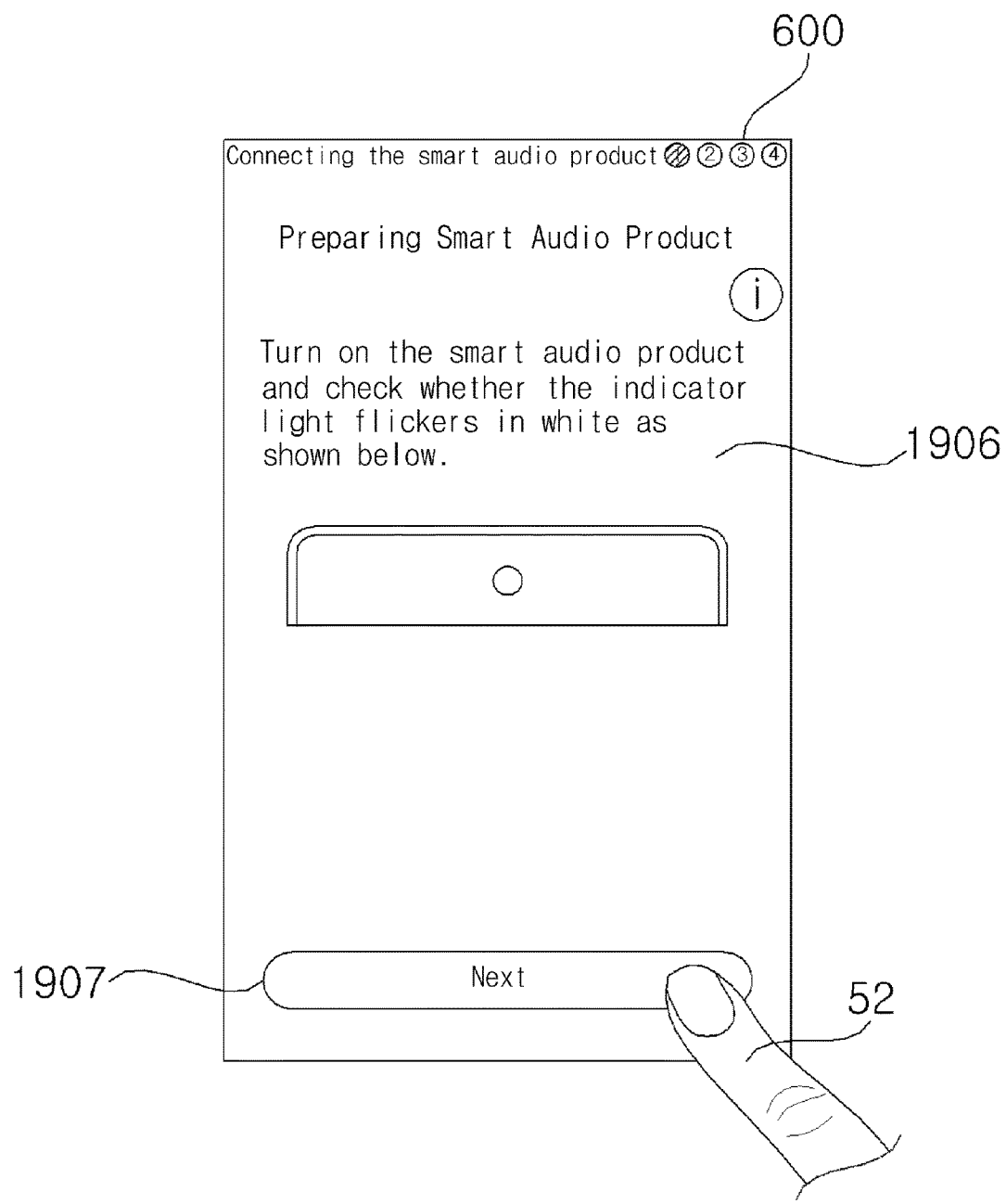
Figure 21C:
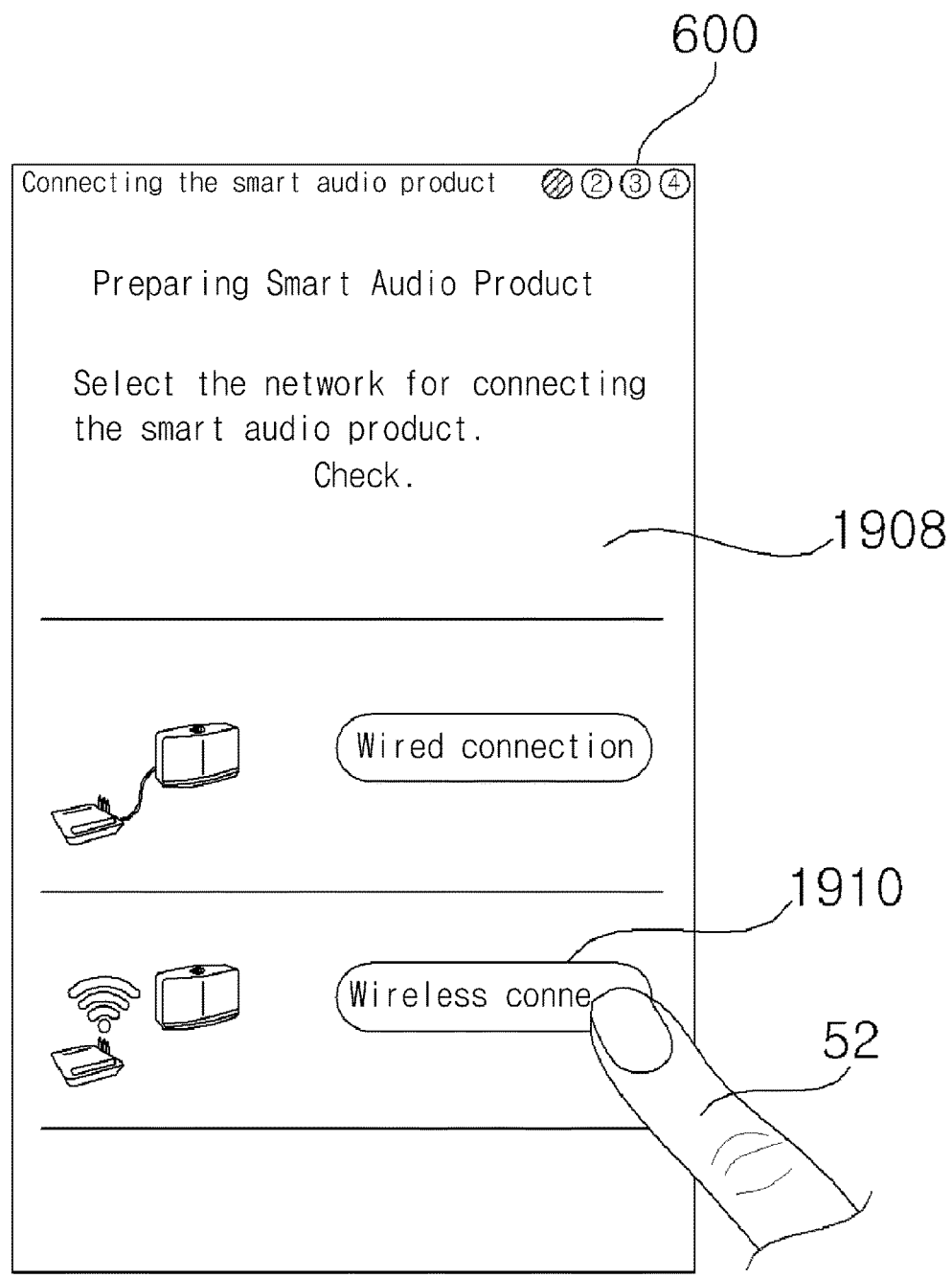
Figure 21D:
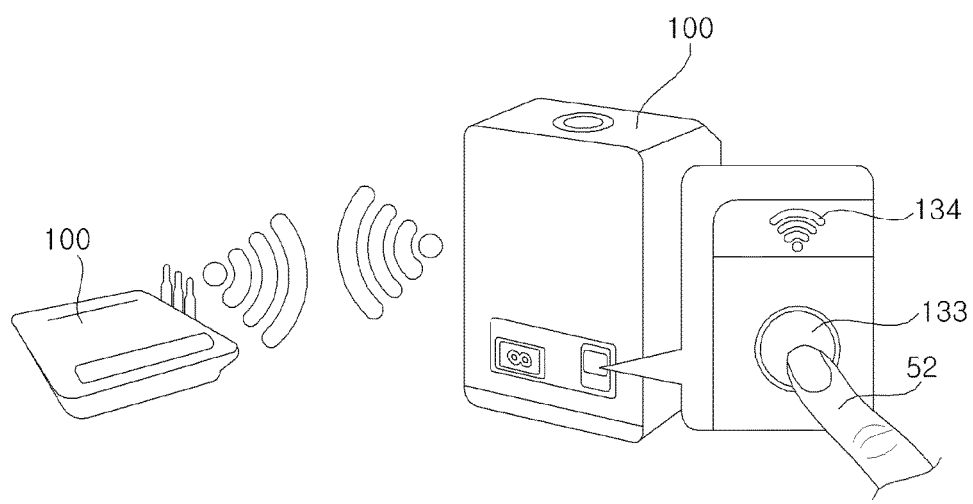
Figure 21E:
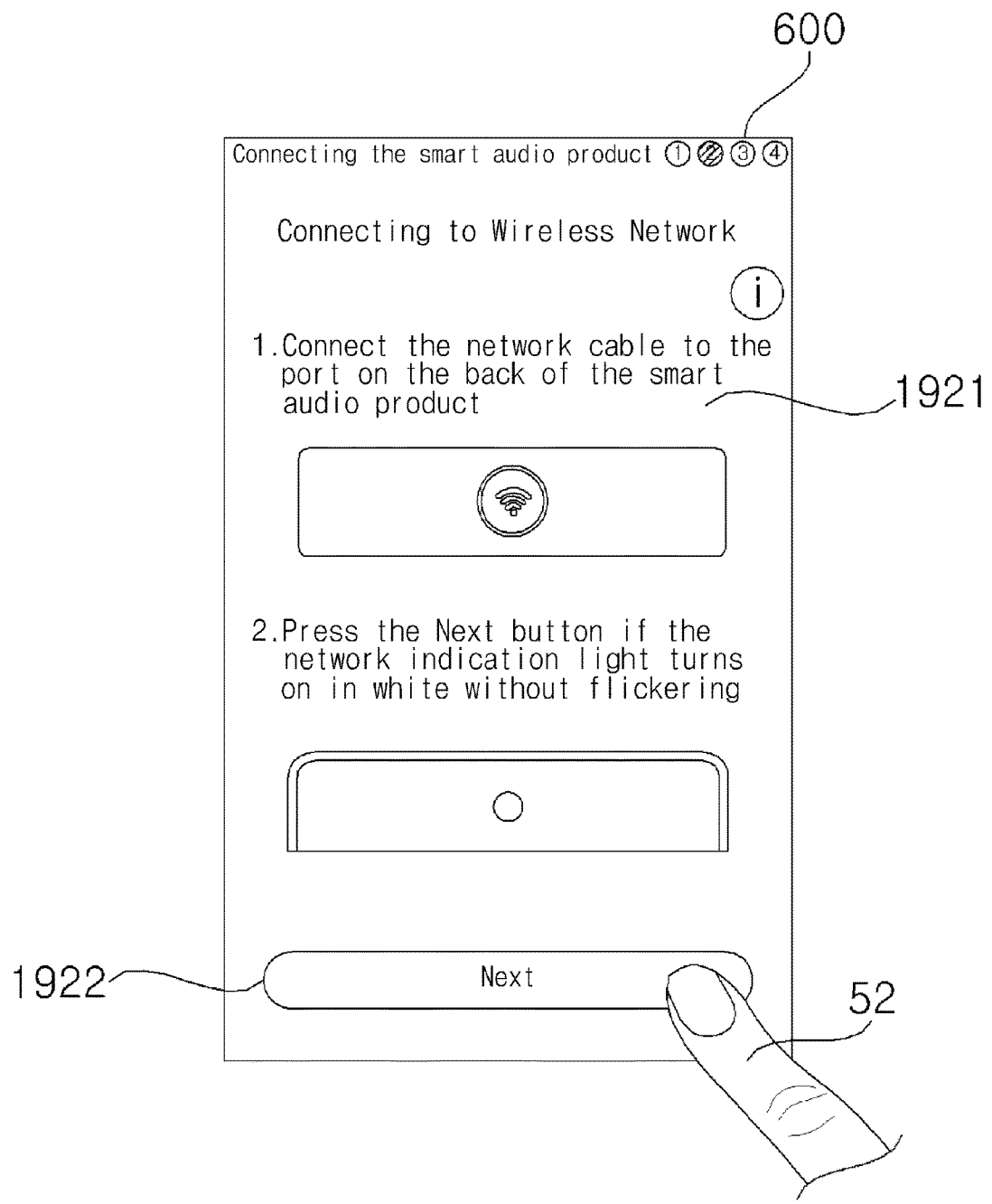
Figure 21F:
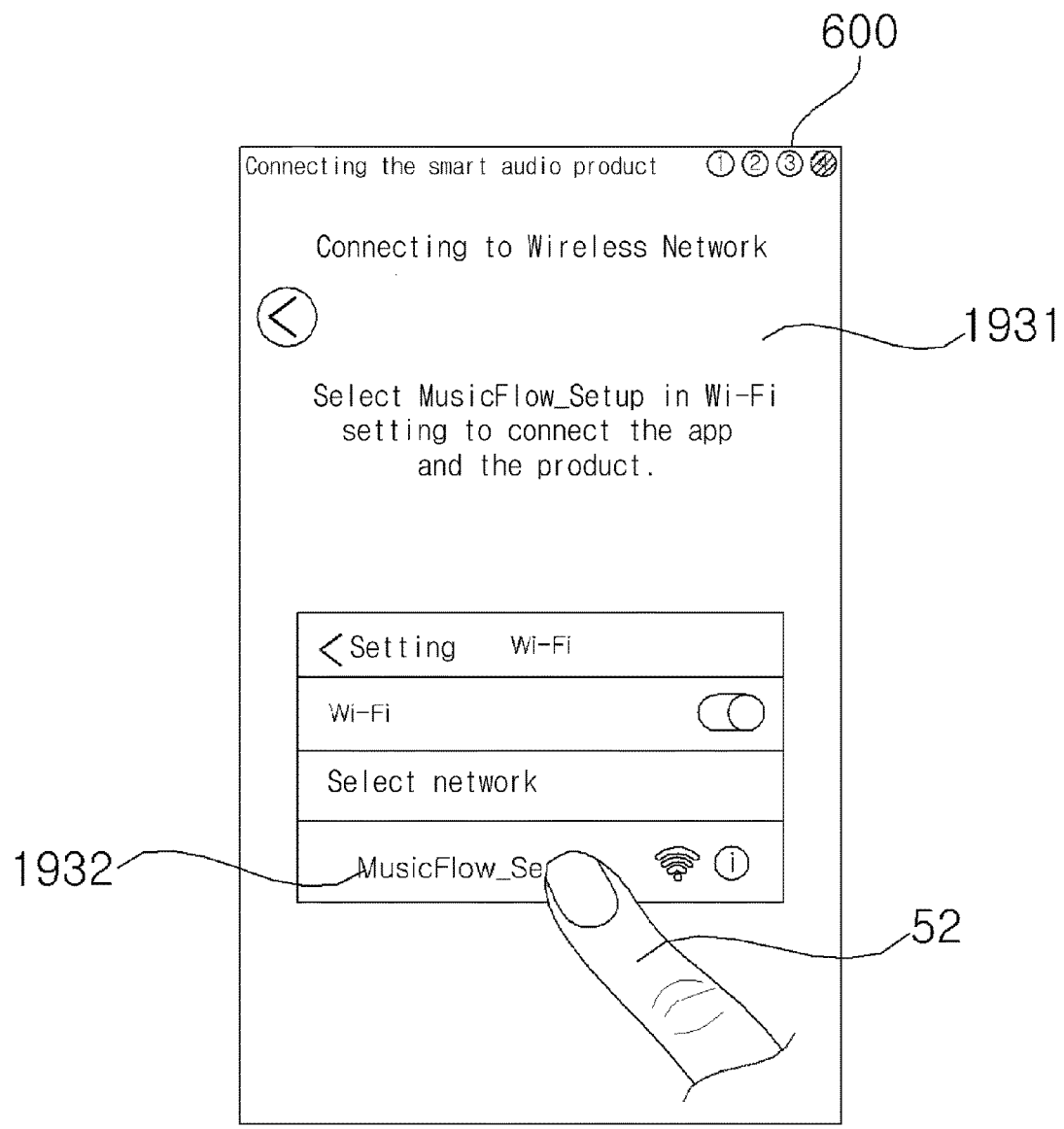
Figure 21G:
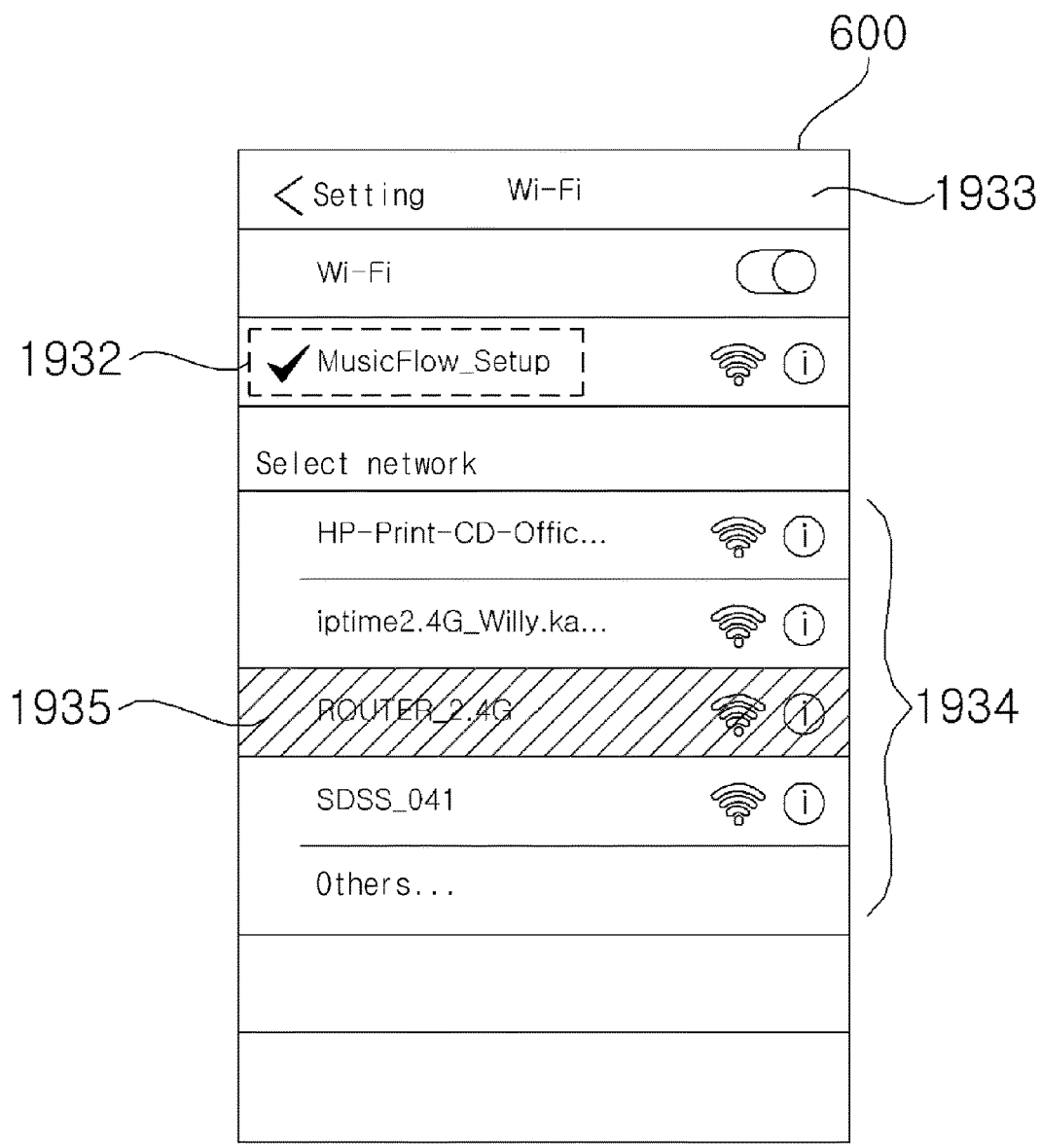
Figure 21H:
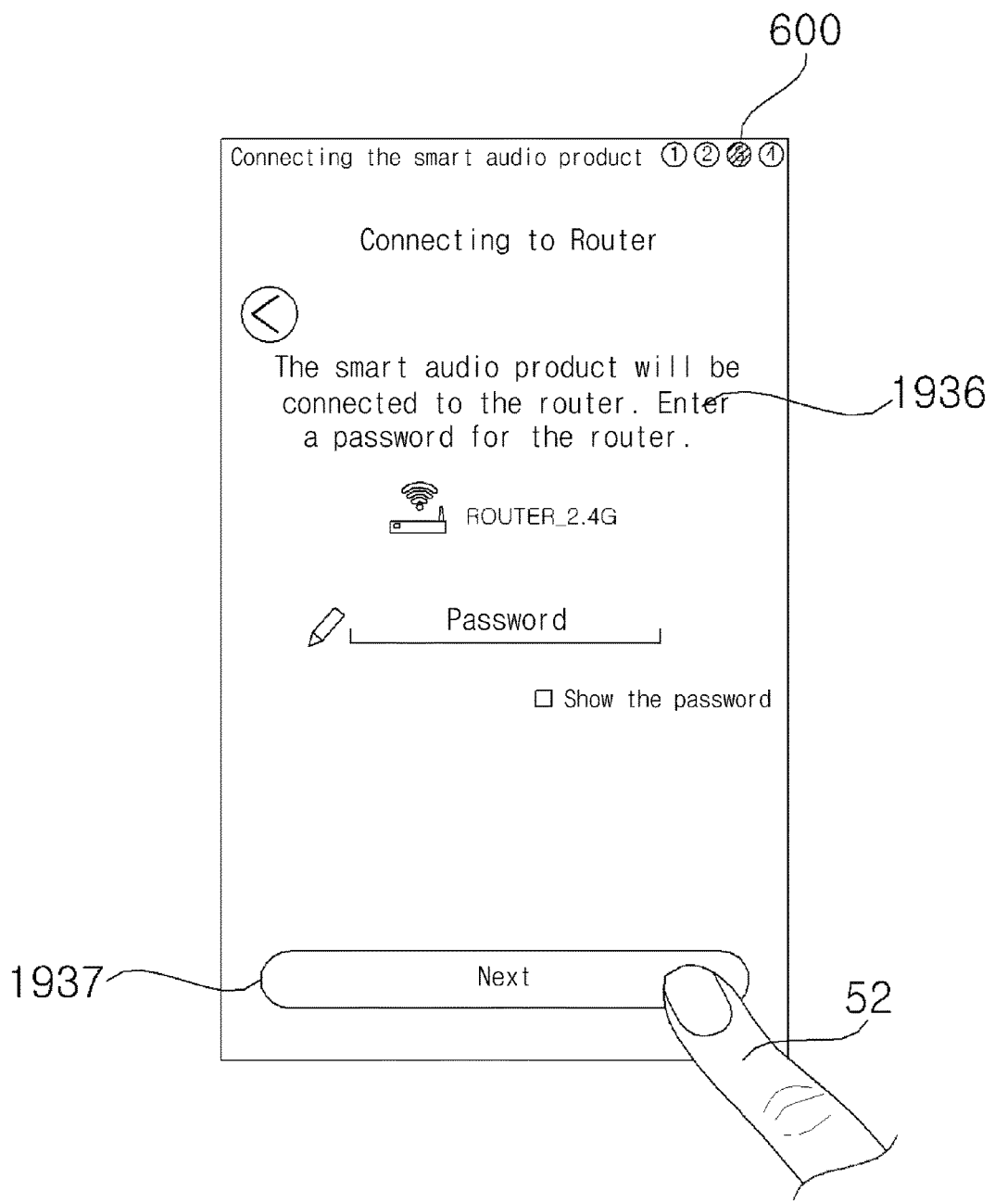
Figure 21I:
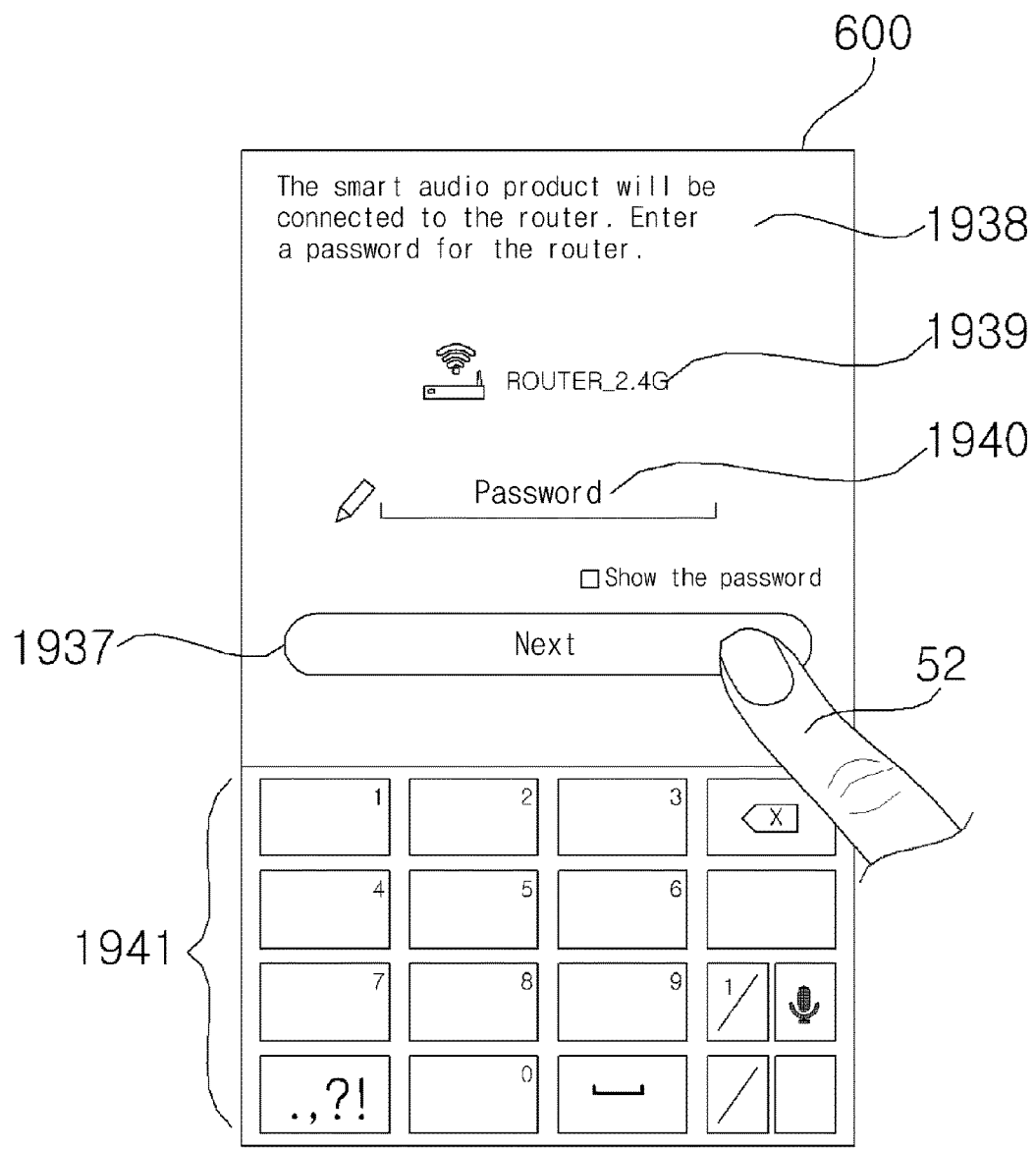
Figure 21J:
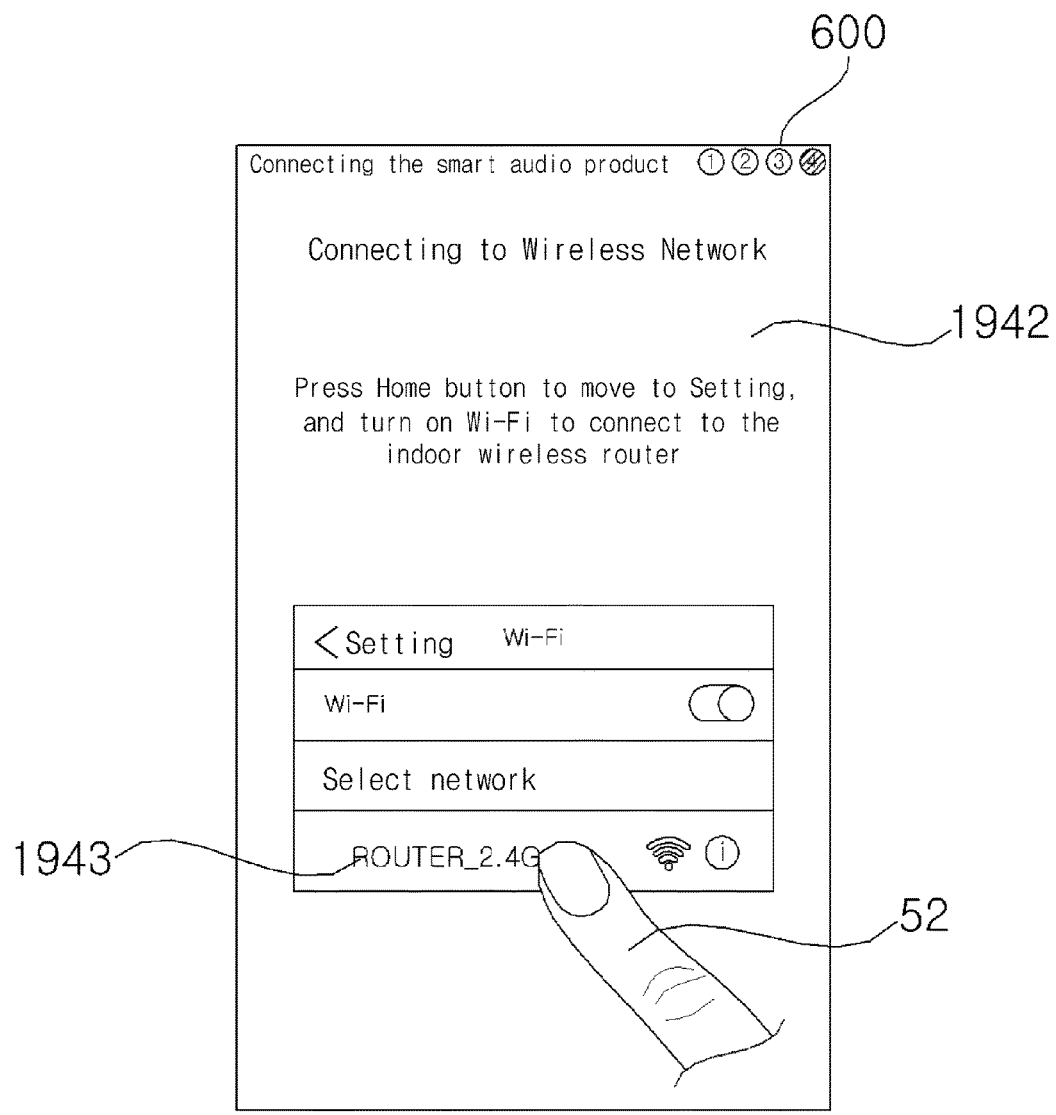
Figure 21K:
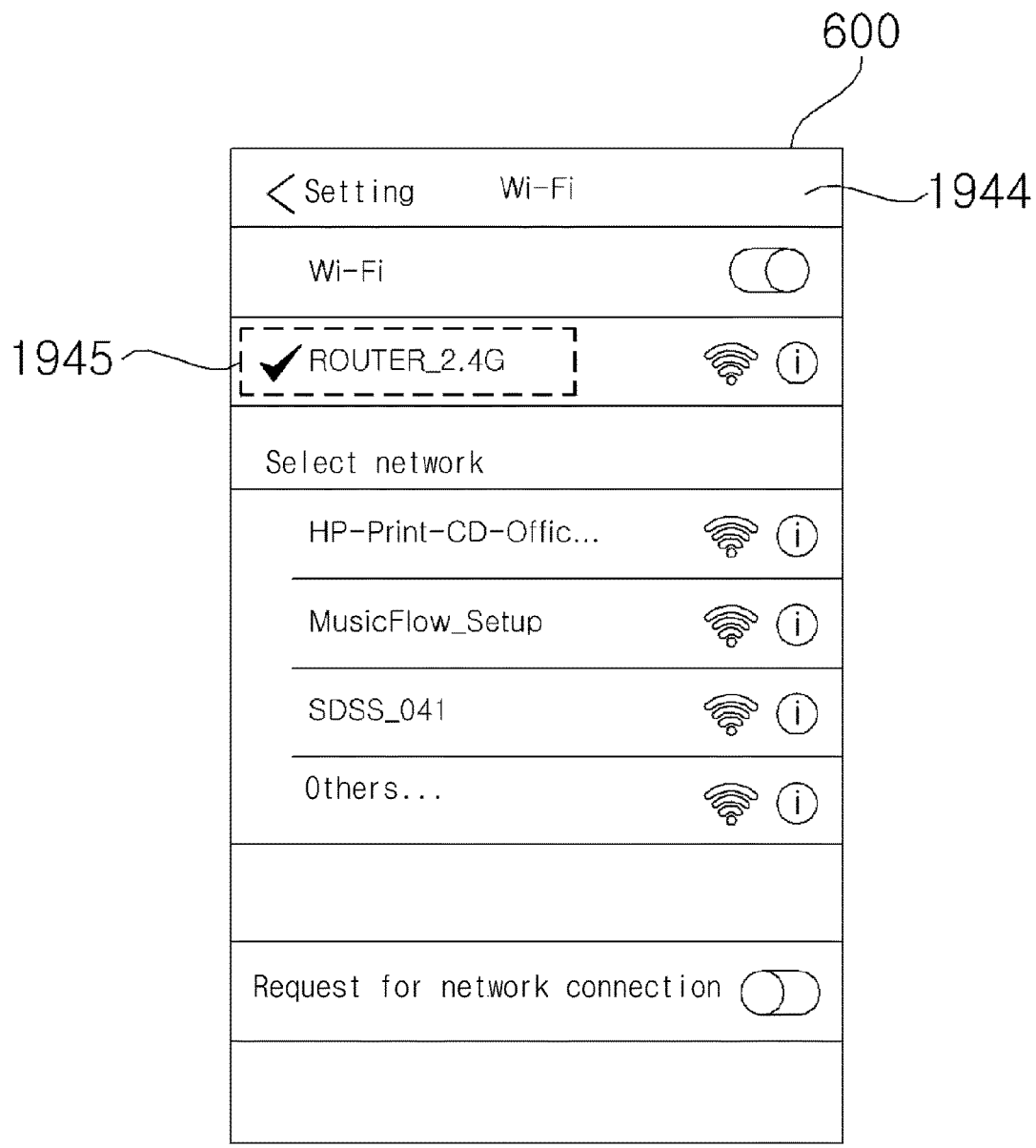
Figure 21L:
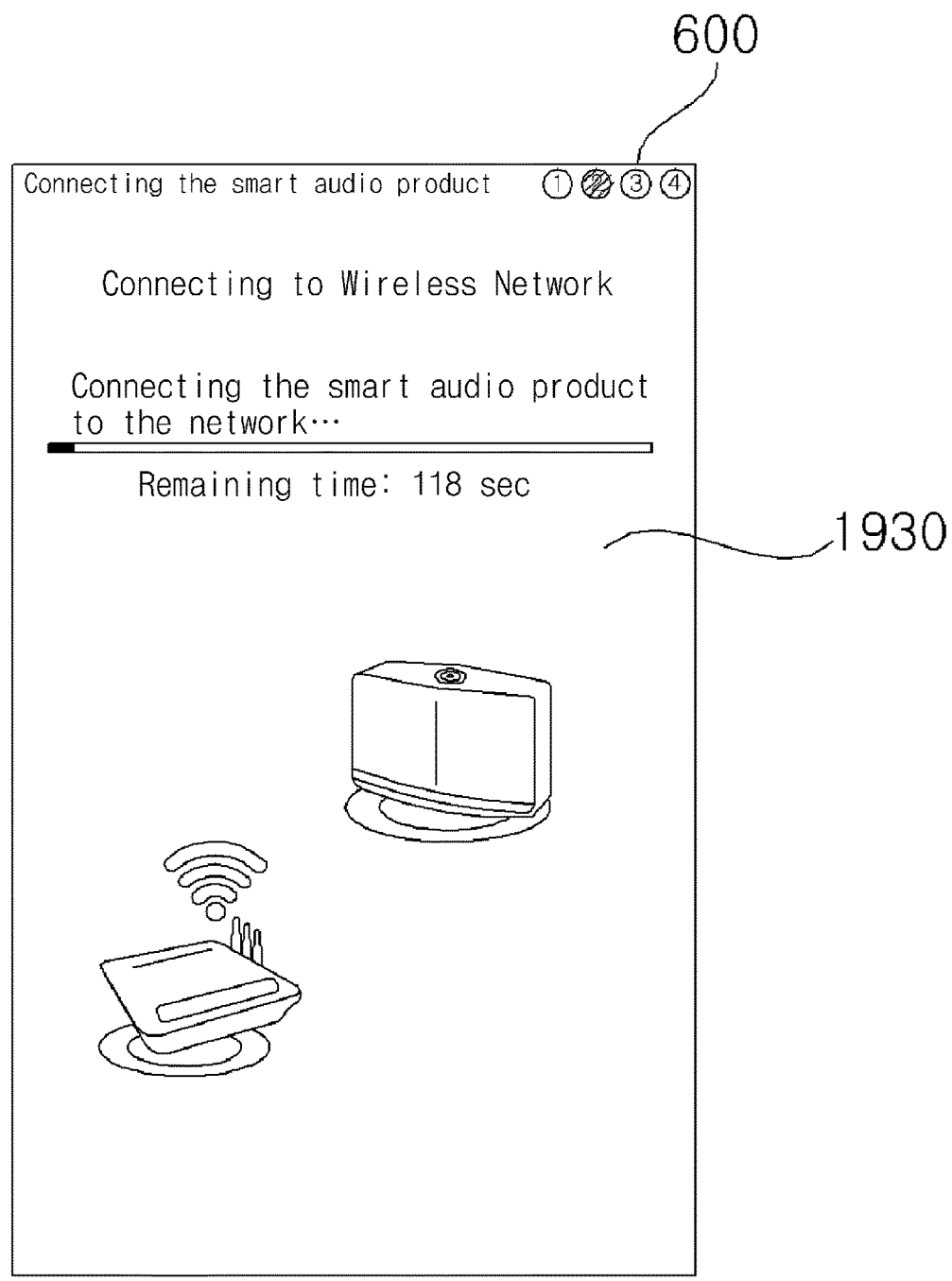
Figure 21M:
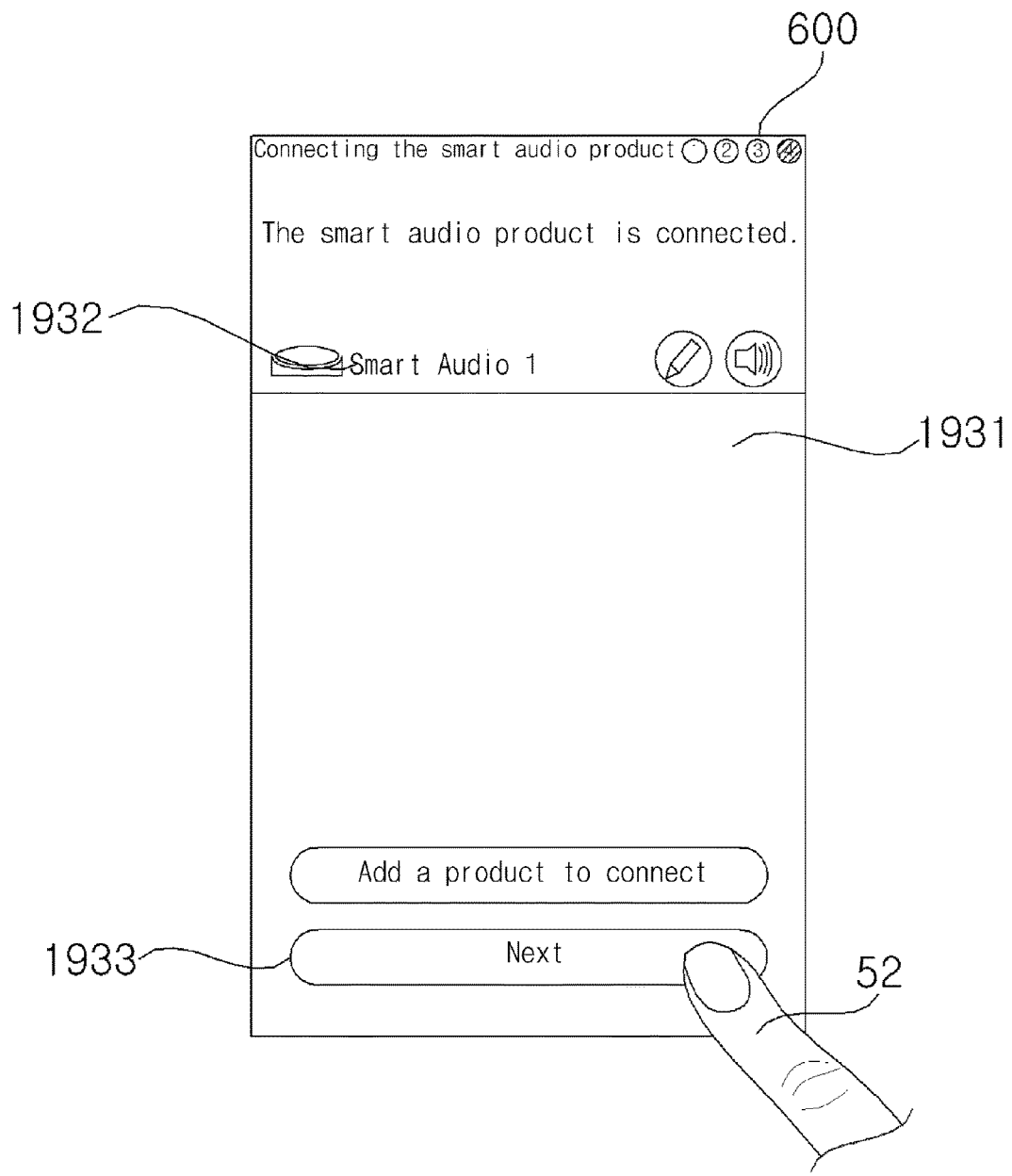
Figure 21N:
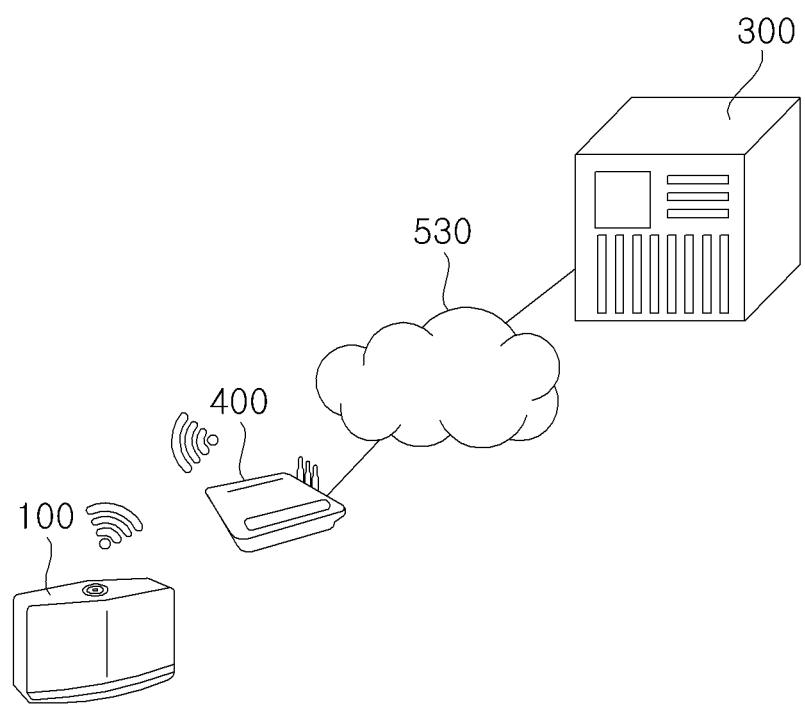

Next, FIGS. 21A to 21N illustrate another example of a UI for wirelessly connecting an audio output device to an AP device.

The screens 1903, 1906, 1908, and 1921 in FIGS. 21A to 21E are the same as the screens 1903, 1906, 1908, and 1921 in FIGS. 19A to 19C.

Next, FIG. 21F illustrates an AP device connection screen 1931. The AP device connection screen 1931 may include an AP device item 1932.

When the AP device item 1932 is selected by the user's hand 52, the controller 680 of the mobile terminal 600 may control an AP device screen 1933 including the AP device item 1932 and an AP device list 1934 to be displayed.

When a predetermined AP device item 1935 is selected in the AP device list 1934, the controller 680 of the mobile terminal 600 may control an AP device connection screen 1936 to be displayed as shown in FIG. 21H. At this time, if a Next item 1937 is selected, a password entry screen 1938 for access to the AP device appears as shown in FIG. 21I.

The password entry screen 1938 for access to the AP device may include an AP device name 1939, a password entry window 1940, a character window 1941 for inputting characters, and a Next item 1937.

When the Next item 1937 is selected after characters for the character window 1941 are input on the password entry window 1940, an AP device connection screen 1942 is displayed. The AP device connection screen 1942 may include an AP device item 1943.

When the AP device item 1943 is selected, an AP device screen 1944 including an AP device item 1945, as shown in FIG. 21K, may be controlled to be displayed.

The controller 680 of the mobile terminal 600 may perform a control operation to display a wireless connection execution screen 1930 as shown in FIG. 21L.

After wireless connection is completed, the controller 680 of the mobile terminal 600 may perform a control operation to display a wireless connection termination screen 1931 as shown in FIG. 21M. The wireless connection termination screen 1931 may include an add-device-to-be-connected item and a Next item 1933.

After the wireless connection is completed, the audio output device 100 may be wirelessly connected to the AP device 400 as shown in FIG. 21N. After being wirelessly connected to the AP device 400, the audio output device 100 may exchange data with the server 300 via the network 530.

Next, FIGS. 22A to 22F illustrate a UI for adding an audio output device.

Figure 22A:
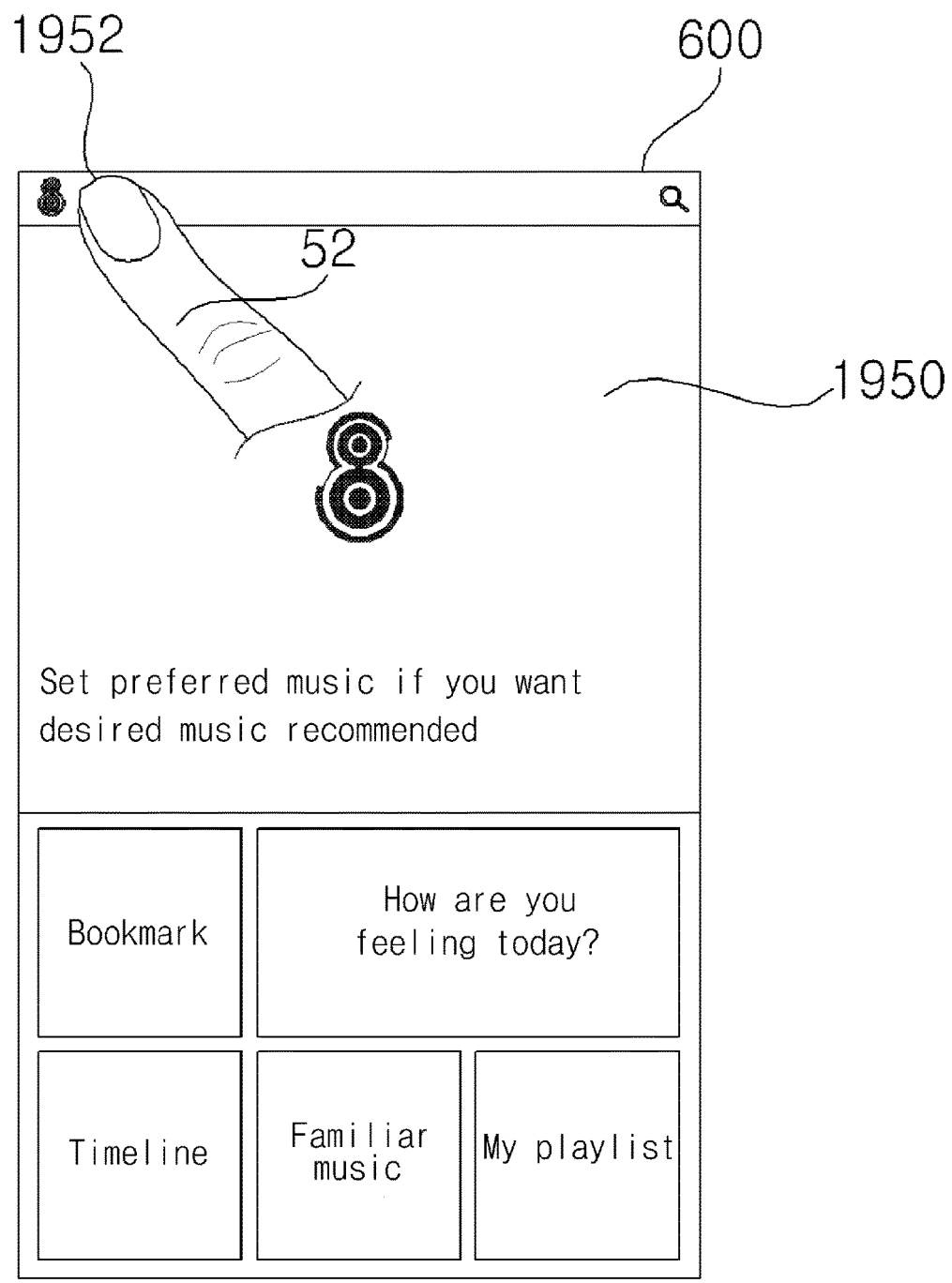

FIG. 22A illustrates a home screen 1950 for audio playback by an audio output device.

Figure 22B:
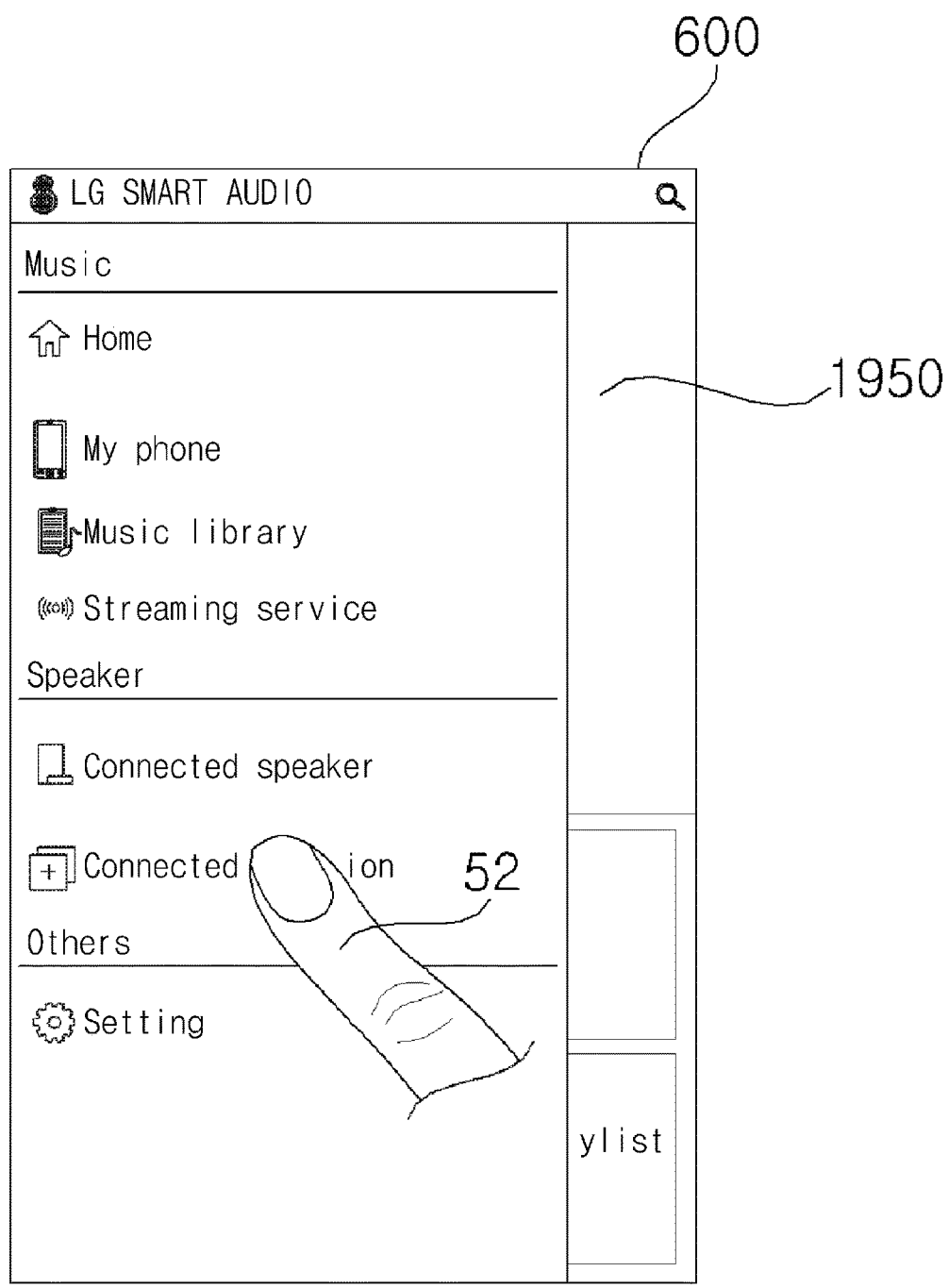

When a menu item 1952 is selected with a home screen 1950 for audio play displayed, the controller 680 of the mobile terminal 600 may control a menu window 1950 to be displayed as shown in FIG. 22B.

Figure 22C:
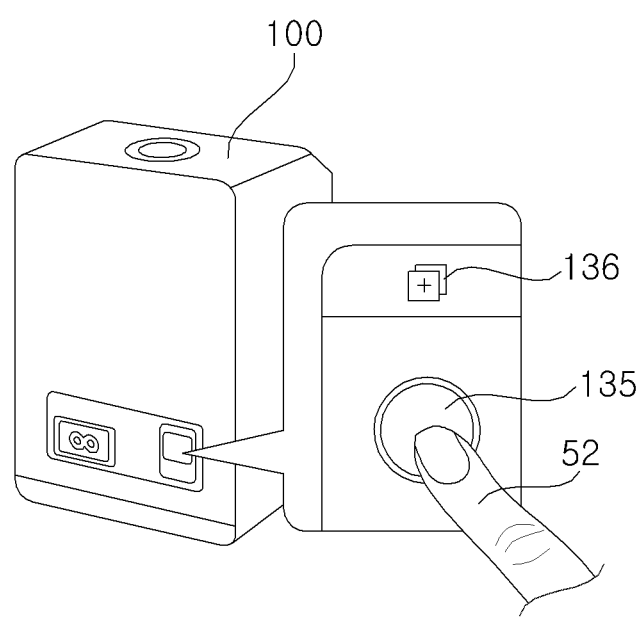
Figure 22D:
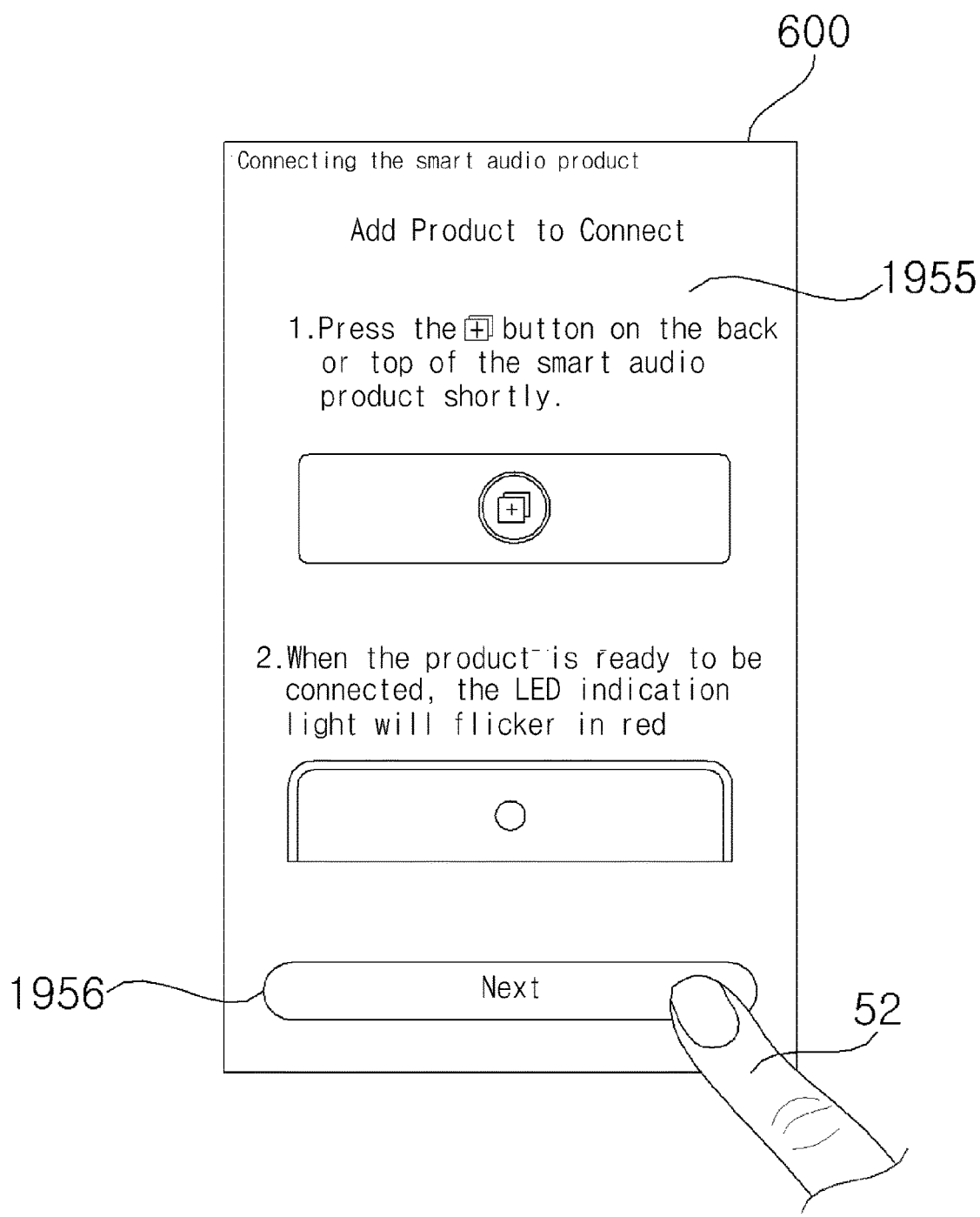
Figure 22E:
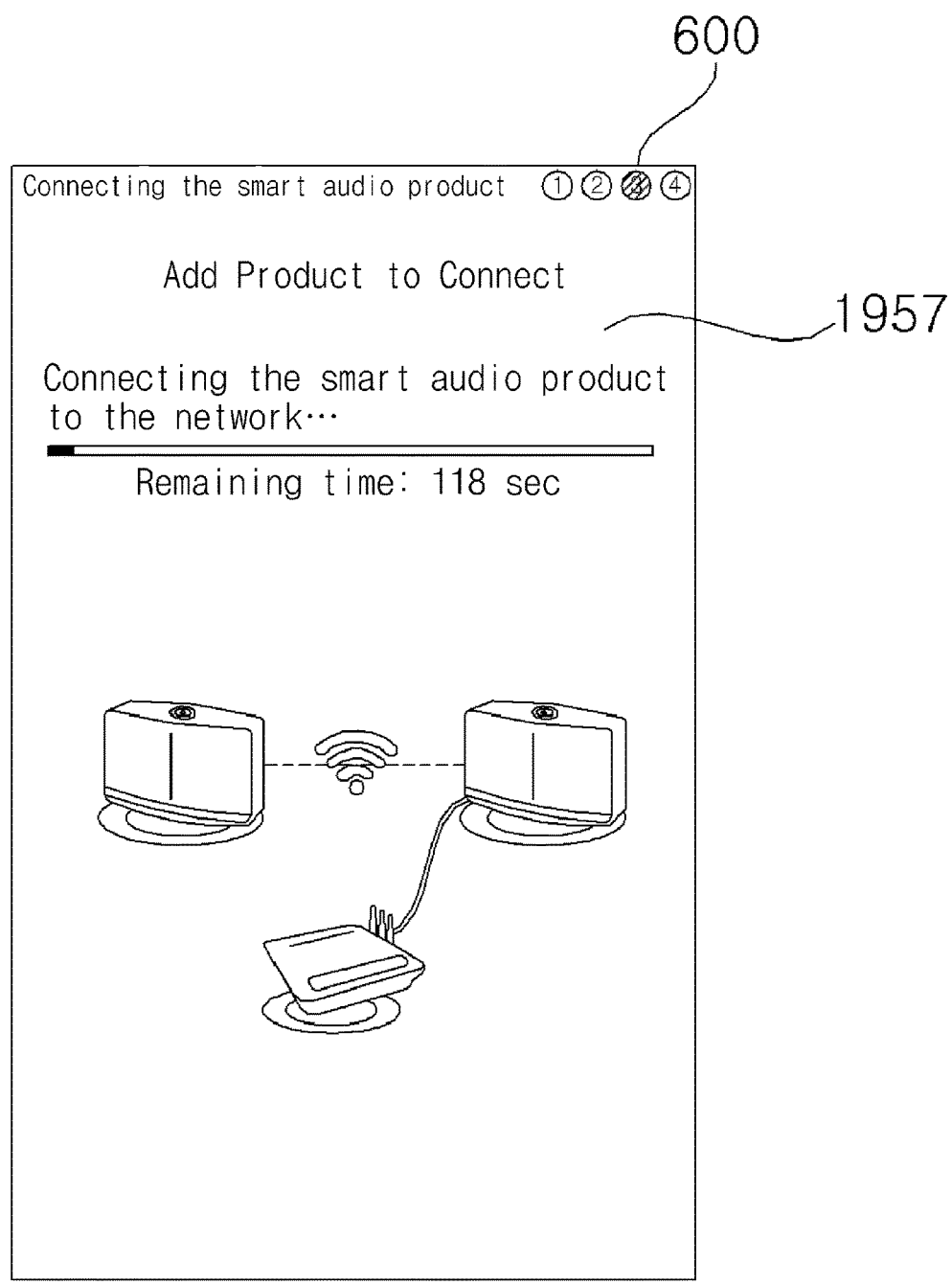
Figure 22F:
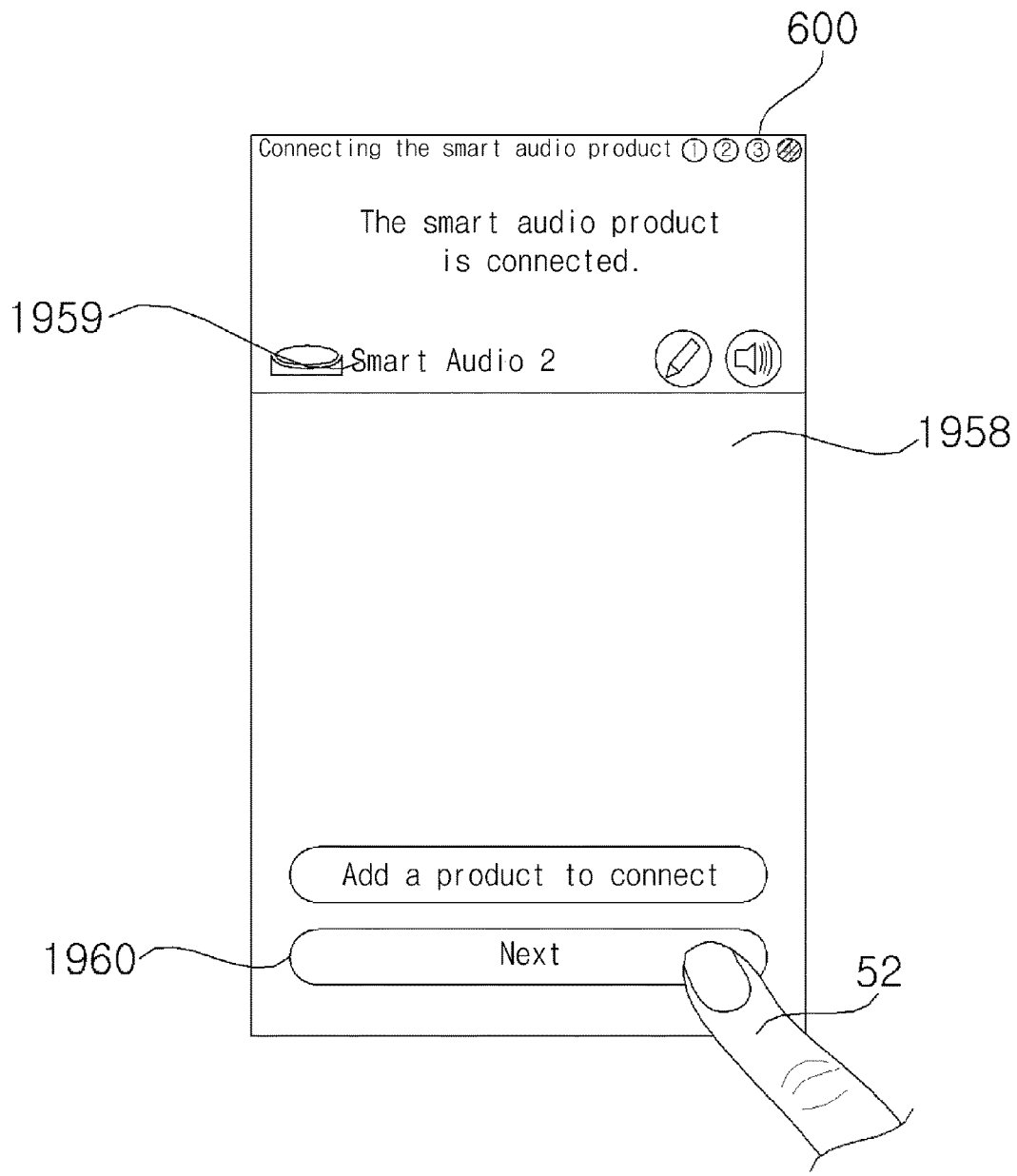

When the add-device-to-be-connected item is selected in the menu window 1950, a connection addition screen 195 as shown in FIG. 22D may be controlled to be displayed.

Referring to FIG. 22C, when the button 135 on the audio output device 100 is pressed, the addition operation may be performed, and an indication for addition may be displayed on the display window 136.

FIG. 22D illustrates that an add-device-to-be-connected screen 195 is displayed. When the Next item 1956 is selected, a screen 1957 indicating that an audio output device to be connected is being added may be displayed.

Next, the controller 680 of the mobile terminal 600 may control an additional connection completion screen 1958 of the audio output device to be displayed. The additional connection completion screen 1958 may include an added audio output device item 1959.

Figure 23A:
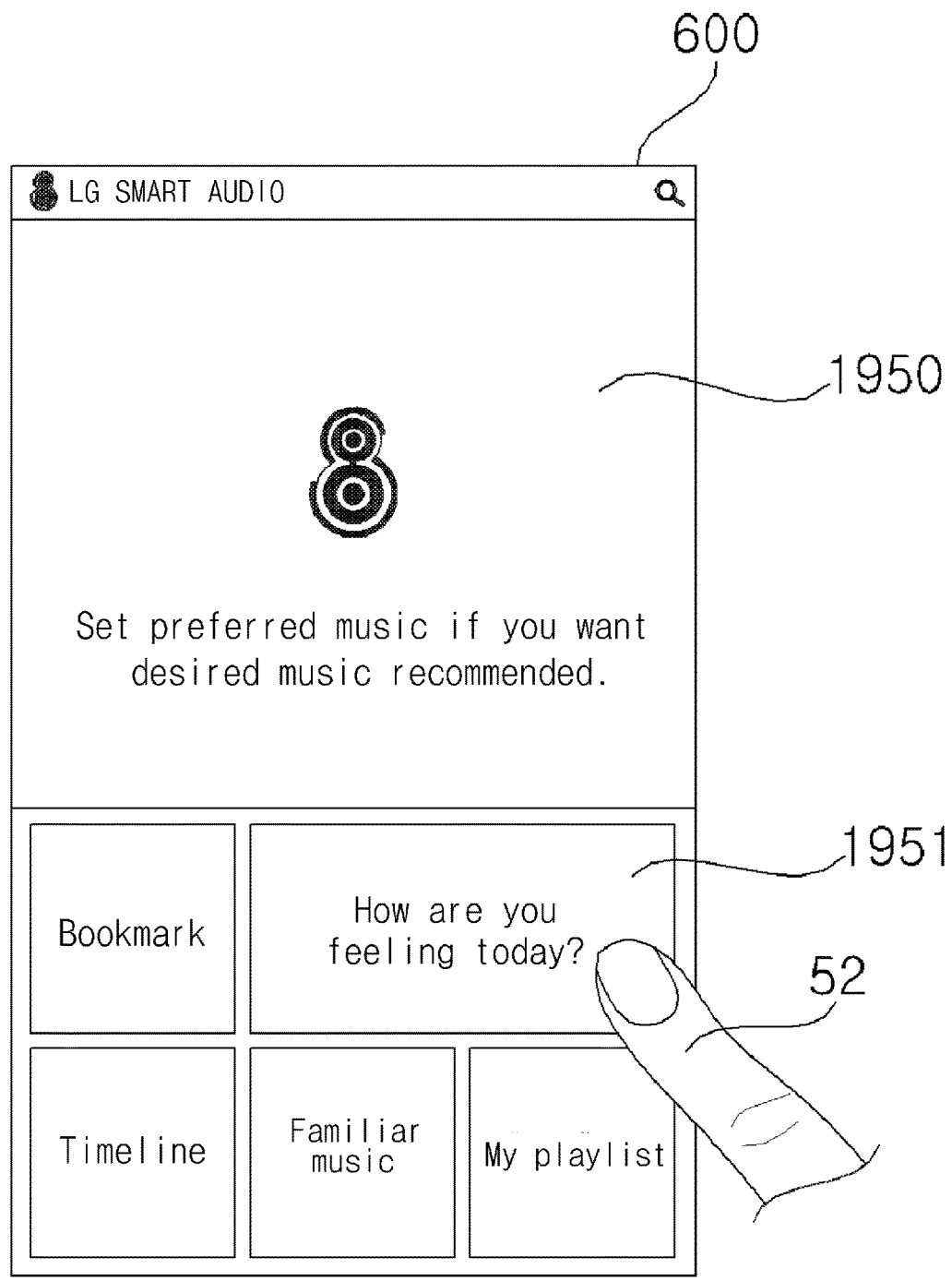

FIG. 23A illustrates a home screen 1950 for audio playback by the audio output device.

Figure 23B:
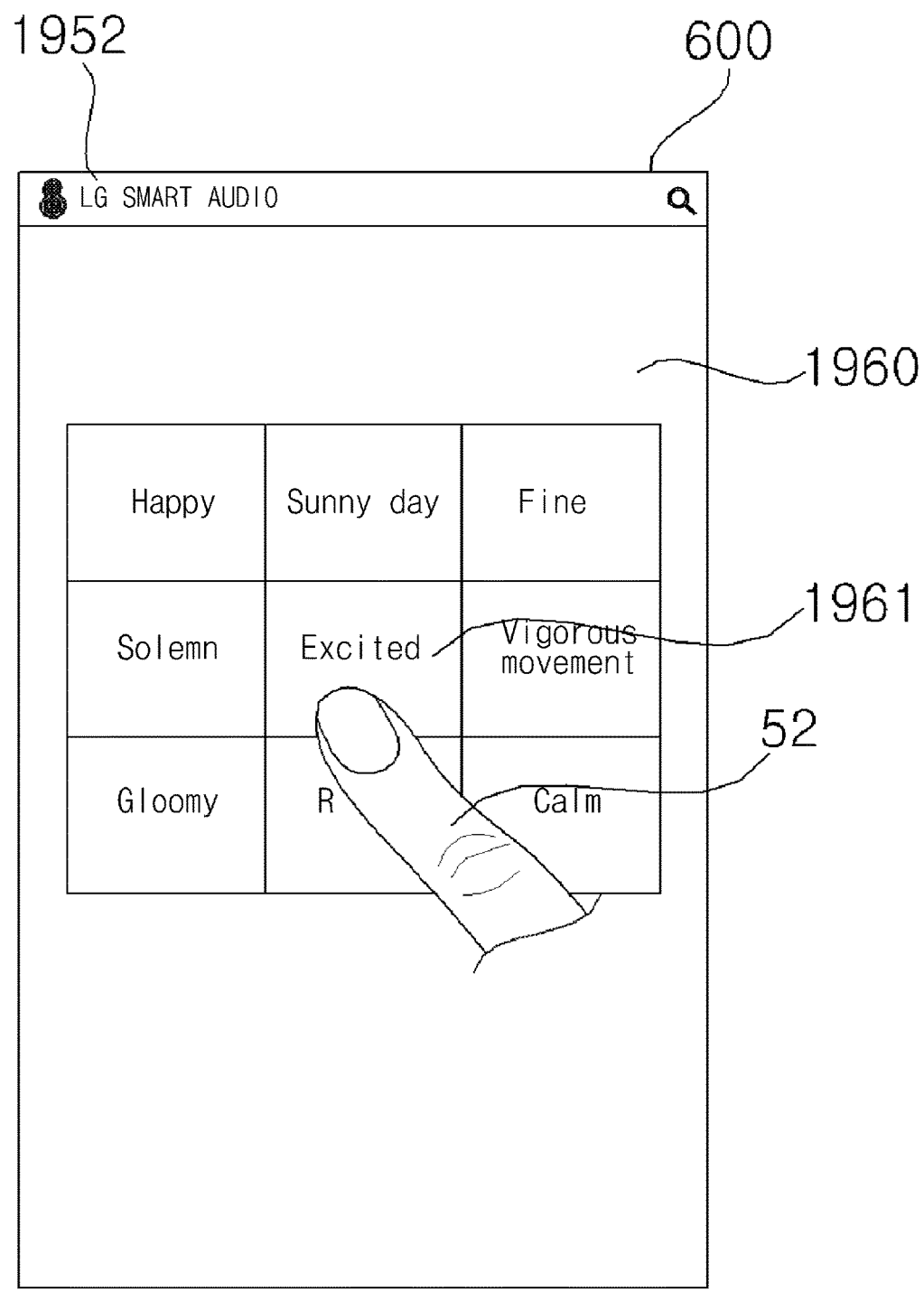

When a mood item 1951 related to today's mood is selected with the home screen 1950 for audio play displayed, the controller 680 of the mobile terminal 600 may control a mood screen 1960 including a plurality of mood items as shown in FIG. 23B to be displayed.

Figure 23C:
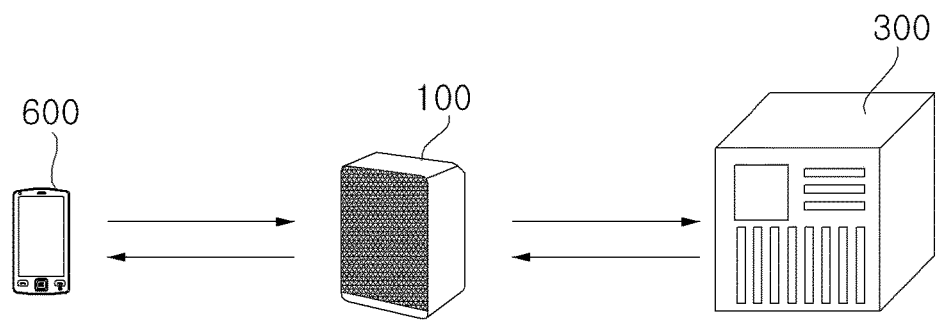

When the "Excited" item 1961 is selected on the mood screen 1960, the controller 680 of the mobile terminal 600 performs a control operation to transmit mood information to the audio output device 100 as shown in FIG. 23C.

The audio output device 100 transmits this mood information to the server 300. The server 300 may transmit recommended music information corresponding to the received "Excited" mood information to the audio output device 100. The audio output device 100 may transmit a music file list corresponding to the recommended music information to the mobile terminal 600.

Figure 23D:
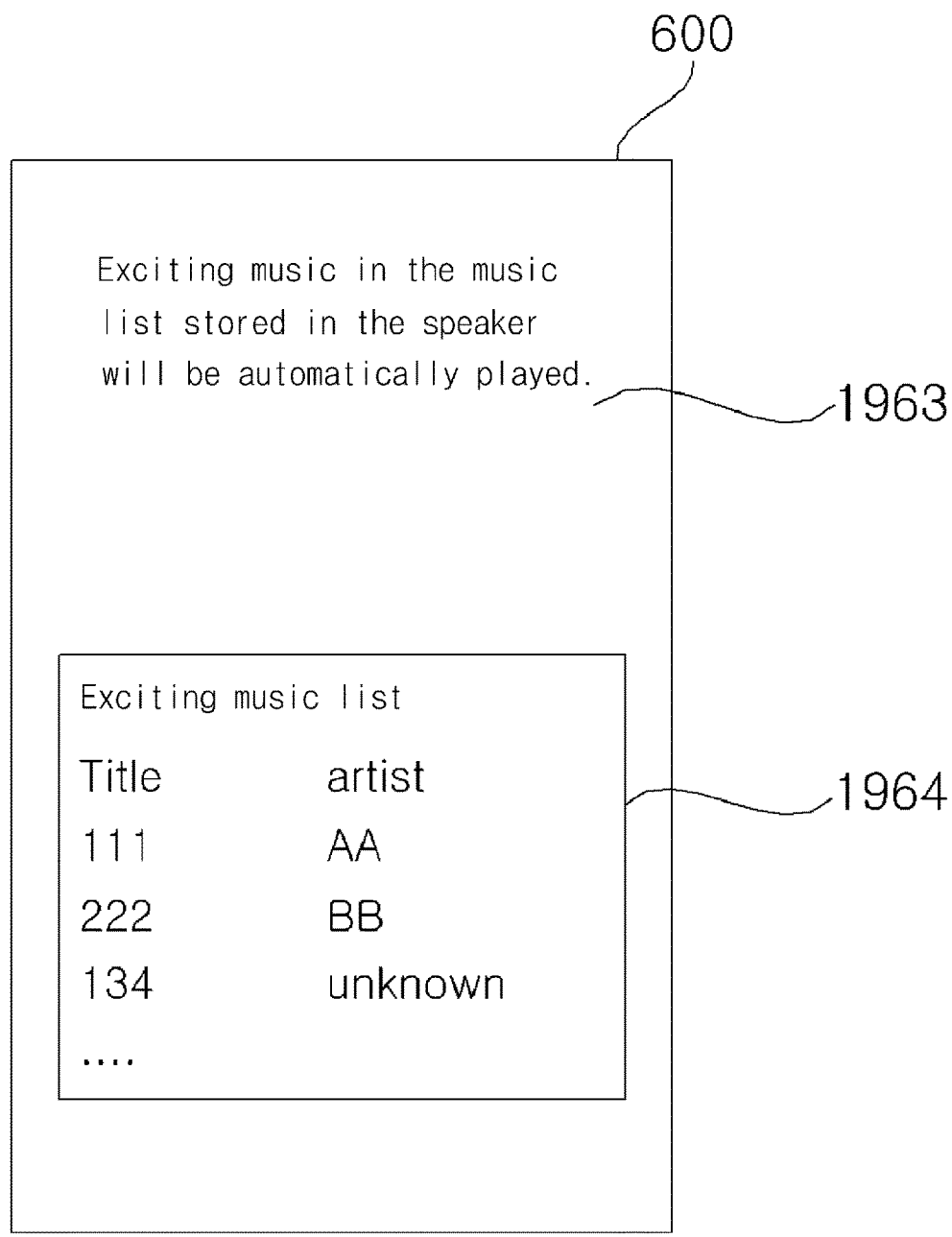
Figure 23E:
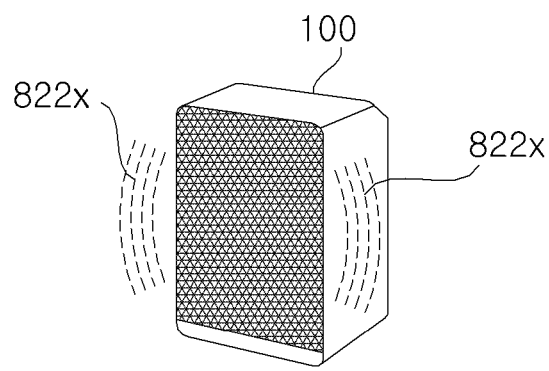

The controller 680 of the mobile terminal 600 displays a music file list screen 1963 corresponding to the "Excited" item 1961 as shown in FIG. 23D. The music file list screen 1963 may include a music file list 1964 including a plurality of music files. Accordingly, the user of the mobile terminal 600 may reproduce a music file corresponding to the mood.

If the mobile terminal 600 approaches the audio output device 100 within a predetermined distance and the RSSI of the beacon signal from the audio output device 100 during reproduction of a music file is within the first predetermine distance as described above, the controller 680 of the mobile terminal 600 controls audio data to be transmitted to the audio output device 100.

The audio output device 100 outputs the received audio data, that is, sound 822X corresponding to the "Excited" mood.

Figure 24A:
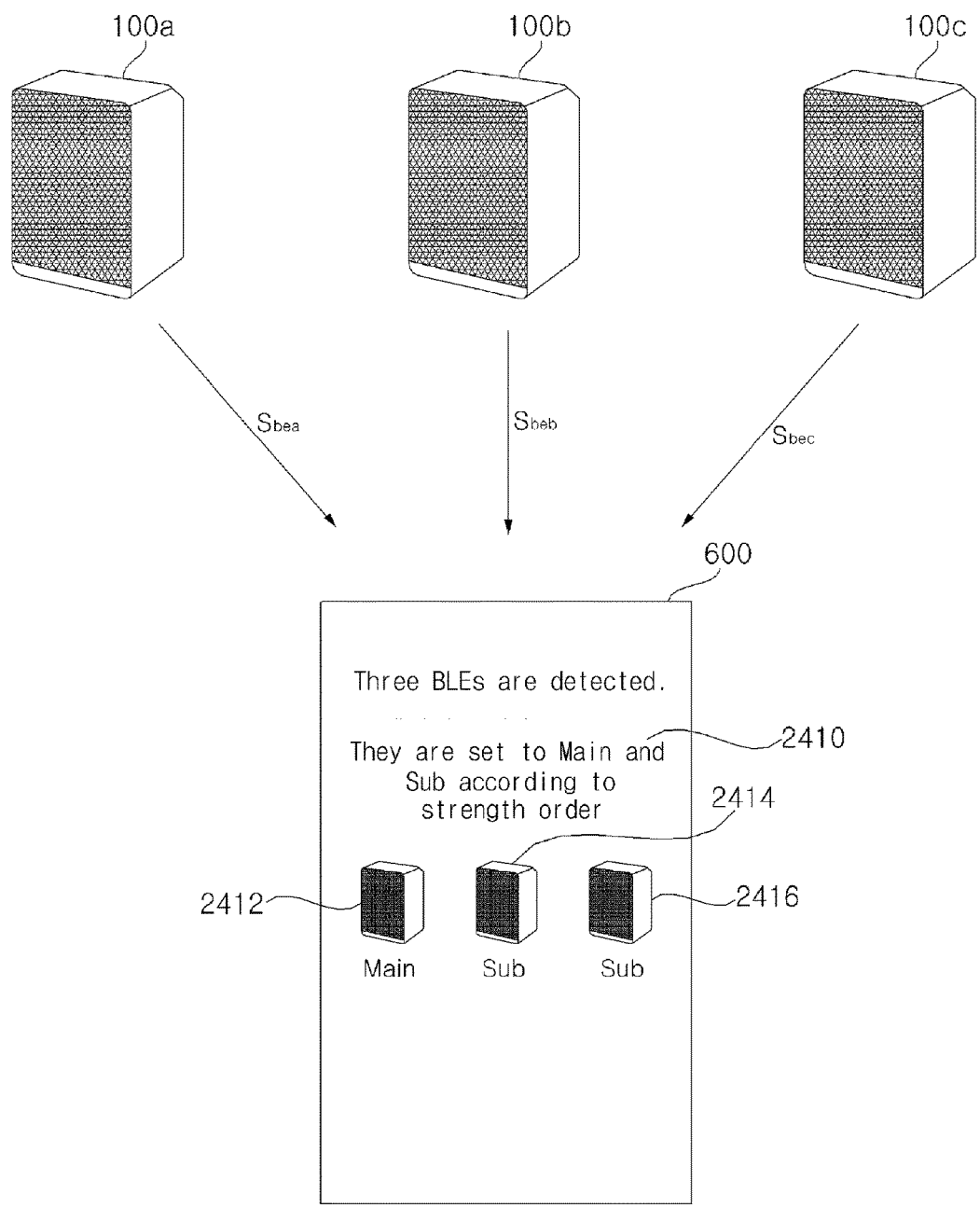
Figure 24B:
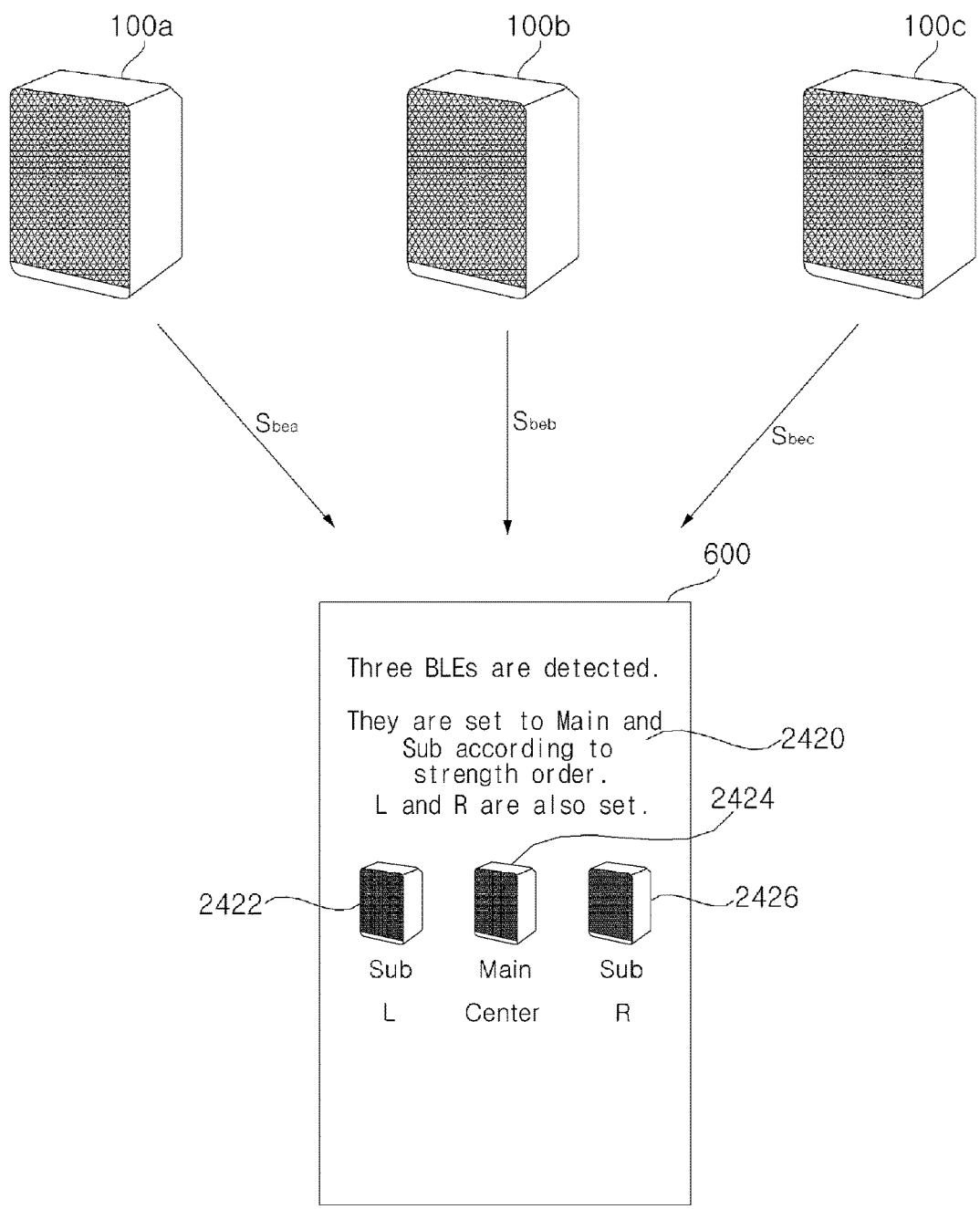
Figure 24C:
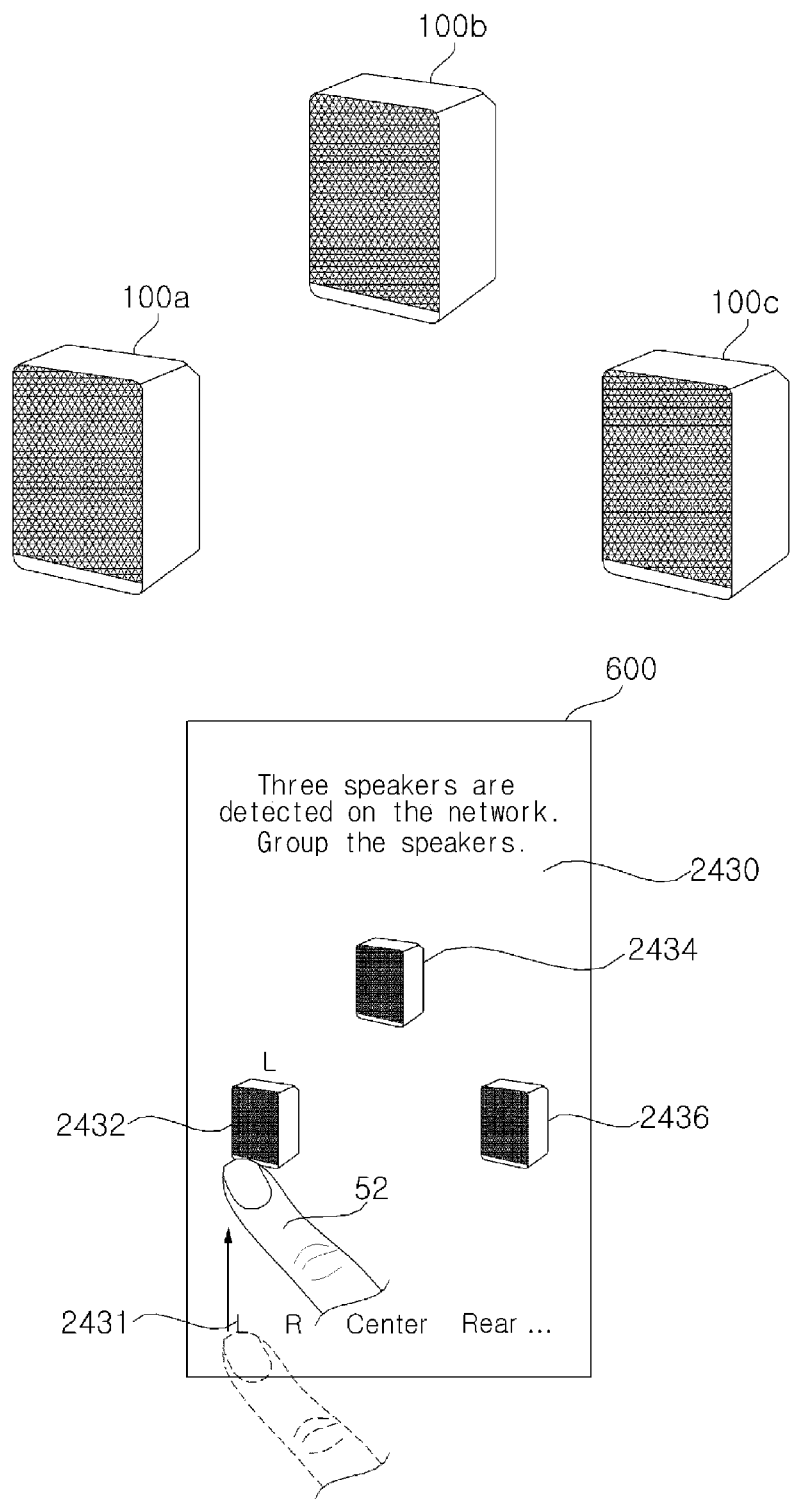

FIGS. 24A to 24C illustrate UIs related to main/sub setting or channel setting, and the like for a plurality of audio output devices.

FIG. 24A illustrates an example of main/sub setting for a plurality of audio output devices.

Referring to the figure, the controller 680 of the mobile terminal 600 receives beacon signals Sbea, Sbeb, and Sbec from a plurality of audio output devices 100a, 100b, and 100c and device signals.

The controller 680 of the mobile terminal 600 may perform a control operation to display a screen 2410 for main/sub setting for the plurality of audio output devices, according to reception of the beacon signals Sbea, Sbeb, and Sbec or based on user input.

Specifically, the controller 680 of the mobile terminal 600 may perform main/sub setting for the plurality of audio output devices based on the RSSIs of the received beacon signals Sbea, Sbeb, and Sbec.

For example, if the strength or level of the beacon signal Sbea from the first audio output device 100a is the highest, the controller 680 of the mobile terminal 600 may set the first audio output device 100a as a main audio output device and the second and third audio output devices 100b and 100c as sub audio output devices.

As shown in the figure, an object 2412 representing the main audio output device and objects 2414 and 2416 representing the sub audio output devices may be displayed on the screen 2410 for main/sub setting.

The controller 680 of the mobile terminal 600 may perform main/sub setting for the plurality of audio output devices based on the RSSIs of the received beacon signals Sbea, Sbeb, Sbec only when the RSSIs are greater than or equal to a first predetermined value.

FIG. 24B illustrates an example of main/sub setting and channel setting for a plurality of audio output devices.

Referring to the figure, the controller 680 of the mobile terminal 600 receives beacon signals Sbea, Sbeb, and Sbec and device signals from a plurality of audio output devices 100a, 100b, and 100c.

The controller 680 of the mobile terminal 600 may perform a control operation to display a screen 2410 for main/sub setting for the plurality of audio output devices 100a, 100b, and 100c, according to reception of the beacon signals Sbea, Sbeb, and Sbec or based on user input.

Specifically, the controller 680 of the mobile terminal 600 may perform main/sub setting for the plurality of audio output devices 100a, 100b, and 100c based on the RSSIs of the received beacon signals Sbea, Sbeb, and Sbec.

For example, if the strength or the level of the beacon signal Sbeb from the second audio output device 100b is the highest, the controller 680 of the mobile terminal 600 may set the second audio output device 100b as a main audio output device and the first and third audio output devices 100a and 100c as sub audio output devices.

In the figure, an object 2424 representing the main audio output device and objects 2422 and 2426 representing the sub audio output devices may be displayed on the screen 2420 for main/sub setting.

The controller 680 of the mobile terminal 600 may perform main/sub setting for the plurality of audio output devices 100a, 100b, and 100c based on the RSSIs of the received beacon signals Sbea, Sbeb, and Sbec.

For example, the controller 680 of the mobile terminal 600 may set the second audio output device 100b as a center audio output device and the first and third audio output devices 100a and 100c as left (L) and right (R) audio output devices, respectively.

FIG. 24C illustrates an example of channel setting for a plurality of audio output devices.

The controller 680 of the mobile terminal 600 may perform a control operation to display a screen 2430 for main/sub setting for the plurality of audio output devices 100a, 100b, and 100c regardless of reception of the beacon signals Sbea, Sbeb, Sbec.

The controller 680 of the mobile terminal 600 may display objects 2432, 2434, and 2436 representing the respective audio output devices and objects for channel setting based on the device information on the plurality of audio output devices 100a, 100b, and 100c.

When the user's hand 2431 drags an object 2431 representing the left channel among the objects for channel setting and drops the object 2432 on an object 2432 representing the first audio output device, the controller 680 of the mobile terminal 600 may set the first audio output device as the left channel audio output device. In this way, channel setting for the plurality of audio output devices may be easily performed.

Figure 25:
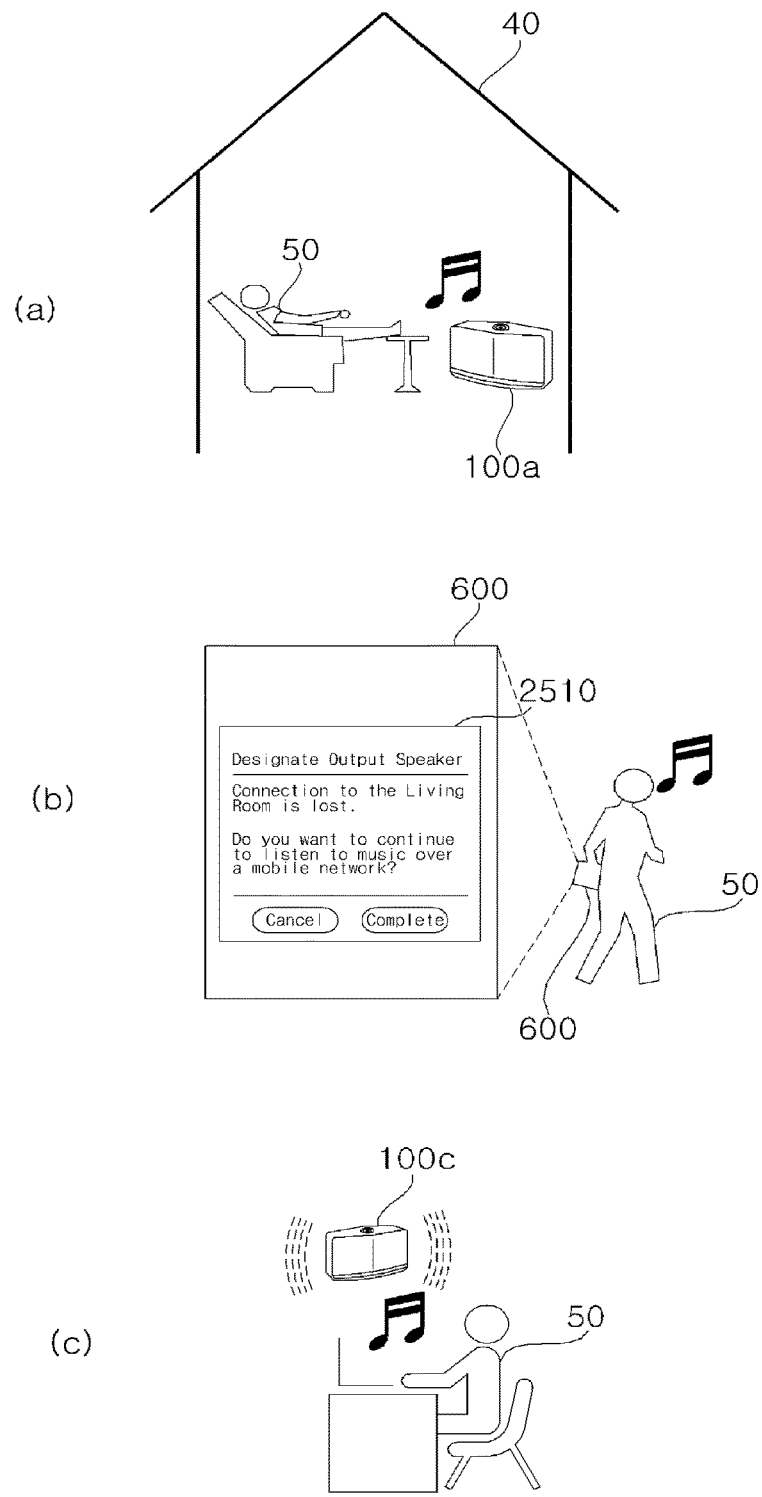

FIG. 25 illustrates an example of seamless audio output.

First, FIG. 25(a) illustrates output of sound through the audio output device 100a in the house 40. In particular, it is illustrated that sound corresponding to the audio data transmitted through the mobile terminal 600 of the user 50 is output through the audio output device 100a.

Next, FIG. 25(b) illustrates that the sound corresponding to the reproduced audio data is output from the mobile terminal 600 when the user 50 goes to work. A screen 2510 for designating an output speaker may be displayed on the mobile terminal 600.

Next, FIG. 25(c) illustrates output of sound through the audio output device 100c at the office. In particular, it is illustrated that sound corresponding to the audio data transmitted through the mobile terminal 600 of the user 50 is output through the audio output device 100c.

Accordingly, the audio data reproduced by the mobile terminal 600 may be seamlessly output.

Figure 26:
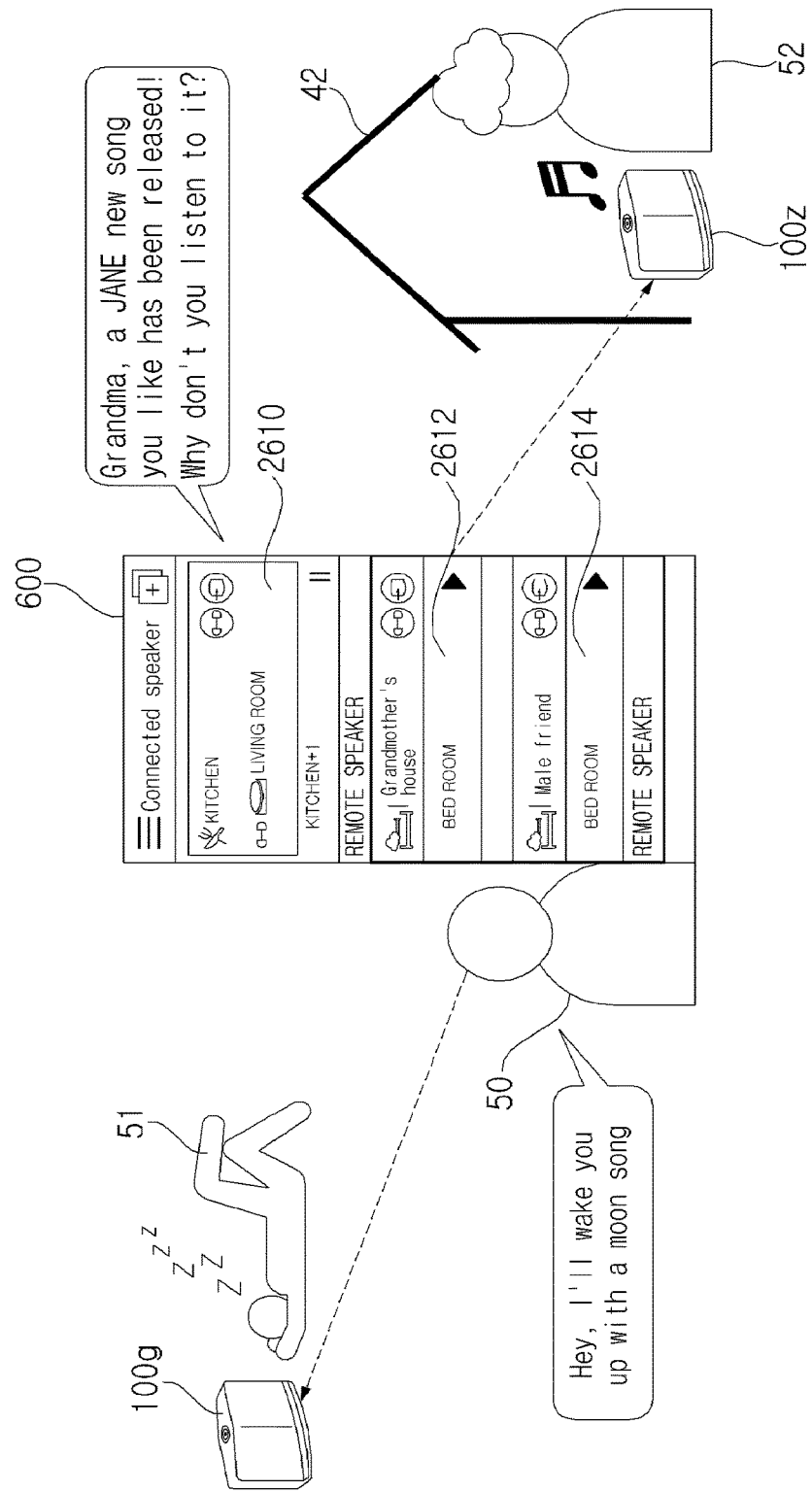

FIG. 26 illustrates that another user outputs sound corresponding to recommended audio data to a nearby audio output device through the mobile terminal 600 of the user.

Referring to the figure, the controller 680 of the mobile terminal 600 may control a selected music file to be wirelessly transmitted to another external audio output device through a remote transmission screen 2610.

In the figure, the remote transmission screen 2610 may include a first audio file item 2612 and a second audio file item 2614.

When the first audio file item 2612 is selected, the controller 680 of the mobile terminal 600 may control the audio file corresponding to the first audio file to be remotely wirelessly transmitted to an audio output device 100z located near the grandmother 52 in the grandmother's house 42.

When the second audio file item 2614 is selected, the audio data corresponding to the second audio file may be controlled to be remotely wirelessly transmitted to an audio output device 100g located near a male friend 51.

Figure 27A:
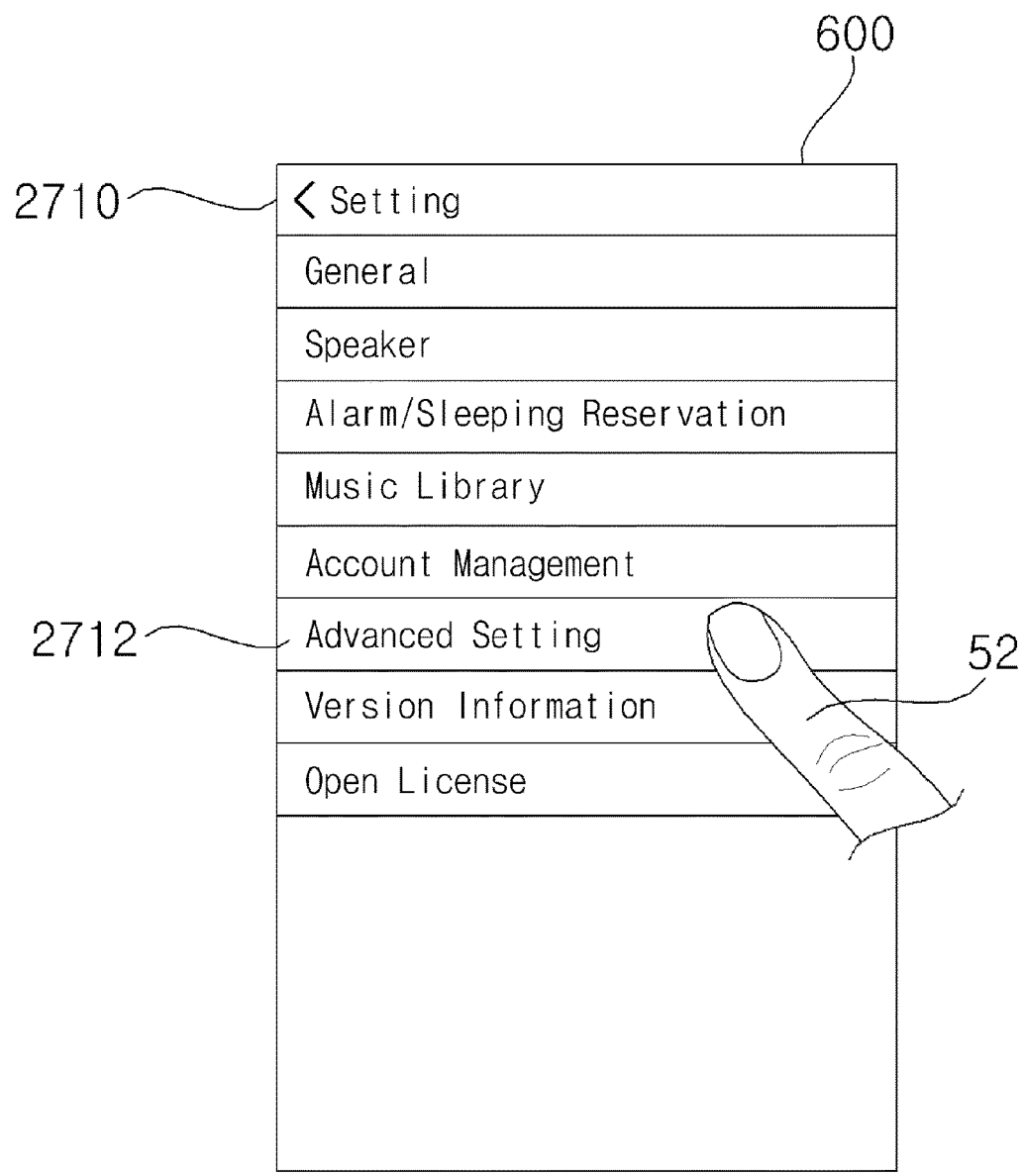
Figure 28A:
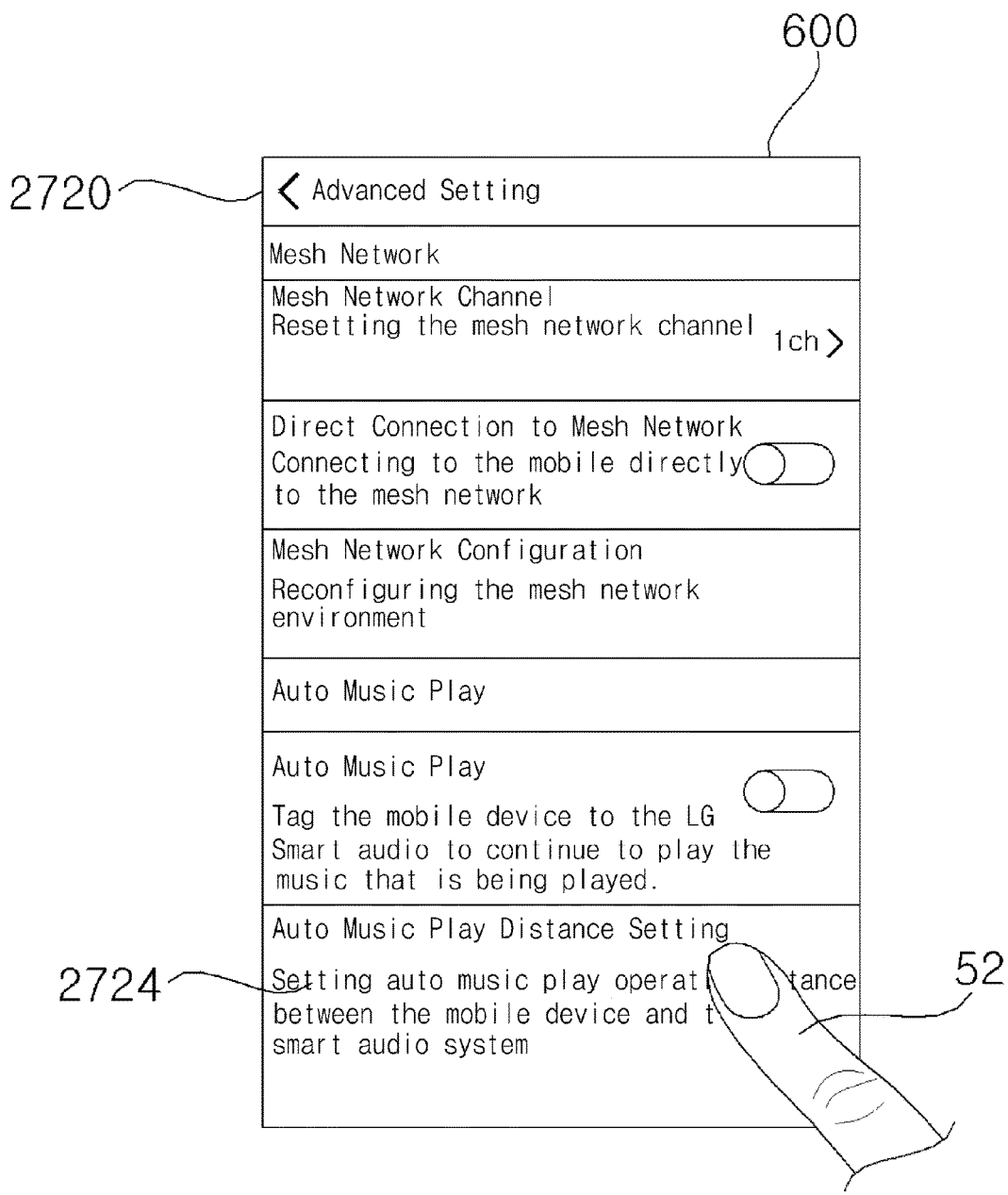
Figure 28B:
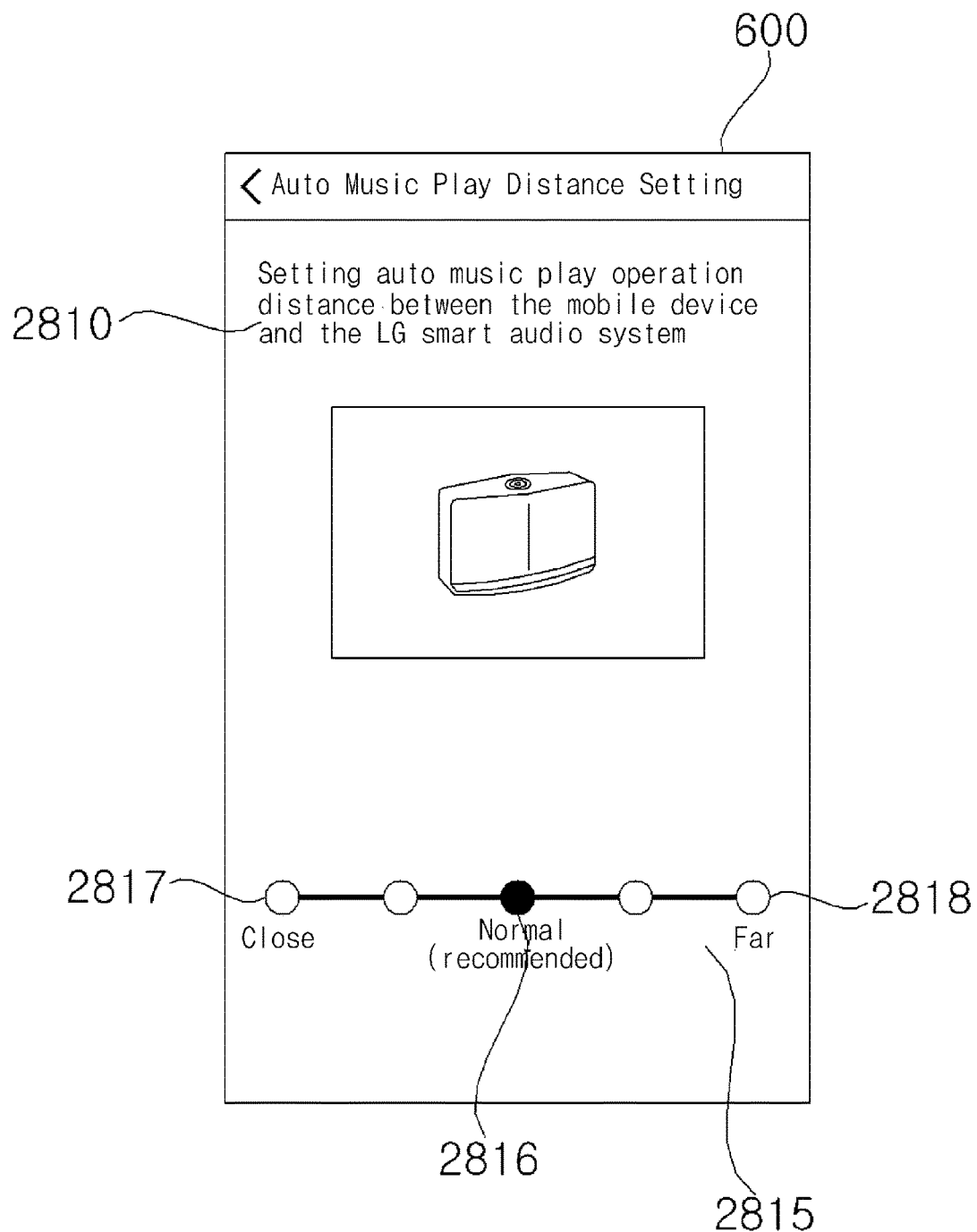

FIGS. 27A and 28B illustrate a UI for setting an auto-music play function in the audio output device 100.

FIG. 27A illustrates that a menu screen 2710 for controlling the audio output device is displayed on the mobile terminal 600.

Figure 27B:
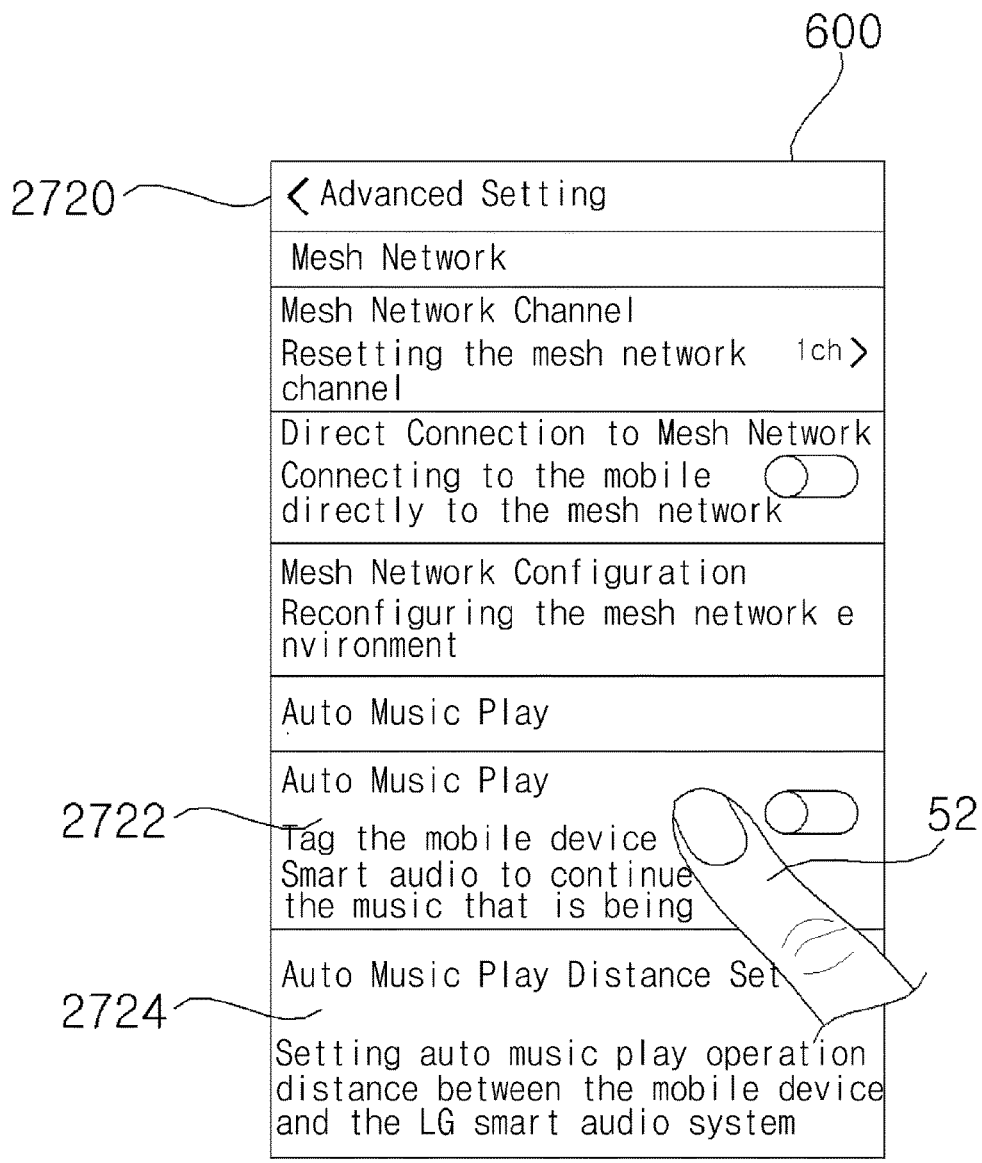

When an advanced setting item 2712 on the menu screen 2710 is selected, the controller 680 of the mobile terminal 600 may control an advanced setting menu screen 2720 to be displayed as shown in FIG. 27B.

The advanced setting menu screen 2720 may include an auto-music play item 2722 and an auto-music play distance setting item 2724.

Figure 27C:
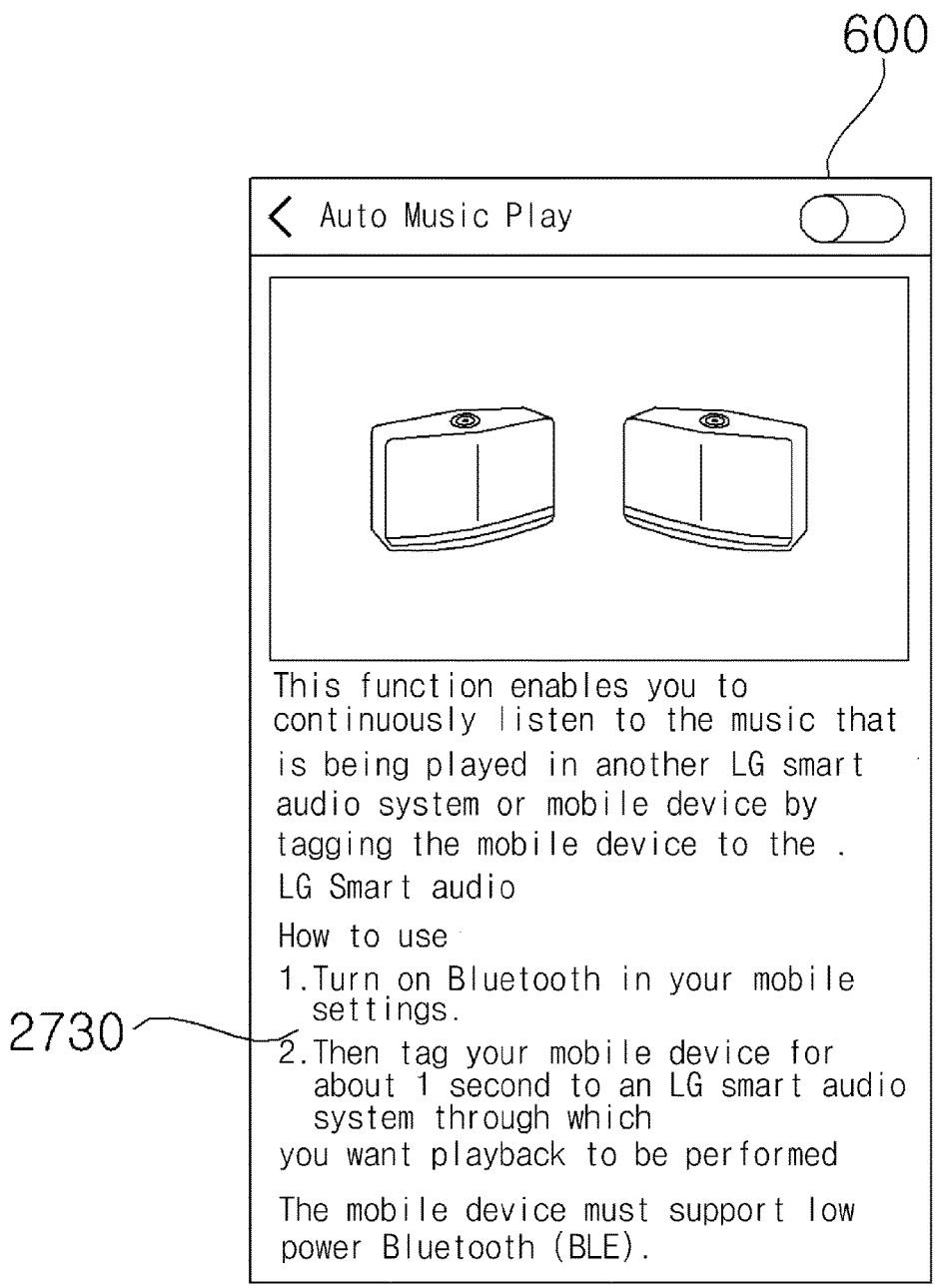

When the auto-music play item 2722 is selected, the controller 680 of the mobile terminal 600 may control a guide screen 2740 for auto-music play to be displayed as shown in FIG. 27C.

Figure 27D:
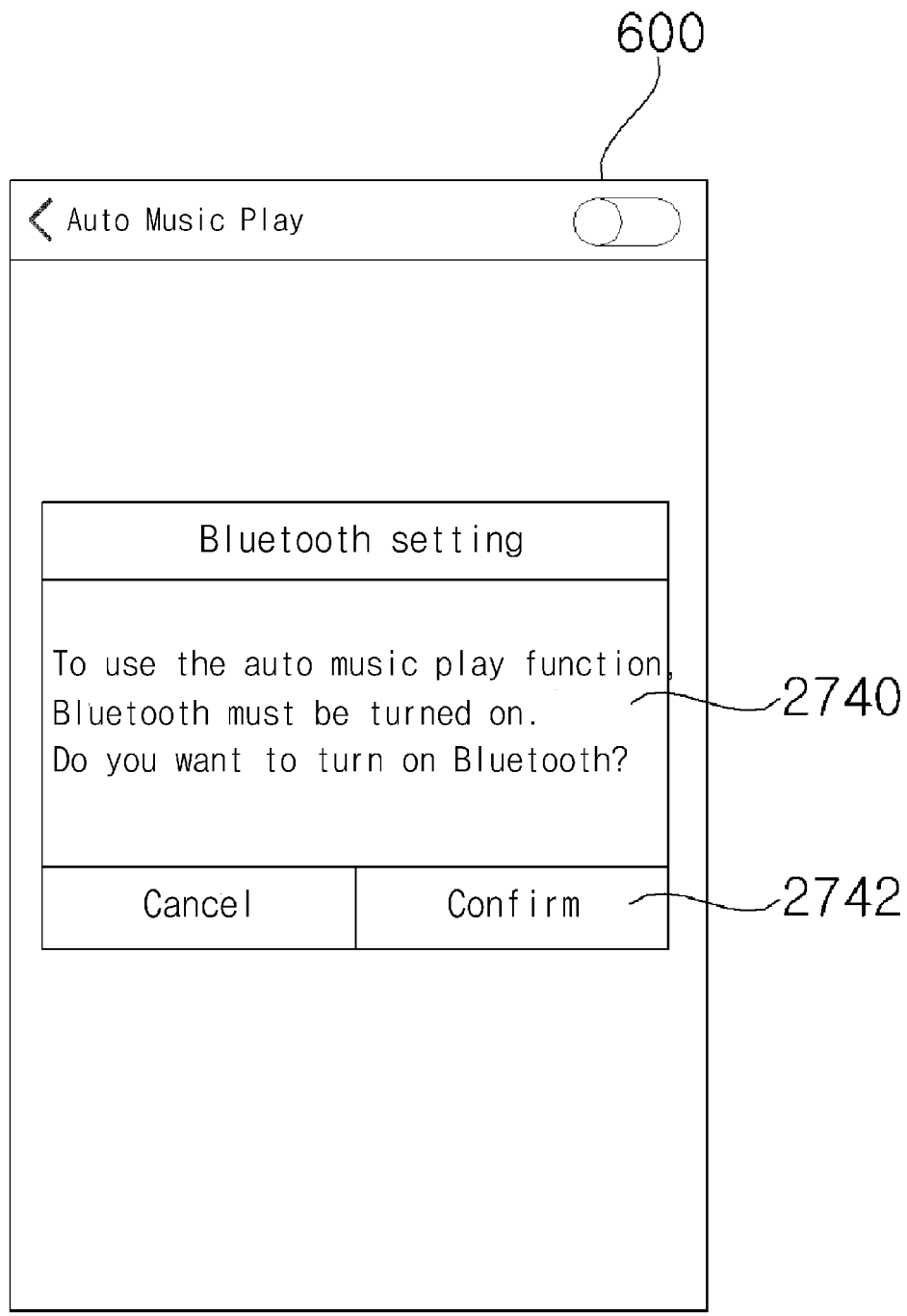

Next, FIG. 27D illustrates that a Bluetooth setting screen 2740 is displayed. When a confirmation item 2742 is selected on the Bluetooth setting screen 2740, the controller 680 of the mobile terminal 600 may activate the Bluetooth function.

FIG. 28A illustrates displaying the advanced setting menu screen 2720 as shown in FIG. 27B.

When the auto-music play distance setting item 2724 is selected on the advanced setting menu screen 2720, the controller 680 of the mobile terminal 600 may perform a control operation to display a screen 2810 for setting an auto-music play distance.

The screen 2810 for setting the auto-music play distance may include a bar for setting the auto-music play distance. The distance for auto-music play may be set as the control item 2816 is scrolled toward the first item 2817 or the second item 2818, that is, leftward or rightward according to touch input.

That is, the reference value of RSSI for auto-music play may be varied.

For example, the controller 680 of the mobile terminal 600 may set the RSSI reference value for auto-music play to increase as the control item 2816 is scrolled toward the first item 2817 and to decrease as the control item 2816 is scrolled toward the second item 2818.

Thus, sensitivity setting, particularly distance setting, for auto-music play may be easily performed.

Figure 29A:
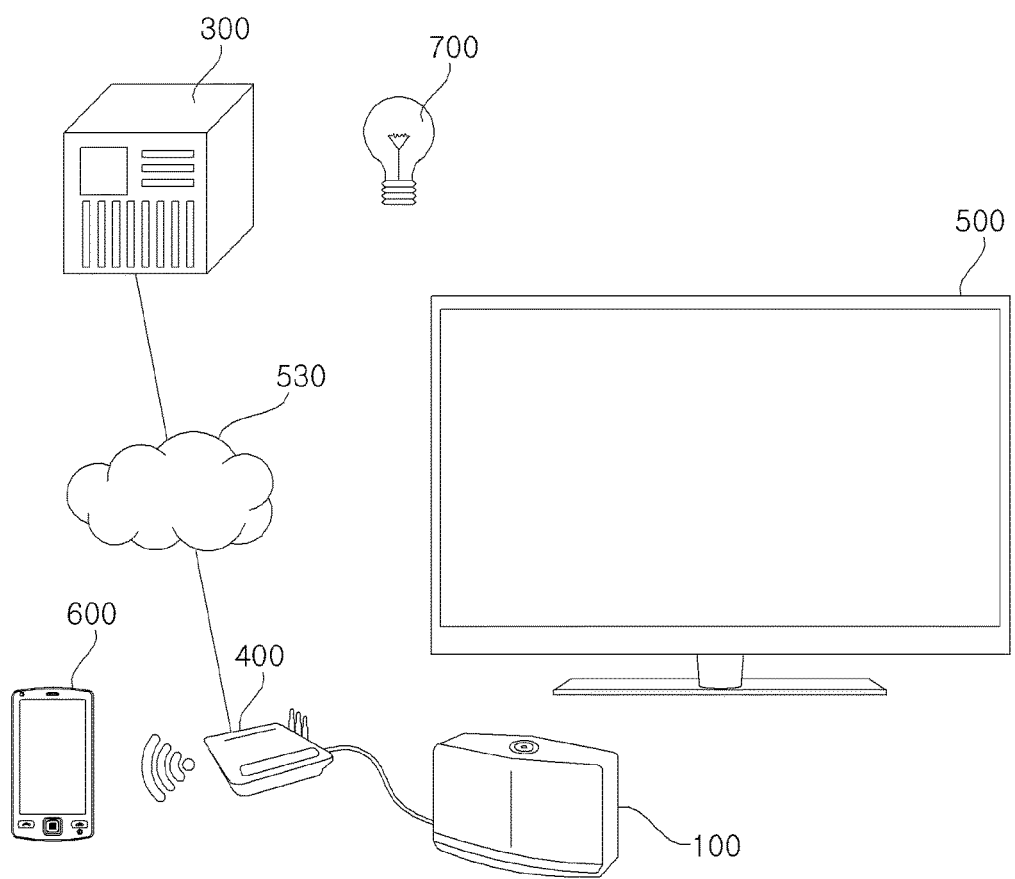
FIG. 29A is a configuration diagram illustrating an audio output system according to another embodiment of the present invention.

FIG. 29A is a configuration diagram illustrating an audio output system according to another embodiment of the present invention.

The audio output system 20 of FIG. 29A is similar to the audio output system 10 of FIG. 1, except that a lighting device 700 is further provided.

In particular, the lighting device 700 includes a communication unit, and may receive a power on/off signal, a color change signal, and the like from the audio output device 100 and perform a corresponding operation.

In particular, the lighting device 700 may receive a power on/off signal, a color change signal, and the like which are based on BLE from the audio output device 100. To this end, the lighting device 700 may include a first communication module for performing BLE-based communication.

The lighting device 700 may be controlled by the audio output device 100, which is constantly powered on.

If a plurality of audio output devices is arranged in a house, a plurality of lighting devices may be controlled by the audio output devices respectively assigned thereto.

Figure 29B:
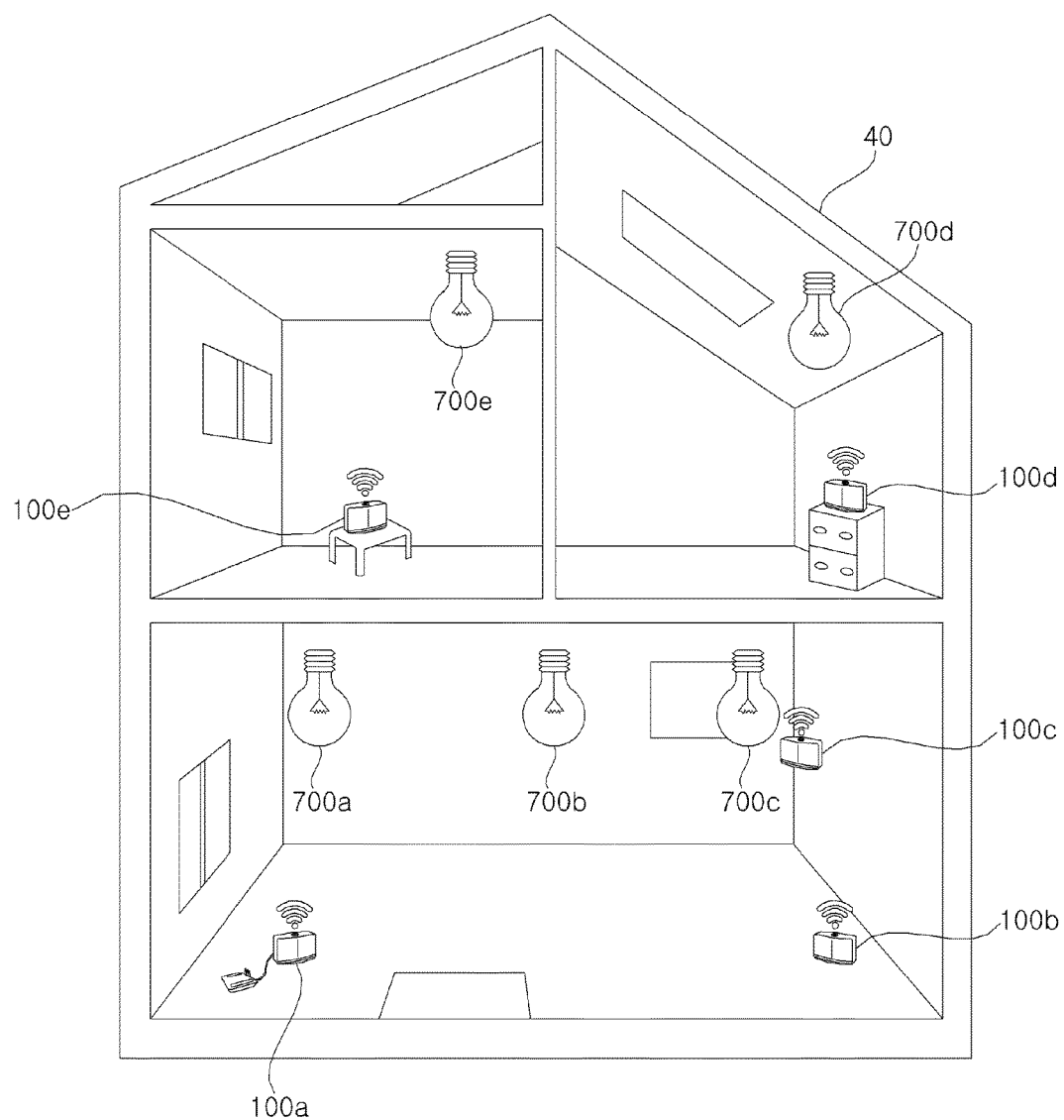
FIG. 29B illustrates an example of deployment of the lighting device of FIG. 29A.

FIG. 29B illustrates an example of deployment of the lighting device of FIG. 29A.

Referring to the figure, a plurality of audio output devices 100a, 100b, 100c, 100d, and 100e may be disposed in a building 40.

For example, each of the first to third audio output devices 100a, 100b, and 100c may control at least one of the first to third lighting devices 700a, 700b, and 700c.

Further, the fourth and fifth audio output devices 100d and 100e may control the fourth and fifth lighting devices 700d and 700e, respectively.

Figure 30:
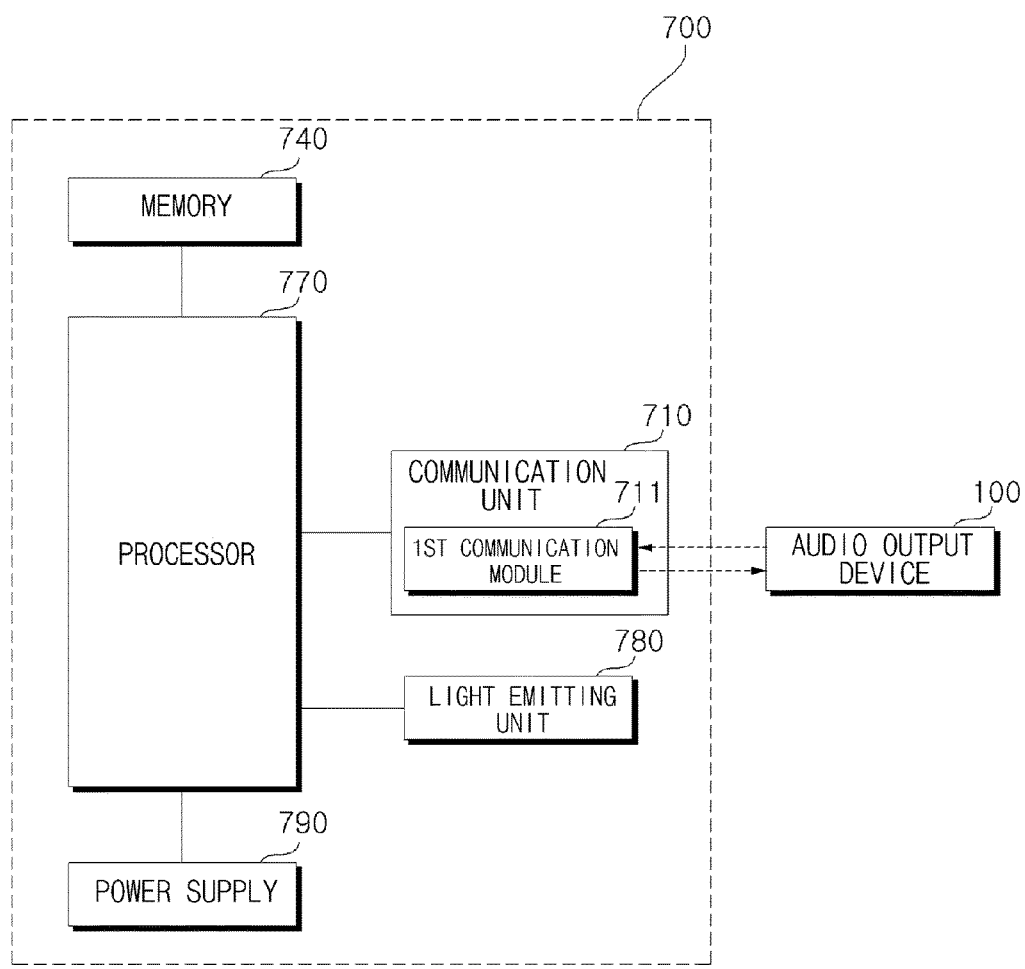
FIG. 30 is an exemplary internal block diagram illustrating the lighting device of FIG. 29A.

FIG. 30 is an exemplary internal block diagram illustrating the lighting device of FIG. 29A.

Referring to the figure, the lighting device 700 may include a communication unit 710 for communication with other external devices, a memory 740, a processor 770 for internal control, and a light emitting unit 780 for emitting light.

The communication unit 710 may include a first communication module 711 for performing communication with the audio output device 100.

For example, the first communication module 711 may receive a power on/off signal from the audio output device 100, and the processor 700 may control the light emitting unit 780 to be turned on or off based on power on/off signal.

As another example, the first communication module 711 may receive a color change signal from the audio output device 100, and the processor 700 may control the color of light emitted from the light emitting unit 780 to change, based on the color change signal.

The first communication module 711 may transmit device information, state information, and the like on the lighting device 700 to the audio output device 100.

The first communication module 711 may exchange data with the audio output device 100 using Bluetooth.

The memory 740 may store data related to operation of the lighting device 700. For example, device information, state information, and the like of the lighting device 700 may be stored. The memory 740 may also store a color change signal from the audio output device 100.

The processor 770 may control each unit in the lighting device 700.

Specifically, the processor 770 may control the light emitting portion 780 to be turned on or off based on the power on/off signal. Alternatively, the processor 770 may control the color of light output from the light emitting unit 780 to change, based on the color change signal.

The light emitting unit 780 may output predetermined light under control of the processor 770. To this end, the light emitting portion 780 may include an LED. The light emitting unit may output light of various colors.

For example, the light emitting unit 780 may output red light when receiving a red light emission signal from the audio output device 100, and may output blue light upon receiving a blue light emission signal.

In addition, the light emitting unit 780 may sequentially output light of various colors according to a sequential color change signal from the audio output device 100.

The light emitting unit 780 may control the travel direction of the output light to be varied under control of the processor 770. For example, the processor 770 may control only a part of the LEDs to be controlled such that light is output only in some directions.

The power supply 790 supplies power to internal units. To this end, it may include an AC/DC converter and a DC/DC converter.

The lighting device 700 may perform only Bluetooth communication without carrying out a communication scheme such as Wi-Fi.

According to this method, since the lighting device 700 receives a BLE signal from the audio output device 100, which is constantly powered on, and operates based on the received BLE signal, it is not necessary to constantly keep communication such as Wi-Fi activated. Therefore, power consumption may be reduced.

Figure 31:
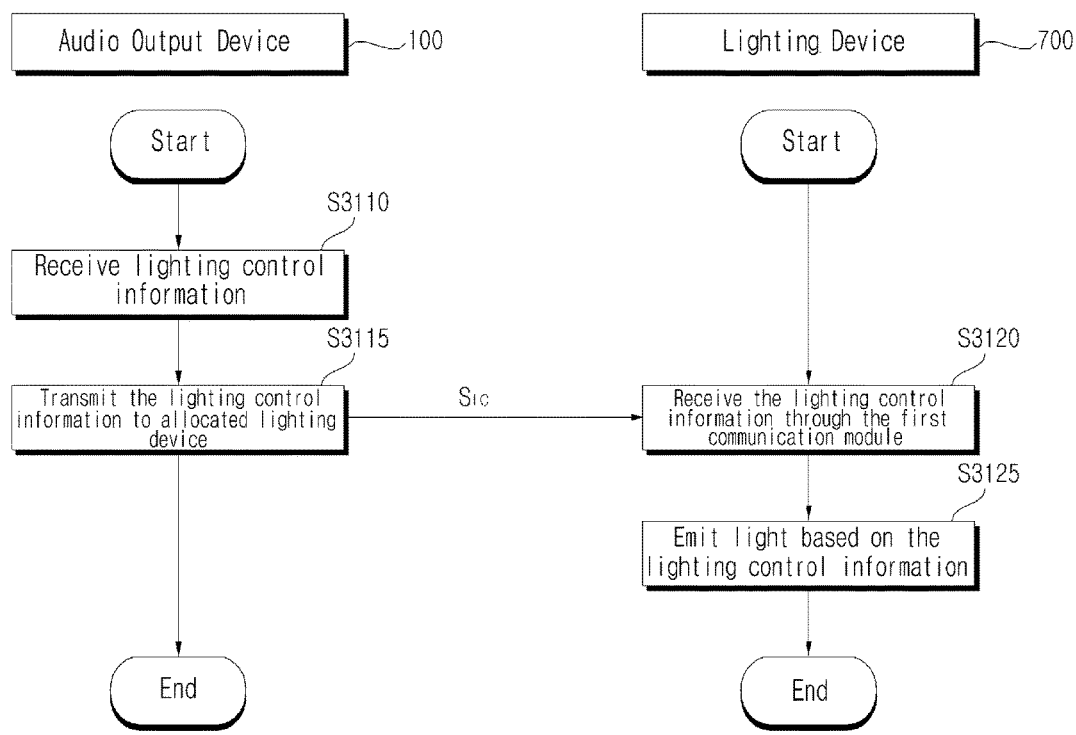
FIG. 31 is a flowchart illustrating an exemplary operation of an audio output system according to another embodiment of the present invention.

FIG. 31 is a flowchart illustrating an exemplary operation of an audio output system according to another embodiment of the present invention, and FIGS. 32A to 45C illustrate operation of the audio output system of FIG. 31.

Referring to FIG. 31, the controller 170 of the audio output device 100 receives lighting control information (S3110).

For example, the audio output device 100 may transmit the mood information to the server 300 and receive from the server 300 a recommended music list including a music file suitable for the current mood. Then, it may receive the lighting control information corresponding to the recommended music list from the server 300.

As another example, the audio output device 100 may receive lighting control information for driving the lighting device 700 from the mobile terminal 600 that is remotely connected from the outside.

Here, the lighting control information may include power on/off information and color change information.

Next, the controller 170 of the audio output device 100 transmits the received lighting control information SLC to the assigned lighting device 700 (S3115).

The first communication module 111 of the audio output device 100 may transmit the received lighting control information SLC to the assigned lighting device 700 according to the Bluetooth communication scheme.

Next, the lighting device 700 may receive the lighting control information SLC through the first communication module 711 (S3120).

Next, the processor 770 of the lighting device 700 controls light to be emitted, based on the received lighting control information (S3120).

Figure 32A:
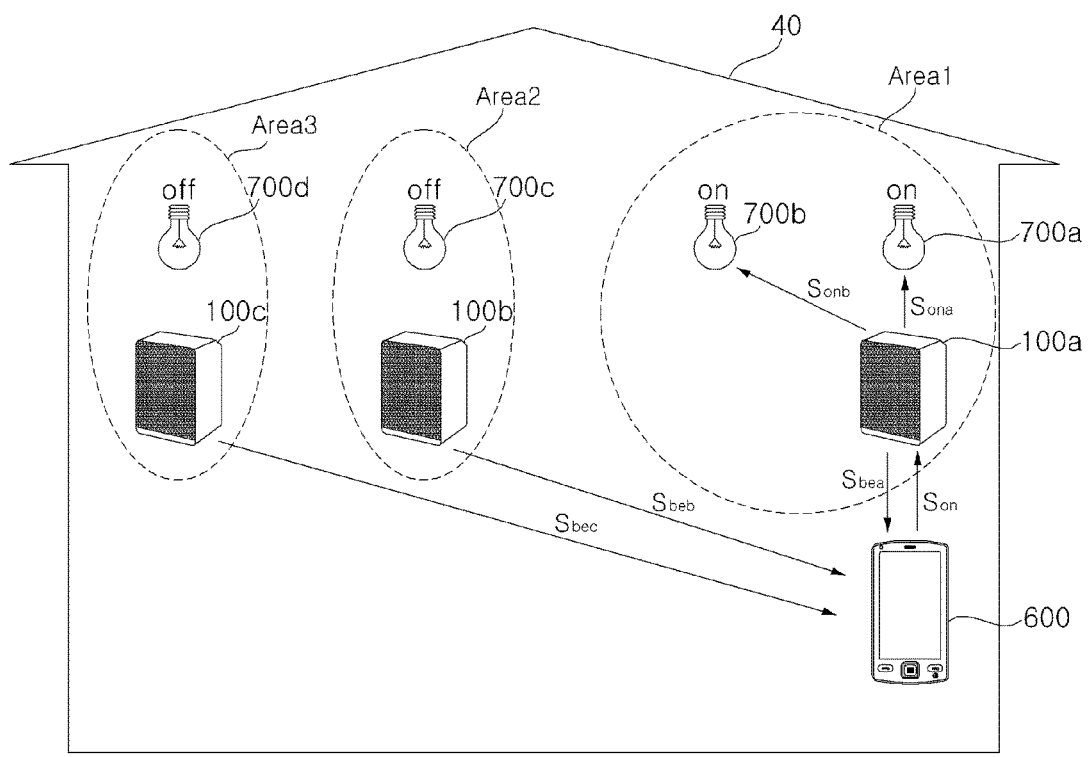
FIGS. 32A to 45C illustrate operation of the audio output system of FIG. 31.
Figure 32B:
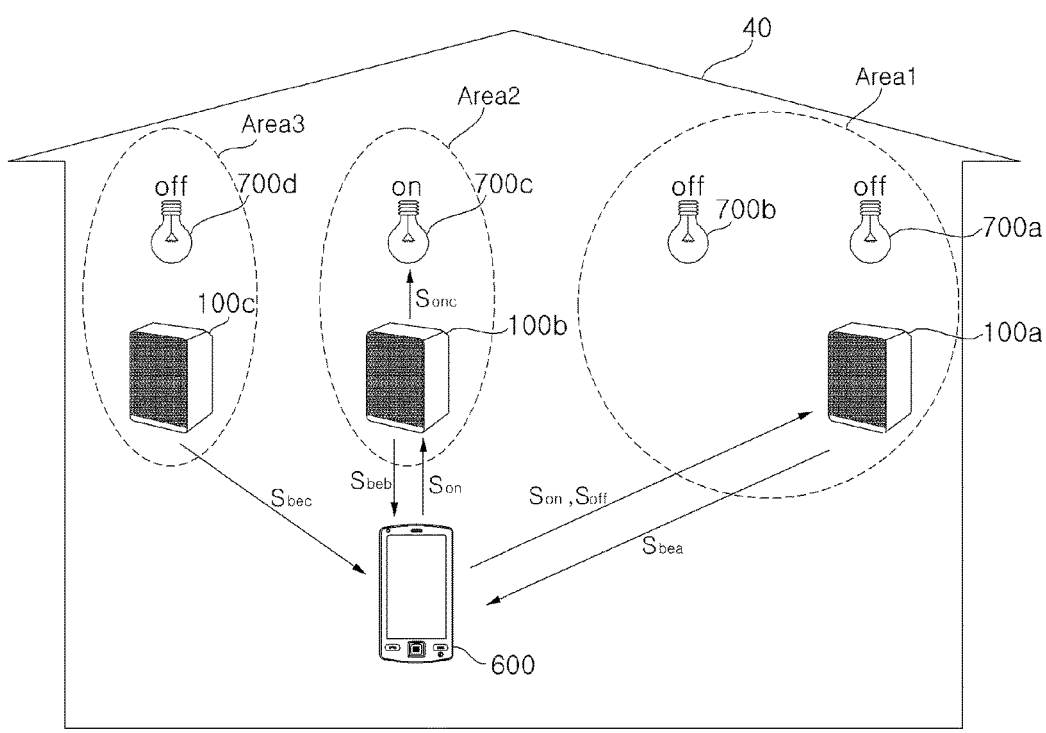
Figure 32C:
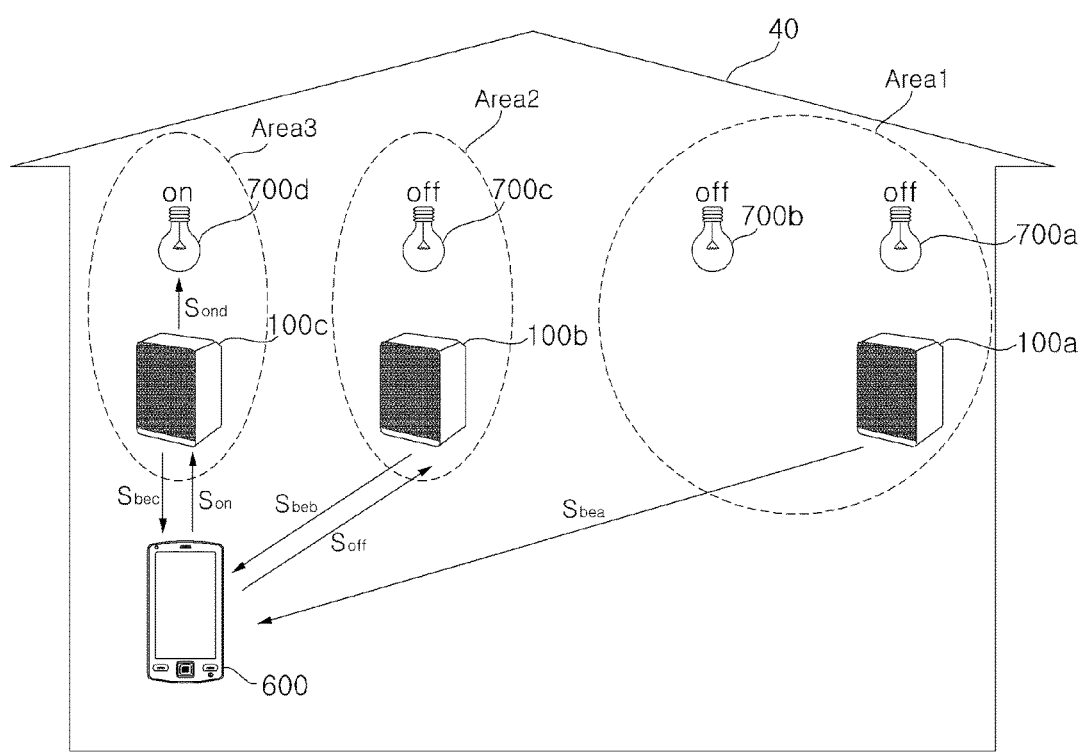

FIGS. 32A to 32C illustrate turning on/off the lighting device using beacon signals from a plurality of audio output devices.

FIG. 32A illustrates that the mobile terminal 600 receives beacon signals from a plurality of audio output devices 100a, 100b, 100c and transmits a power-on signal Son only to a first audio output device 100*a* whose beacon signal has RSSI greater than or equal to a first predetermined value.

That is, the controller 680 of the mobile terminal 600 may receive beacon signals from the plurality of audio output devices 100*a*, 100*b*, and 100*c*, and control a power-on signal Son to be transmitted to the audio output device 100*a* only when the RSSI of the received beacon signals are greater than or equal to the first predetermined value.

For each of the audio output devices 100*a*, 100*b*, and 100*c*, a pre-allocated lighting device may be set.

In the figure, it is illustrated that the first and second lighting devices 700*a* and 700*b* are arranged in a first area Area1 and are set to be controlled by the first audio output device 100*a*, the third lighting device 700*c* is arranged in a second the area Area2 and set to be controlled by the second audio output device 100*b*, and the third lighting device 700*c* is arranged in a third area Area3 and is set to be controlled by the third audio output device 100*c*.

The first audio output device 100*a* may receive the power-on signal Son from the mobile terminal 600 through the second communication module 112, and transmit power-on signal Sona and Sonb to the first and second lighting devices 700*a* and 700*b* through the first communication module 111.

Accordingly, the lighting devices 700*a* and 700*b* may be turned on simply by placing the mobile terminal 600 in the vicinity of the first audio output device 100*a* without pressing separate switches for the lighting devices 700*a* and 700*b*.

Next, FIG. 32B illustrates that the mobile terminal 600 receives beacon signals from a plurality of audio output devices 100*a*, 100*b*, and 100*c*, and transmits a power-on signal Son only to the second audio output device 100*b* whose beacon signal has RSSI greater than or equal to a first predetermined value.

That is, the controller 680 of the mobile terminal 600 may receive beacon signals from the plurality of audio output devices 100*a*, 100*b*, and 100*c*, and perform a control operation to transmit the power-on signal Son only to the second audio output device 100*b* whose beacon signal has RSSI greater than or equal to the first predetermined value.

The second audio output device 100*b* may receive the power-on signal Son from the mobile terminal 600 through the second communication module 112 and transmit a power-on signal Sonc to the third lighting device 700*c* through the first communication module 111.

Accordingly, the third lighting device 700*c* may be turned on simply by placing the mobile terminal 600 in the vicinity of the second audio output device 100*b* without pressing a separate switch for the lighting device 700*c*.

The controller 680 of the mobile terminal 600 may perform a control operation to transmit, to the first audio output device 100*a*, a power-off signal Soff for turning off the power of the first and second lighting devices 700*a* and 700*b* whose power is on. Thereby, the first and second lighting devices 700*a* and 700*b* may be turned off.

Next, FIG. 32C illustrates a case where the mobile terminal 600 receives beacon signals from a plurality of audio output devices 100*a*, 100*b*, and 100*c*, and transmits a power-on signal Son only to the third audio output device 100*c* whose beacon signal has RSSI greater than or equal to a first predetermined value.

That is, the controller 680 of the mobile terminal 600 may receive beacon signals from the plurality of audio output devices 100*a*, 100*b*, and 100*c*, and perform a control operation to transmit the power-on signal Son only to the third audio output device 100*c* whose beacon signal has RSSI greater than or equal to the first predetermined value.

The third audio output device 100*c* may receive the power-on signal Son from the mobile terminal 600 through the second communication module 112 and transmit a power-on signal Sonc to the fourth lighting device 700*d* through the first communication module 111.

Accordingly, the fourth lighting device 700*d* may be turned on simply by placing the mobile terminal 600 in the vicinity of the third audio output device 100*c* without pressing a separate switch for the lighting device 700*d*.

A power-off signal Soff for turning off the power of the third lighting device 700*c* whose power is on may be controlled to be transmitted to the second audio output device 100*b*. Thereby, the third lighting device 700*c* may be turned off.

Figure 33:
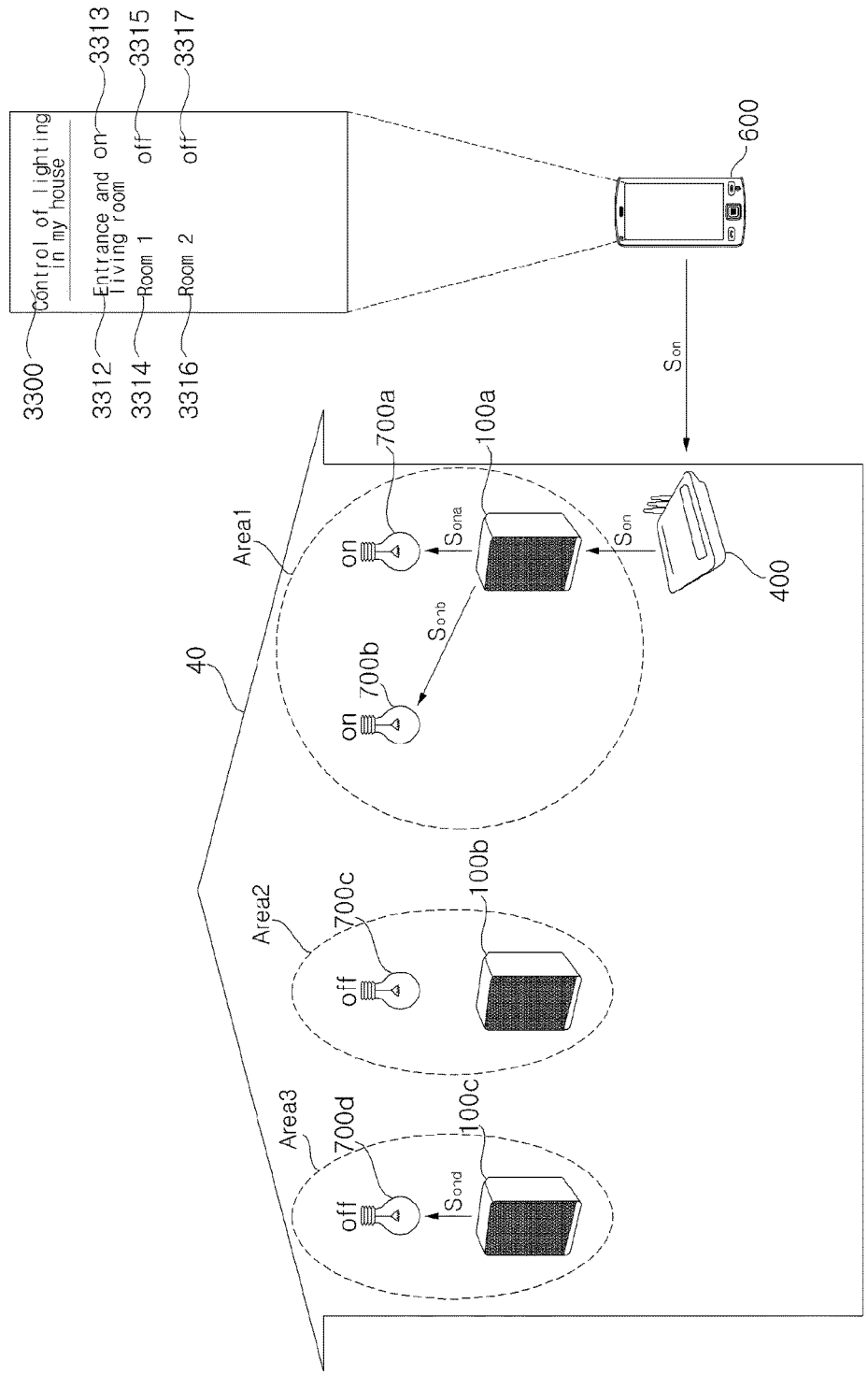

FIG. 33 illustrates control of a lighting device in a house by the mobile terminal 600 at a remote place.

Referring to the figure, the controller 680 of the mobile terminal 600 may perform a control operation according to user input to display a remote lighting control screen 3300 for lighting control.

For example, the remote lighting control screen 3300 may include an "entrance and living room" item 3312, a "Room 1" item 3314, and a "Room 2" item 3316 in the house.

The "entrance and living room" item 3312, "Room 1" item 3314, and "Room 2" item may include on/off items 3312, 3314, and 3316, respectively.

In accordance with the touch input for the on/off items 3313, 3315, and 3317, lighting control information including an on/off command of power of the lighting devices related to the "entrance and living room" item 3312, "Room 1" item 3314, and "Room 2" may be transmitted to the outside.

In the figure, it is illustrated that the power-on information Son in the power on/off command is transmitted to the AP device 400.

The controller 680 of the mobile terminal 600 may perform a control operation to transmit the lighting control information, in particular, the power-on information Son, to at least one of the plurality of audio output devices 100*a*, 100*b*, and 100*c* in the house 40 via the AP device 400.

When any one of the plurality of audio output devices 100*a*, 100*b*, and 100*c* is set as the main audio output device, the controller 680 of the mobile terminal 600 may perform a control operation to transmit the lighting control information, in particular, the power-on information Son, to the corresponding audio output device.

FIG. 33 illustrates a case where the "entrance and living room" item 3312 is set to "on" in the remote lighting control screen 3300. The controller 680 of the mobile terminal 600 may perform a control operation to transmit the power-on information to the first audio output device 100*a* among the audio output devices 100*a*, 100*b*, and 100*c*.

The controller 170 of the first audio output device 100*a* may control an entrance lighting device 700*a* and a living room lighting device 700*b*.

Therefore, the controller 170 of the first audio output device 100*a* may transmit power-on signals Sona and Sonb for the entrance lighting device 700*a* and the living room lighting device 700*b* based on the received power-on information Son.

Figure 34A:
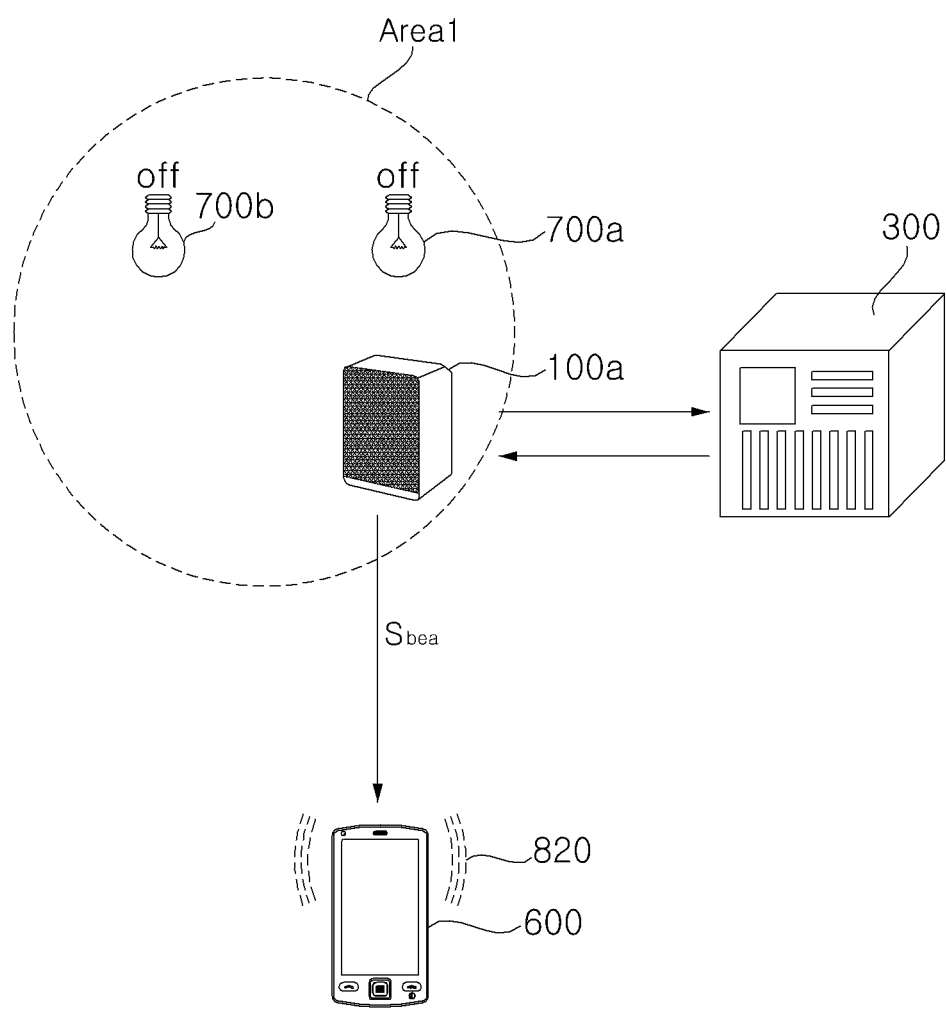
Figure 34B:
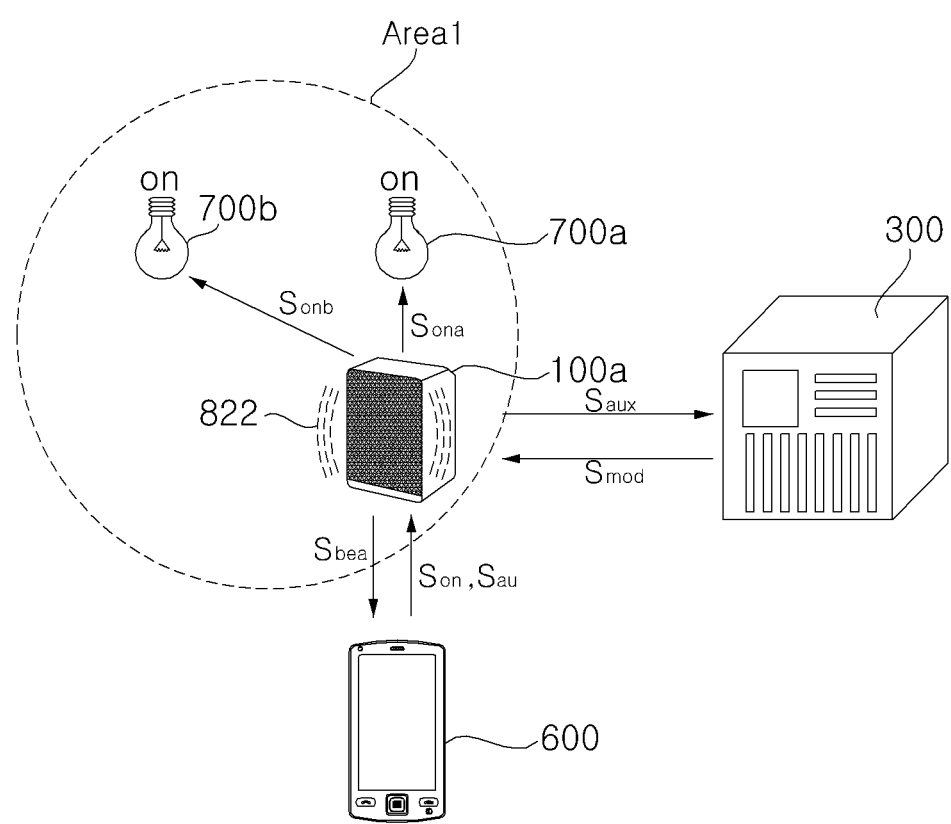

FIGS. 34A and 34B illustrate control of sound output and lighting through an audio output device.

If the distance between the audio output device 100*a* and the mobile terminal 600 is about a first distance which is sufficiently long as shown in FIG. 34A, the controller 680 of the mobile terminal 600 may perform a control operation to transmit the audio data being reproduced to the mobile terminal 600 despite presence of a beacon signal Sbea from the audio output device 100*a* since the RSSI of the beacon signal Sbea is less than the first predetermined value.

If the distance between the audio output device 100*a* and the mobile terminal 600 is about a second distance which is sufficiently short as shown in FIG. 34B, the controller 680 of the mobile terminal 600 may perform a control operation to transmit the audio data being reproduced to the audio output device 100*a* since the RSSI of the beacon signal Sbea from the audio output device 100*a* is greater than or equal to the first predetermined value.

The audio output device 100*a* may output sound 822 corresponding to the received audio data.

Upon receiving the audio data, the controller 170 of the audio output device 100*a* may control the ON signals Sona and Sonb for the first and second lighting devices 700*a* and 700*b* to be transmitted. Accordingly, when a predetermined sound is output from the audio output device 100*a*, lighting control of the first and second lighting devices 700*a* and 700*b* may be performed.

The audio output device 100*a* may transmit information Saux on the received audio data to the server 300 and receive mood information on the received audio data from the server 300.

The controller 170 of the audio output device 100*a* may further transmit color change signals for the first and second lighting devices 700*a* and 700*b* according to the mood information received from the server 300. Thus, it is possible to control lighting according to the mood as well as sound output corresponding to the received audio data.

FIGS. 35A to 35E illustrates reproducing a music file corresponding to the user's mode in the music file list stored in the audio output device.

Figure 35A:
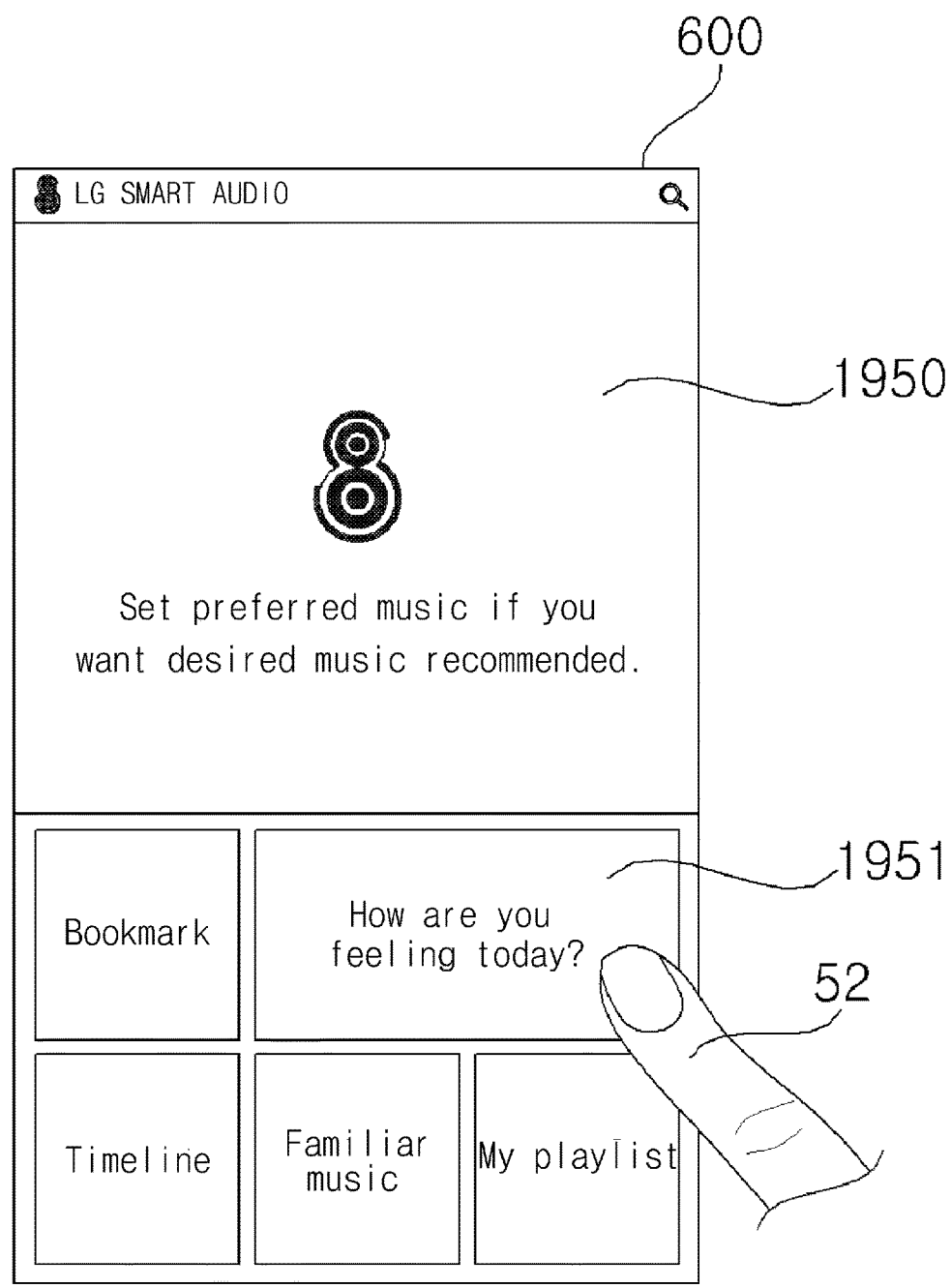
Figure 35B:
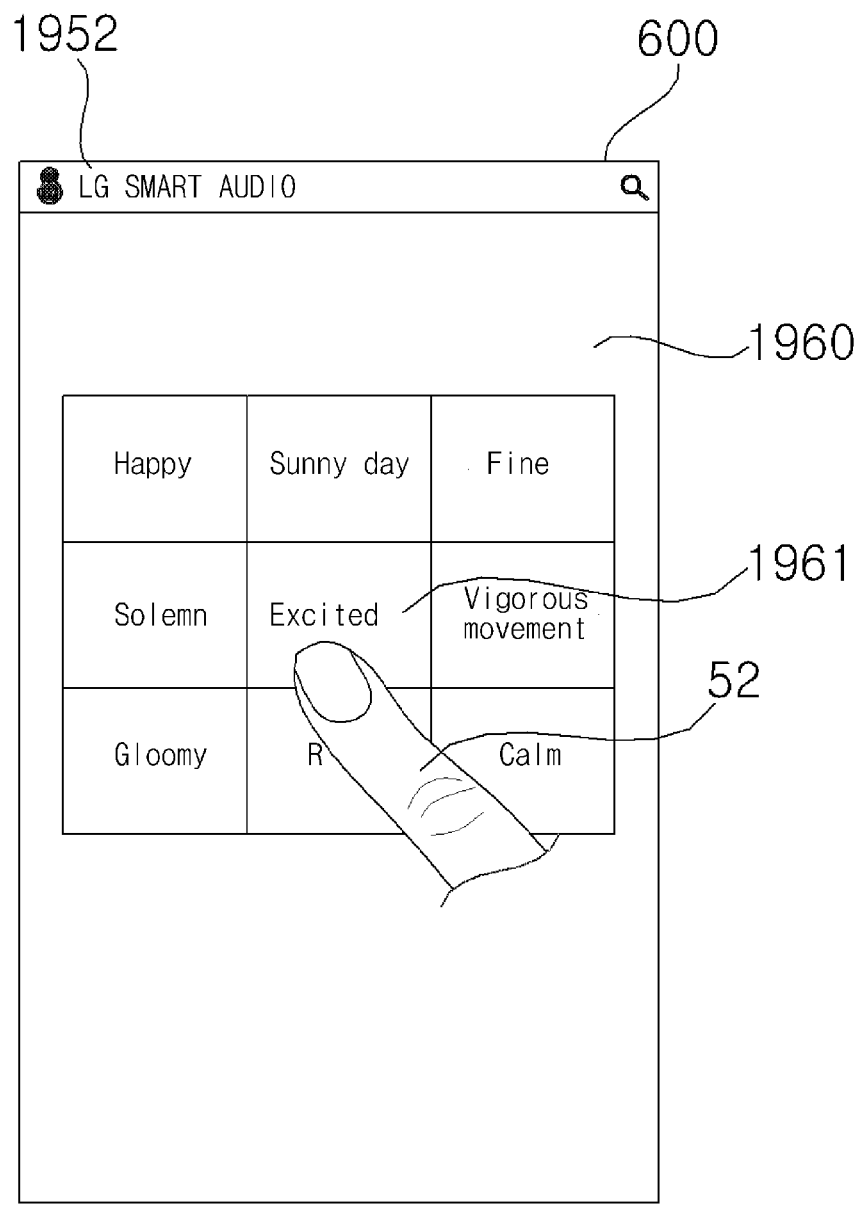

First, FIG. 35A illustrates a home screen 1950 for audio playback by the audio output device.

When a mood item 1951 related to today's mood is selected with the home screen 1950 for audio playback displayed, the controller 680 of the mobile terminal 600 may control a mood screen 1960 including a plurality of mood items as shown in FIG. 23B to be displayed.

Figure 35C:
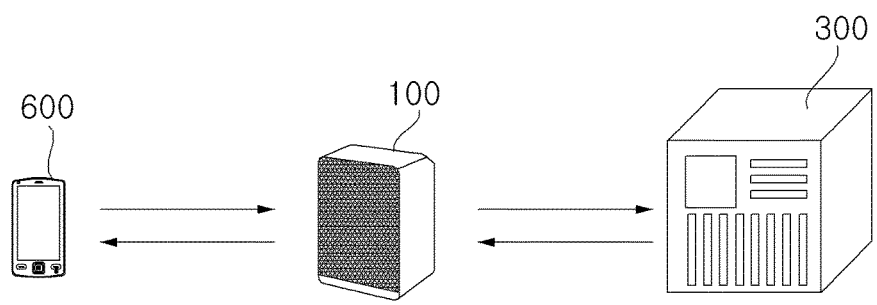
Figure 35D:
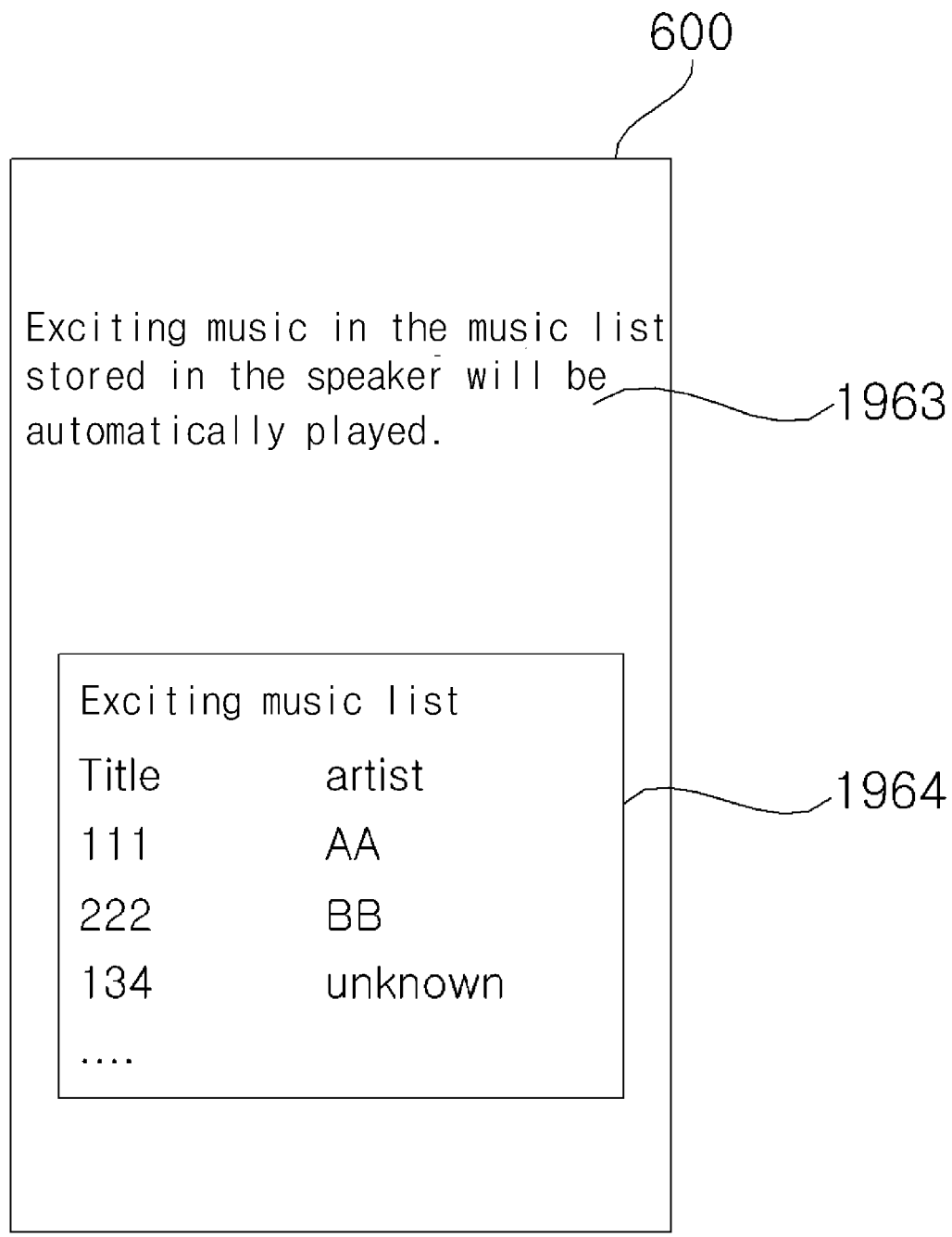

When the "Excited" item 1961 is selected on the mood screen 1960, the controller 680 of the mobile terminal 600 performs a control operation to transmit mood information to the audio output device 100 as shown in FIG. 35C.

The audio output device 100 transmits this mood information to the server 300. The server 300 may transmit recommended music information corresponding to the received "Excited" mood information to the audio output device 100. The audio output device 100 may transmit a music file list corresponding to the recommended music information to the mobile terminal 600.

Accordingly, the controller 680 of the mobile terminal 600 may perform a control operation to display a music file list screen 1964 including a music file list 1964 corresponding to the "Excited" item 1961 among the music files stored in the audio output device 100.

In addition, the controller 680 of the mobile terminal 600 may reproduce the audio data corresponding to the music file list 1964 according to a reproduction input from the user and transmit the reproduced audio data to the audio output device 100.

Figure 35E:
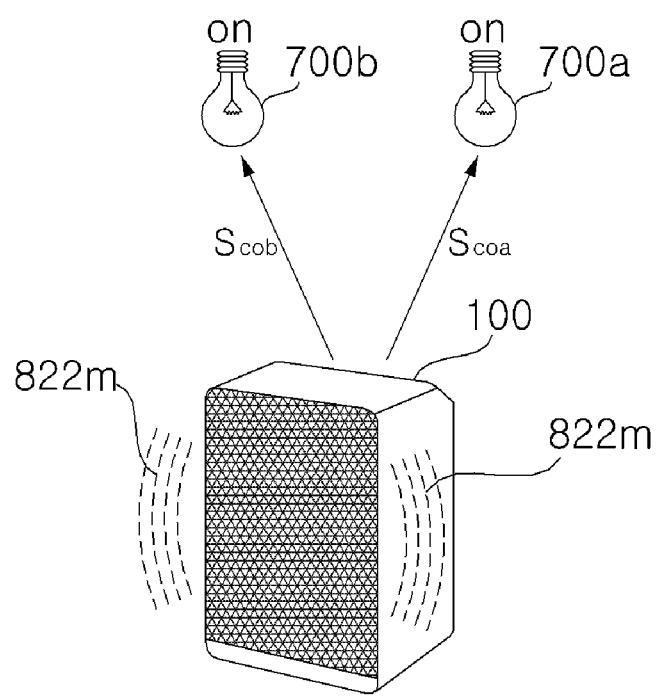

Accordingly, the controller 170 of the audio output device 100 may control sound 822*m* corresponding to the received audio data to be output as shown in FIG. 35E.

Meanwhile, the controller 170 of the audio output device 100 may perform a control operation to output, to the lighting devices 700*a* and 700*b*, which are assigned and controllable, control change signals or color signals Scoa and Scob causing light of colors corresponding to "Excited" to be output.

Figure 36B:
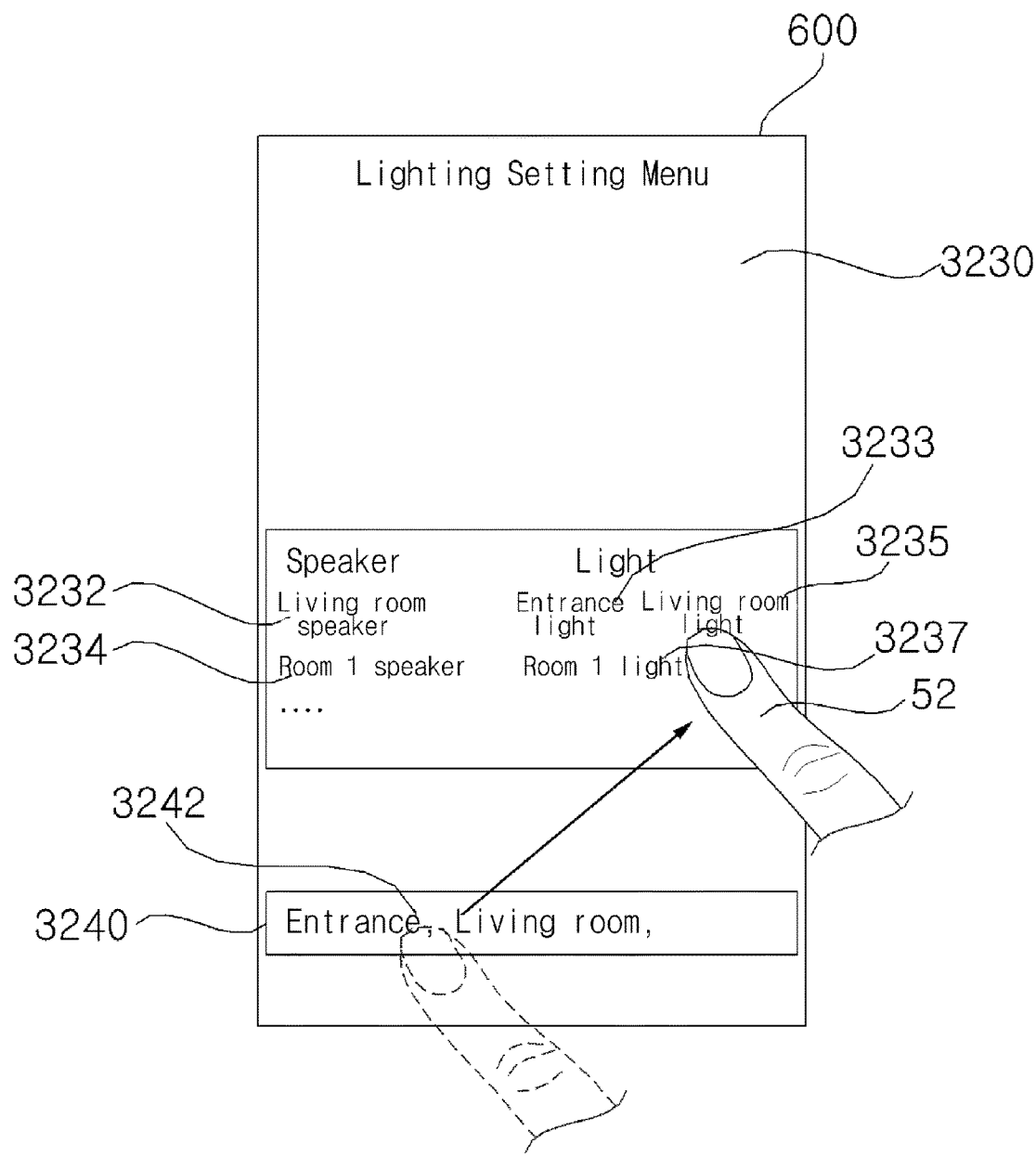

Each processor 770 of the lighting devices 700*a* and 700*b* may perform a control operation to output light of a corresponding color based on the received color change signal or color signal Scoa, Scob FIGS. 36A to 36B illustrate a UI for color setting for a lighting device.

First, FIG. 36A illustrates displaying a lighting color setting menu 3210 on the mobile terminal 600.

The lighting color setting menu 3210 may include various mood items 3212 and 3214 and color items 3215 and 3217 of the lighting device corresponding to the mood items. The lighting color setting menu 3210 may further include a color menu 3220 for setting a color item of the lighting device by touch and drop.

When the Blue item 3222 in the color menu 3220 is dragged and dropped in a color setting area corresponding to the depressed mode item 3214, the controller 680 of the mobile terminal 600 may set blue as the depressed mode.

Next, FIG. 36B illustrates displaying a lighting setting menu 3230 on the mobile terminal 600.

The lighting setting menu 3230 may include various audio output devices 3232 and 3234 and lighting device items 3233, 3235, and 3237 corresponding to the audio output devices. The lighting setting menu 3230 may further include a lighting menu 3240 for lighting device allocation by drag and drop.

When the living room item 3242 in the lighting menu 3240 is dragged and dropped in an area corresponding to the living room speaker item 3232, the controller 680 of the mobile terminal 600 may set the living room light 325 to be allocated to the living room speaker, namely, the living room audio output device.

FIGS. 37A to 37F illustrate a UI for adding a lighting device.

Figure 37A:
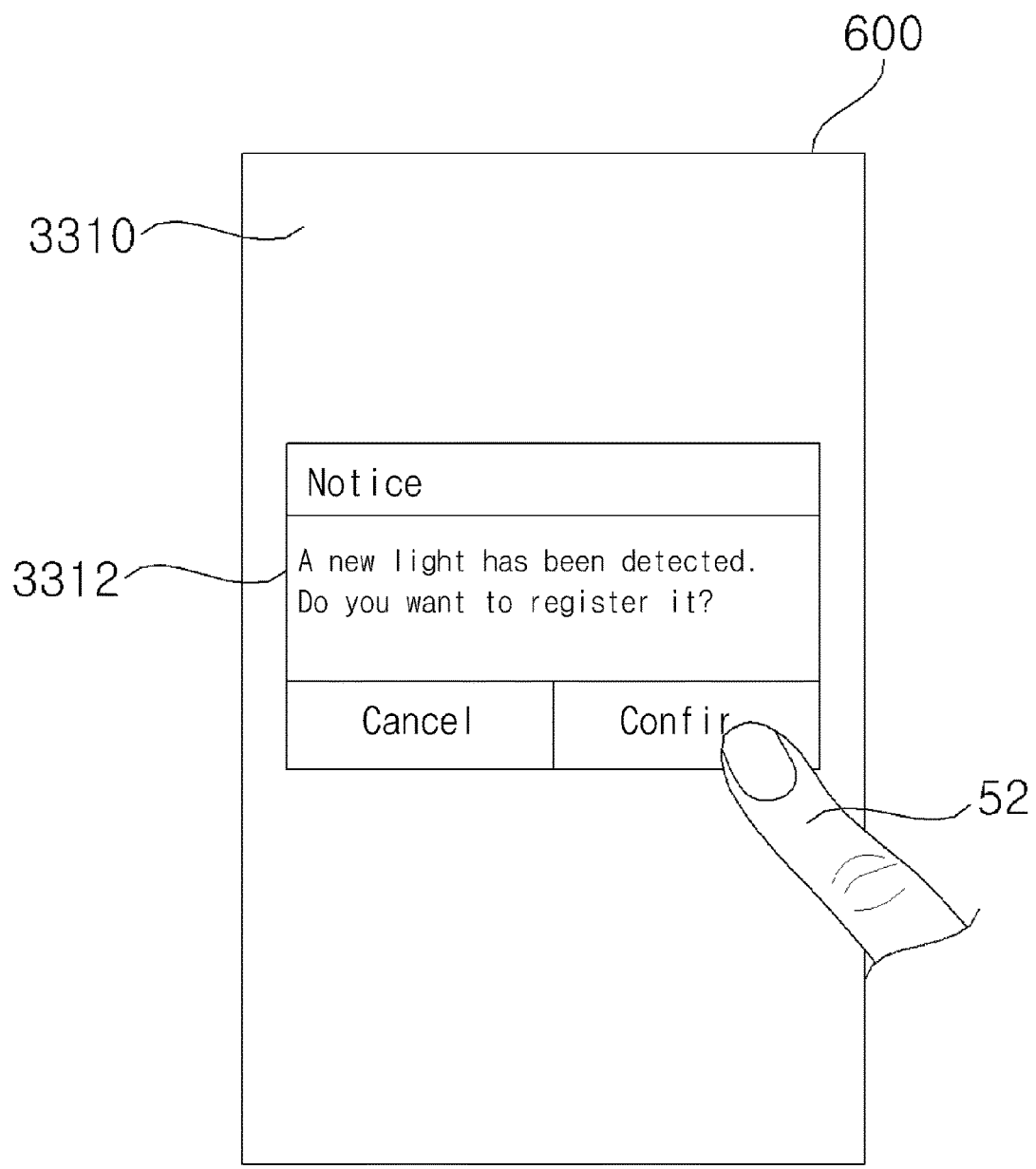
Figure 37B:
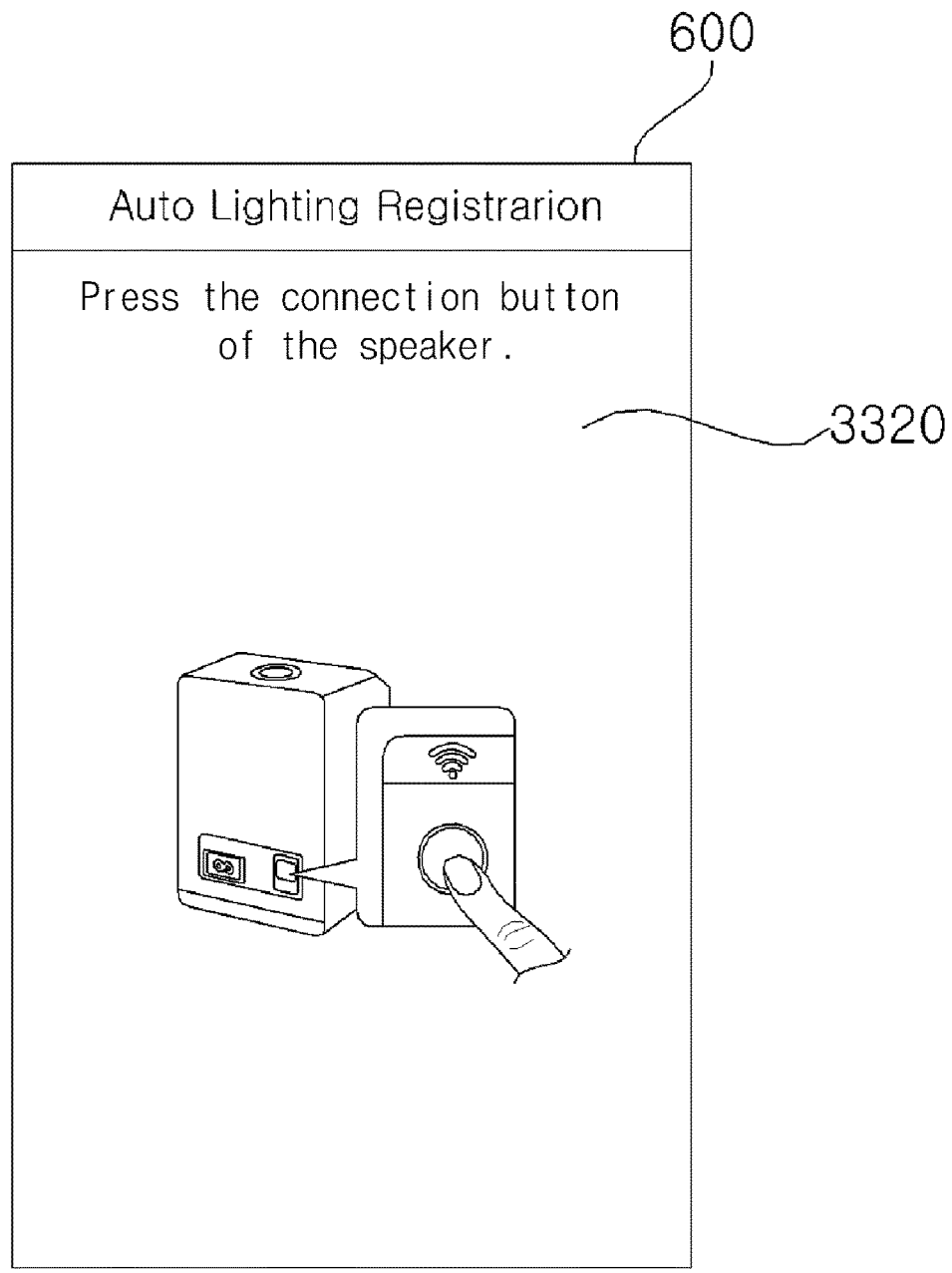

First, when a new nearby lighting device is discovered, the controller 680 of the mobile terminal 600 may perform a control operation to display a light registration start screen 3310, as shown in FIG. 37A.

When the Confirm item is selected on the light registration start screen 3310, the controller 680 of the mobile terminal 600 may perform a control operation to display a guide screen 3320 for connection between the audio output device and the lighting device.

Figure 37C:
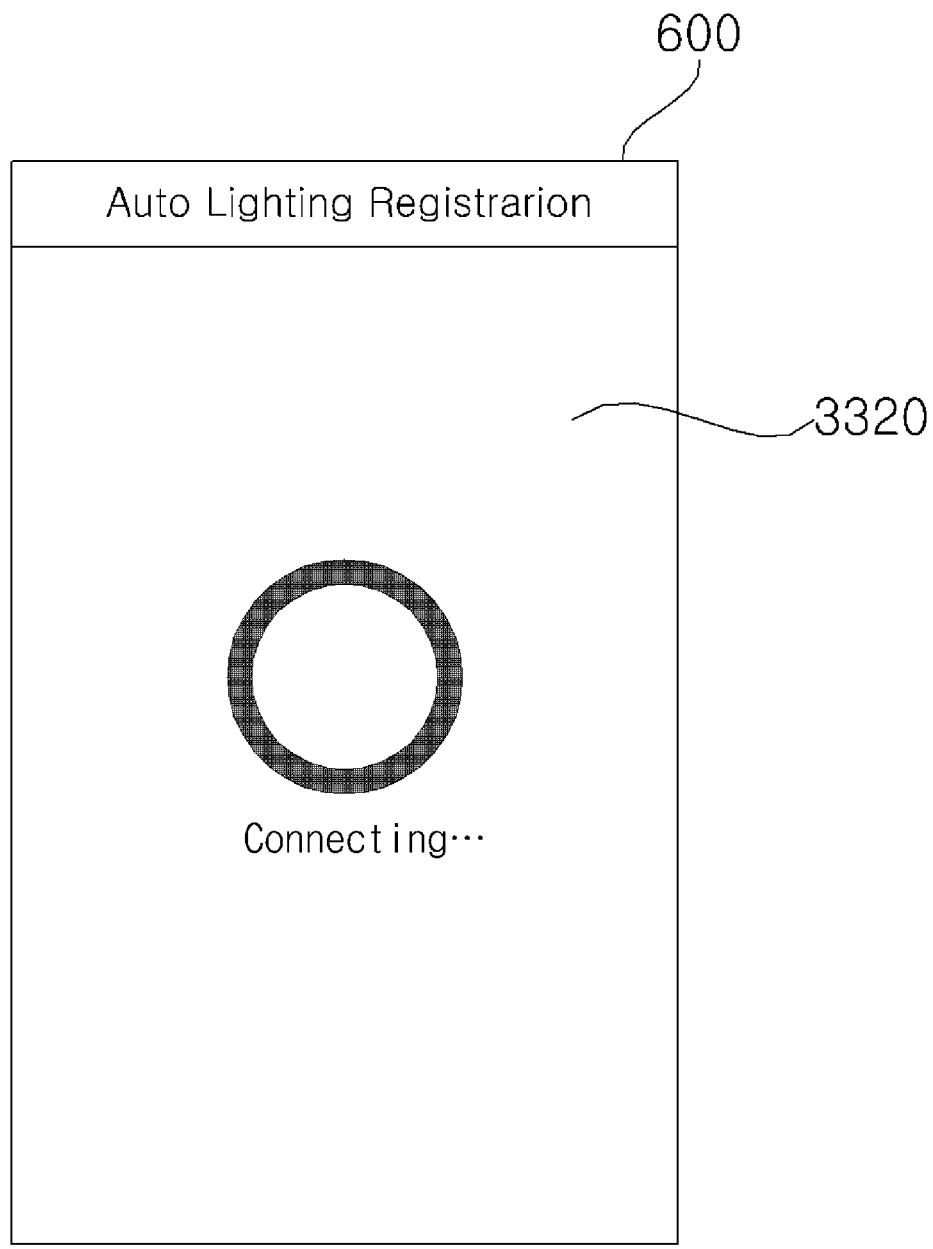

FIG. 37C illustrates a screen 332 indicating that connection between the audio output device and the lighting device is being established. Pairing of the audio output device 100 and the lighting device 700 may be performed based on Bluetooth.

When registration with the added lighting device 700 is completed, the controller 170 of the audio output device 100 may transmit registration completion information to the mobile terminal 600.

Figure 37D:
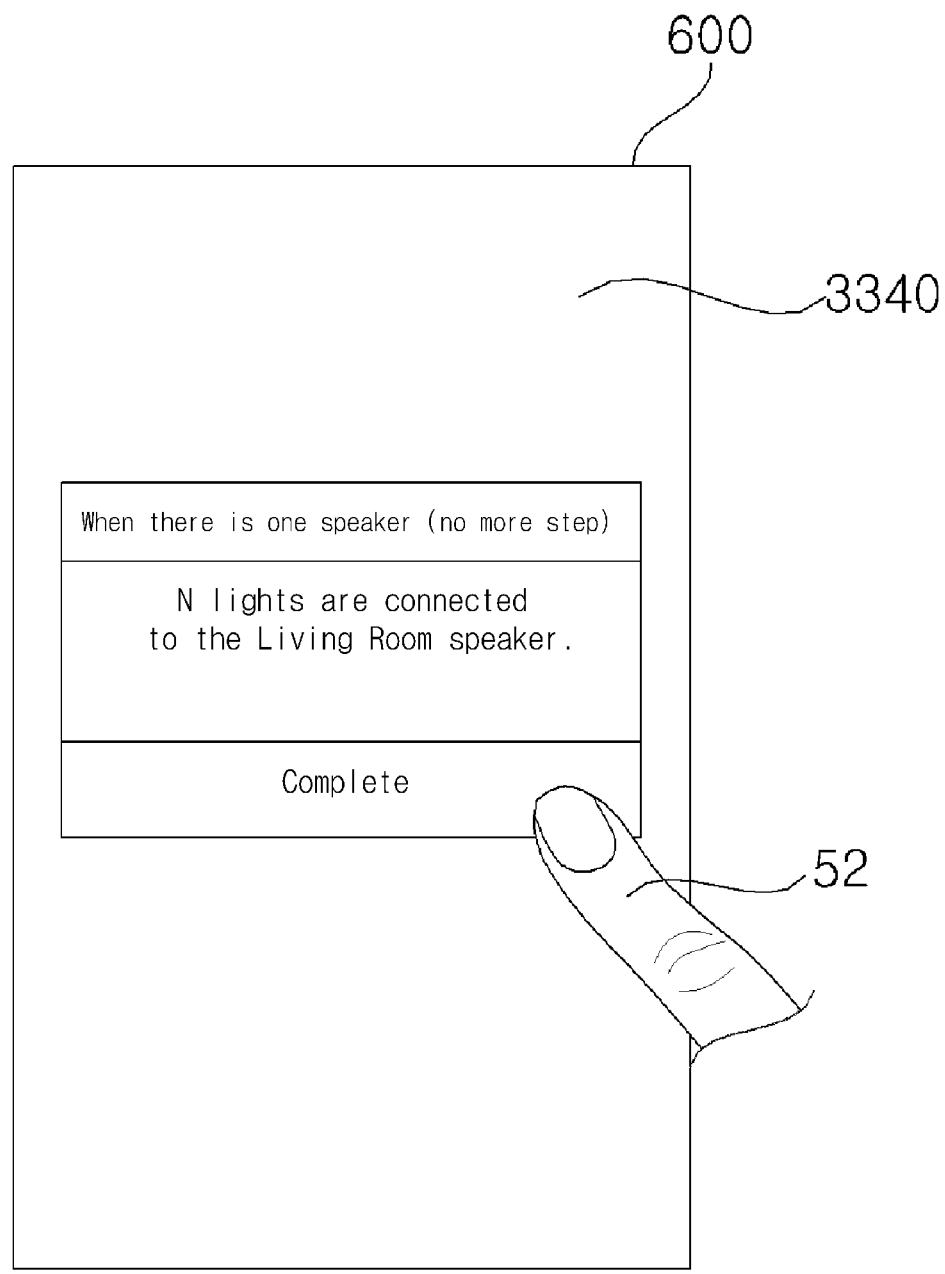
Figure 37E:
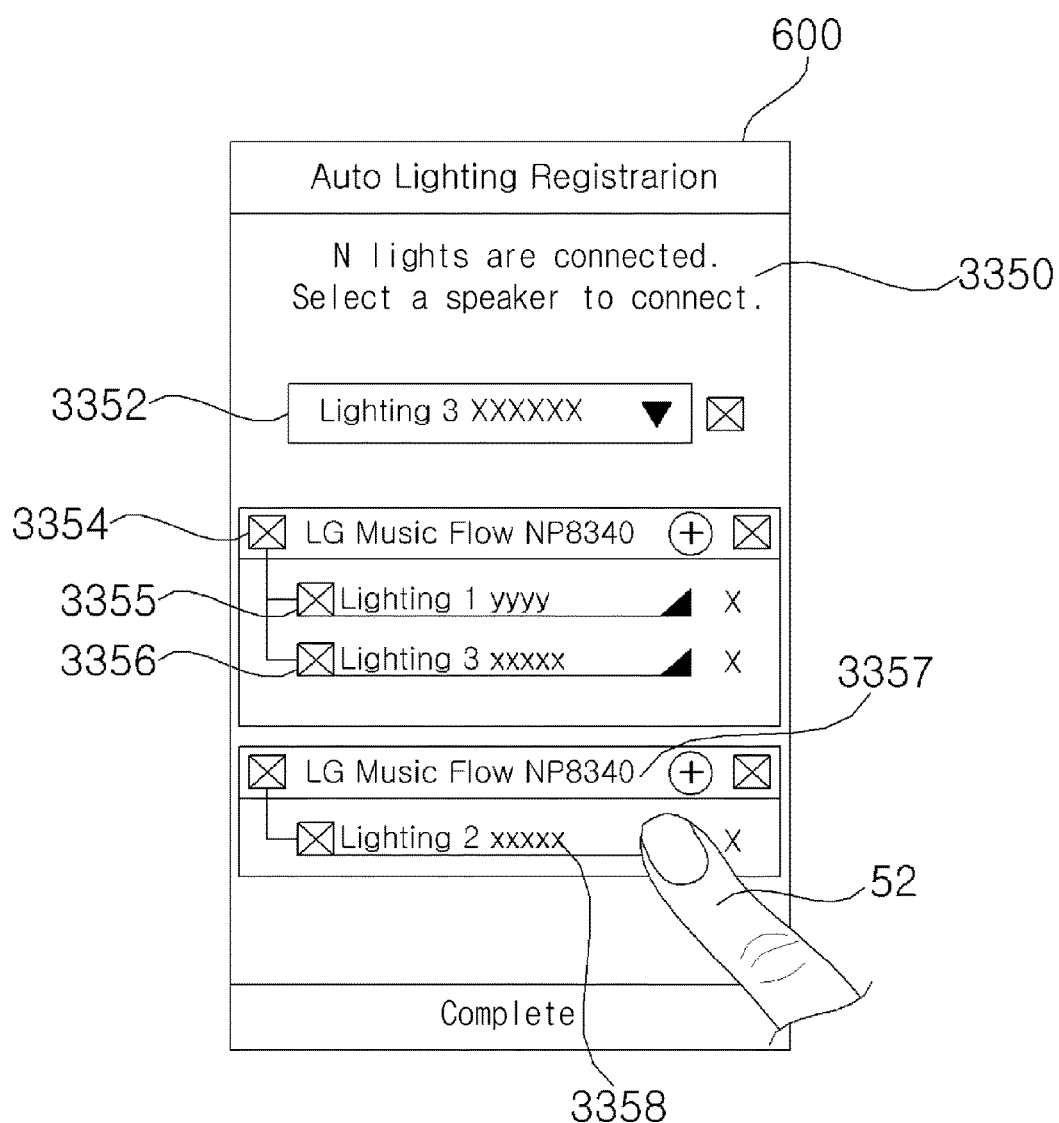

Accordingly, when additional registration of the lighting device is completed, the controller 680 of the mobile terminal 600 may perform a control operation to display a registration completion screen 3340 as shown in FIG. 37D.

After registration is completed, the controller 680 of the mobile terminal 600 may display a screen 3350 for setting the audio device for the added lighting device.

The screen 3350 for setting the audio device may include an added lighting device item 3352, a first audio output device item 3354, lighting device items 3355 and 3356 allocated to the corresponding audio output device item, a second audio output device item 3357, and a lighting device item 3357 allocated to the corresponding audio output device item.

Figure 37F:
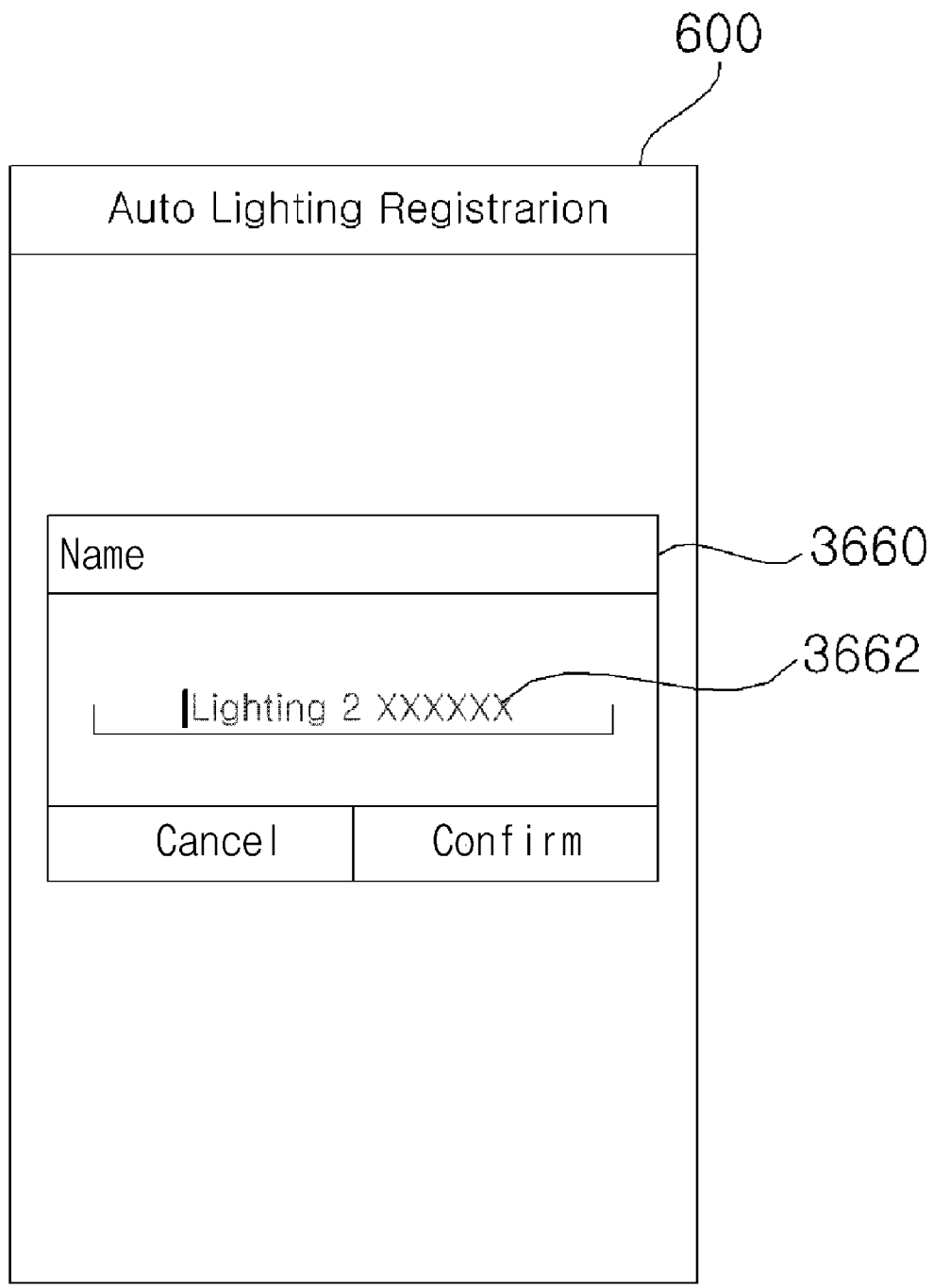

When the lighting device item 3357 corresponding to the second audio output device item 3357 is selected, a related information screen 3660 as shown in FIG. 37F may be displayed. The related information screen 3660 may include a name item 3662 of the lighting device item.

Figure 38A:
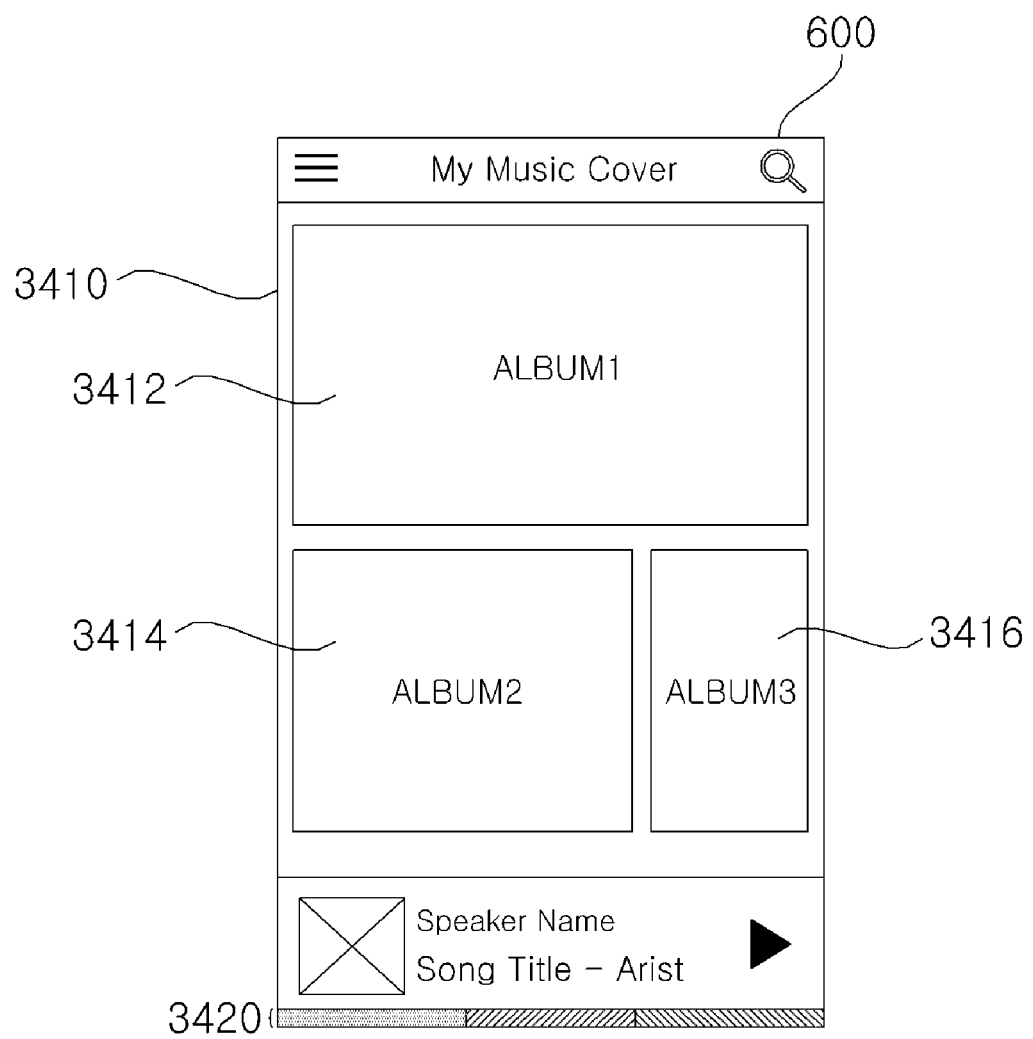
Figure 38B:
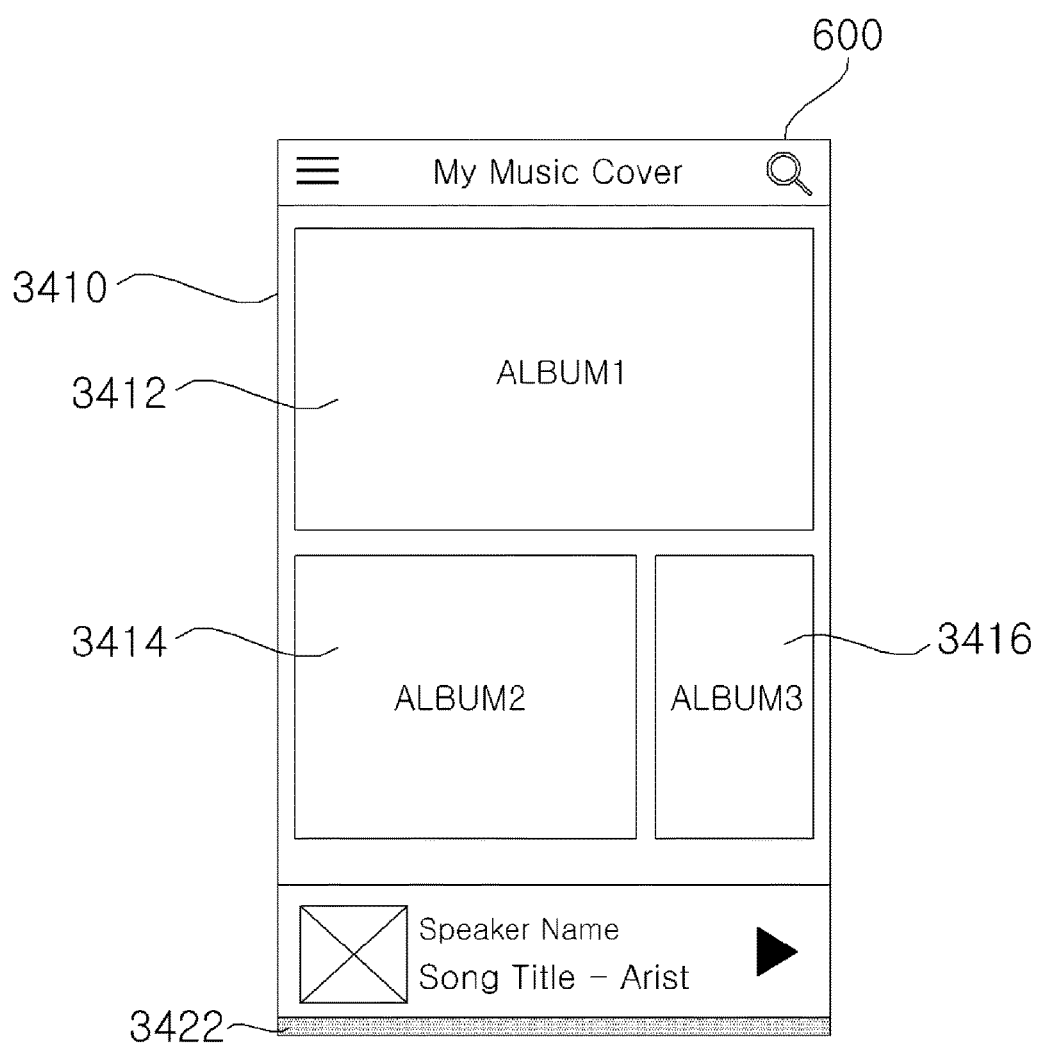
Figure 38C:
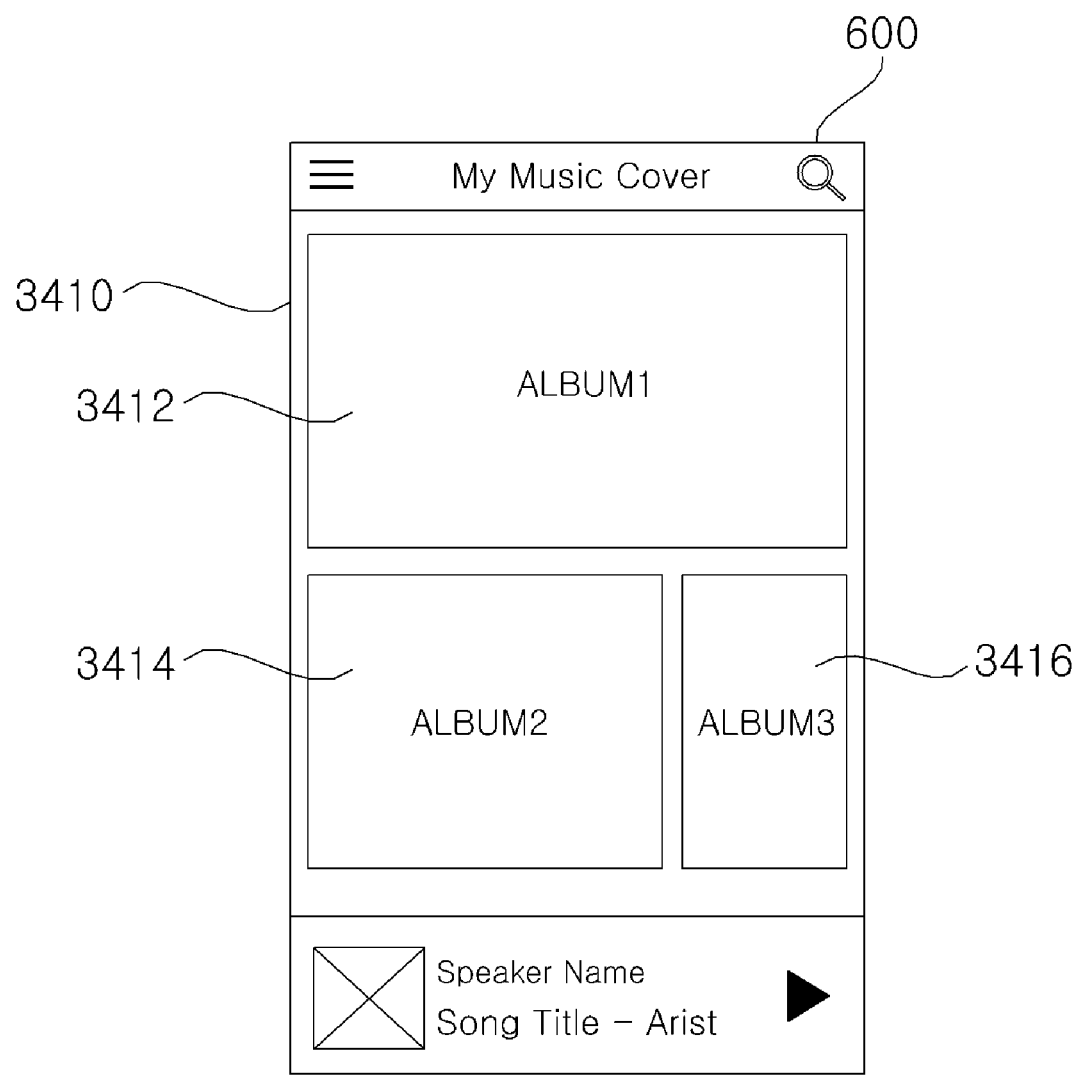

FIG. 38A to 38C illustrate an example of a UI for music playback by an audio output device.

FIG. 38A illustrates a music playback screen 3410 including a plurality of album items 3412, 3414, and 3416.

When initially entering the music play screen 3410, the controller 680 of the mobile terminal 600 may perform a control operation to highlight, for example, the bottom of the screen if there is a related remote controllable lighting device. In the figure, it is illustrated that at least three colors are displayed at the bottom of the screen as a highlight indication.

By the highlight indication, the user may recognize that the color of the lighting device is variable during music playback.

Next, after a predetermined time elapses, the controller 680 of the mobile terminal 600 may display color information 3422 on the current light at the bottom of the screen, reflecting the current color of the lighting device as shown in FIG. 38B.

Since such color information on the light is transmitted from the audio output device 100 to the lighting device 700, the mobile terminal 600 may receive the color information from the lighting device 700.

If the lighting device is not currently emitting light or there is no connected lighting device, the controller 680 of the mobile terminal 600 may perform a control operation not to display any lighting-related information at the bottom of the screen as shown in FIG. 38C.

Figure 39A:
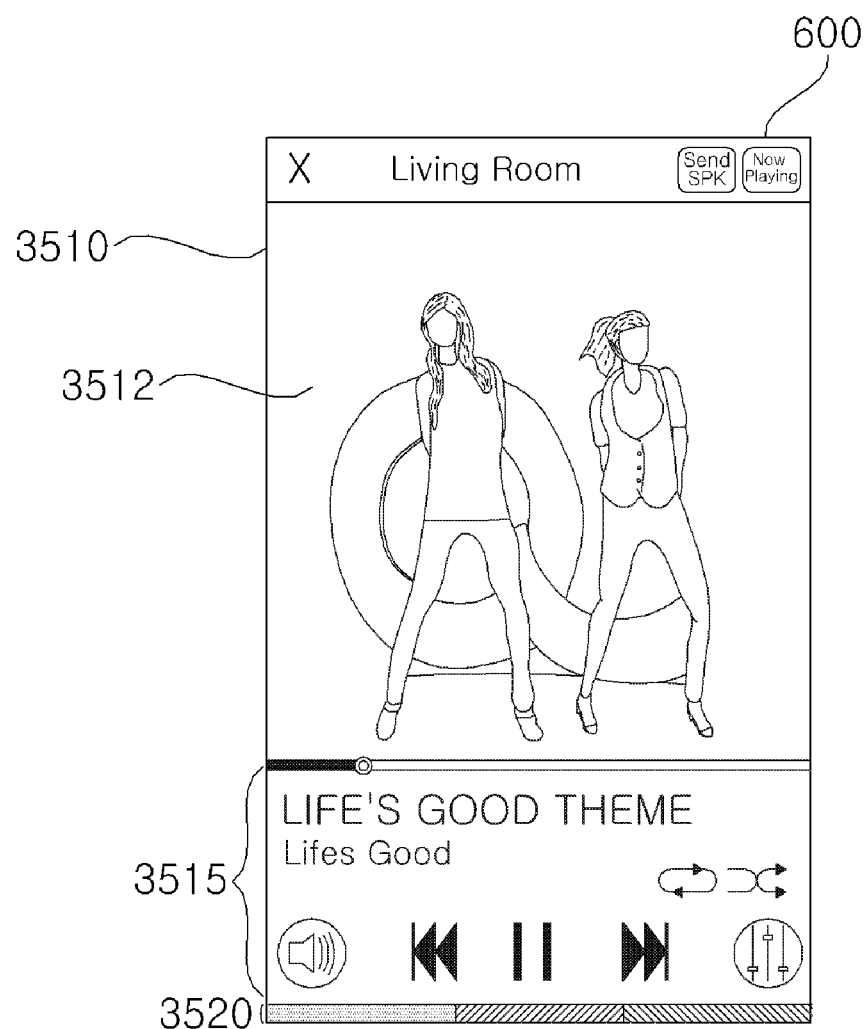
Figure 39B:
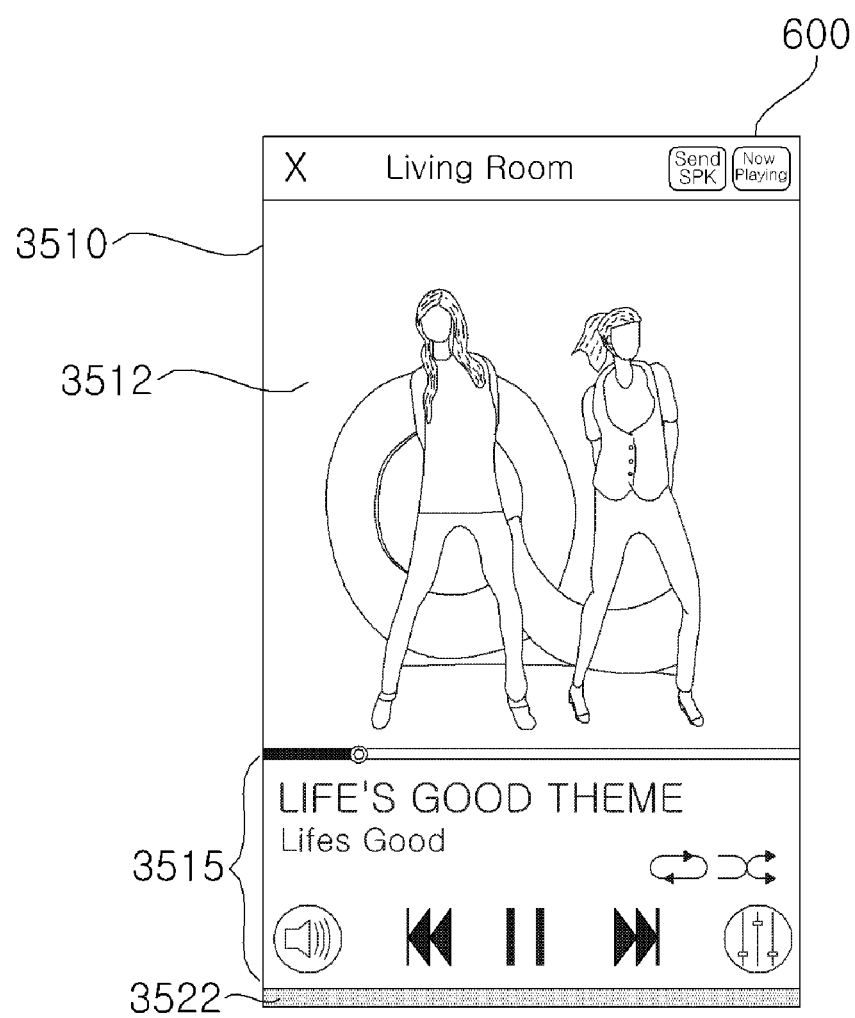
Figure 39C:
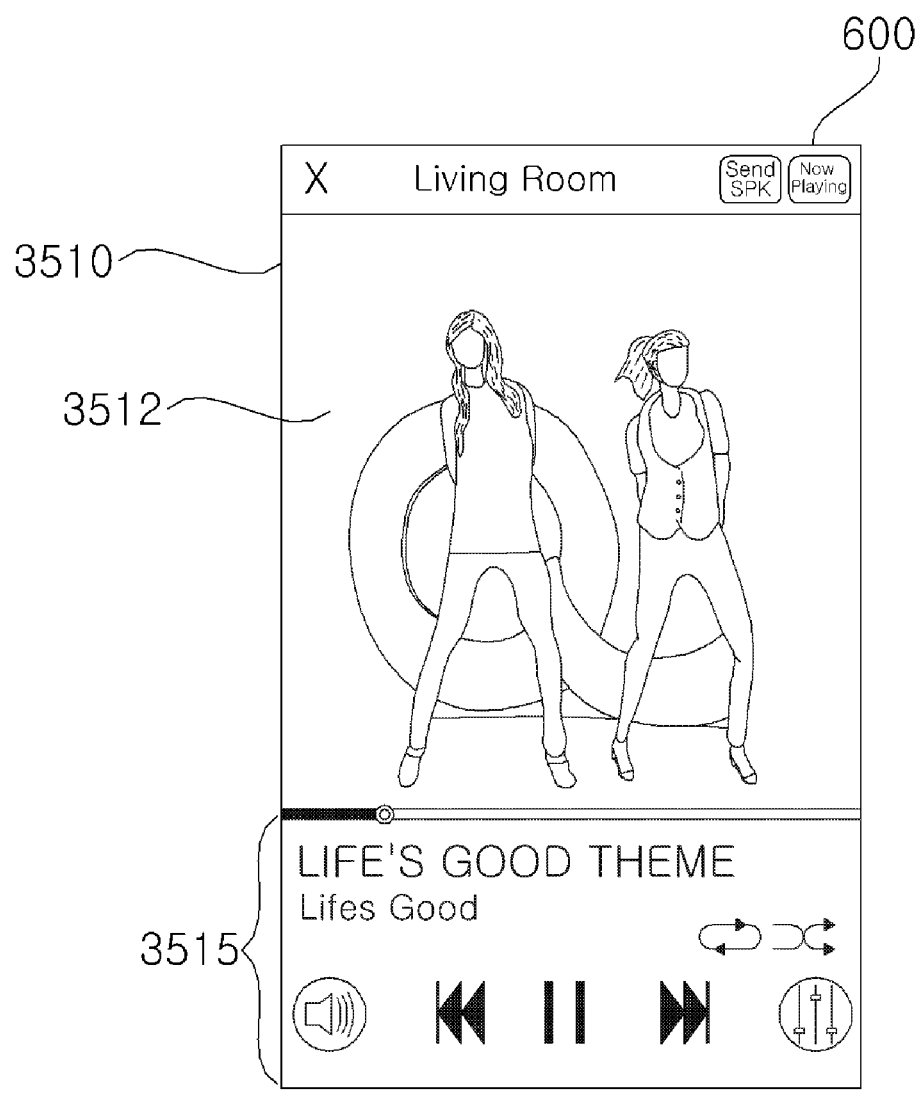

FIGS. 39A to 39C illustrate another example of a UI for music playback by an audio output device.

FIGS. 39A to 39C are similar to FIGS. 38A to 38C, except that a music playback screen 3510 related to the music file is displayed instead of the music playback screen 3410 related to the album.

The music playback screen 3510 may include a music image 3512 and a play menu 3515.

According to this, when music playback is performed in the mobile terminal 600, the audio data being reproduced may be transmitted to a related audio output device 100, and the audio output device 100 may output sound corresponding to the audio data. Then, the audio output device may perform lighting control corresponding to the output sound.

The user may recognize the current color information or the like on the lighting device 700 based on the color information 3520 shown in FIG. 39A or the color information 3522 as shown in FIG. 39B.

Next, FIGS. 40A to 45C illustrate various UIs for a lighting device.

Figure 40A:
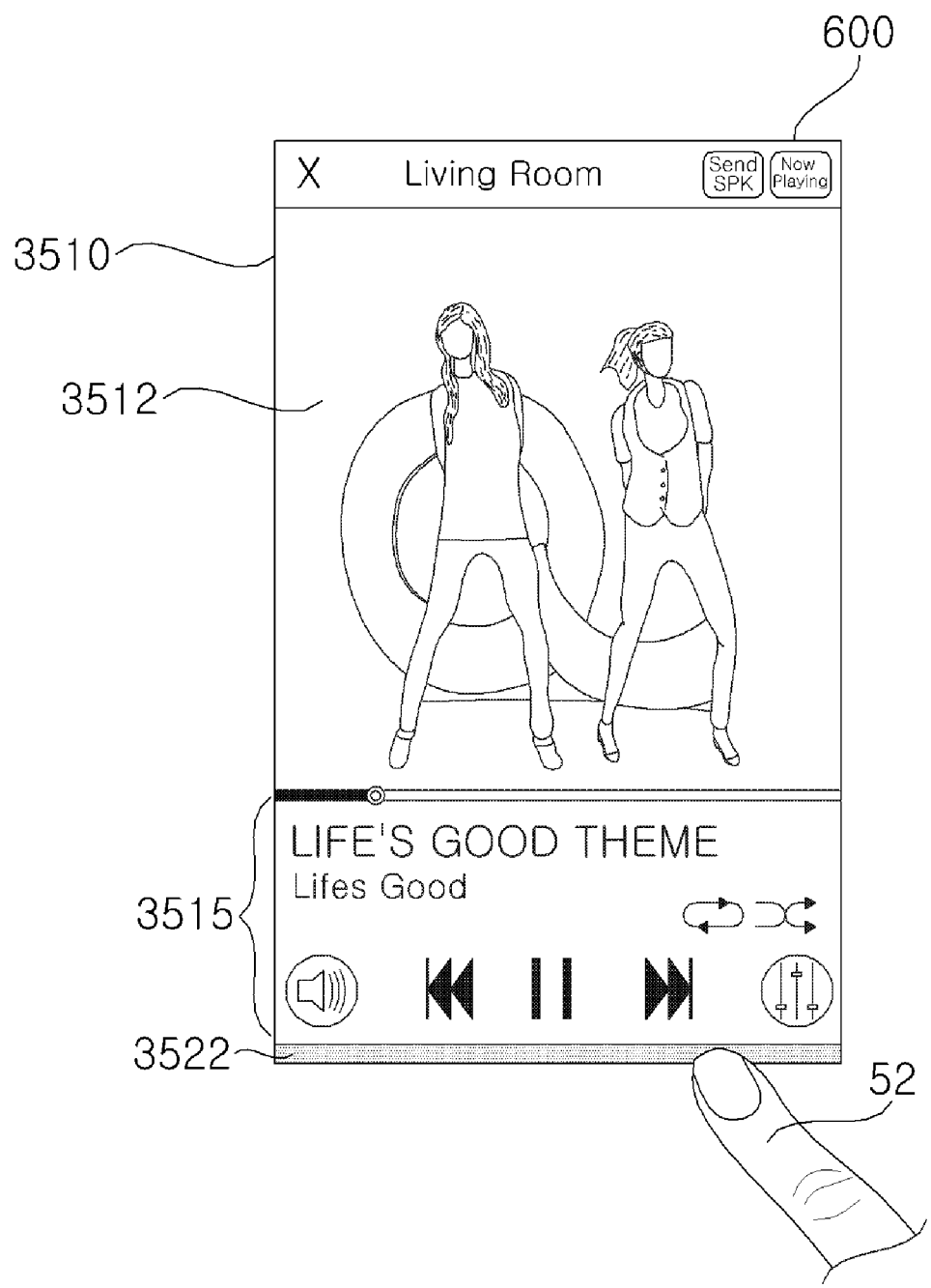

FIG. 40A illustrates a music playback screen 3510 including color information 3522.

Figure 40B:
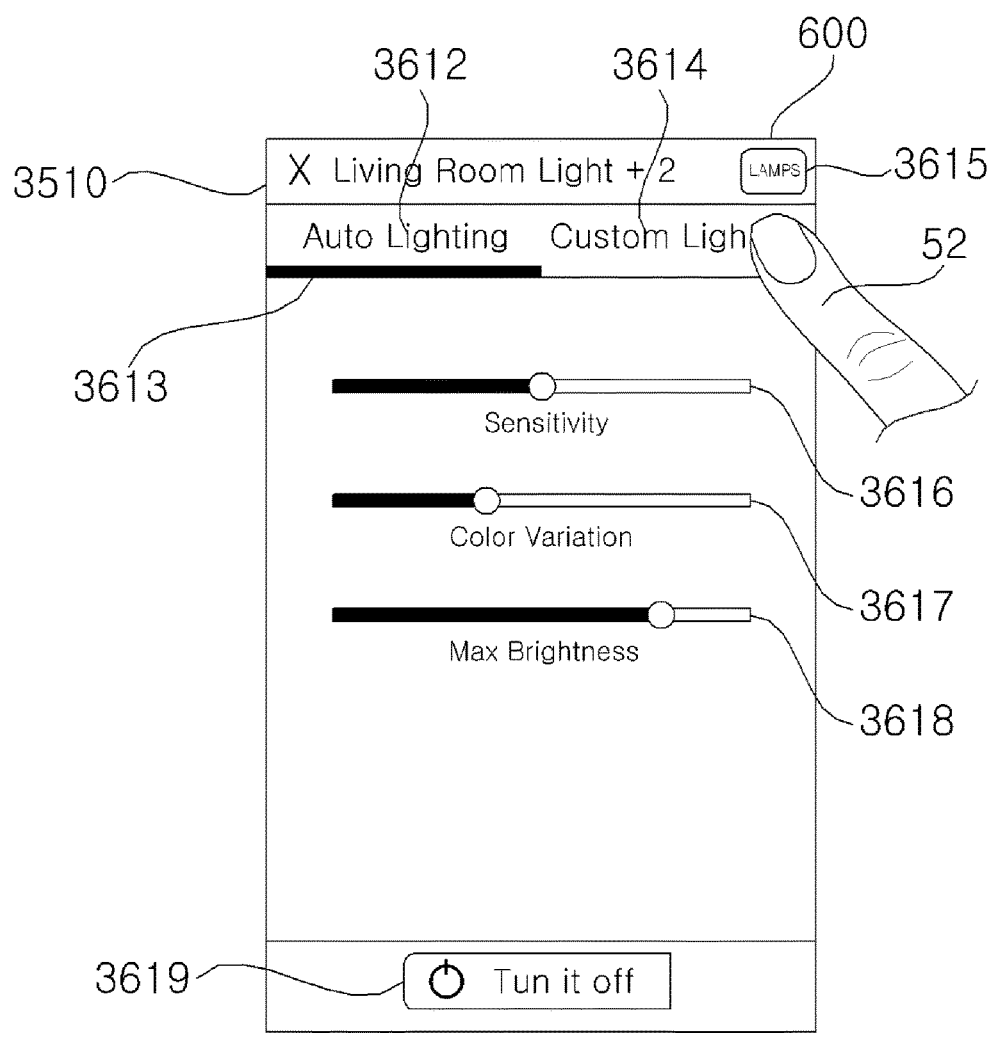
Figure 40C:
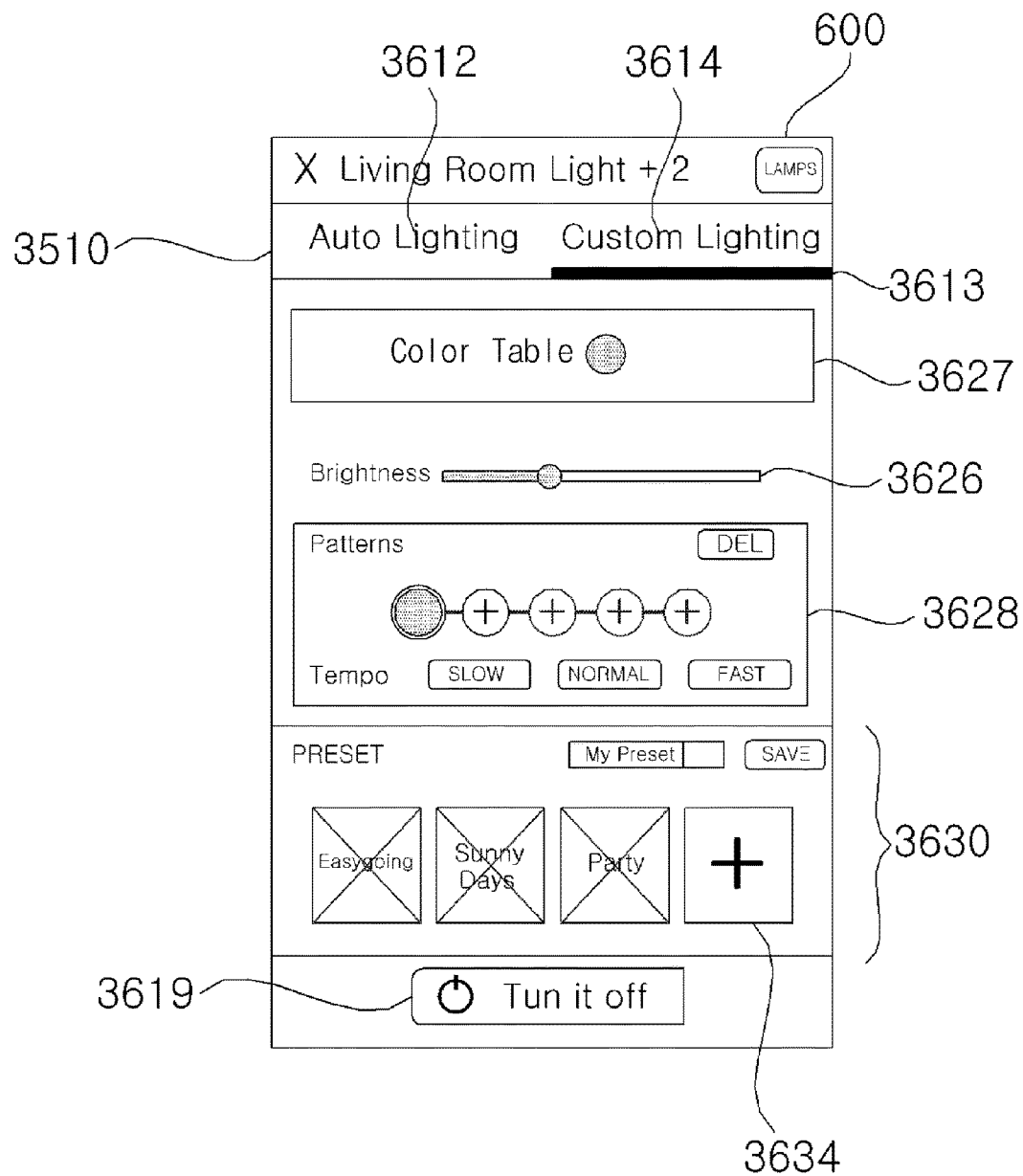

When the color information 3522 is selected on the music playback screen 3510, the controller 680 of the mobile terminal 600 may control a setting screen 3510 for the lighting device to be displayed as shown in FIG. 40B.

The setting screen 3510 for the lighting device may include a lamp item 3615, an automatic lighting item 3613, a recommended lighting item 3614, and an OFF item 3619. In the figure, the status bar 3613 is positioned on the automatic lighting item 3613.

The automatic lighting item 3613 may include a sensitivity adjustment item 3616, a color variation width item 3617, and a maximum brightness item 3618.

When a recommended lighting item 3614 is selected on the setting screen 3510, the controller 680 of the mobile terminal 600 may perform a control operation to display a screen 3510 including a color table 3627, a brightness item 3626, a Tempo item 3628, a preset menu 3630, and an OFF item 3619.

In the figure, the status bar 3613 is positioned on the recommended lighting item 3614.

Figure 41A:
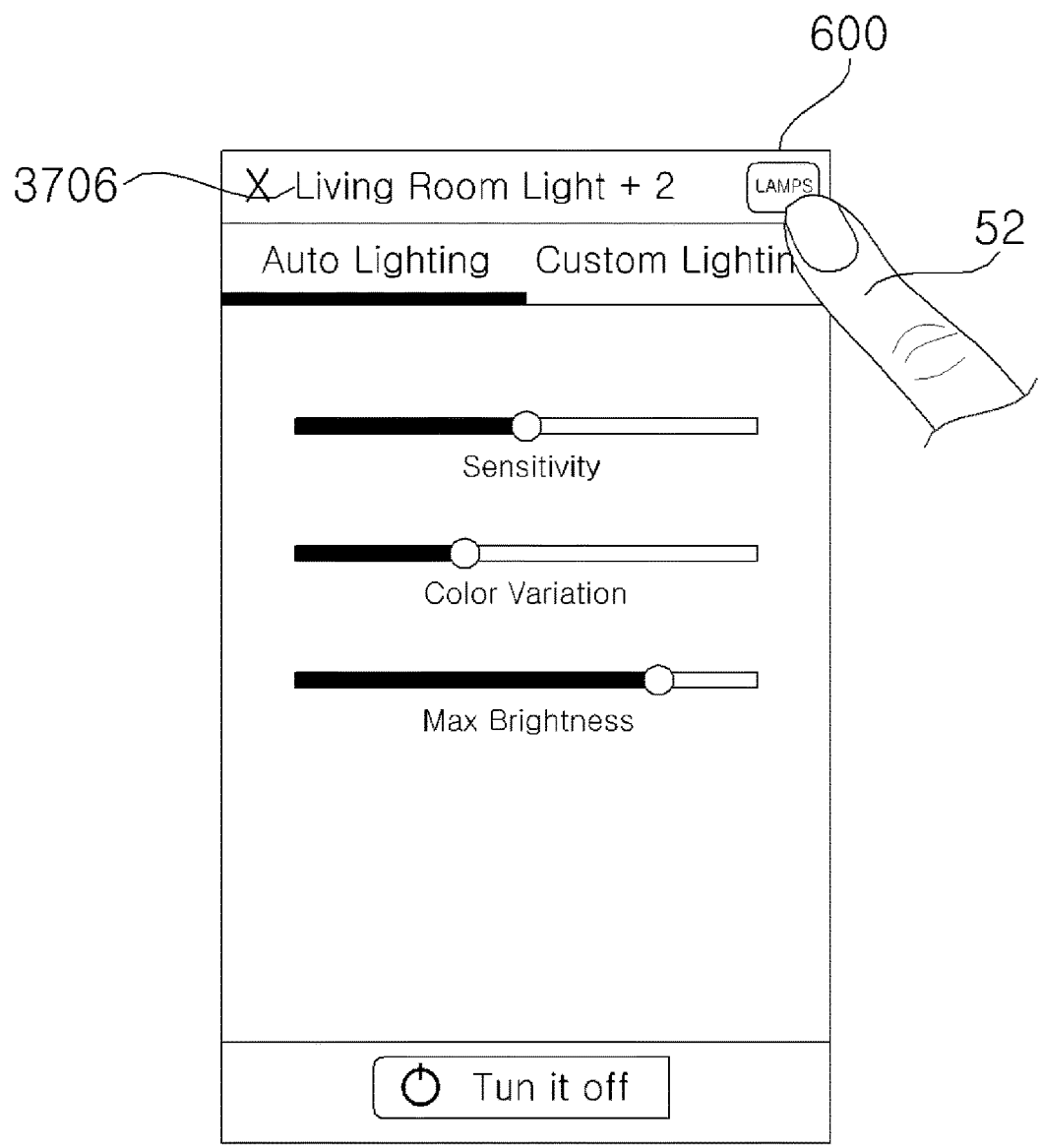
Figure 41B:
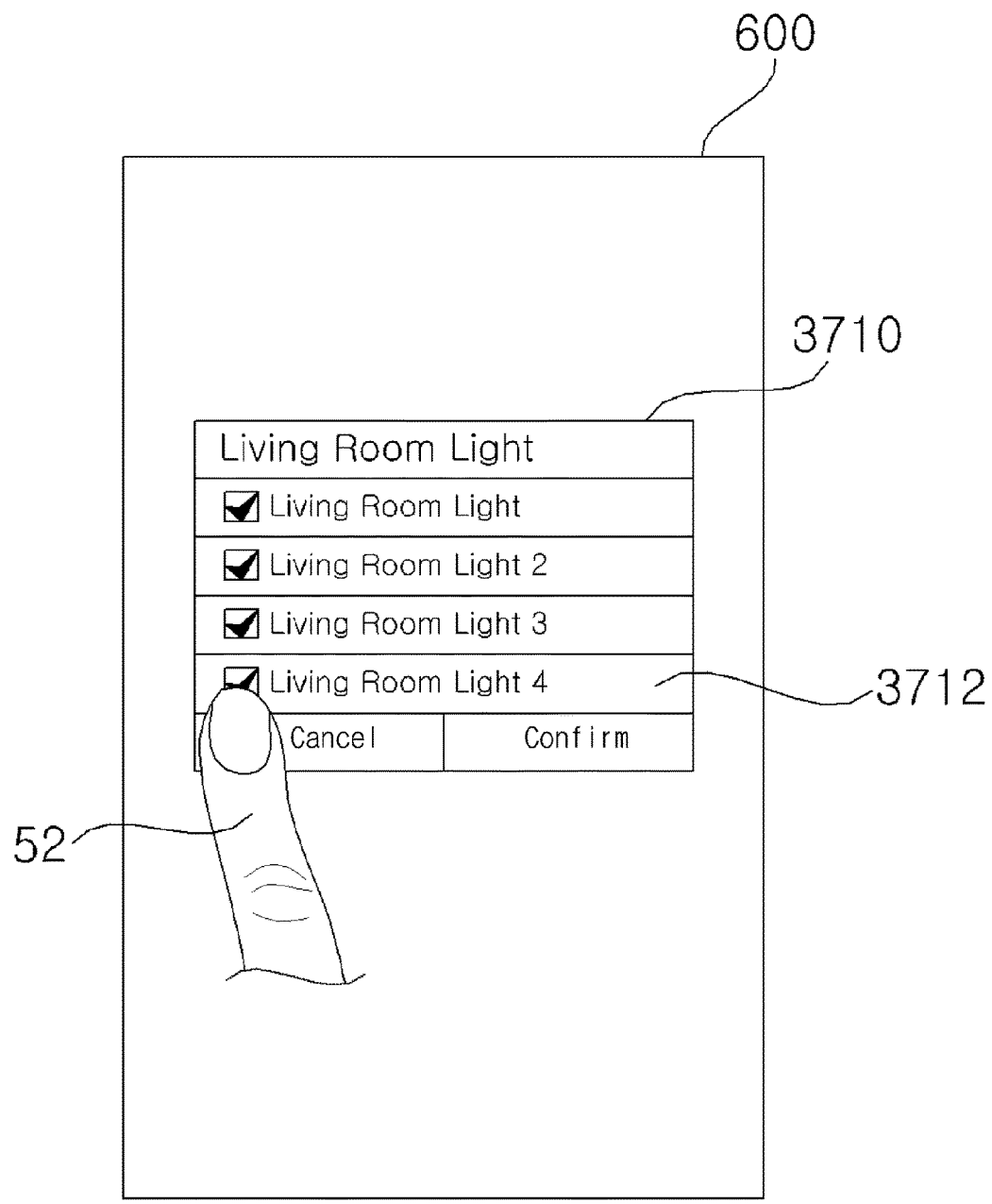

FIG. 41A illustrates a setting screen 3706.

When the lamp item 3615 is selected on the setting screen 3706, the controller 680 of the mobile terminal 600 may perform a control operation to display a lighting device list 3710 including a plurality of lighting device items as shown in FIG. 41.

Figure 41C:
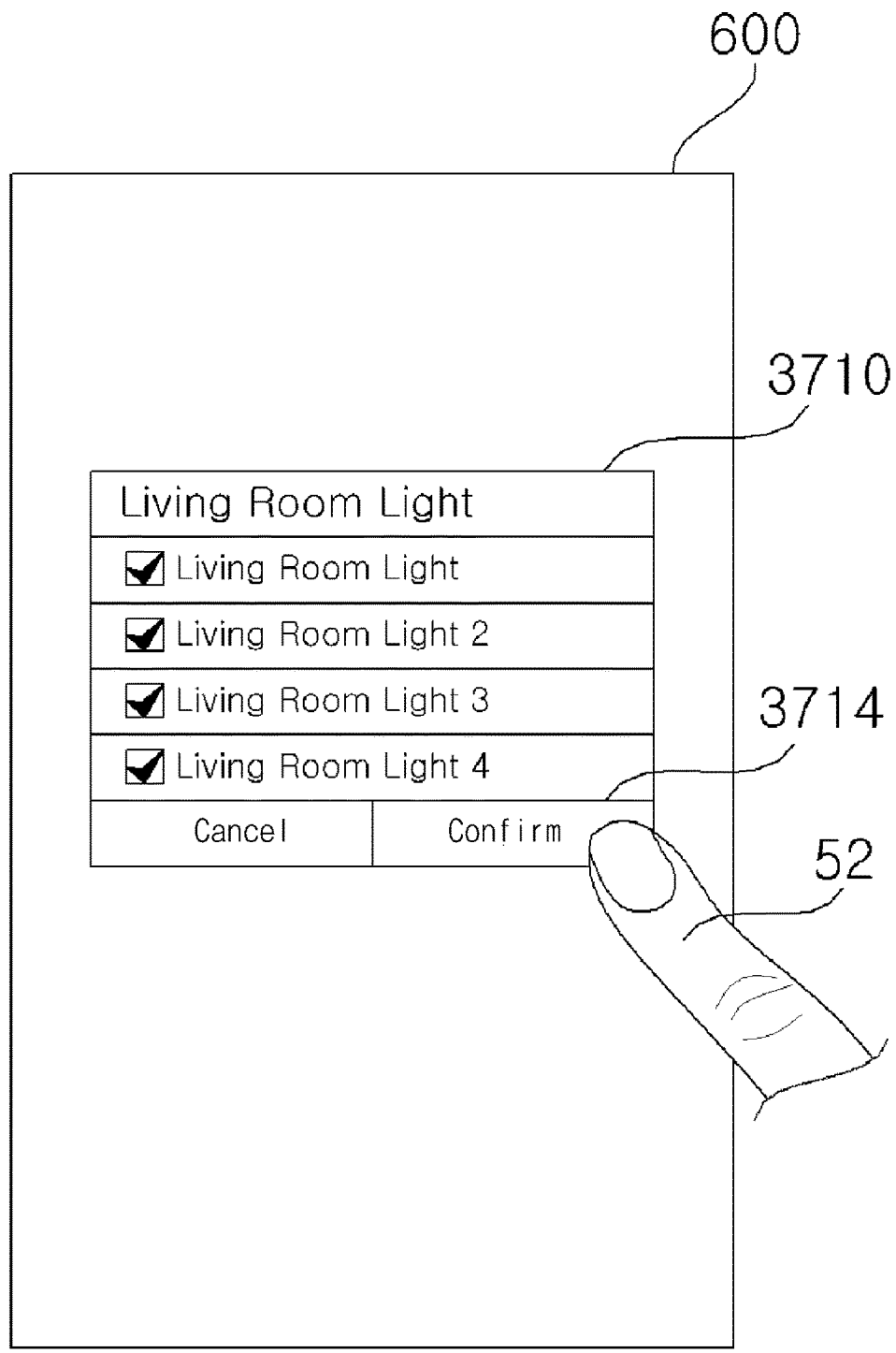
Figure 41D:
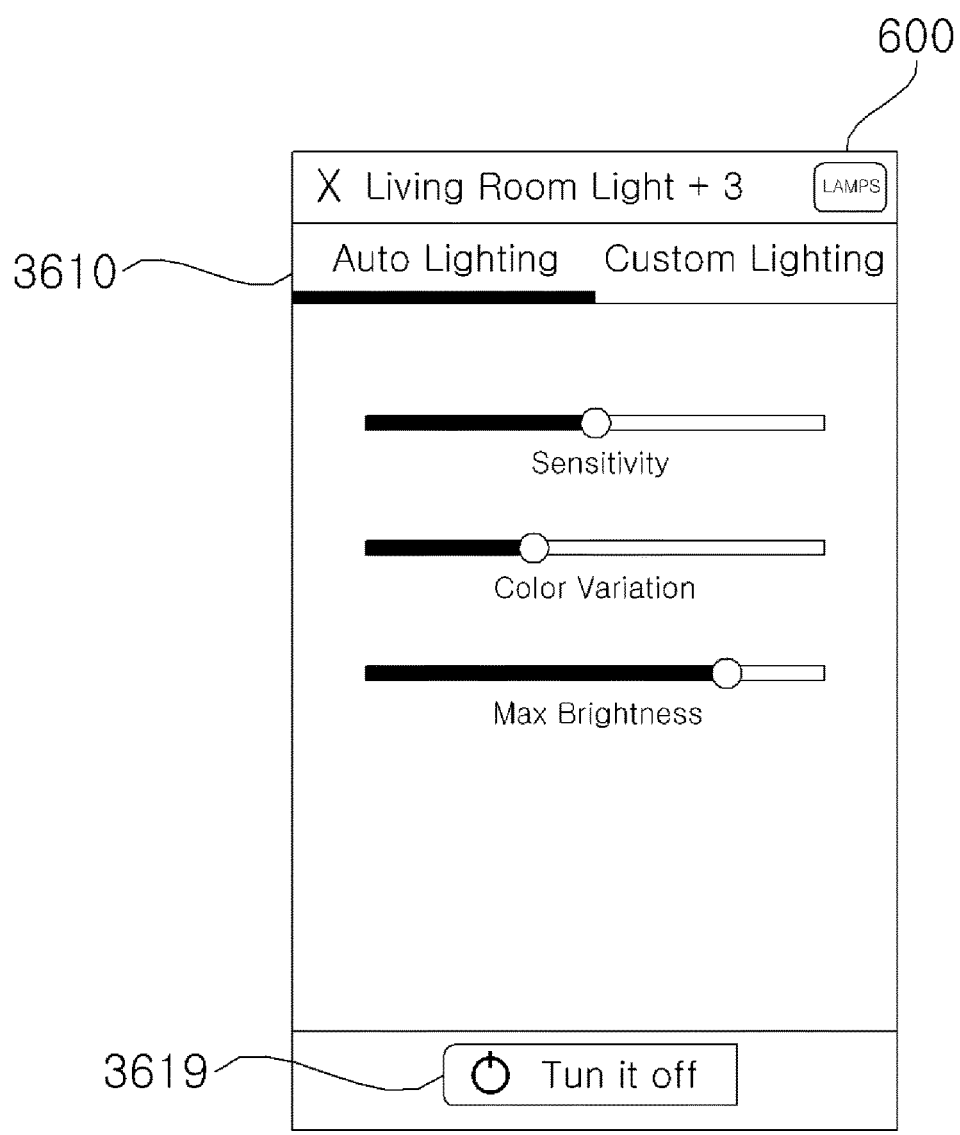

When the fourth lighting device item 3712 is selected in the lighting device list 3710, a lighting device list to which the fourth lighting device item is added may be displayed as shown in FIG. 41C.

After addition of the lighting device is completed, the controller 680 of the mobile terminal 600 may display a setting screen 3610 for the added lighting device, as shown in FIG. 41. The setting screen 3610 may include a lamp item, an automatic lighting item, a recommended lighting item, and an OFF item, as described above.

FIGS. 42A to 42D illustrate a UI for adding a color of light to be emitted from a lighting device.

Figure 42A:
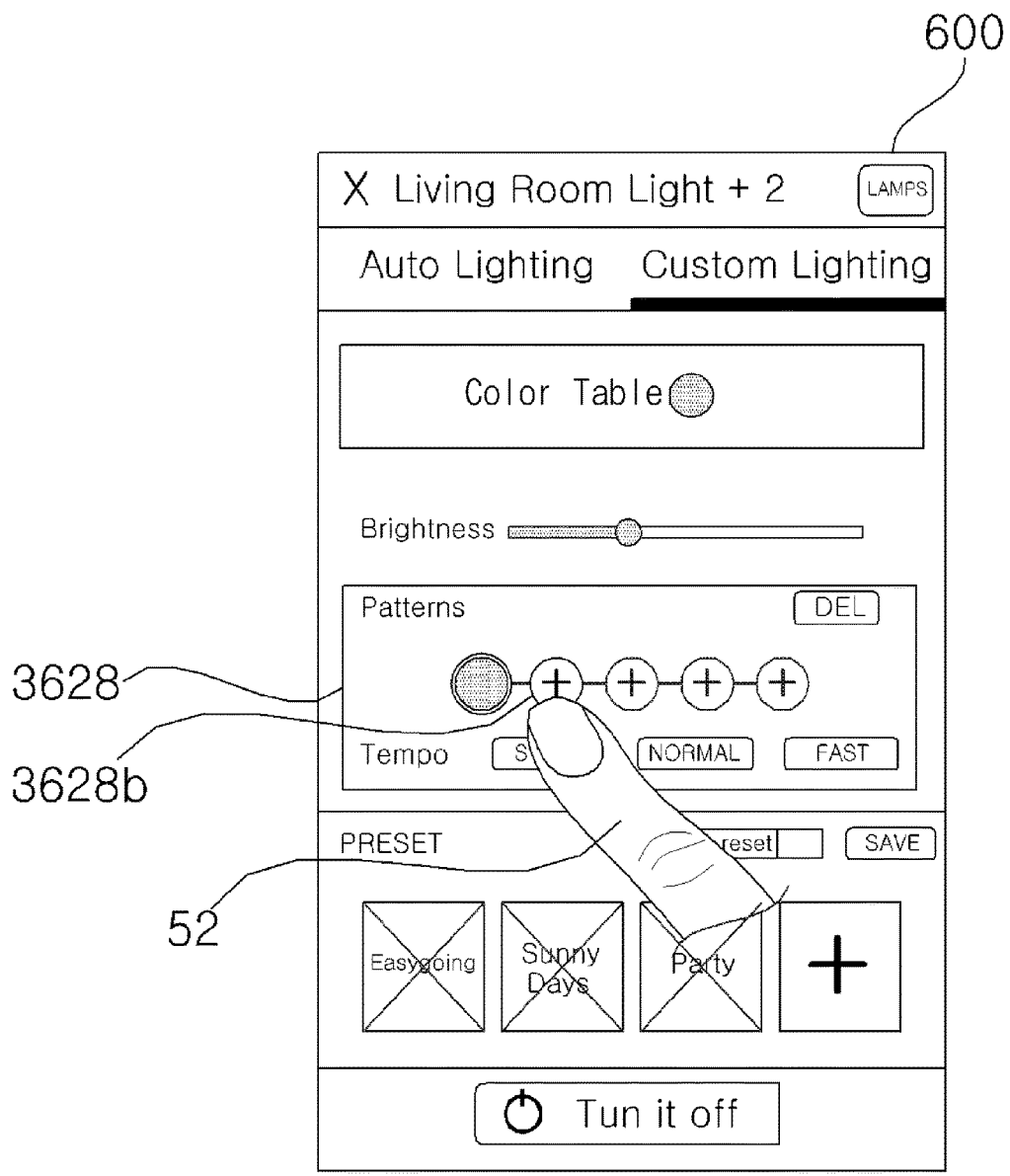
Figure 42B:
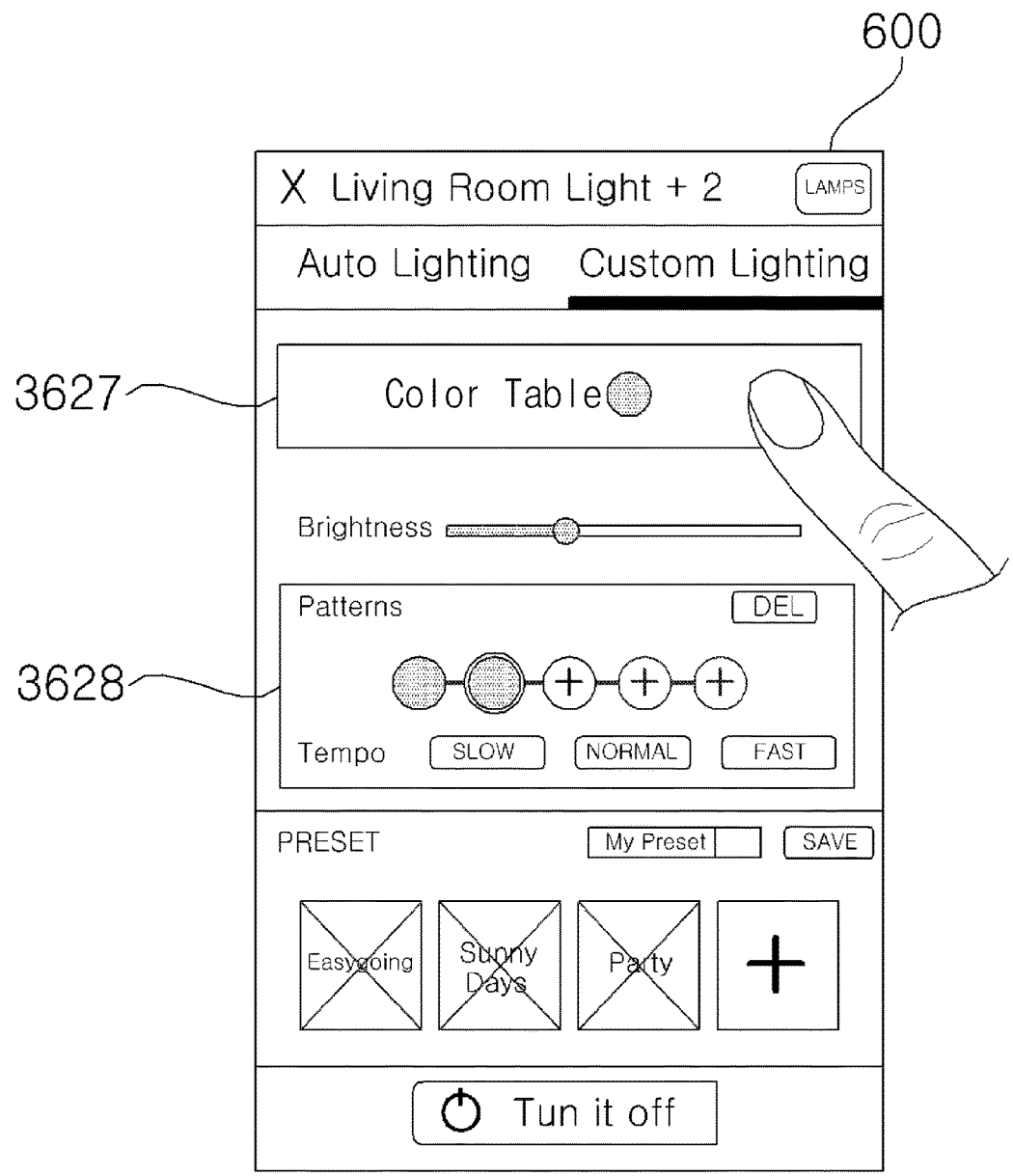
Figure 42C:
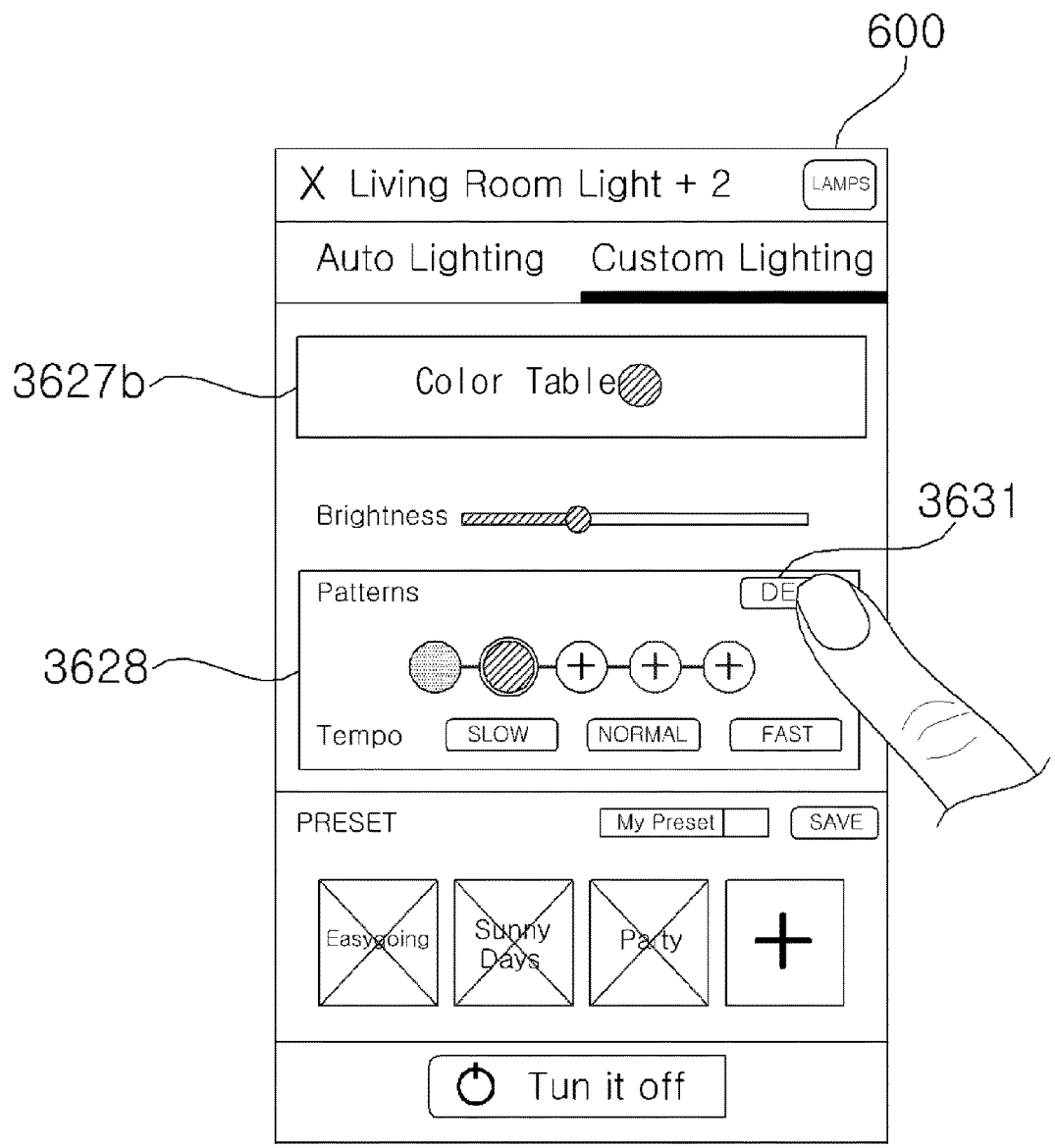

When an Add item 3628 in the Tempo item 3628 is selected on the setting screen 3510 for the lighting device of FIG. 42A, a second color in the color table 3627 is added as shown in FIG. 42B, the controller 680 of the mobile terminal 600 may control the second color to be added to and displayed on the Tempo item 3628 along with the first color as shown in FIG. 42C.

The information according to addition of the first color and the second color is transmitted to the audio output device 100, and the audio output device 100 transmits a lighting control signal to the lighting device 700 such that the first color and the second color of light are alternately emitted. Then, the lighting device 700 emits light at the tempo of the first color and the second color.

Figure 42D:
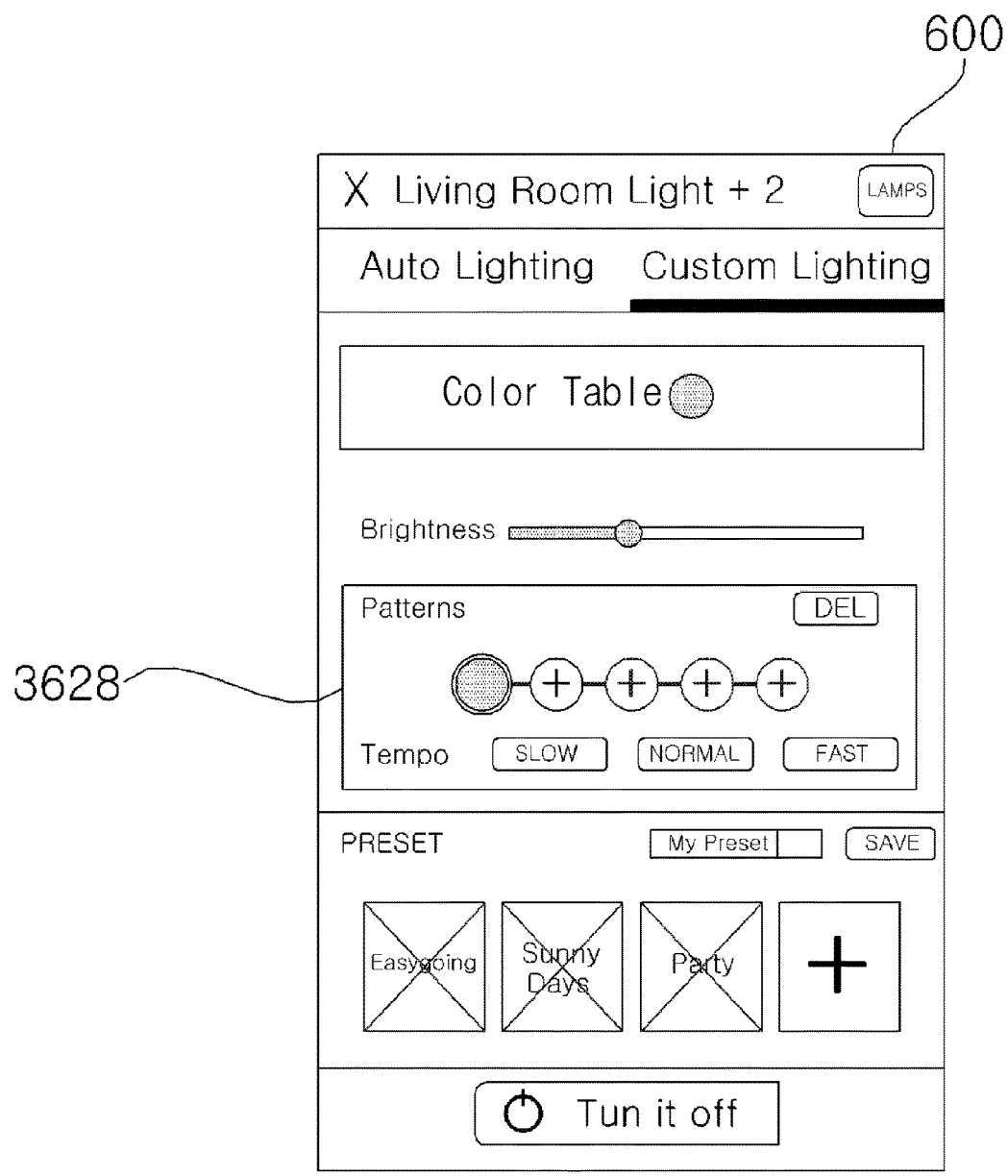

When the Delete item 3631 is selected as shown in FIG. 42C, the controller 680 of the mobile terminal 600 may delay the added second color item, and set only the first color to be displayed as shown in FIG. 42D.

Figure 43:
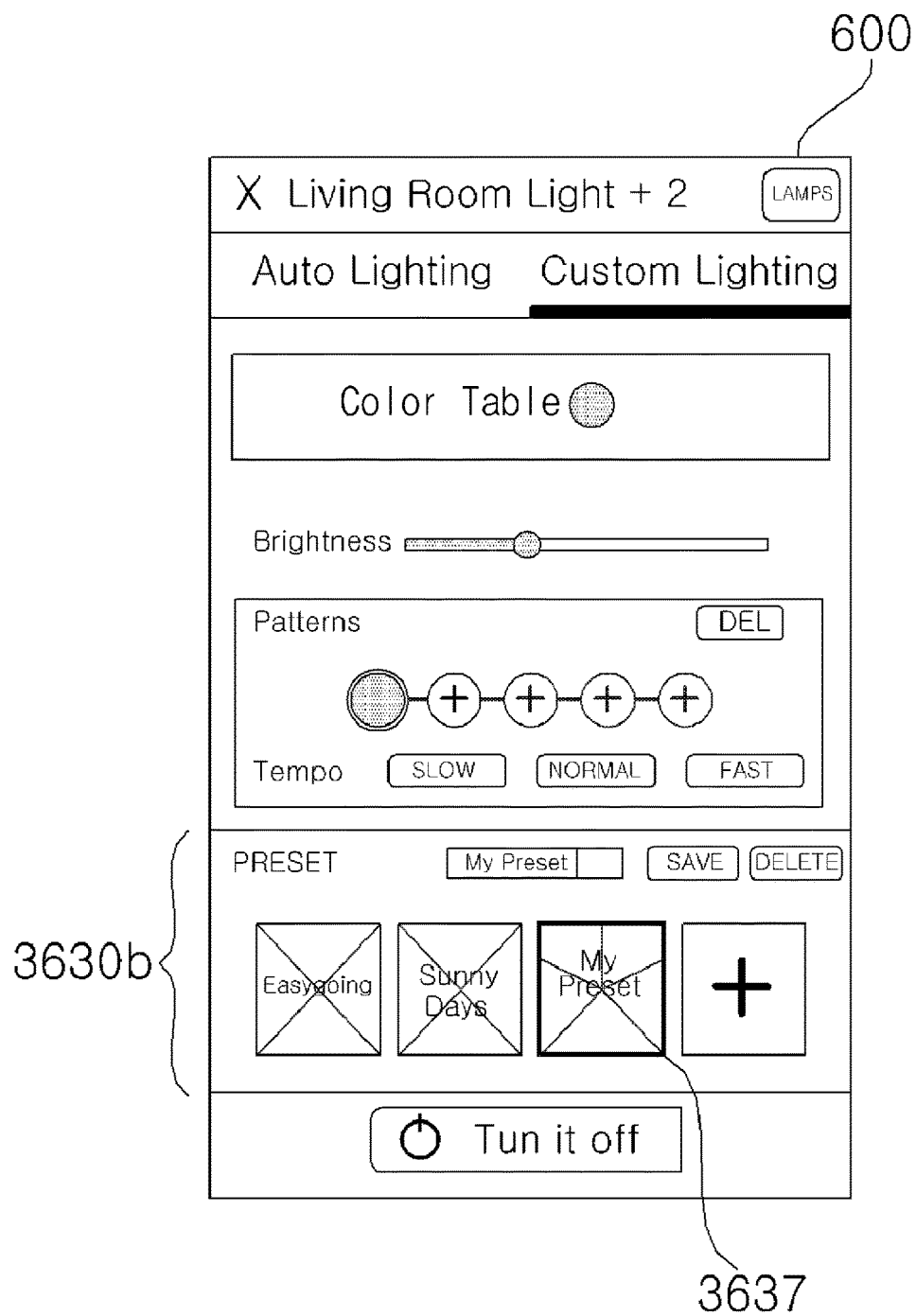

FIG. 43 illustrates that the setting screen 3510 for the lighting device includes a preset menu 3630.

In the figure, the preset menu 3630, to which an item can be added by user setting, includes a "My Preset" item 3637, in which five color patterns are set.

In setting an alarm and a timer, the controller 680 of the mobile terminal 600 may perform a control operation to perform setting related to the lighting device. Details will be described with reference to FIGS. 44A to 45C.

FIGS. 44A to 44D illustrate a lighting control related UI associated with an alarm application.

Figure 44A:
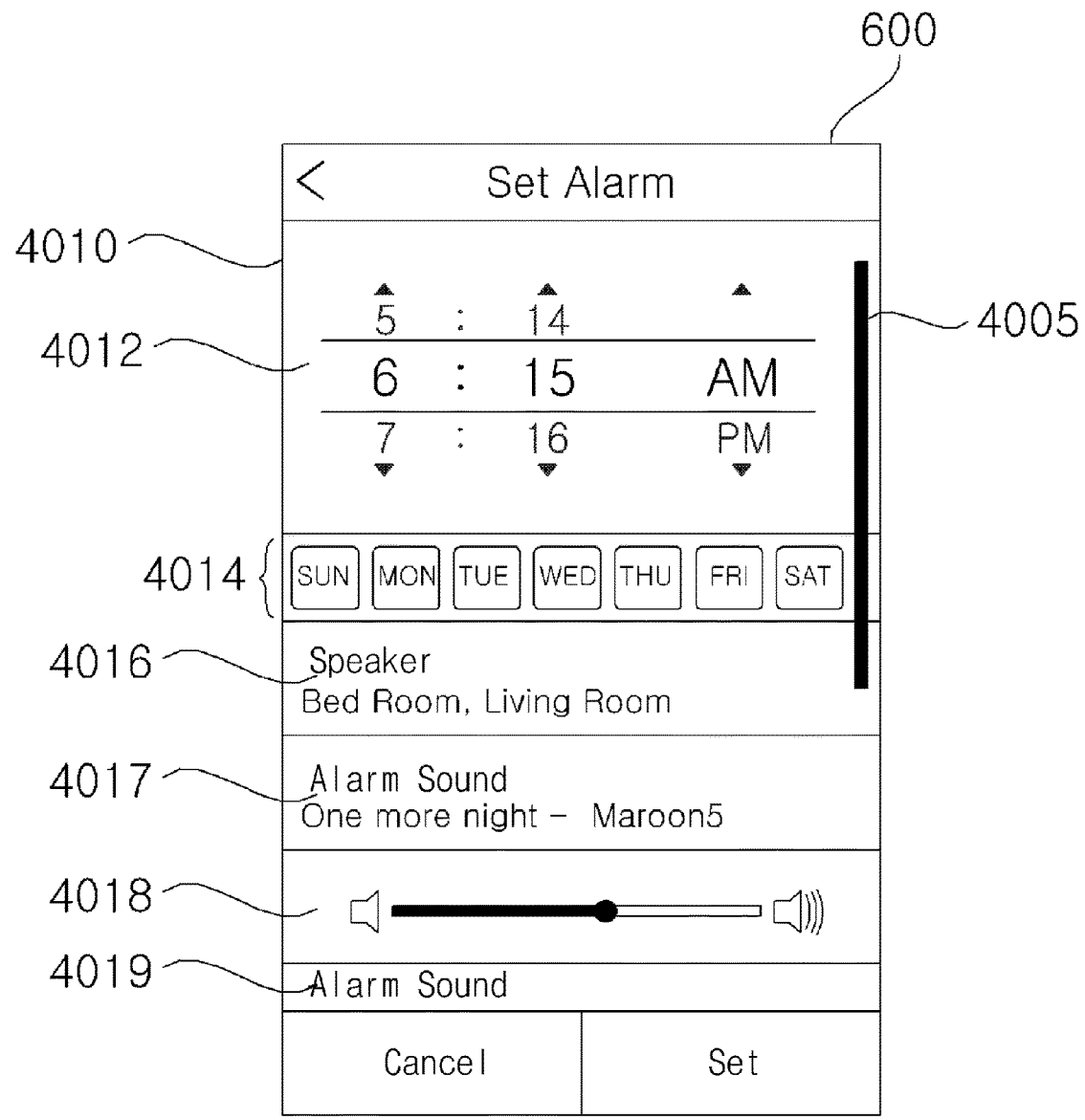

First, FIG. 44A illustrates an alarm setting screen 4010.

The alarm setting screen 4010 may include a time setting item 4012, a day setting item 4014, a sound output method item 4016, a sound type setting item 4017, a volume setting item 4018, and a lighting setting item 4019. A scroll bar 4005 may also be displayed on the screen.

Figure 44B:
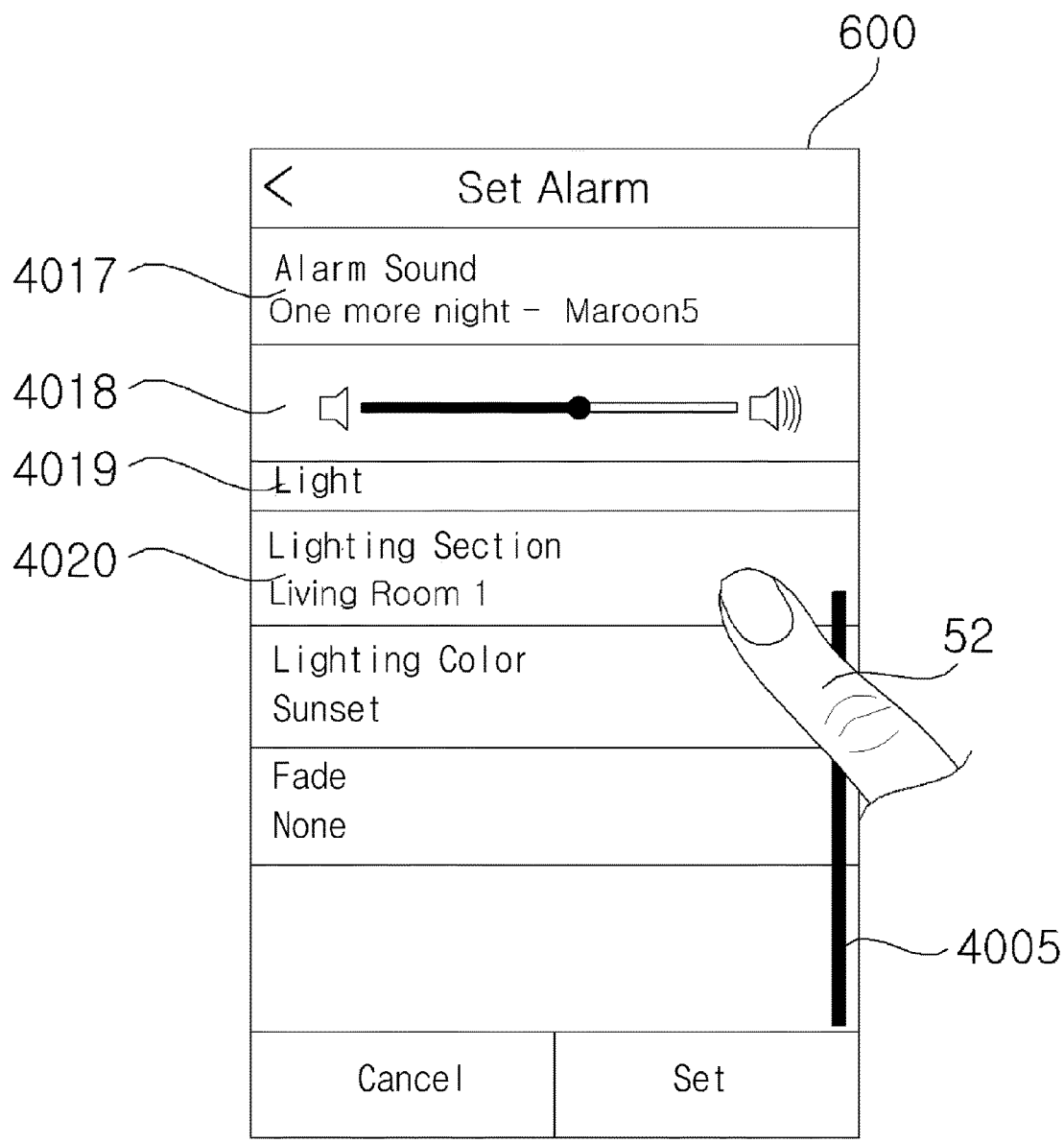

FIG. 44B illustrates that the alarm setting screen 4010 is scrolled downward.

The alarm setting screen 4010 may include a lighting setting item 4019, a lighting selection item 4020, and a lighting color item.

Figure 44C:
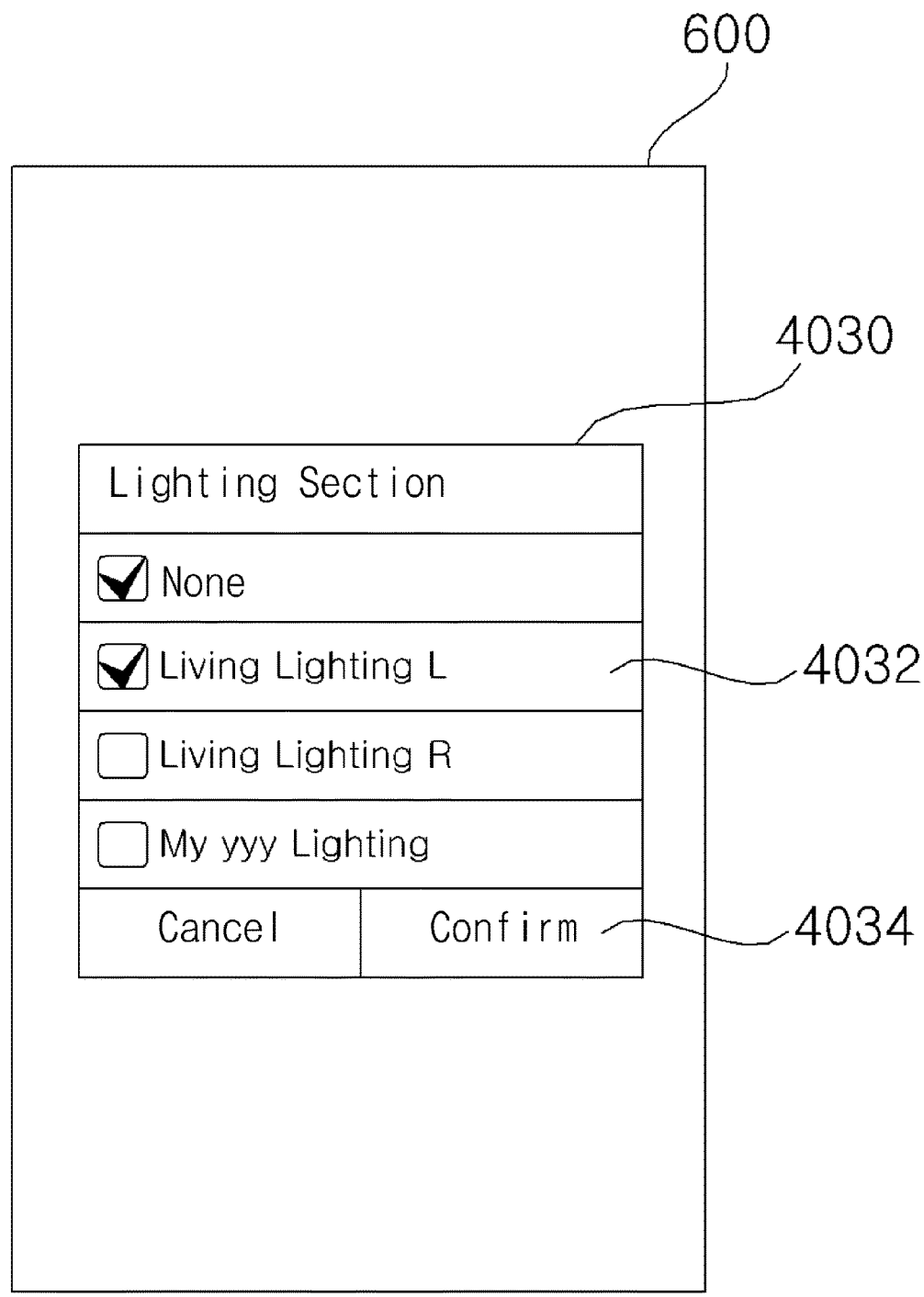

When the lighting selection item 4020 is selected, the controller 680 of the mobile terminal 600 may control a lighting selection menu 4030 to be displayed as shown in FIG. 44C.

The lighting selection menu 4030 may include a plurality of lighting device items. In the figure, it is illustrated that a first lighting device item 4032 is selected. Thereby, the user may set the lighting device associated with the alarm.

When a lighting selection item 4020 is selected on the alarm setting screen 4010, the controller 680 of the mobile terminal 600 may control a lighting color menu 4040 to be displayed as shown in FIG. 44D. Thus, the user may set the light emission color of the lighting device associated with the alarm FIGS. 45A to 45C illustrate a lighting control related UI associated with a timer application.

Figure 45A:
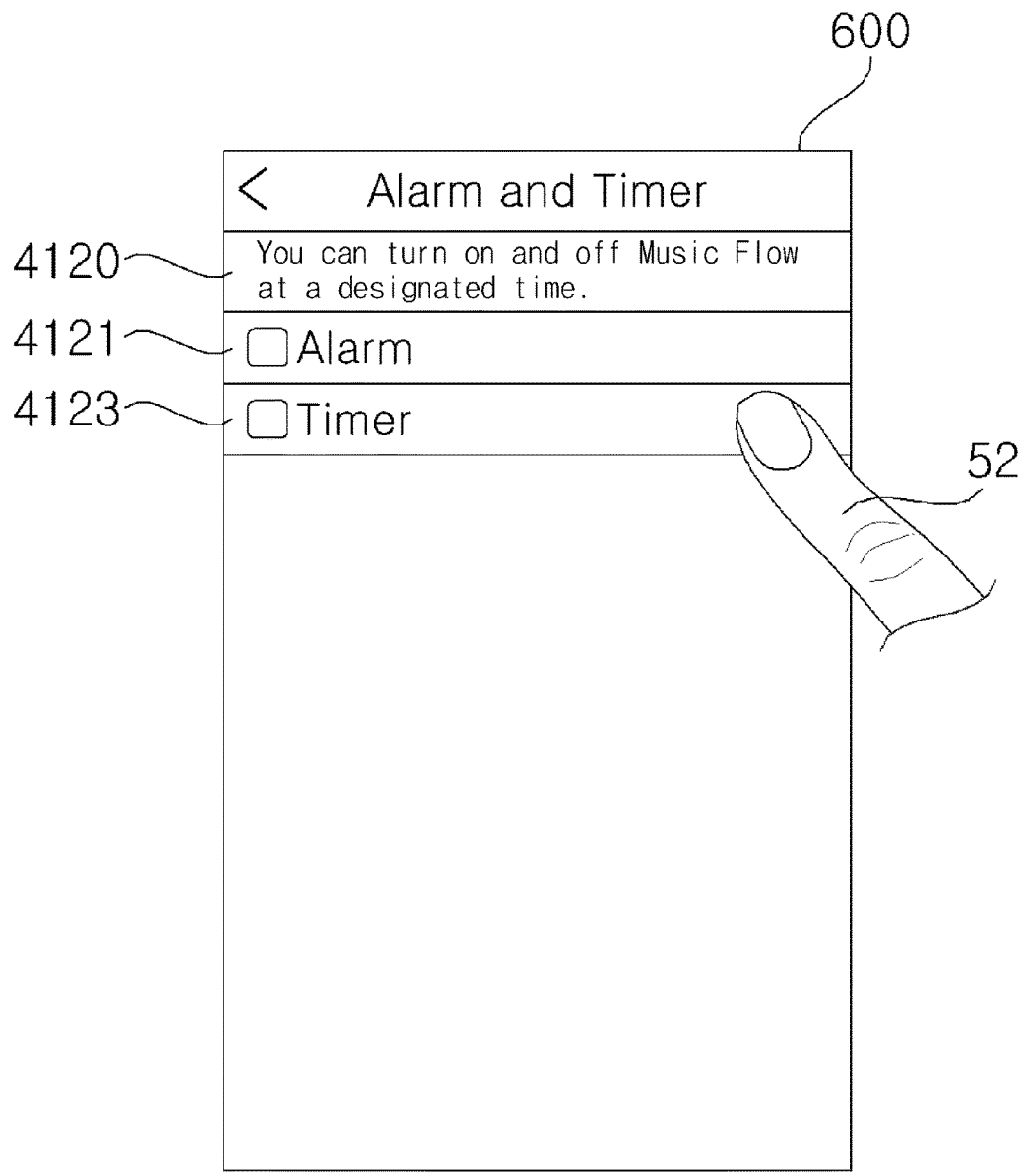

First, FIG. 45A illustrates displaying an alarm timer screen 4120 including an alarm item 4121 and a timer item 4123.

Figure 45B:
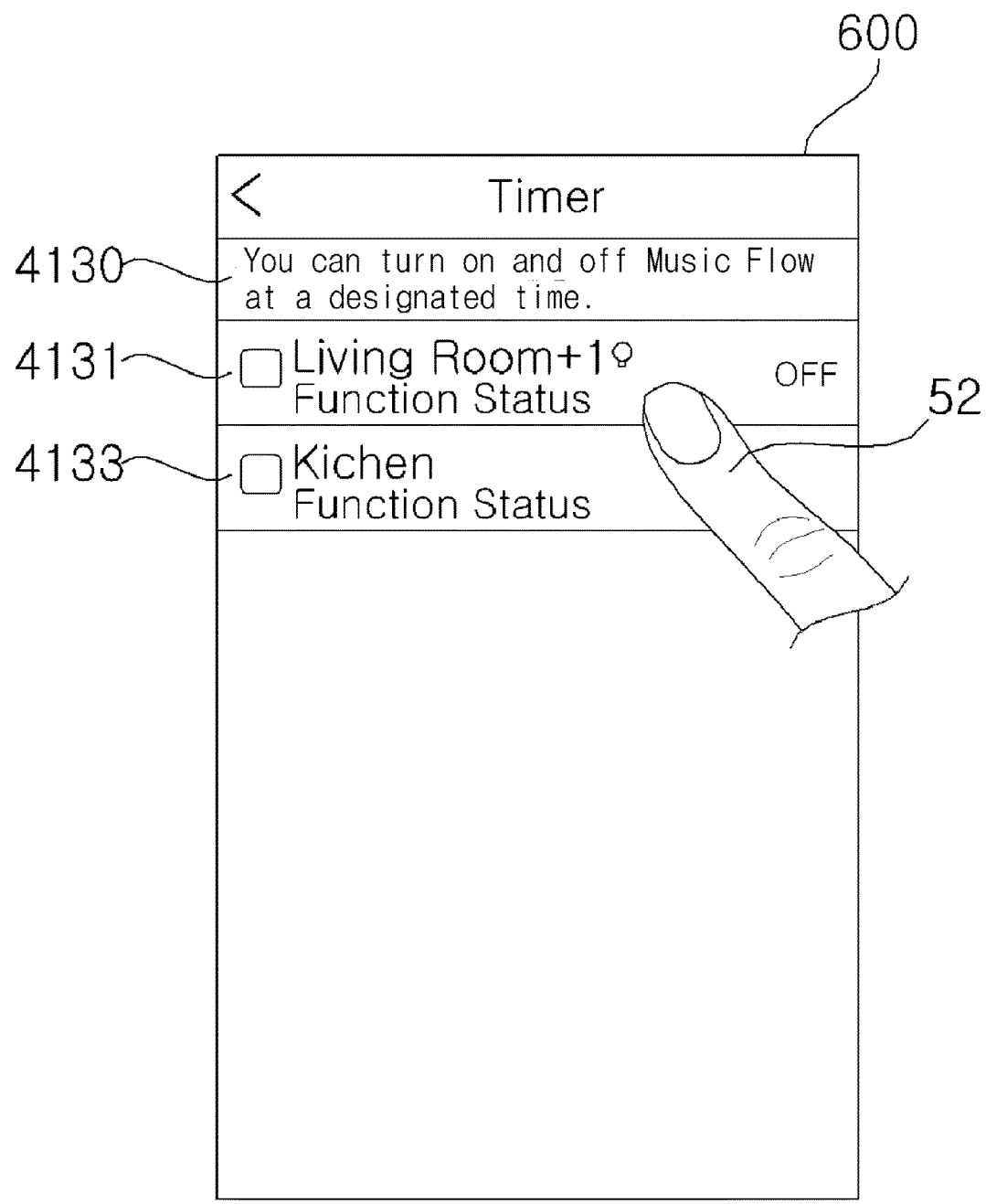
Figure 45C:
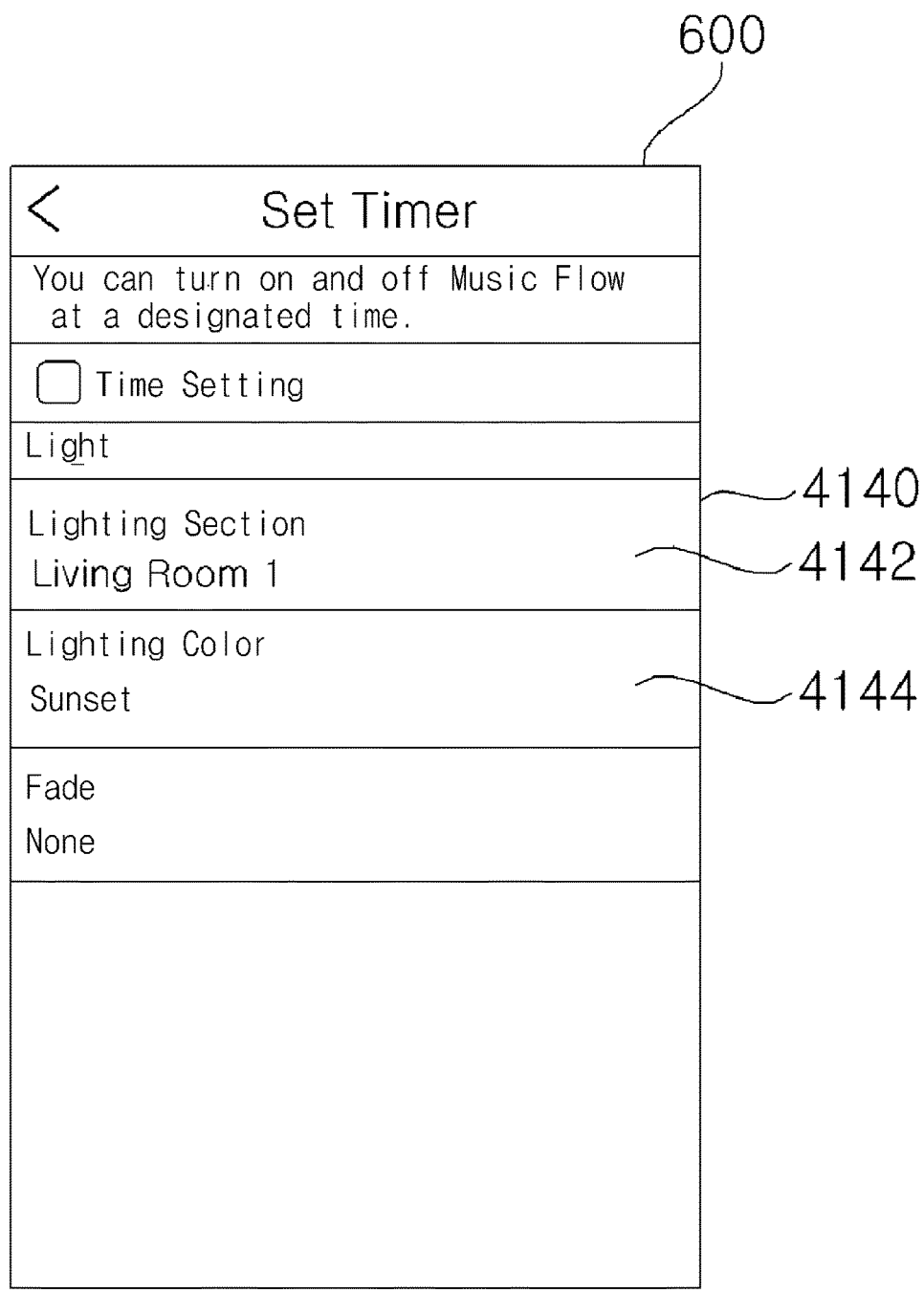

When the timer item 4123 is selected on the alarm timer screen 4120, the controller 680 of the mobile terminal 600 may control a timer setting screen 4130 to be displayed as shown in FIG. 45B.

The timer setting screen 4130 may include a plurality of lighting device items 4131 and 4133. When the first lighting device item 4131 is selected, the controller 680 of the mobile terminal 600 may control a related menu screen 4140, which includes a lighting color item 4144, a lighting selection item 4142 and a time setting item for the first lighting device, to be displayed.

Figure 46A:
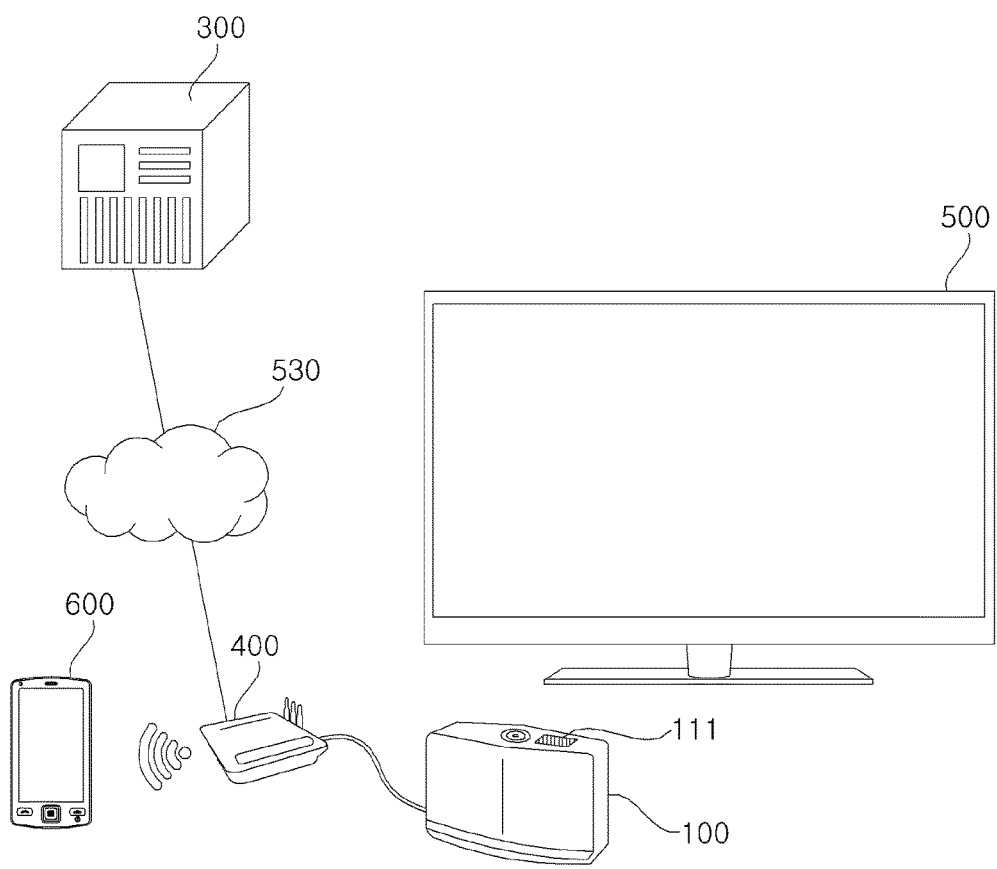
FIG. 46A is a configuration diagram illustrating an audio output system according to another embodiment of the present invention.

FIG. 46A is a configuration diagram illustrating an audio output system according to another embodiment of the present invention.

The audio output system 30 of FIG. 46A is similar to the audio output system 10 of FIG. 1, except that the first communication module 111 can be detached from or attached to the audio output device 100, rather than being provided in the audio output device.

In the figure, it is illustrated that the first communication module 111 capable of performing Bluetooth communication is attached to the top of the audio output device 100.

The first communication module 111 may output a repeated wireless signal to the outside as described above.

Figure 46B:
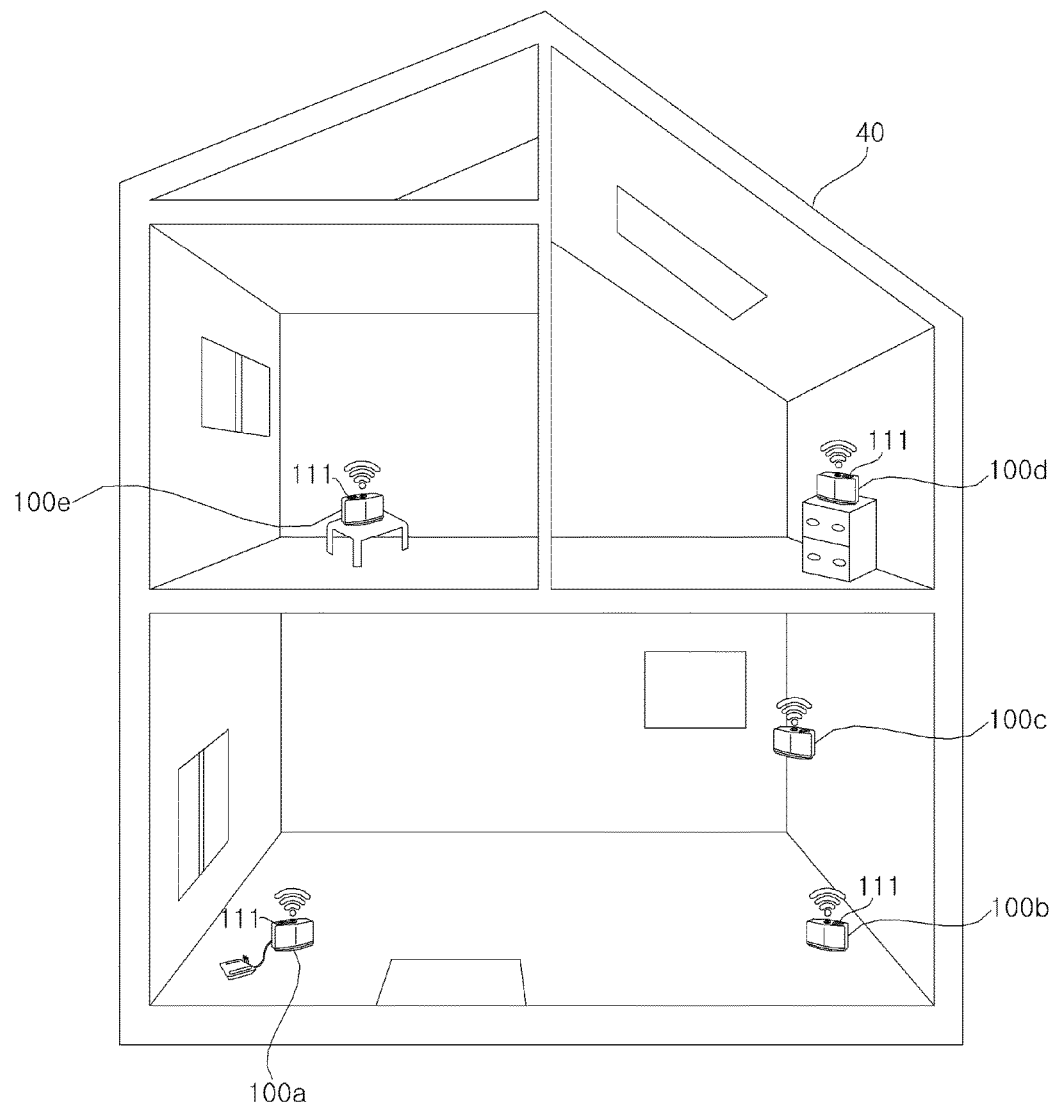
FIG. 46B illustrates an example of deployment of the first detachable communication module of FIG. 46A.

FIG. 46B illustrates an example of deployment of the first detachable communication module of FIG. 46A.

The first communication module of FIG. 46B may be attached to the top of the audio output devices 100a to 100e.

Figure 47:
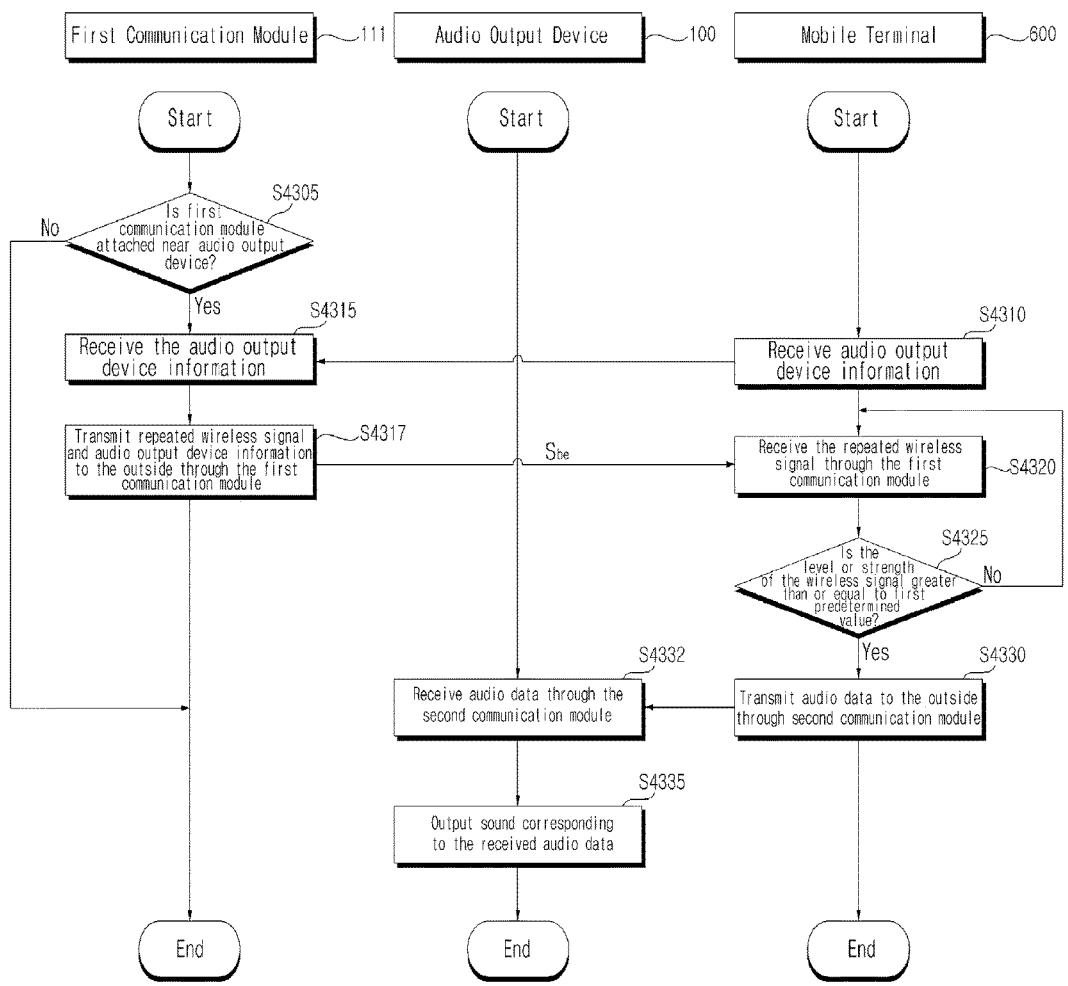
FIG. 47 is an exemplary internal block diagram illustrating the audio output device of FIG. 46A.

FIG. 47 is an exemplary internal block diagram illustrating the audio output device of FIG. 46A.

The internal block diagram of the audio output device of FIG. 47 is similar to the internal block of FIG. 3.

In this example, the first communication module 111 is not provided in the communication unit 110, but is provided separately. The internal block diagram of the first communication module 111 may be the same as that of FIG. 4.

Figure 48:
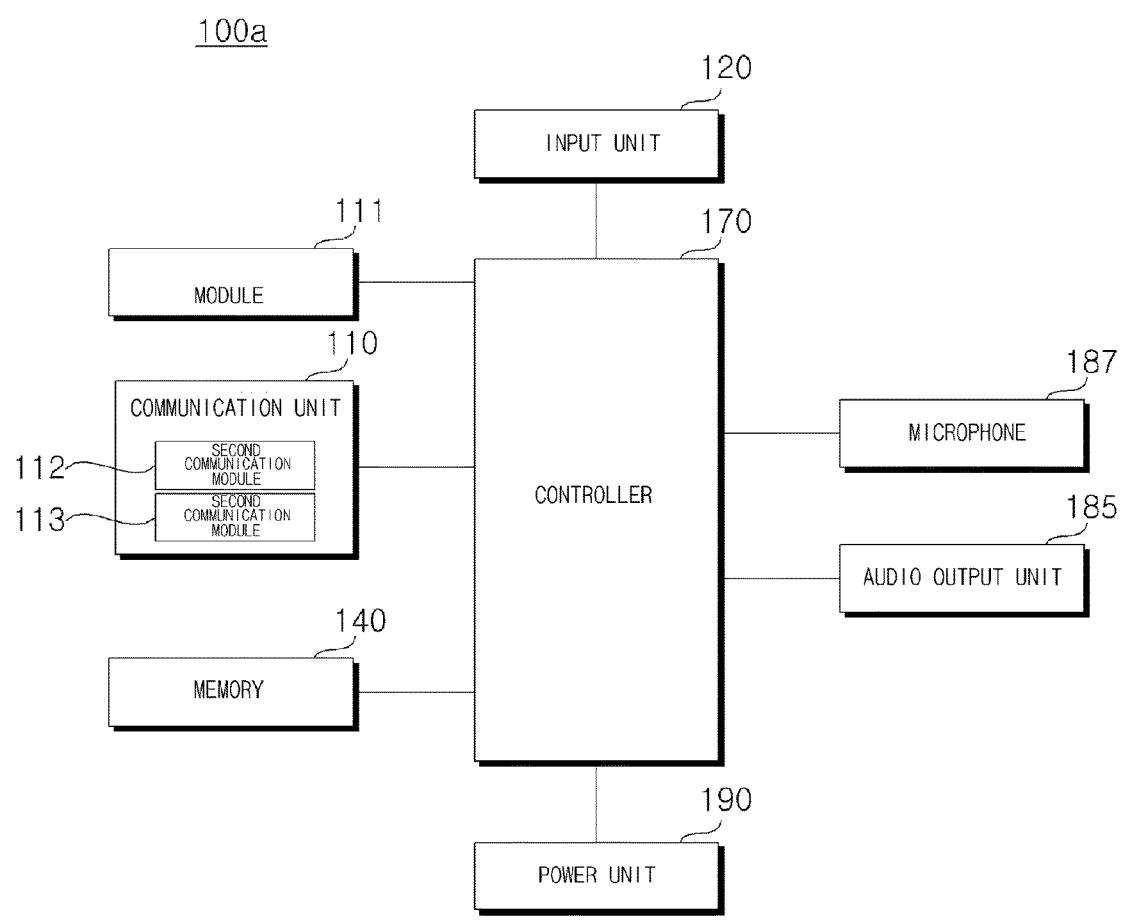
FIG. 48 is a flowchart illustrating an exemplary operation of an audio output system according to another embodiment of the present invention.

FIG. 48 is a flowchart illustrating an exemplary operation of an audio output system according to another embodiment of the present invention, and FIGS. 49A to 49D illustrate operation of the audio output system of FIG. 48.

First, it is determined whether the first communication module 111 is attached to the periphery of the audio output device (S4305). If so, information on the audio output device is received from the mobile terminal 600 (S4315).

That is, the mobile terminal 600 may transmit information on the audio output device to the first communication module 111 (S4310).

If the first communication module 111 is attached to the periphery of the audio output device 100, the controller 680 of the mobile terminal 600 may transmit the device information about the audio output device 100 to the first communication module 111 through a first communication module 615a according to user setting.

Next, the first communication module 111 may transmit the repeated wireless signal and the device information on the audio output device 100 to the outside (S4317).

The mobile terminal 600 may receive the repeated wireless signal and the device information on the audio output device 100 (S4320). The repeated wireless signal may be a beacon signal.

Then, the controller 680 of the mobile terminal 600 may determine whether the RSSI of the received beacon signal is greater than or equal to a first predetermined value (S4325). If so, the controller may control the audio data being reproduced to be transmitted to the outside through a second communication module 615b (S4330).

Then, the audio output device 100 receives the audio data through the second communication module 112 in the communication unit 110 (S4332).

Then, the controller 170 of the audio output device 100 performs a control operation to output sound corresponding to the received audio data (S4335).

Figure 49A:
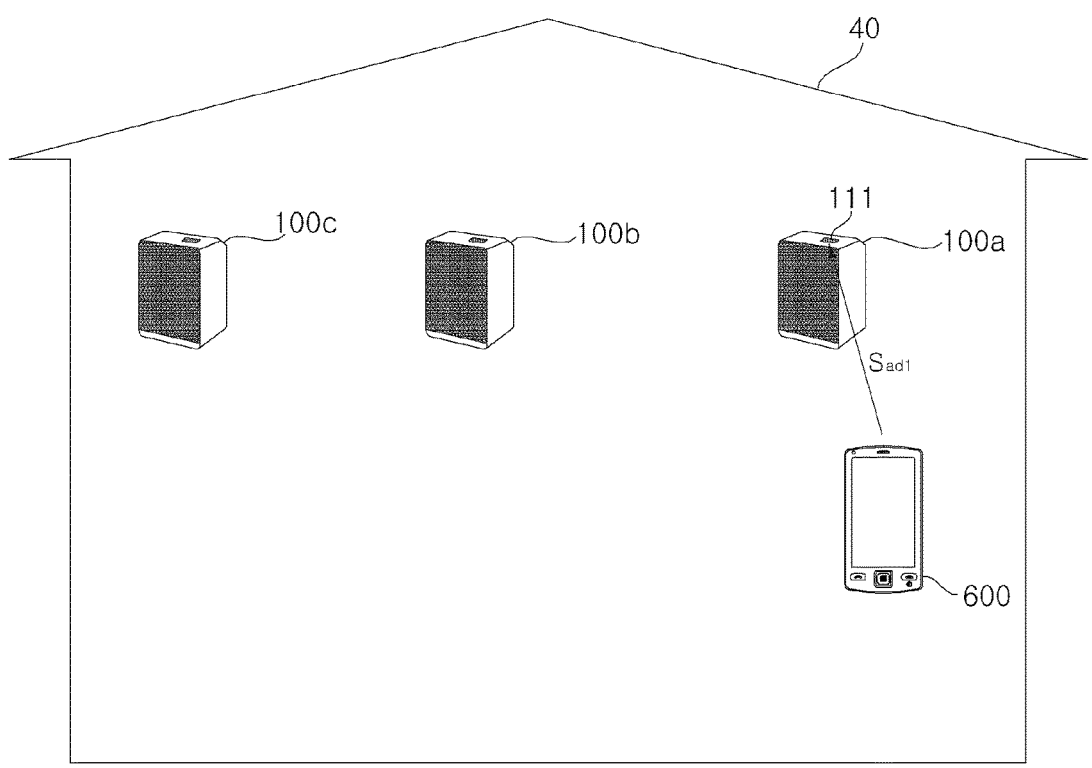
FIGS. 49A to 49D illustrate operation of the audio output system of FIG. 48.

FIG. 49A illustrates a case where the first communication module 111 is attached to the periphery of the first audio output device 100a among the plurality of audio output devices 100, 100b, and 100c in a house 400.

The mobile terminal 600 may transmit device information Sad1 on the first audio output device 100a to which the first communication module 111 is attached, as shown in FIG. 49A.

Figure 49B:
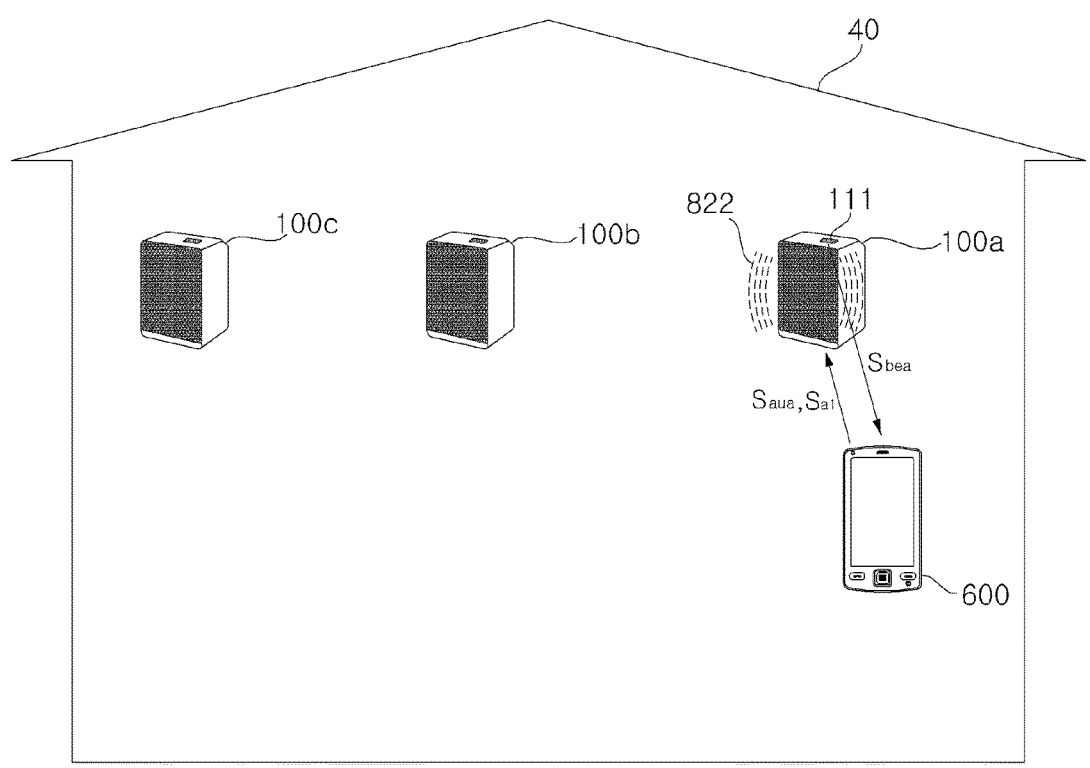

The first communication module 111 may output a repeated beacon signal Sbea as shown in FIG. 49B. If the RSSI of the received beacon signal Sbea is greater than or equal to a first predetermined value, the controller 680 of the mobile terminal 600 may output audio data Saua being reproduced and the information Sa1 on the first audio output device 100a.

The second communication module 112 of the first audio output device 100a may receive the audio data Saua being reproduced and the information Sa1 on the first audio output device 100a, and the controller 170 of the first audio output device 100a may control the sound 822 corresponding to the received audio data Saua to be output.

The memory 140 of the first audio output device 100a may store the received device information Sad1 on the first audio output device 100a or the information Sa1 on the first audio output device 100a.

Figure 49C:
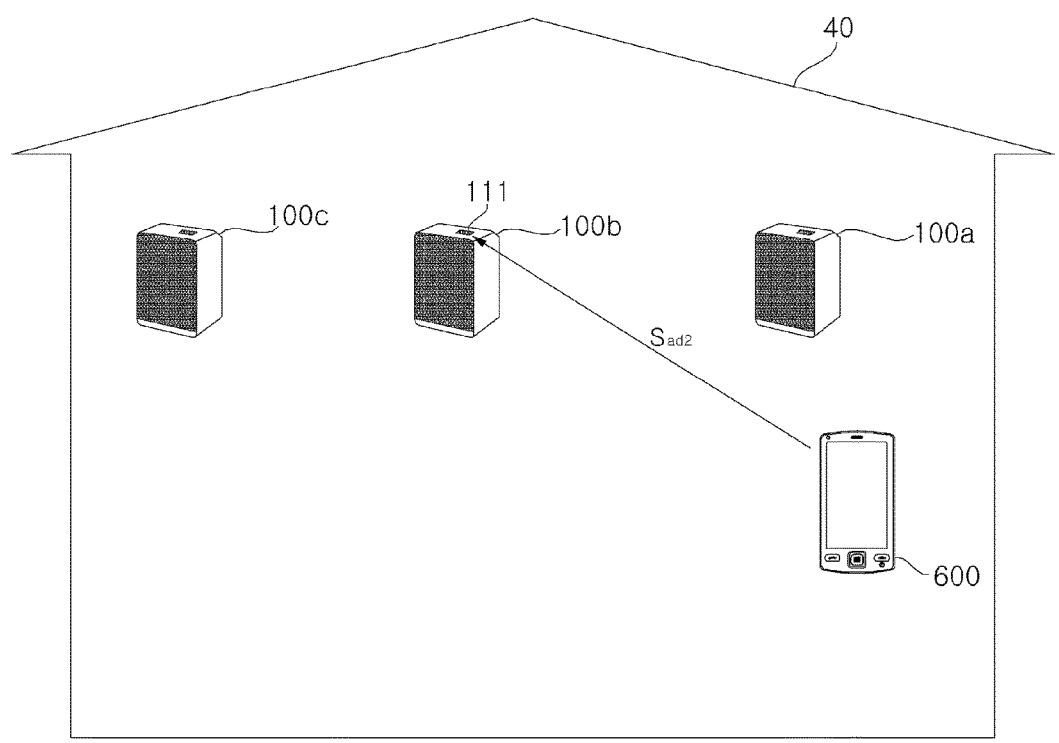

FIG. 49C illustrates that the first communication module 111 is detached in the vicinity of the first audio output device 100a and attached to the second audio output device 100b.

The mobile terminal 600 may transmit device information Sad2 on the second audio output device 100b to which the first communication module 111 is attached, as shown in FIG. 49C.

Figure 49D:
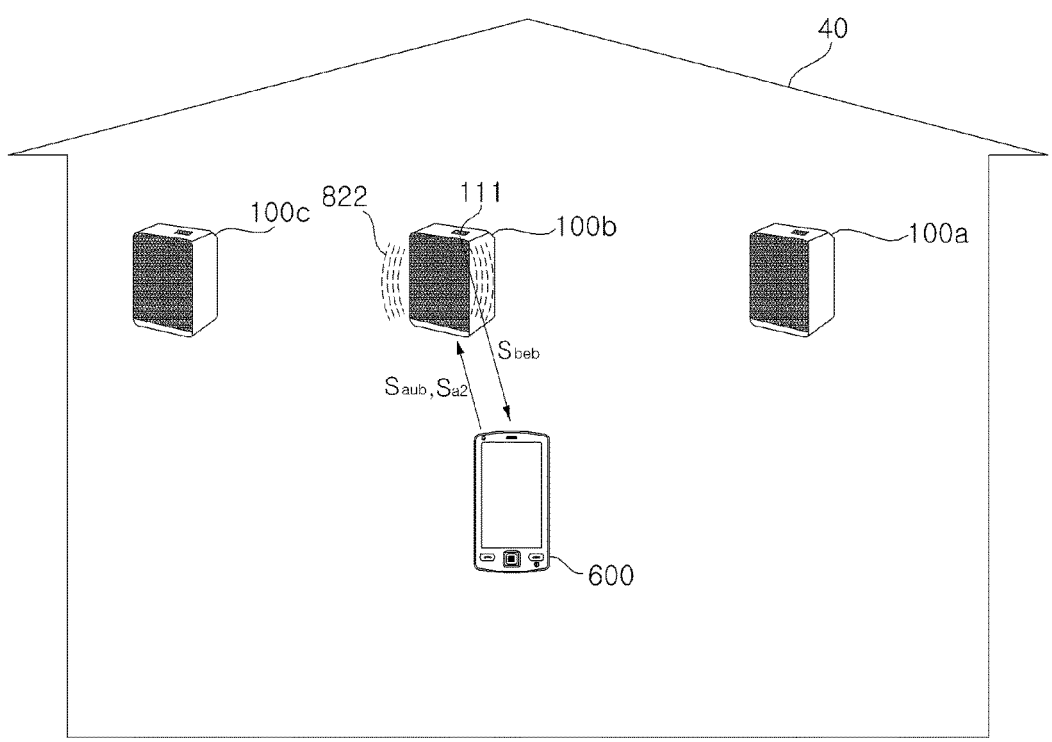

The first communication module 111 may output the repeated beacon signal Sbea as shown in FIG. 49D. If the RSSI of the received beacon signal Sbea is greater than or equal to the first predetermined value, the controller 680 of the mobile terminal 600 may output audio data Saub being reproduced and the information Sa2 on the second audio output device 100b.

The second communication module 112 of the second audio output device 100b may receive the audio data Saub being reproduced and the information Sa2 on the second audio output device 100b, and the controller 170 of the second audio output device 100b may control the sound 822 corresponding to the received audio data Saub to be output.

The memory 140 of the second audio output device 100b may store the received device information Sad2 on the second audio output device 100b or the information Sa2 on the second audio output device 100b.

As described above, using the first communication module 111 which is detachable, sound of the audio data being reproduced may be output through a desired audio output device.

As described above, the first communication module may be a low power based BLE communication module. The first communication module may be detached from or attached to various electronic devices.

The mobile terminal, audio output device, and audio output system including the same according to the present invention are not limited to the configurations and methods of the embodiments described above. Variations may be made to the embodiments described above by selectively combining all or some of the embodiments.

The method of operating the mobile terminal or the audio output device of the present invention may be implemented as a code that may be read by a processor on a processor-readable recording medium included in the mobile terminal or the audio output device. The recording medium readable by the processor includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The variant embodiments should not be individually understood from the spirit or prospect of the present invention.

The invention claimed is:

1. A mobile terminal comprising:
a sensor to sense motion of the mobile terminal;
a memory to store audio data;
a first transceiver to receive a repeated wireless signal from an audio output device;
a second transceiver to output the audio data to the audio output device; and
a controller configured to wirelessly transmit the audio data to the audio output device when a strength or level of the repeated wireless signal is greater than or equal to a first predetermined value,
wherein when the mobile terminal is rotated in a first direction, the controller is configured to control the second transceiver to transmit a first audio data of a first channel for a first audio output device among a plurality of audio output devices based on a first motion information sensed by the sensor, and
wherein when the mobile terminal is rotated in a second direction, the controller is configured to control the second transceiver to transmit a second audio data of a second channel for a second audio output device among the plurality of audio output devices based on a second motion information sensed by the sensor.

2. The mobile terminal according to claim 1, wherein the controller is further configured to perform a control operation to stop reproduction of the audio data during the wireless transmission to the audio output device.

3. The mobile terminal according to claim 1, wherein, the repeated wireless signal is periodically repeated.

4. The mobile terminal according to claim 1, wherein, after the audio data is transmitted, the controller is further configured to not calculate the strength or level of the repeated wireless signal, or
further configured to control the audio data not to be transmitted to the audio output device only when the strength or level of the repeated wireless signal is less than or equal to a second predetermined value, the second predetermined value being less than or equal to the first predetermined value.

5. The mobile terminal according to claim 4, wherein, when the strength or level of the repeated wireless signal is greater than the second predetermined value, the controller is further configured to control the audio data to be continuously transmitted to the audio output device.

6. The mobile terminal according to claim 1, wherein, when the strength or level of the repeated wireless signal is greater than or equal to the first predetermined value, the controller is further configured to control audio data of a first volume to be transmitted,
wherein, when the strength or level of the repeated wireless signal is greater than or equal to a second predetermined value less than the first predetermined value after the audio data is transmitted, the controller is further configured to control the audio data of a second volume larger than the first volume to be transmitted.

7. The mobile terminal according to claim 1, wherein the controller is further configured to receive a plurality of repeated wireless signals, and
controls the audio data being reproduced to be transmitted to an audio output device corresponding to a wireless signal having a highest strength or level among the received wireless signals.

8. The mobile terminal according to claim 1, wherein the controller is further configured to receive a plurality of repeated wireless signals, and
further configured to control the audio data being reproduced to be transmitted to an audio output device corresponding to a wireless signal having a strength or level greater than or equal to the first predetermined value among the received wireless signals.

9. The mobile terminal according to claim 1, wherein the controller is further configured to control the same audio data to be transmitted to a plurality of audio output devices such that the same sound is output from the plurality of audio output devices.

10. The mobile terminal according to claim 1, wherein the controller is further configured to control audio data of different channels to be transmitted to a plurality of audio output devices.

11. The mobile terminal according to claim 1, wherein when strengths or levels of sequentially received different wireless signals are greater than or equal to the first predetermined value within a predetermined time, the controller is further configured to control the same audio data to be transmitted to a plurality of audio output devices having transmitted the different wireless signals.

12. The mobile terminal according to claim 1, wherein the controller is further configured to perform main setting or sub setting or perform channel setting for a plurality of audio output devices based on the strength or level of the received wireless signal.

13. The mobile terminal according to claim 1, wherein the controller is further configured to perform channel setting for a first audio output device among a plurality of audio output devices, based on a drag and drop input for an object for channel setting displayed on a screen.

14. The mobile terminal according to claim 1, wherein a bandwidth of a wireless signal in the first transceiver is narrower than a bandwidth of a wireless signal of the second transceiver.

15. An audio output system comprising:
a mobile terminal to receive a repeated wireless signal and to wirelessly transmit audio data to the audio output device during reproduction of the audio data when a strength or level of the repeated wireless signal is greater than or equal to a first predetermined value; and
an audio output device to output the repeated wireless signal and to output, when receiving audio data from the mobile terminal, sound corresponding to the received audio data,
wherein the mobile terminal comprises:
a sensor to sense motion of the mobile terminal;
a first transceiver to receive the repeated wireless signal; and
a second transceiver to output the audio data to the audio output device,
wherein when the mobile terminal is rotated in a first direction, the mobile terminal transmits a first audio data of a first channel for a first audio output device among a plurality of audio output devices based on a first motion information sensed by the sensor, and
wherein when the mobile terminal is rotated in a second direction, the mobile terminal transmits a second audio data of a second channel for a second audio output device among the plurality of audio output devices based on a second motion information sensed by the sensor.

* * * * *